United States Patent
Wojciechowski

(10) Patent No.: US 10,835,926 B2
(45) Date of Patent: Nov. 17, 2020

(54) INJECTION MOLDED SCREENING APPARATUSES AND METHODS

(71) Applicant: Derrick Corporation, Buffalo, NY (US)

(72) Inventor: Keith Wojciechowski, Lakeview, NY (US)

(73) Assignee: Derrick Corporation, Buffalo, NY (US)

(*) Notice: Subject to any disclaimer, the term of this patent is extended or adjusted under 35 U.S.C. 154(b) by 100 days.

(21) Appl. No.: 16/269,646

(22) Filed: Feb. 7, 2019

(65) Prior Publication Data

US 2019/0168261 A1   Jun. 6, 2019

Related U.S. Application Data

(60) Continuation of application No. 15/965,195, filed on Apr. 27, 2018, now Pat. No. 10,576,502, which is a
(Continued)

(51) Int. Cl.
*B07B 1/46* (2006.01)
*B29C 45/00* (2006.01)
(Continued)

(52) U.S. Cl.
CPC .......... *B07B 1/4618* (2013.01); *B01D 29/012* (2013.01); *B07B 1/46* (2013.01);
(Continued)

(58) Field of Classification Search
CPC ....... B07B 1/46; B07B 1/4618; B07B 1/4609; B07B 1/4645; B07B 1/4663;
(Continued)

(56) References Cited

U.S. PATENT DOCUMENTS 3,377,322 A   4/1968   Kenneth
3,390,771 A   7/1968   Wehner
(Continued)

FOREIGN PATENT DOCUMENTS

CA   1293223 C   12/1991
CA   2269314 A1   10/2000
(Continued)

OTHER PUBLICATIONS

Multotec, "Injection Moulded Polywedge Screen Panels", (Rev. 4), www.multotec.com.
(Continued)

*Primary Examiner* — Terrell H Matthews
(74) *Attorney, Agent, or Firm* — Jason P. Mueller; FisherBroyles, LLP

(57) ABSTRACT

Screening members, screening assemblies, methods for fabricating screening members and assemblies and methods for screening materials are provided for vibratory screening machines that incorporate the use of injection molded materials. Use of injection molded screen elements provide, inter alia, for: varying screening surface configurations; fast and relatively simple screen assembly fabrication; and a combination of outstanding screen assembly mechanical and electrical properties, including toughness, wear and chemical resistance. Embodiments of the present invention use a thermoplastic injection molded material.

30 Claims, 107 Drawing Sheets

Related U.S. Application Data continuation-in-part of application No. 15/851,099, filed on Dec. 21, 2017, now Pat. No. 10,259,013, which is a division of application No. 15/201,865, filed on Jul. 5, 2016, now Pat. No. 9,884,344, which is a continuation of application No. 14/268,101, filed on May 2, 2014, now Pat. No. 9,409,209, which is a continuation-in-part of application No. 13/800,826, filed on Mar. 13, 2013, now Pat. No. 10,046,363.

(60) Provisional application No. 62/648,771, filed on Mar. 27, 2018, provisional application No. 61/714,882, filed on Oct. 17, 2012, provisional application No. 61/652,039, filed on May 25, 2012.

(51) Int. Cl.

| | | |
|---|---|---|
| *B01D 29/01* | (2006.01) | |
| *B29C 65/16* | (2006.01) | |
| *B29D 28/00* | (2006.01) | |
| *B29K 75/00* | (2006.01) | |
| *B07B 1/48* | (2006.01) | |

(52) U.S. Cl.
CPC ............ *B07B 1/4609* (2013.01); *B07B 1/469* (2013.01); *B07B 1/4645* (2013.01); *B07B 1/4654* (2013.01); *B07B 1/4663* (2013.01); *B29C 45/0001* (2013.01); *B29C 65/16* (2013.01); *B29D 28/00* (2013.01); *B07B 1/48* (2013.01); *B29K 2075/00* (2013.01)

(58) Field of Classification Search
CPC . B07B 1/4654; B01D 29/012; B29C 45/0001; B29C 65/16
USPC ....................................................... 209/276
See application file for complete search history.

(56) References Cited

U.S. PATENT DOCUMENTS

| | | | |
|---|---|---|---|
| 3,401,800 A | 9/1968 | Stock | |
| 3,713,541 A | 1/1973 | Nelson | |
| 4,028,230 A | 6/1977 | Rosenblum | |
| 4,100,248 A | 7/1978 | Adams | |
| 4,141,821 A | 2/1979 | Wolff | |
| 4,188,208 A | 2/1980 | Guay | |
| 4,190,527 A | 2/1980 | Spiller | |
| 4,222,865 A | 9/1980 | Valera et al. | |
| 4,265,742 A | 5/1981 | Buecker et al. | |
| 4,383,919 A | 5/1983 | Schmidt | |
| 4,452,656 A * | 6/1984 | Benson ................ B07B 1/4618 156/174 |
| 4,526,682 A | 7/1985 | Wallace | |
| 4,569,761 A | 2/1986 | Spiewok et al. | |
| 4,674,251 A | 6/1987 | Wolff | |
| 4,819,809 A | 4/1989 | Derrick | |
| 4,857,176 A | 8/1989 | Derrick et al. | |
| 4,885,040 A | 12/1989 | Wolff | |
| 4,932,112 A | 6/1990 | Tikkanen | |
| 4,986,900 A | 1/1991 | Mason | |
| 5,149,739 A | 9/1992 | Lee | |
| 5,238,117 A | 8/1993 | Hunter | |
| 5,282,538 A | 2/1994 | Moys | |
| 5,332,101 A | 7/1994 | Bakula | |
| 5,372,261 A | 12/1994 | Galton et al. | |
| 5,378,364 A | 1/1995 | Welling | |
| 5,385,669 A | 1/1995 | Leone, Sr. | |
| 5,472,096 A | 12/1995 | Prinsloo | |
| 5,558,042 A * | 9/1996 | Bradley ................ A01K 63/045 119/226 |
| 5,575,618 A | 11/1996 | Brandon et al. | |
| 5,626,234 A | 5/1997 | Cook et al. | |
| 5,672,267 A | 9/1997 | Terblanche | |
| 5,816,413 A | 10/1998 | Boccabella et al. | |
| 5,868,260 A | 2/1999 | Bosman et al. | |
| 5,876,552 A | 3/1999 | Bakula | |
| 5,971,159 A | 10/1999 | Leone et al. | |
| 6,033,564 A | 3/2000 | Kirker et al. | |
| 6,092,667 A | 7/2000 | Steinmuller et al. | |
| 6,253,926 B1 | 7/2001 | Woodgate | |
| 6,267,246 B1 | 7/2001 | Russell et al. | |
| 6,318,565 B1 | 11/2001 | Diemer et al. | |
| 6,461,499 B1 | 10/2002 | Bosman | |
| 6,530,484 B1 | 3/2003 | Bosman | |
| 6,564,947 B2 * | 5/2003 | Bakula ................ B01D 29/012 209/315 |
| 6,565,698 B1 | 5/2003 | Adams et al. | |
| 6,669,027 B1 | 12/2003 | Mooney et al. | |
| 6,715,613 B2 | 4/2004 | Eeles et al. | |
| 6,759,000 B2 | 7/2004 | Cook et al. | |
| 6,820,748 B2 | 11/2004 | Fallon | |
| 6,915,910 B2 | 7/2005 | Lutz et al. | |
| 7,000,777 B2 | 2/2006 | Adams et al. | |
| 7,063,214 B2 | 6/2006 | Schulte, Jr. et al. | |
| 7,090,083 B2 | 8/2006 | Russell et al. | |
| 7,216,768 B2 | 5/2007 | Fisher et al. | |
| 7,228,971 B2 | 6/2007 | Mooney et al. | |
| 7,389,882 B2 | 6/2008 | Cady et al. | |
| 7,413,087 B2 | 8/2008 | Kriel | |
| 7,467,715 B2 | 12/2008 | Johnson et al. | |
| 7,484,625 B2 | 2/2009 | Scott et al. | |
| 7,578,394 B2 | 8/2009 | Wojciechowski et al. | |
| 7,654,395 B2 | 2/2010 | Johnson et al. | |
| 7,810,649 B2 | 10/2010 | Robertson | |
| 7,819,254 B2 | 10/2010 | Robertson | |
| 7,819,255 B2 | 10/2010 | Cady | |
| 7,909,172 B2 | 3/2011 | Carr | |
| 7,942,353 B2 | 5/2011 | Cerra et al. | |
| 7,959,009 B2 | 6/2011 | Weaver et al. | |
| 7,992,719 B2 | 8/2011 | Carr et al. | |
| 8,025,154 B2 | 9/2011 | Kriel | |
| 8,113,357 B2 | 2/2012 | Johnson et al. | |
| 8,127,932 B2 | 3/2012 | Trench et al. | |
| 8,371,450 B2 | 2/2013 | McGregor et al. | |
| 8,393,474 B2 | 3/2013 | Robertson | |
| 8,408,397 B2 | 4/2013 | Cady | |
| 8,439,203 B2 | 5/2013 | Wojciechowski et al. | |
| 8,443,984 B2 | 5/2013 | Wojciechowski et al. | |
| 8,544,655 B2 | 10/2013 | Trench et al. | |
| 8,584,866 B2 | 11/2013 | Lipa et al. | |
| 8,596,464 B2 | 12/2013 | Robertson | |
| 8,827,545 B2 | 9/2014 | Kalidindi | |
| 9,010,539 B2 | 4/2015 | Lipa et al. | |
| 9,050,607 B2 | 6/2015 | Heley et al. | |
| 9,056,335 B2 | 6/2015 | Wojciechowski et al. | |
| 9,149,841 B2 | 10/2015 | Ghosh | |
| 9,156,061 B2 | 10/2015 | Robertson | |
| 9,180,493 B2 | 11/2015 | Dahl | |
| 9,327,318 B2 | 5/2016 | Paul et al. | |
| 9,375,756 B2 | 6/2016 | Lipa et al. | |
| 9,403,192 B2 | 8/2016 | Lipa et al. | |
| 9,409,209 B2 | 8/2016 | Wojciechowski | |
| 9,610,614 B2 | 4/2017 | Woodgate et al. | |
| 9,884,344 B2 | 2/2018 | Wojciechowski | |
| 9,908,150 B2 | 3/2018 | Lipa et al. | |
| 10,046,363 B2 | 8/2018 | Wojciechowski | |
| 10,086,408 B2 | 10/2018 | Cady et al. | |
| 2002/0033358 A1 | 3/2002 | Bakula | |
| 2002/0112998 A1 | 8/2002 | Bosman | |
| 2004/0211707 A1 | 10/2004 | Lipa | |
| 2005/0133465 A1 | 6/2005 | Derrick et al. | |
| 2005/0183991 A1 | 8/2005 | Kriel | |
| 2005/0274653 A1 | 12/2005 | LaVeine et al. | |
| 2007/0151920 A1 | 7/2007 | Kay | |
| 2007/0187302 A1 | 8/2007 | Parra Huerta | |
| 2007/0187303 A1 | 8/2007 | Fisher et al. | |
| 2007/0195143 A1 * | 8/2007 | Andrews ................ B41J 2/17563 347/93 |
| 2008/0078703 A1 | 4/2008 | Robertson | |
| 2008/0121568 A1 | 5/2008 | McGregor et al. | |
| 2009/0139909 A1 | 6/2009 | Robertson | |
| 2009/0166268 A1 | 7/2009 | Malmberg | |

(56) References Cited

U.S. PATENT DOCUMENTS

| | | |
|---|---|---|
| 2009/0301945 A1 | 12/2009 | Trench et al. |
| 2009/0321328 A1 | 12/2009 | Wodjciechowski et al. |
| 2010/0270215 A1 | 10/2010 | Robertson et al. |
| 2010/0276343 A1 | 11/2010 | Hukki |
| 2011/0094950 A1 | 4/2011 | Dahl |
| 2011/0139688 A1 | 6/2011 | Carr et al. |
| 2011/0155653 A1 | 6/2011 | Robertson et al. |
| 2012/0006735 A1 | 1/2012 | Ralph |
| 2012/0080362 A1 | 4/2012 | Trench et al. |
| 2013/0168387 A1 | 7/2013 | Carvajal et al. |
| 2013/0277281 A1* | 10/2013 | McClung, III ............ B07B 1/46 209/346 |
| 2013/0277282 A1 | 10/2013 | Lipa et al. |
| 2013/0313168 A1 | 11/2013 | Wojciechowski |
| 2014/0262978 A1 | 9/2014 | Wojciechowski |
| 2014/0327171 A1* | 11/2014 | Thierry .................... B29B 9/16 264/141 |
| 2014/0342110 A1 | 11/2014 | Zhu et al. |
| 2015/0197827 A1 | 7/2015 | Perkins et al. |
| 2015/0239014 A1 | 8/2015 | Lipa et al. |
| 2015/0283583 A1 | 10/2015 | Woodgate et al. |
| 2016/0101377 A1 | 4/2016 | Cady et al. |
| 2016/0303611 A1 | 10/2016 | Lipa et al. |
| 2018/0185880 A1 | 7/2018 | Wojciechowski |
| 2018/0243797 A1 | 8/2018 | Wojciechowski |
| 2018/0312667 A1* | 11/2018 | Colgrove ............... C08G 18/10 |
| 2018/0345319 A1 | 12/2018 | Colgrove et al. |
| 2019/0076881 A1 | 3/2019 | Colgrove et al. |
| 2019/0329293 A1 | 10/2019 | Colgrove et al. |

FOREIGN PATENT DOCUMENTS

| | | | |
|---|---|---|---|
| CL | 2015002761 A1 | 11/2016 | |
| CN | 101716573 A * | 6/2010 | ............... B07B 1/46 |
| CN | 201855117 U * | 6/2011 | ............... A47J 31/06 |
| DE | 2924571 A1 | 1/1981 | |
| DE | 3542635 C1 | 2/1987 | |
| DE | 102009010684 A1 | 9/2010 | |
| DE | 102011119344 A1 | 4/2013 | |
| DE | 102014009702 B3 | 8/2015 | |
| EA | 00076997-0001 | 8/2007 | |
| EA | 001153464-0003 | 9/2009 | |
| EA | 201170173 A1 | 6/2011 | |
| EA | 002241158-0002 | 5/2013 | |
| EA | 002303412-0012 | 5/2013 | |
| EA | 002667436-0001 | 3/2015 | |
| EA | 004496263-0002 | 6/2017 | |
| EP | 1205265 A2 | 5/2002 | |
| GB | 2497873 A | 6/2013 | |
| JP | 2008255145 A | 10/2008 | |
| KR | 1020140027283 A | 3/2014 | |
| TW | M258183 U | 3/2005 | |
| TW | M328904 U | 3/2008 | |
| TW | M340860 U | 9/2008 | |
| TW | 200925535 A | 6/2009 | |
| TW | M447274 U | 2/2013 | |
| TW | M459903 U | 8/2013 | |
| TW | M468568 U | 12/2013 | |
| TW | M470701 U | 1/2014 | |
| TW | M481766 U | 7/2014 | |
| TW | M513735 U | 12/2015 | |
| TW | M527789 U | 9/2016 | |
| TW | M529549 U | 10/2016 | |
| TW | M532900 U | 12/2016 | |
| TW | M544259 U | 7/2017 | |
| TW | M556176 U | 3/2018 | |
| WO | 0053343 A1 | 9/2000 | |
| WO | 20010097947 A1 | 12/2001 | |
| WO | 2007079270 A2 | 7/2007 | |
| WO | 2008115673 A1 | 9/2008 | |
| WO | 2008141373 A1 | 11/2008 | |
| WO | 2010066543 A1 | 6/2010 | |
| WO | 20100069970 A1 | 6/2010 | |

OTHER PUBLICATIONS

Multotec, "Injection Moulded TeePee Panels", (Rev. 2), www.multotec.com.

\* cited by examiner

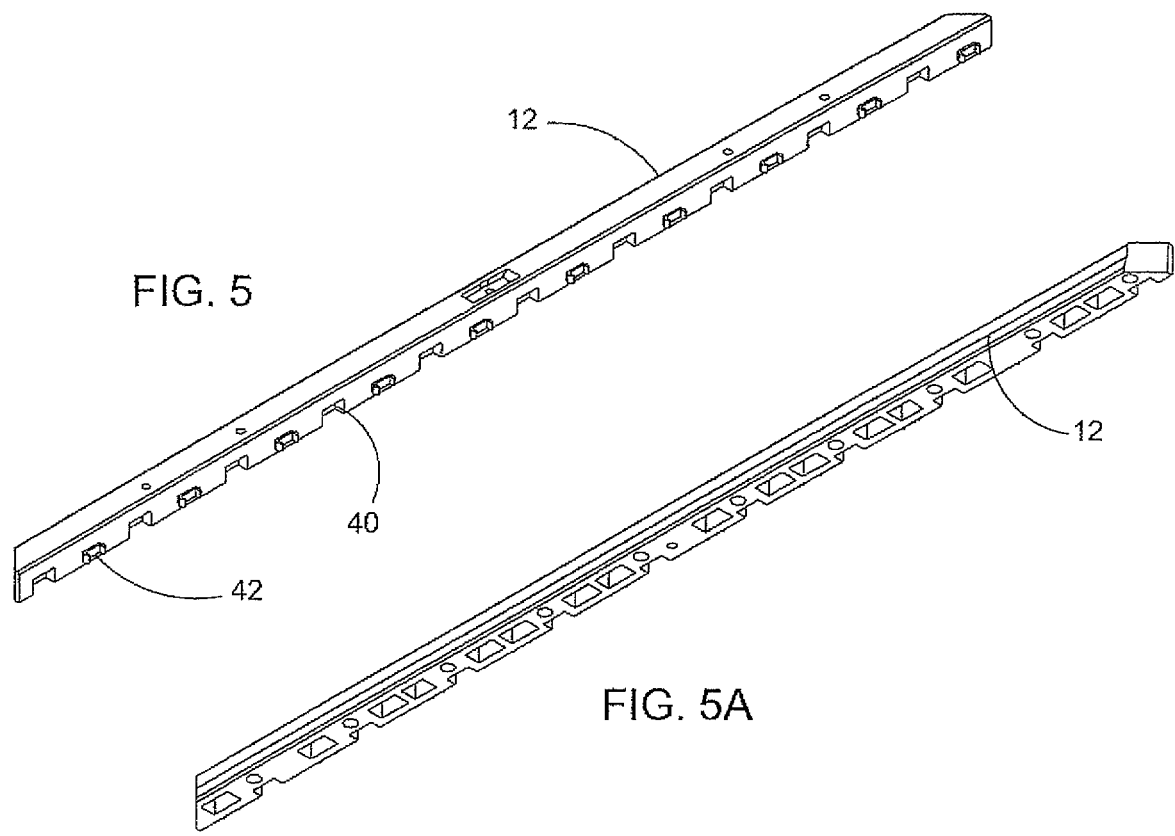

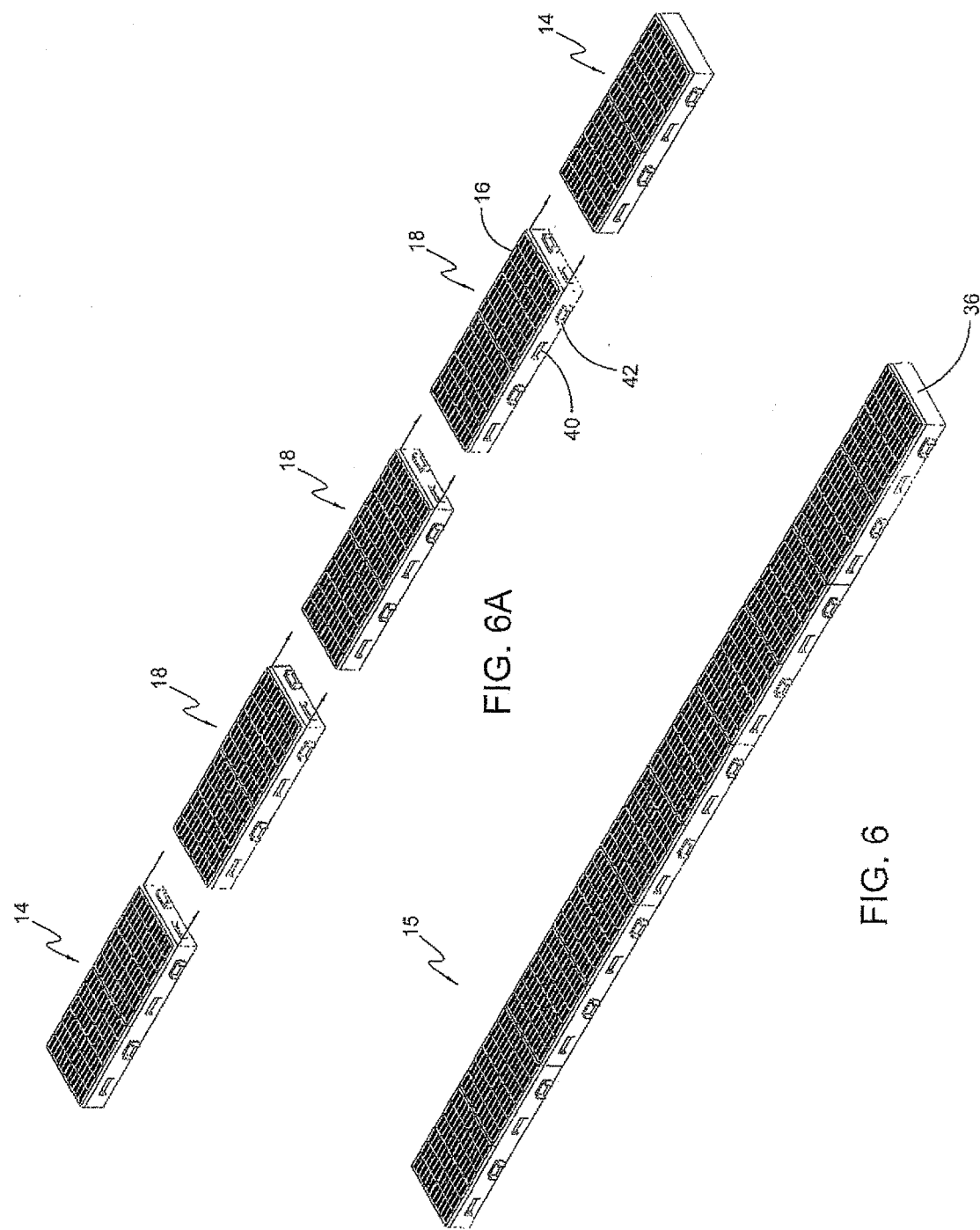

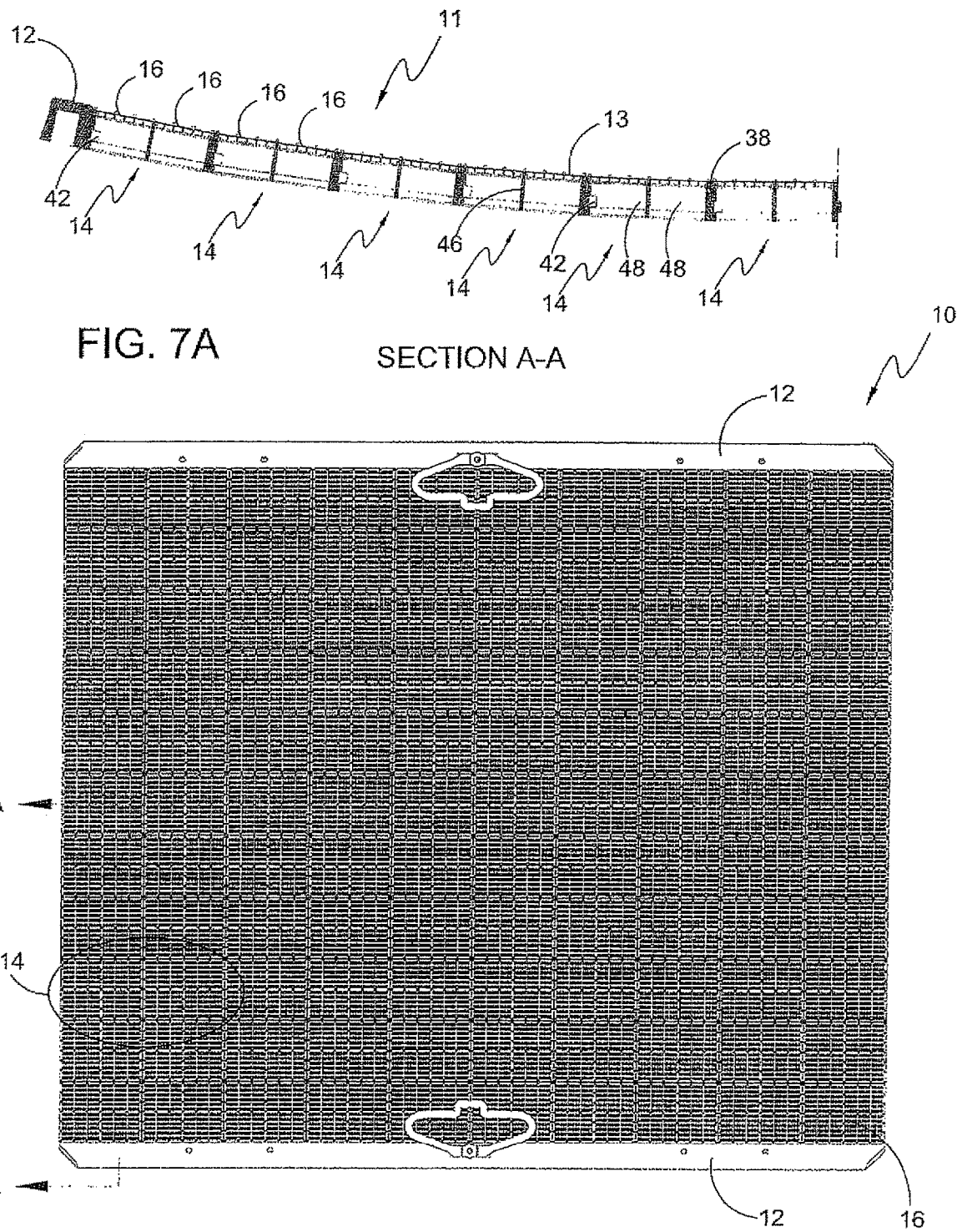

SECTION B-B

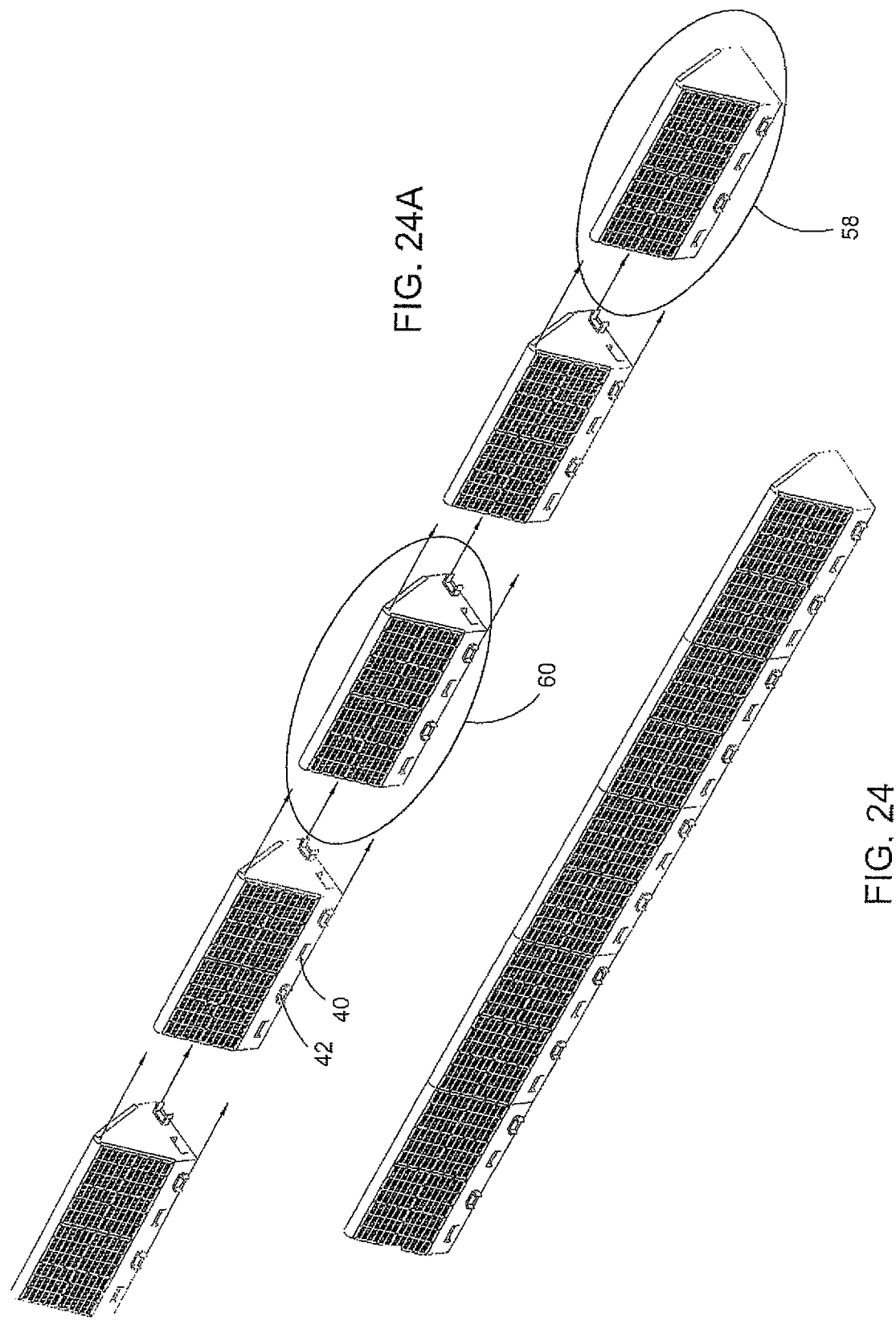

SECTION C-C

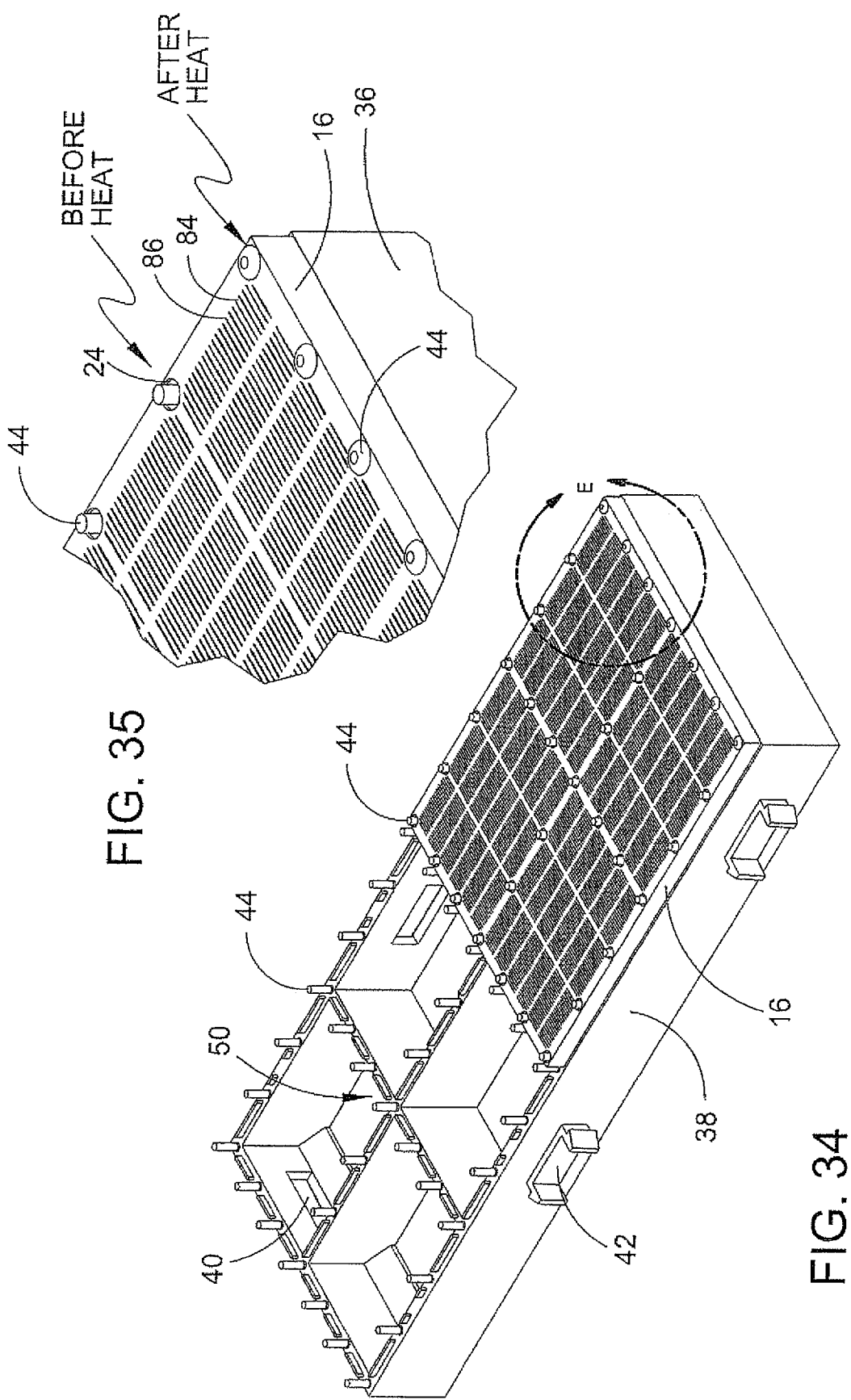

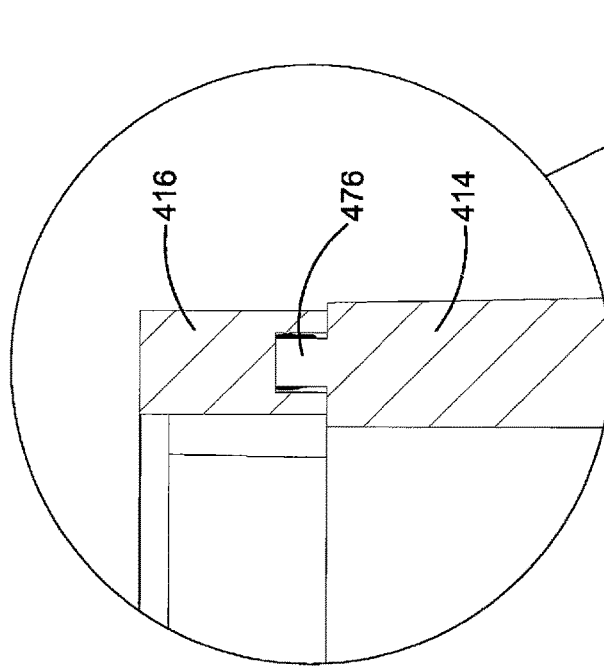
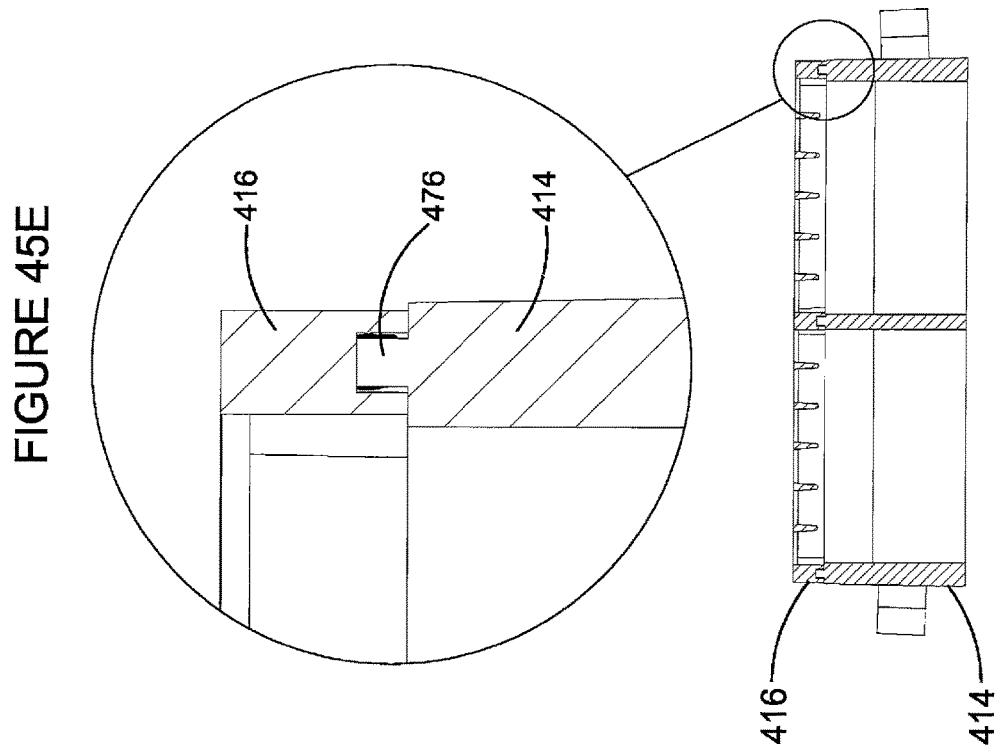
FIGURE 45E
FIGURE 45D
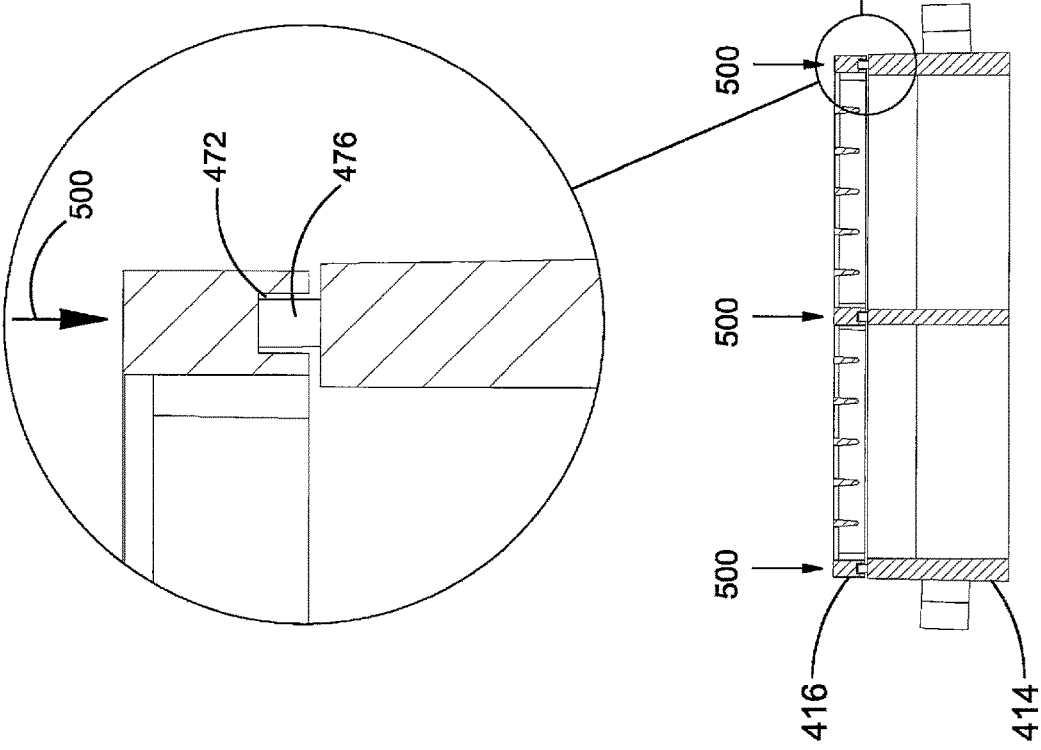
FIGURE 45C
FIGURE 45B

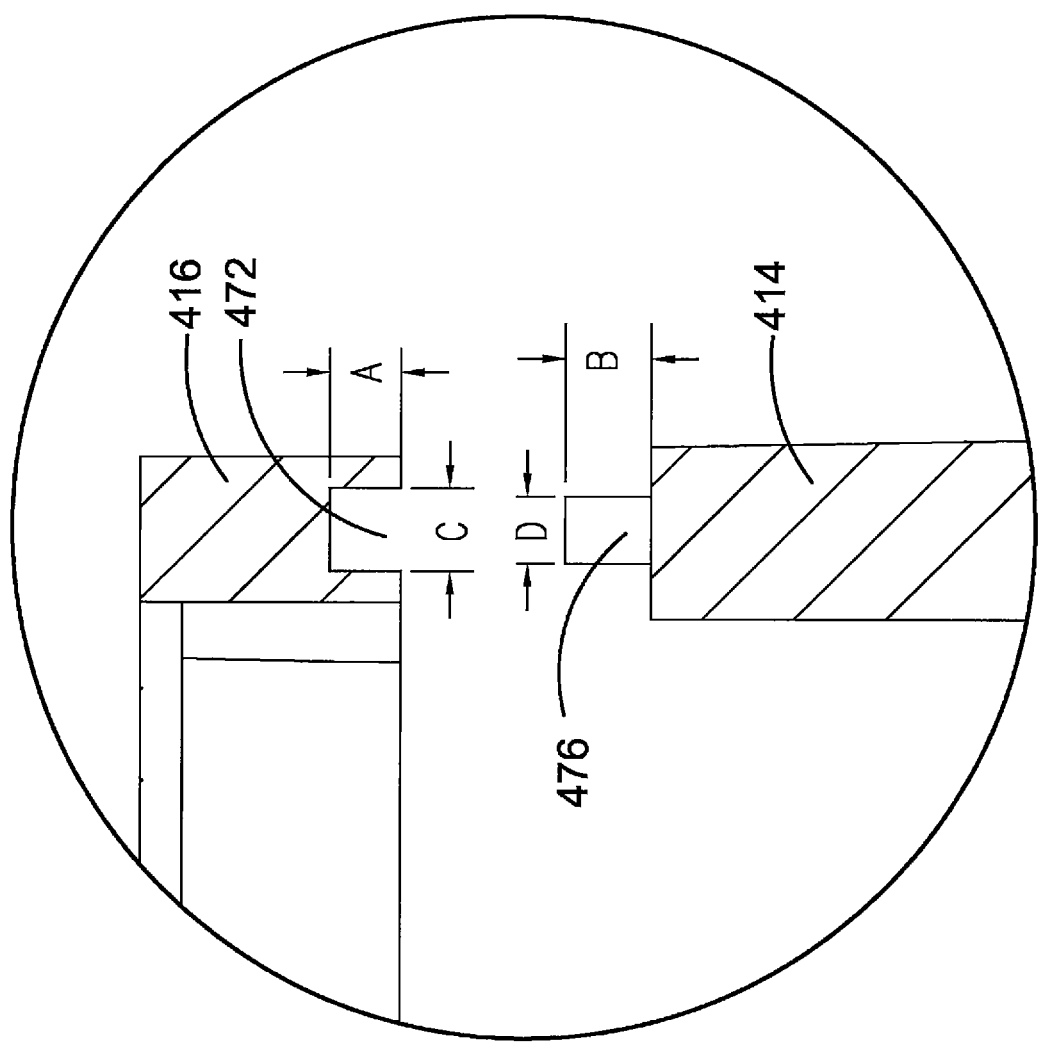

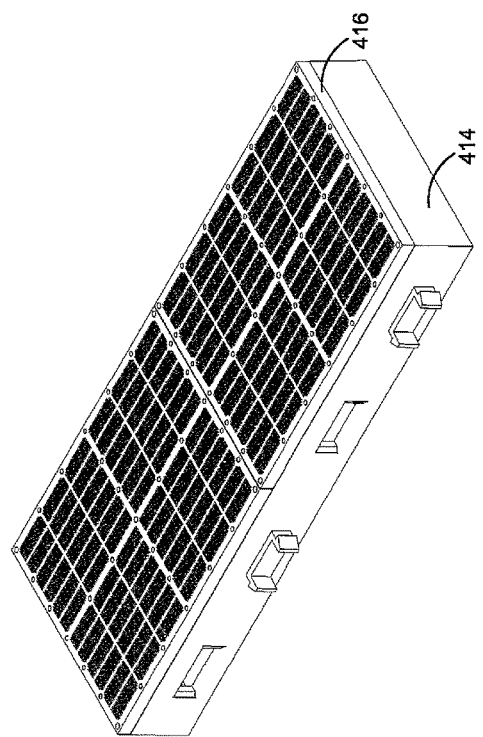
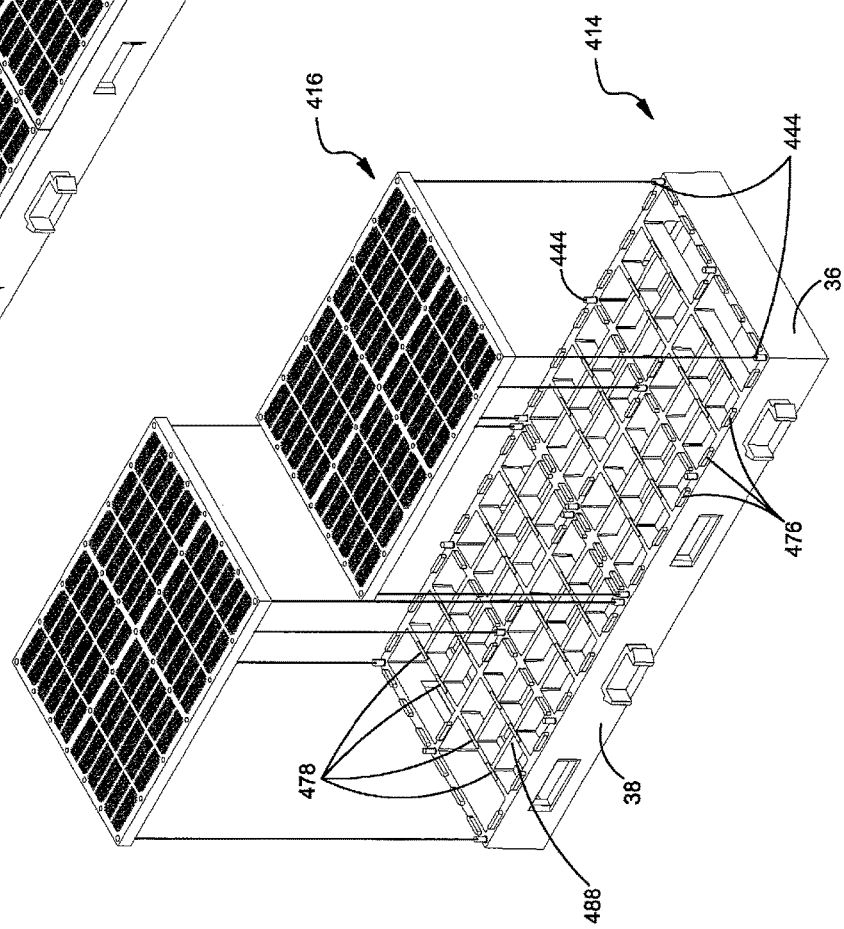
FIGURE 51A
FIGURE 51

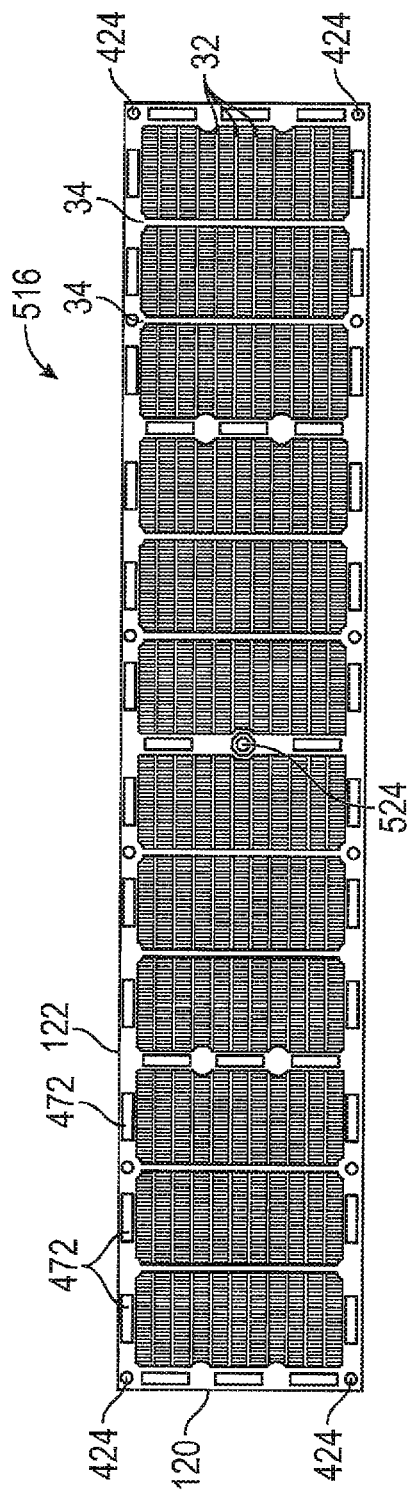
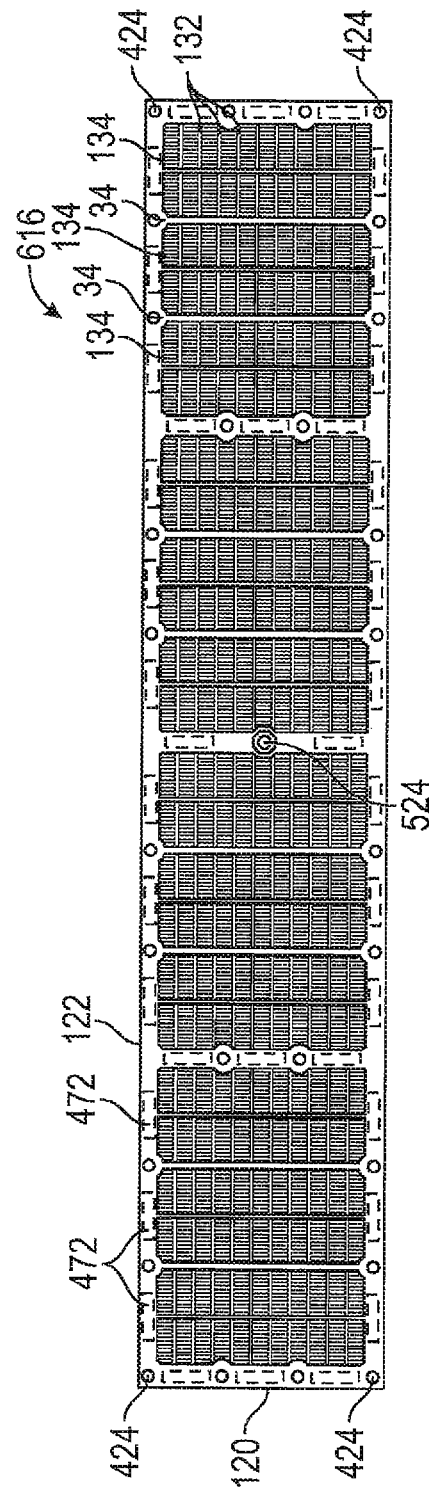
FIGURE 70
FIGURE 70A

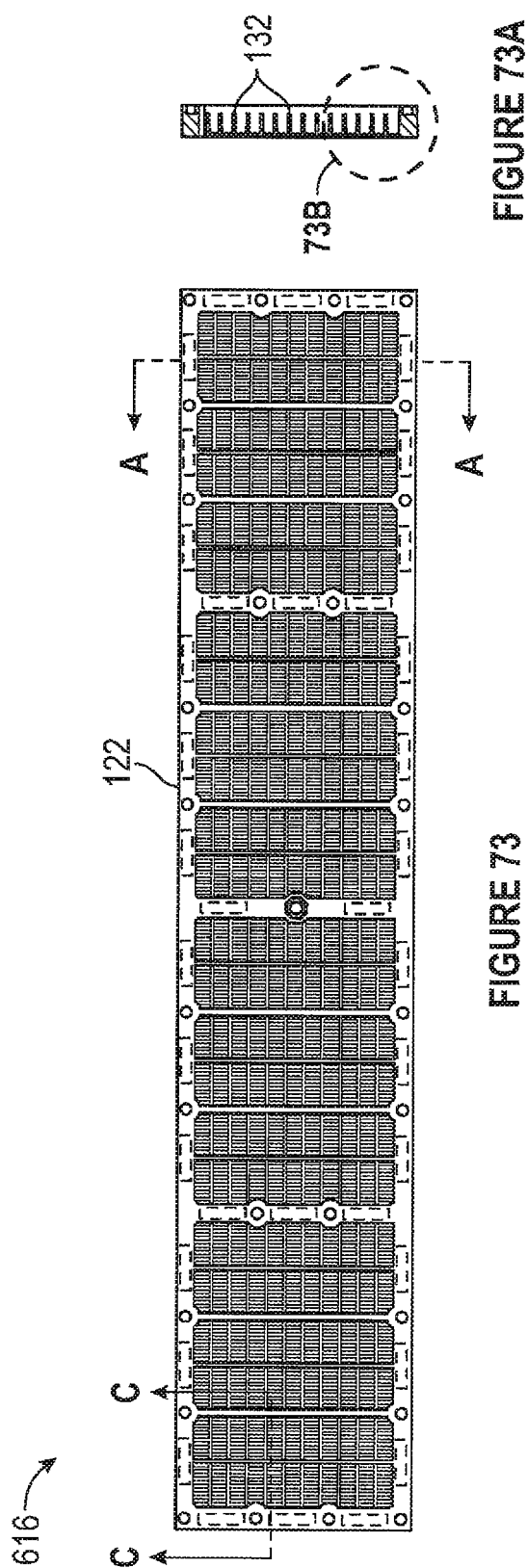

INJECTION MOLDED SCREENING APPARATUSES AND METHODS

CROSS-REFERENCE TO RELATED APPLICATIONS

The present application claims priority to U.S. Provisional Patent Application No. 62/648,771, filed Mar. 27, 2018, and is also a continuation of U.S. patent application Ser. No. 15/965,195, filed Apr. 27, 2018, which claims priority to U.S. Provisional Application No. 62/648,771, filed Mar. 27, 2018. U.S. patent application Ser. No. 15/965,195 is also a continuation-in-part of U.S. patent application Ser. No. 15/851,099, filed Dec. 21, 2017, which is a divisional of U.S. patent application Ser. No. 15/201,865, filed Jul. 5, 2016, now U.S. Pat. No. 9,884,344, which is a continuation of U.S. patent application Ser. No. 14/268,101, filed May 2, 2014, now U.S. Pat. No. 9,409,209, which is a continuation-in-part of U.S. patent application Ser. No. 13/800,826, filed Mar. 13, 2013, which claims the benefit of U.S. Provisional Patent Application Ser. Nos. 61/652,039 filed May 25, 2012, and 61/714,882 filed Oct. 17, 2012, the entire contents of each of which are incorporated herein by reference.

FIELD

The present disclosure relates generally to material screening. More particularly, the present disclosure relates to screening members, screening assemblies, methods for fabricating screening members and assemblies and methods for screening materials.

BACKGROUND

Material screening includes the use of vibratory screening machines. Vibratory screening machines provide the capability to excite an installed screen such that materials placed upon the screen may be separated to a desired level. Oversized materials are separated from undersized materials. Over time, screens wear and require replacement. As such, screens are designed to be replaceable.

Replacement screen assemblies must be securely fastened to a vibratory screening machine and are subjected to large vibratory forces. Replacement screens may be attached to a vibratory screening machine by tensioning members, compression members or clamping members.

Replacement screen assemblies are typically made of metal or a thermoset polymer. The material and configuration of the replacement screens are specific to a screening application. For example, due to their relative durability and capacity for fine screening, metal screens are frequently used for wet applications in the oil and gas industry. Traditional thermoset polymer type screens (e.g., molded polyurethane screens), however, are not as durable and would likely not withstand the rough conditions of such wet applications and are frequently utilized in dry applications, such as applications in the mining industry.

Fabricating thermoset polymer type screens is relatively complicated, time consuming and prone to errors. Typical thermoset type polymer screens that are used with vibratory screening machines are fabricated by combining separate liquids (e.g., polyester, polyether and a curative) that chemically react and then allowing the mixture to cure over a period of time in a mold. When fabricating screens with fine openings, e.g., approximately 43 microns to approximately 100 microns, this process can be extremely difficult and time consuming. Indeed, to create fine openings in a screen, the channels in the molds that the liquid travels through have to be very small (e.g., on the order of 43 microns) and all too often the liquid does not reach all the cavities in the mold. As a result, complicated procedures are often implemented that require close attention to pressures and temperatures. Since a relatively large single screen (e.g., two feet by three feet or larger) is made in a mold, one flaw (e.g., a hole, i.e., a place where the liquid did not reach) will ruin the entire screen. Thermoset polymer screens are typically fabricated by molding an entire screen assembly structure as one large screening piece and the screen assembly may have openings ranging from approximately 43 microns to approximately 4000 microns in size. The screening surface of conventional thermoset polymer screens normally have a uniform flat configuration.

Thermoset polymer screens are relatively flexible and are often secured to a vibratory screening machine using tensioning members that pull the side edges of the thermoset polymer screen away from each other and secure a bottom surface of the thermoset polymer screen against a surface of a vibratory screening machine. To prevent deformation when being tensioned, thermoset polymer assemblies may be molded with aramid fibers that run in the tensioning direction (see, e.g., U.S. Pat. No. 4,819,809). If a compression force were applied to the side edges of the typical thermoset polymer screens it would buckle or crimp, thereby rendering the screening surface relatively ineffective.

In contrast to thermoset polymer screens, metal screens are rigid and may be compressed or tensioned onto a vibratory screening machine. Metal screen assemblies are often fabricated from multiple metal components. The manufacture of metal screen assemblies typically includes: fabricating a screening material, often three layers of a woven wire mesh; fabricating an apertured metal backing plate; and bonding the screening material to apertured metal backing plate. The layers of wire cloth may be finely woven with openings in the range of approximately 30 microns to approximately 4000 microns. The entire screening surface of conventional metal assemblies is normally a relatively uniform flat configuration or a relatively uniform corrugated configuration.

Critical to screening performance of screen assemblies (thermoset polymer assemblies and metal type assemblies) for vibratory screening machines are the size of the openings in the screening surface, structural stability and durability of the screening surface, structural stability of the entire unit, chemical properties of the components of the unit and ability of the unit to perform in various temperatures and environments. Drawbacks to conventional metal assemblies include lack of structural stability and durability of the screening surface formed by the woven wire mesh layers, blinding (plugging of screening openings by particles) of the screening surface, weight of the overall structure, time and cost associated with the fabrication or purchase of each of the component members, and assembly time and costs. Because wire cloth is often outsourced by screen manufacturers, and is frequently purchased from weavers or wholesalers, quality control can be extremely difficult and there are frequently problems with wire cloth. Flawed wire cloth may result in screen performance problems and constant monitoring and testing is required.

One of the biggest problems with conventional metal assemblies is blinding. A new metal screen may initially have a relatively large open screening area but over time, as the screen is exposed to particles, screening openings plug (i.e., blind) and the open screening area, and effectiveness of the screen itself, is reduced relatively quickly. For example, a 140 mesh screen assembly (having three layers of screen cloth) may have an initial open screening area of 20-24%. As the screen is used, however, the open screening area may be reduced by 50% or more.

Conventional metal screen assemblies also lose large amounts of open screening area because of their construction, which includes adhesives, backing plates, plastic sheets bonding layers of wire cloth together, etc.

Another major problem with conventional metal assemblies is screen life. Conventional metal assemblies don't typically fail because they get worn down but instead fail due to fatigue. That is, the wires of the woven wire cloth often actually break due to the up and down motion they are subject to during vibratory loading.

Drawbacks to conventional thermoset polymer screens also include lack of structural stability and durability. Additional drawbacks include inability to withstand compression type loading and inability to withstand high temperatures (e.g., typically a thermoset polymer type screen will begin to fail or experience performance problems at temperatures above 130° F., especially screens with fine openings, e.g., approximately 43 microns to approximately 100 microns). Further, as discussed above, fabrication is complicated, time consuming and prone to errors. Also, the molds used to fabricate thermoset polymer screens are expensive and any flaw or the slightest damage thereto will ruin the entire mold and require replacement, which may result in costly downtime in the manufacturing process.

Another drawback to both conventional metal and thermoset polymer screens is the limitation of screen surface configurations that are available. Existing screening surfaces are fabricated with relatively uniform opening sizes throughout and a relatively uniform surface configuration throughout, whether the screening surface is flat or undulating.

The conventional polymer type screens referenced in U.S. Provisional Application No. 61/652,039 (also referred to therein as traditional polymer screens, existing polymer screens, typical polymer screens or simply polymer screens) refer to the conventional thermoset polymer screens described in U.S. Provisional Patent Application Ser. No. 61/714,882 and the conventional thermoset polymer screens described herein (also referred to herein and in U.S. Provisional Patent Application Ser. No. 61/714,882 as traditional thermoset polymer screens, existing thermoset polymer screens, typical thermoset polymer screens or simply thermoset screens). Accordingly, the conventional polymer type screens referenced in U.S. Provisional Application No. 61/652,039 are the same conventional thermoset polymer screens referenced herein, and in U.S. Provisional Patent Application Ser. No. 61/714,882, and may be fabricated with extremely small screening openings (as described herein and in U.S. Provisional Patent Application Ser. No. 61/714,882) but have all the drawbacks (as described herein and in U.S. Provisional Patent Application Ser. No. 61/714,882) regarding conventional thermoset polymer screens, including lack of structural stability and durability, inability to withstand compression type loading, inability to withstand high temperatures and complicated, time consuming, error prone fabrication methods.

There is a need for versatile and improved screening members, screening assemblies, methods for fabricating screening members and assemblies and methods for screening materials for vibratory screening machines that incorporate the use of injection molded materials (e.g., thermoplastics) having improved mechanical and chemical properties.

SUMMARY

The present disclosure is an improvement over existing screen assemblies and methods for screening and fabricating screen assemblies and parts thereof. The present invention provides extremely versatile and improved screening members, screening assemblies, methods for fabricating screening members and assemblies and methods for screening materials for vibratory screening machines that incorporate the use of injection molded materials having improved properties, including mechanical and chemical properties. In certain embodiments of the present invention a thermoplastic is used as the injection molded material. The present invention is not limited to thermoplastic injection molded materials and in embodiments of the present invention other materials may be used that have similar mechanical and/or chemical properties. In embodiments of the present invention, multiple injection molded screen elements are securely attached to subgrid structures. The subgrids are fastened together to form the screen assembly structure, which has a screening surface including multiple screen elements. Use of injection molded screen elements with the various embodiments described herein provide, inter alia, for: varying screening surface configurations; fast and relatively simple screen assembly fabrication; and a combination of outstanding screen assembly mechanical, chemical and electrical properties, including toughness, wear and chemical resistance.

Embodiments of the present invention include screen assemblies that are configured to have relatively large open screening areas while having structurally stable small screening openings for fine vibratory screening applications. In embodiments of the present invention, the screening openings are very small (e.g., as small as approximately 43 microns) and the screen elements are large enough (e.g., one inch by one inch, one inch by two inches, two inches by three inches, etc.) to make it practical to assemble a complete screen assembly screening surface (e.g., two feet by three feet, three feet by four feet, etc.). Fabricating small screening openings for fine screening applications requires injection molding very small structural members that actually form the screening openings. These structural members are injection molded to be formed integrally with the screen element structure. Importantly, the structural members are small enough (e.g., in certain applications they may be on the order of approximately 43 microns in screening surface width) to provide an effective overall open screening area and form part of the entire screen element structure that is large enough (e.g., two inches by three inches) to make it practical to assemble a relatively large complete screening surface (e.g., two feet by three feet) therefrom.

In one embodiment of the present invention a thermoplastic material is injection molded to form screening elements. Previously thermoplastics have not been used with the fabrication of vibratory screens with fine size openings (e.g., approximately 43 microns to approximately 1000 microns) because it would be extremely difficult, if not impossible, to thermoplastic injection mold a single relatively large vibratory screening structure having fine openings and obtain the open screening area necessary for competitive performance in vibratory screening applications.

According to an embodiment of the present disclosure, a screen assembly is provided that: is structurally stable and can be subjected to various loading conditions, including compression, tensioning and clamping; can withstand large vibrational forces; includes multiple injection molded screen elements that, due to their relatively small size, can be fabricated with extremely small opening sizes (having dimensions as small as approximately 43 microns); eliminates the need for wirecloth; is lightweight; is recyclable; is simple and easy to assemble; can be fabricated in multiple different configurations, including having various screen opening sizes throughout the screen and having various screening surface configurations, e.g., various combinations of flat and undulating sections; and can be fabricated with application-specific materials and nanomaterials. Still further, each screen assembly may be customized to a specific application and can be simply and easily fabricated with various opening sizes and configurations depending on the specifications provided by an end user. Embodiments of the present disclosure may be applied to various applications, including wet and dry applications and may be applied across various industries. The present invention is not limited to the oil and gas industry and the mining industry. Disclosed embodiments may also be utilized in any industry that requires separation of materials using vibratory screenings machines, including pulp and paper, chemical, pharmaceuticals and others.

In an example embodiment of the present invention, a screen assembly is provided that substantially improves screening of materials using a thermoplastic injection molded screen element. Multiple thermoplastic polymer injection molded screen elements are securely attached to subgrid structures. The subgrids are fastened together to form the screen assembly structure, which has a screening surface including multiple screen elements. Each screen element and each subgrid may have different shapes and configurations. Thermoplastic injection molding individual screen elements allows for precise fabrication of screening openings, which may have dimensions as small as approximately 43 microns. The grid framework may be substantially rigid and may provide durability against damage or deformation under the substantial vibratory load burdens it is subjected to when secured to a vibratory screening machine. Moreover, the subgrids, when assembled to form the complete screen assembly, are strong enough not only to withstand the vibratory loading, but also the forces required to secure the screen assembly to the vibratory screening machine, including large compression loads, tension loads and/or clamping loads. Still further, the openings in the subgrids structurally support the screen elements and transfer vibrations from the vibratory screening machine to the elements forming the screening openings thereby optimizing screening performance. The screen elements, subgrids and/or any other component of the screen assembly may include nanomaterials and/or glass fibers that, in addition to other benefits, provide durability and strength.

According to an example embodiment of the present disclosure, a screen assembly is provided having a screen element including a screen element screening surface with a series of screening openings and a subgrid including multiple elongated structural members forming a grid framework having grid openings. The screen element spans at least one of the grid openings and is attached to a top surface of the subgrid. Multiple independent subgrids are secured together to form the screen assembly and the screen assembly has a continuous screen assembly screening surface having multiple screen element screening surfaces. The screen element includes substantially parallel end portions and substantially parallel side edge portions substantially perpendicular to the end portions. The screen element further includes a first screen element support member and a second screen element support member orthogonal to the first screen element support member. The first screen element support member extends between the end portions and is approximately parallel to the side edge portions. The second screen element support member extends between the side edge portions and is approximately parallel to the end portions. The screen element includes a first series reinforcement members substantially parallel to the side edge portions and a second series of reinforcement members substantially parallel to the end portions. The screen element screening surface includes screen surface elements forming the screening openings. The end portions, side edge portions, first and second support members and first and second series of reinforcement members structurally stabilize screen surface elements and screening openings. The screen element is formed as a single thermoplastic injection molded piece.

The screening openings may be rectangular, square, circular, and oval or any other shape. The screen surface elements may run parallel to the end portions and form the screening openings. The screen surface elements may also run perpendicular to the end portions and form the screen openings. Different combinations of rectangular, square, circular and oval screening openings (or other shapes) may be incorporated together and depending on the shape utilized may run parallel and/or perpendicular to the end portions.

The screen surface elements may run parallel to the end portions and may be elongated members forming the screening openings. The screening openings may be elongated slots having a distance of approximately 43 microns to approximately 4000 microns between inner surfaces of adjacent screen surface elements. In certain embodiments, the screen openings may have a distance of approximately 70 microns to approximately 180 microns between inner surfaces of adjacent screen surface elements. In other embodiments, the screening openings may have a distance of approximately 43 microns to approximately 106 microns between inner surfaces of adjacent screen surface elements. In embodiments of the present invention, the screening openings may have a width and a length, the width may be about 0.043 mm to about 4 mm and the length may be about 0.086 mm to about 43 mm. In certain embodiments, the width to length ratio may be approximately 1:2 to approximately 1:1000.

Multiple subgrids of varying sizes may be combined to form a screen assembly support structure for screen elements. Alternatively, a single subgrid may be thermoplastic injection molded, or otherwise constructed, to form the entire screen assembly support structure for multiple individual screen elements.

In embodiments that use multiple subgrids, a first subgrid may include a first base member having a first fastener that mates with a second fastener of a second base member of a second subgrid, the first and second fasteners securing the first and second subgrids together. The first fastener may be a clip and the second fastener may be a clip aperture, wherein the clip snaps into the clip aperture and securely attaches the first and second subgrids together.

The first and second screen element support members and the screen element end portions may include a screen element attachment arrangement configured to mate with a subgrid attachment arrangement. The subgrid attachment arrangement may include elongated attachment members and the screen element attachment arrangement may include attachment apertures that mate with the elongated attachment members securely attaching the screen element to the subgrid. A portion of the elongated attachment members may be configured to extend through the screen element attachment apertures and slightly above the screen element screening surface. The attachment apertures may include a tapered bore or may simply include an aperture without any tapering. The portion of the elongated attachment members above the screening element screening surface may be melted and may fill the tapered bore, fastening the screen element to the subgrid. Alternatively, the portion of the elongated attachment members that extends through and above the aperture in screening element screening surface may be melted such that it forms a bead on the screening element screening surface and fastens the screen element to the subgrid.

The elongated structural members may include substantially parallel subgrid end members and substantially parallel subgrid side members substantially perpendicular to the subgrid end members. The elongated structural members may further include a first subgrid support member and a second subgrid support member orthogonal to the first subgrid support member. The first subgrid support member may extend between the subgrid end members and may be approximately parallel to the subgrid side members. The second subgrid support member may extend between the subgrid side members and may be approximately parallel to the subgrid end members, and substantially perpendicular to the subgrid edge members.

The grid framework may include a first and a second grid framework forming a first and a second grid opening. The screen elements may include a first and a second screen element. The subgrid may have a ridge portion and a base portion. The first and second grid frameworks may include first and second angular surfaces that peak at the ridge portion and extend downwardly from the peak portion to the base portion. The first and second screen elements may span the first and second angular surfaces, respectively.

According to an example embodiment of the present invention, a screen assembly is provided having a screen element including a screen element screening surface with a series of screening openings and a subgrid including multiple elongated structural members forming a grid framework having grid openings. The screen element spans at least one grid opening and is secured to a top surface of the subgrid. Multiple subgrids are secured together to form the screen assembly and the screen assembly has a continuous screen assembly screening surface comprised of multiple screen element screening surfaces. The screen element is a single thermoplastic injection molded piece.

The screen element may include substantially parallel end portions and substantially parallel side edge portions substantially perpendicular to the end portions. The screen element may further include a first screen element support member and a second screen element support member orthogonal to the first screen element support member. The first screen element support member may extend between the end portions and may be approximately parallel to the side edge portions. The second screen element support member may extend between the side edge portions and may be approximately parallel to the end portions. The screen element may include a first series reinforcement members substantially parallel to the side edge portions and a second series of reinforcement members substantially parallel to the end portions. The screen element may include elongated screen surface elements running parallel to the end portions and forming the screening openings. The end portions, side edge portions, first and second support members, first and second series of reinforcement members may structurally stabilize the screen surface elements and the screening openings.

The first and second series of reinforcement members may have a thickness less than a thickness of the end portions, side edge portions and the first and second screen element support members. The end portions and the side edge portions and the first and second screen element support members may form four rectangular areas. The first series of reinforcement members and the second series of reinforcement members may form multiple rectangular support grids within each of the four rectangular areas. The screening openings may have a width of approximately 43 microns to approximately 4000 microns between inner surfaces of each of the screen surface elements. In certain embodiments, the screening openings may have a width of approximately 70 microns to approximately 180 microns between inner surfaces of each of the screen surface elements. In other embodiments, the screening openings may have a width of approximately 43 microns to approximately 106 microns between inner surfaces of each of the screen surface elements. In embodiments of the present invention, the screening openings may have a width of about 0.043 mm to about 4 mm and length of about 0.086 mm to about 43 mm. In certain embodiments, the width to length ratio may be approximately 1:2 to approximately 1:1000.

The screen elements may be flexible.

The subgrid end members, the subgrid side members and the first and second subgrid support members may form eight rectangular grid openings. A first screen element may span four of the grid openings and a second screen element may span the other four openings.

A central portion of the screening element screening surface may slightly flex when subject to a load. The subgrid may be substantially rigid. The subgrid may also be a single thermoplastic injection molded piece. At least one of the subgrid end members and the subgrid side members may include fasteners configured to mate with fasteners of other subgrids, which fasteners may be clips and clip apertures that snap into place and securely attach the subgrids together.

The subgrid may include: substantially parallel triangular end pieces, triangular middle pieces substantially parallel to the triangular end pieces, a first and second mid support substantially perpendicular to the triangular end pieces and extending between the triangular end pieces, a first and second base support substantially perpendicular to the triangular end pieces and extending the between the triangular end pieces and a central ridge substantially perpendicular to the triangular end pieces and extending the between the triangular end pieces. A first edge of the triangular end pieces, the triangular middle pieces, and the first mid support, the first base support and the central ridge may form a first top surface of the subgrid having a first series of grid openings. A second edge of the triangular end pieces, the triangular middle pieces, and the second mid support, the second base support and the central ridge may form a second top surface of the subgrid having a second series of grid openings. The first top surface may slope down from the central ridge to the first base support and the second top surface may slope down from the central ridge to the second base support. A first and a second screen element may span the first series and second series of grid openings, respectively. The first edges of the triangular end pieces, the triangular middle pieces, the first mid support, the first base support and the central ridge may include a first subgrid attachment arrangement configured to securely mate with a first screen element attachment arrangement of the first screen element. The second edges of the triangular end pieces, the triangular middle pieces, the second mid support, the second base support and the central ridge may include a second subgrid attachment arrangement configured to securely mate with a second screen element attachment arrangement of the second screen element. The first and second subgrid attachment arrangements may include elongated attachment members and the first and second screen element attachment arrangements may include attachment apertures that mate with the elongated attachment members thereby securely attaching the first and second screen elements to the first and second subgrids, respectively. A portion of the elongated attachment members may extend through the screen element attachment apertures and slightly above a first and second screen element screening surface.

The first and second screen elements each may include substantially parallel end portions and substantially parallel side edge portions substantially perpendicular to the end portions. The first and second screen elements may each include a first screen element support member and a second screen element support member orthogonal to the first screen element support member, the first screen element support member extending between the end portions and being approximately parallel to the side edge portions, the second screen element support member extending between the side edge portions and may be approximately parallel to the end portions. The first and second screen elements may each include a first series reinforcement members substantially parallel to the to the side edge portions and a second series of reinforcement members substantially parallel to the end portions. The first and second screen elements may each include elongated screen surface elements running parallel to the end portions and forming the screening openings. The end portions, side edge portions, first and second support members, first and second series of reinforcement members may structurally stabilize screen surface elements and screening openings.

One of the first and second base supports may include fasteners that secure the multiple subgrids together, which fasteners may be clips and clip apertures that snap into place and securely attach subgrids together.

The screen assembly may include a first, a second, a third and a fourth screen element. The first series of grid openings may be eight openings formed by the first edge of the triangular end pieces, the triangular middle pieces, and the first mid support, the first base support and the central ridge. The second series of grid openings may be eight openings formed by the second edge of the triangular end pieces, the triangular middle pieces, the second mid support, the second base support and the central ridge. The first screen element may span four of the grid openings of the first series of grid openings and the second screen element may span the other four openings of the first series of grid openings. The third screen element may span four of the grid openings of the second series of grid openings and the fourth screen element may span the other four openings of the second series of grid openings. A central portion of the first, second, third and fourth screening element screening surfaces may slightly flex when subject to a load. The subgrid may be substantially rigid and may be a single thermoplastic injection molded piece.

According to an example embodiment of the present disclosure, a screen assembly is providing having a screen element including a screen element screening surface with screening openings and a subgrid including a grid framework with grid openings. The screen element spans the grid openings and is attached to a surface of the subgrid. Multiple subgrids are secured together to form the screen assembly and the screen assembly has a continuous screen assembly screening surface that includes multiple screen element screening surfaces. The screen element is a thermoplastic injection molded piece.

The screen assembly may also include a first thermoplastic injection molded screen element and a second thermoplastic injection molded screen element and the grid framework may include a first and second grid framework forming a first grid opening and a second grid opening. The subgrid may include a ridge portion and a base portion, the first and second grid frameworks including first and second angular surfaces that peak at the ridge portion and extend downwardly from the peak portion to the base portion. The first and second screen elements may span the first and second angular surfaces, respectively. The first and second angular surfaces may include a subgrid attachment arrangement configured to securely mate with a screen element attachment arrangement. The subgrid attachment arrangement may include elongated attachment members and the screen element attachment arrangement may include apertures that mate with the elongated attachment members thereby securely attaching the screen elements to the subgrid.

The subgrid may be substantially rigid and may be a single thermoplastic injection molded piece. A section of the base portion may include a first and a second fastener that secure the subgrid to a third and a fourth fastener of another subgrid. The first and third fasteners may be clips and the second and fourth fasteners may be clip apertures. The clips may snap into clip apertures and securely attach the subgrid and then another subgrid together.

The subgrids may form a concave structure and the continuous screen assembly screening surface may be concave. The subgrids may form a flat structure and the continuous screen assembly screening surface may be flat. The subgrids may form a convex structure and the continuous screen assembly screening surface may be convex.

The screen assembly may be configured to form a predetermined concave shape when subjected to a compression force by a compression assembly of a vibratory screening machine against at least one side member of the vibratory screen assembly when placed in the vibratory screening machine. The predetermined concave shape may be determined in accordance with a shape of a surface of the vibratory screening machine. The screen assembly may have a mating surface mating the screen assembly to a surface of the vibratory screening machine, which mating surface may be rubber, metal (e.g., steel, aluminum, etc.), a composite material, a plastic material or any other suitable material. The screen assembly may include a mating surface configured to interface with a mating surface of a vibratory screening machine such that the screen assembly is guided into a fixed position on the vibratory screening machine. The mating surface may be formed in a portion of at least one subgrid. The screen assembly mating surface may be a notch formed in a corner of the screen assembly or a notch formed approximately in the middle of a side edge of the screen assembly. The screen assembly may have an arched surface configured to mate with a concave surface of the vibratory screening machine. The screen assembly may have a substantially rigid structure that does not substantially deflect when secured to the vibratory screening machine. The screen assembly may include a screen assembly mating surface configured such that it forms a predetermined concave shape when subjected to a compression force by a member of a vibratory screening machine. The screen assembly mating surface may be shaped such that it interfaces with a mating surface of the vibratory screening machine such that the screen assembly may be guided into a predetermined location on the vibratory screening machine. The screen assembly may include a load bar attached to an edge surface of the subgrid of the screen assembly. The load bar may be configured to distribute a load across a surface of the screen assembly. The screen assembly may be configured to form a predetermined concave shape when subjected to a compression force by a compression member of a vibratory screening machine against the load bar of the vibratory screen assembly. The screen assembly may have a concave shape and may be configured to deflect and form a predetermined concave shape when subjected to a compression force by a member of a vibratory screening machine.

A first set of the subgrids may be formed into center support frame assemblies having a first fastener arrangement. A second set of the subgrids may be formed into a first end support frame assembly having a second fastener arrangement. A third set of the subgrids may be formed into a second end support frame assembly having a third fastener arrangement. The first, second, and third fastener arrangements may secure the first and second end support frames to the center support assemblies. A side edge surface of the first end support frame assembly may form a first end of the screen assembly. A side edge surface of the second end support frame arrangement may form a second end of the screen assembly. An end surface of each of the first and second end support frame assemblies and center support frame assemblies may cumulatively form a first and a second side surface of the complete screen assembly. The first and second side surfaces of the screen assembly may be substantially parallel and the first and second end surfaces of the screen assembly may be substantially parallel and substantially perpendicular to the side surfaces of the screen assembly. The side surfaces of the screen assembly may include fasteners configured to engage at least one of a binder bar and a load distribution bar. The subgrids may include side surfaces such that when individual subgrids are secured together to form the first and second end support frame assemblies and the center support frame assembly that the first and second end support frame assemblies and the center support frame assembly each form a concave shape. The subgrids may include side surfaces shaped such that when individual subgrids are secured together to form the first and second end support frame assemblies and the center support frame assembly that the first and second end support frame assemblies and the center support frame assembly each form a convex shape.

The screen elements may be affixed to the subgrids by at least one of a mechanical arrangement, an adhesive, heat staking and ultrasonic welding.

According to an example embodiment of the present disclosure, a screen element is provided having: a screen element screening surface with screen surface elements forming a series of screening openings; a pair of substantially parallel end portions; a pair of substantially parallel side edge portions substantially perpendicular to the end portions; a first screen element support member; a second screen element support member orthogonal to the first screen element support member, the first screen element support member extending between the end portions and being approximately parallel to the side edge portions, the second screen element support member extending between the side edge portions and being approximately parallel to the end portions and substantially perpendicular to the side edge portions; a first series of reinforcement members substantially parallel to the side edge portions; and a second series of reinforcement members substantially parallel to the end portions. The screen surface elements run parallel to the end portions. The end portions, side edge portions, first and second support members, first and second series of reinforcement members structurally stabilize screen surface elements and screening openings, and the screen element is a single thermoplastic injection molded piece.

According to an example embodiment of the present disclosure, a screen element is provided having a screen element screening surface with screen surface elements forming a series of screening openings; a pair of substantially parallel end portions; and a pair of substantially parallel side edge portions substantially perpendicular to the end portions. The screen element is a thermoplastic injection molded piece.

The screen element may also have a first screen element support member; a second screen element support member orthogonal to the first screen element support member, the first screen element support member extending between the end portions and being approximately parallel to the side edge portions, the second screen element support member extending between the side edge portions and being approximately parallel to the end portions; a first series of reinforcement members substantially parallel to the side edge portions; and a second series of reinforcement members substantially parallel to the end portions. The screen surface elements may run parallel to the end portions. In certain embodiments, the screen surface elements may also be configured to run perpendicular to the end portions. The end portions, side edge portions, first and second support members, first and second series of reinforcement members may structurally stabilize screen surface elements and screening openings.

The screen element may also have a screen element attachment arrangement molded integrally with the screen element and configured to mate with a subgrid attachment arrangement. Multiple subgrids may form a screen assembly and the screen assembly may have a continuous screen assembly screening surface that includes multiple screen element screening surfaces.

According to an example embodiment of the present disclosure, a method for fabricating a screen assembly for screening materials is provided that includes: determining screen assembly performance specifications for the screen assembly; determining a screening opening requirement for a screen element based on the screen assembly performance specifications, the screen element including a screen element screening surface having screening openings; determining a screen configuration based on the screen assembly performance specifications, the screen configuration including having the screen elements arranged in at least one of flat configuration and a nonflat configuration; injection molding the screen elements with a thermoplastic material; fabricating a subgrid configured to support the screen elements, the subgrid having a grid framework with grid openings wherein at least one screen element spans at least one grid opening and is secured to a top surface of the subgrid, the top surface of each subgrid including at least one of a flat surface and a nonflat surface that receives the screen elements; attaching the screen elements to the subgrids; attaching multiple subgrid assemblies together to form end screen frames and center screen frames; attaching the end screen frames to the center screen frames to form a screen frame structure; attaching a first binder bar to a first end of the screen frame structure; and attaching a second binder bar to a second end of the screen frame structure to form the screen assembly, the screen assembly having a continuous screen assembly screening surface comprised of multiple screen element screening surfaces.

The screen assembly performance specifications may include at least one of dimensions, material requirements, open screening area, cut point, and capacity requirements for a screening application. A handle may be attached to the binder bar. A tag may be attached to the binder bar, which tag may include a performance description of the screen assembly. At least one of the screen element and the subgrid may be a single thermoplastic injection molded piece. The thermoplastic material may include a nanomaterial. The subgrid may include at least one base member having fasteners that mate with fasteners of other base members of other subgrids and secure the subgrids together. The fasteners may be clips and clip apertures that snap into place and securely attach the subgrids together.

According to an example embodiment of the present disclosure, a method for fabricating a screen assembly for screening materials is provided by injection molding a screen element with a thermoplastic material, the screen element including a screen element screening surface having screening openings; fabricating a subgrid that supports the screen element, the subgrid having a grid framework with grid openings, the screen element spanning at least one grid opening; securing the screen element to a top surface of the subgrid; and attaching multiple subgrid assemblies together to form the screen assembly, the screen assembly having a continuous screen assembly screening surface made of multiple screen element screening surfaces. The method may also include attaching a first binder bar to a first end of the screen assembly and attaching a second binder bar to a second end of the screen assembly. The first and second binder bars may bind the subgrids together. The binder bar may be configured to distribute a load across the first and second ends of the screen assembly. The thermoplastic material may include a nanomaterial.

According to an example embodiment of the present disclosure, a method for screening a material is provided by attaching a screen assembly to a vibratory screening machine, the screen assembly including a screen element having a series of screening openings forming a screen element screening surface and a subgrid including multiple elongated structural members forming a grid framework having grid openings. Screen elements span grid openings and are secured to a top surface of the subgrid. Multiple subgrids are secured together to form the screen assembly. The screen assembly has a continuous screen assembly screening surface comprised of multiple screen element screening surfaces. The screen element is a single thermoplastic injection molded piece. The material is screened using the screen assembly.

According to an example embodiment of the present disclosure, a method for screening a material is provided including attaching a screen assembly to a vibratory screening machine and forming a top screening surface of the screen assembly into a concave shape. The screen assembly includes a screen element having a series of screening openings forming a screen element screening surface and a subgrid including multiple elongated structural members forming a grid framework having grid openings. Screen elements span grid openings and are secured to a top surface of the subgrid. Multiple subgrids are secured together to form the screen assembly and the screen assembly has a continuous screen assembly screening surface comprised of multiple screen element screening surfaces. The screen element is a single thermoplastic injection molded piece. The material is screened using the screen assembly.

According to an example embodiment of the present disclosure, a screen assembly is provided, including: a screen element having a first adhesion arrangement; and a subgrid unit having a second adhesion arrangement. The first adhesion arrangement and the second adhesion arrangement may be different materials. At least one of the first adhesion arrangement and the second adhesion arrangement is excitable such that the screen element and the subgrid may be secured together. The screen element is a single thermoplastic injection molded piece.

The first adhesion arrangement may be a plurality of cavity pockets on a bottom surface of the screen element and the second adhesion arrangement may be a plurality of fusion bars a top surface of the subgrid. The screen element is micro molded and has screening openings between approximately 40 microns and approximately 1000 microns. The cavity pockets may be elongated pockets. The fusion bars may have a height slightly larger than a depth of the cavity pockets. The depth of the cavity pockets may be approximately 0.05 inches and the height of the fusion bars is approximately 0.056 inches. The fusion bars may have a width slightly smaller than a width of the cavity pockets.

The screen element may include thermoplastic polyurethane. The subgrid may include nylon. The screen assembly may include additional screen elements and subgrids secured together, wherein multiple subgrids are secured together. The screen element may have a plurality of screening openings being elongated slots with a width and a length, the width of the screening openings being approximately 43 microns to approximately 1000 microns between inner surfaces of each screen surface element. The screen element may be attached to the subgrid via laser welding. A weld between the screen element and the subgrid may include a mixture of materials from the screen element and the subgrid.

According to an example embodiment of the present disclosure, a screen assembly is provided, including: a screen element including a screen element screening surface having a series of screening openings; and a subgrid including multiple elongated structural members forming a grid framework having grid openings. The screen element spans at least one of the grid openings and is attached to a top surface of the subgrid. Multiple independent subgrids are secured together to form the screen assembly and the screen assembly has a continuous screen assembly screening surface having multiple screen element screening surfaces. The screen element includes substantially parallel end portions and substantially parallel side edge portions substantially perpendicular to the end portions. The screen element further includes a first screen element support member and a second screen element support member orthogonal to the first screen element support member, the first screen element support member extending between the end portions and being approximately parallel to the side edge portions, the second screen element support member extending between the side edge portions and being approximately parallel to the end portions. The screen element includes a first series reinforcement members substantially parallel to the side edge portions, a second series of reinforcement members substantially parallel to the end portions. The screen element screening surface includes screen surface elements forming the screening openings. The end portions, side edge portions, first and second support members, first and second series of reinforcement members structurally stabilize screen surface elements and screening openings. The screen element is a single thermoplastic injection molded piece. The screen element includes a plurality of pocket cavities on a bottom surface of the screen element. The subgrid includes a plurality of fusion bars on the top surface of the subgrid. The plurality of fusion bars are configured to mate with the plurality of pocket cavities.

The screening openings may be elongated slots with a width and a length, the width of the screening openings being approximately 43 microns to approximately 1000 microns between inner surfaces of each screen surface element. The plurality of fusion bars may have a height slightly larger than a depth of the plurality of pocket cavities. The height of the plurality of fusion bars may be approximately 0.056 inches. The depth of the plurality of pocket cavities may be approximately 0.050 inches. Each of plurality of pocket cavities may have a width slightly larger than a width of each of the plurality of fusion bars. The plurality of fusion bars may be configured such that, when melted, a portion of the plurality of fusion bars fills the width of the plurality of pocket cavities. Material of the screen element may be fused with material of the subgrid. The screen element may be configured to allow a laser to pass through the screen element and contact the plurality of fusion bars. The laser may melts a portion of the plurality of fusion bars fusing the screen element to the subgrid.

The subgrid may be a single thermoplastic injection molded piece. The screen element may include a thermoplastic polyurethane material. The thermoplastic polyurethane may be at least one of a poly-ether based thermoplastic polyurethane and a polyester based thermoplastic polyurethane. The subgrid may include a nylon material. The fusion bars may include at least one of a carbon and a graphite material. The subgrid may include a screen element locator arrangement configured to locate a screen element upon the subgrid. The screen element may include a plurality of tapered counter bores on a top surface of the screen element along the side edge portions and the end portions between locator apertures of the locator arrangement. The fusion bars and the pocket cavities may be different materials.

The grid framework may include a first and second grid framework forming a first and a second grid opening, the screen elements including a first and a second screen element. The subgrid may include a ridge portion and a base portion, the first and second grid frameworks include first and second angular surfaces that peak at the ridge portion and extend downwardly from the peak portion to the base portion, wherein the first and second screen elements span the first and second angular surfaces, respectively. The screen assembly may include a secondary support framework spanning at least a portion of each grid opening.

According to an exemplary embodiment of the present invention a screen assembly is provided, including: a screen element including a screen element screening surface having a series of screening openings and a plurality of pocket cavities on a bottom surface of the screen element; and a subgrid including multiple elongated structural members forming a grid framework having grid openings and a plurality of fusion bars on a top surface of the subgrid. The screen element spans at least one grid opening and is secured to the top surface of the subgrid via fusing the plurality of fusion bars to the plurality of pocket cavities. Multiple subgrids are secured together to form the screen assembly and the screen assembly has a continuous screen assembly screening surface comprised of multiple screen element screening surfaces. The screen element is a single thermoplastic injection molded piece. The screen element in configured to allow a laser to pass through the screen element and contact the plurality of fusion bars.

The screening openings may be elongated slots with a width and a length, the width of the screening openings being approximately 43 microns to approximately 1000 microns between inner surfaces of each screen surface element. The screening openings may be elongated slots with a width and a length, the width of the screening openings being approximately 70 microns to approximately 180 microns between inner surfaces of each screen surface element. The screening openings may be elongated slots with a width and a length, the width of the screening openings being approximately 43 microns to approximately 106 microns between inner surfaces of each screen surface element. The screening openings may be elongated slots with a width and a length, the width being about 0.044 mm to about 4 mm and the length being about 0.088 mm to about 60 mm.

The subgrid may include substantially parallel triangular end pieces, triangular middle pieces substantially parallel to the triangular end pieces, a first and second mid support substantially perpendicular to the triangular end pieces and extending between the triangular end pieces, a first and second base support substantially perpendicular to the triangular end pieces and extending between the triangular end pieces and a central ridge substantially perpendicular to the triangular end pieces and extending between the triangular end pieces, a first edge of the triangular end pieces, the triangular middle pieces, the first mid support, the first base support and the central ridge form a first top surface of the subgrid having a first series of grid openings and a second edge of the triangular end pieces, the triangular middle pieces, the second mid support, the second base support and the central ridge form a second top surface of the subgrid having a second series of grid openings, the first top surface sloping from the central ridge to the first base support, the second top surface sloping from the central ridge to the second base support. A first and a second screen element may span the first series and second series of grid openings, respectively.

In exemplary embodiments of the present invention, a method of fabricating a screen assembly is provided, including: laser welding a screen element of a first material to a subgrid of a second material; and attaching multiple subgrids together to form the screen assembly. The first material and the second material are different materials. The first material and the second material are fused together at laser weld locations.

The screen assembly may have a first adhesion arrangement on a bottom surface of the screen element and the subgrid has a second adhesion arrangement on a top surface of the subgrid. The first adhesion arrangement may be a plurality of pocket cavities and the second adhesion arrangement is a plurality of fusion bars. The plurality of pocket cavities may be configured to mate with the plurality of fusion bars.

The method for fabricating a screen assembly may include locating the screen element upon the subgrid via location apertures in the screen element and location extensions on a top surface of the subgrid. The method for fabricating a screen assembly may include passing a laser through the screen element such that it contacts the plurality of fusion bars. The method for fabricating a screen assembly may include melting a portion of the plurality of fusion bars with the laser. The method for fabricating a screen assembly may include melting a portion of the first material with one of heat produced by the laser and heat transfer from the melted portions of the plurality of fusion bars. The method for fabricating a screen assembly may include removing the laser such that the melted portion of the first material and the melted portion of the fusion bars mix and return to a solid.

Example embodiments of the present disclosure are described in more detail below with reference to the appended Figures.

BRIEF DESCRIPTION OF DRAWINGS

FIG. 5 is a top isometric view of a binder bar, according to an exemplary embodiment of the present invention.

FIG. 5A is a bottom isometric view of the binder bar shown in FIG. 5.

FIG. 6 is an isometric view of a screen subassembly, according to an exemplary embodiment of the present invention.

FIG. 6A is an exploded view of the subassembly shown in FIG. 6.

FIG. 7 is a top view of the screen assembly shown in FIG. 1.

FIG. 7A is an enlarged cross-section of Section A-A of the screen assembly shown in FIG. 7.

FIG. 16A is an exploded isometric view of the end support frame subassembly shown in FIG. 16.

FIG. 17A is an exploded isometric view of the center support frame subassembly shown in FIG. 17.

FIG. 24 is an isometric view of a pyramidal shaped subassembly, according to an exemplary embodiment of the present invention.

FIG. 24A is an exploded isometric view of the pyramidal shaped subassembly shown in FIG. 24.

FIG. 34 is an isometric view of the end subgrid shown in FIG. 3 having a single screen element partially attached thereto, according to an exemplary embodiment of the present invention.

FIG. 35 is an enlarged view of break out Section E of the end subgrid shown in FIG. 34.

FIG. 44A is an isometric top view of the prescreen assembly shown in FIG. 44, according to an exemplary embodiment of the present invention.

FIG. 45B is a side view of cross section A-A of the screen element and the portion of the subgrid of FIG. 45 prior to attachment of the screen element to the subgrid, according to an exemplary embodiment of the present invention.

FIG. 45C is an enlarged view of section A of FIG. 45B.

FIG. 45D is a side view of cross section A-A of the screen element and the portion of the subgrid of FIG. 45 after attachment of the screen element to the subgrid, according to an exemplary embodiment of the present invention.

FIG. 45E is an enlarged view of section B of FIG. 45D.

FIG. 46 is side cross section view of a portion of a screen element and a portion of a subgrid, according to an exemplary embodiment of the present invention.

FIG. 51 is an exploded isometric view of an end subgrid showing screen elements prior to attachment to the end subgrid, according to an exemplary embodiment of the present invention.

FIG. 51A is an isometric view of the end subgrid shown in FIG. 51 having the screen elements attached thereto.

FIG. 63A is a bottom isometric view of the pyramidal shaped end subgrid shown in FIG. 63.

FIG. 63B illustrates an isometric view of clip 42 of FIGS. 3 and 3A, according to an embodiment.

FIG. 63C illustrates an isometric view of clip 142 of FIGS. 59-62A, according to an embodiment.

FIG. 63D illustrates an isometric view of clip 242 of FIGS. 63 and 63A, according to an embodiment.

FIG. 64 is a top isometric view of an end subgrid, according to an exemplary embodiment.

FIG. 64A is a bottom isometric view of the end subgrid shown in FIG. 64.

FIG. 65 is a top isometric view of a center subgrid, according to an exemplary embodiment.

FIG. 65A is a bottom isometric view of the center subgrid shown in FIG. 65.

FIG. 66 is an isometric top view of a screen element, according to an exemplary embodiment of the present invention.

FIG. 66A is a top view of the screen element shown in FIG. 66.

FIG. 66B is a bottom isometric view of the screen element shown in FIG. 66.

FIG. 66C is a bottom view of the screen element shown in FIG. 66.

Figure 67:
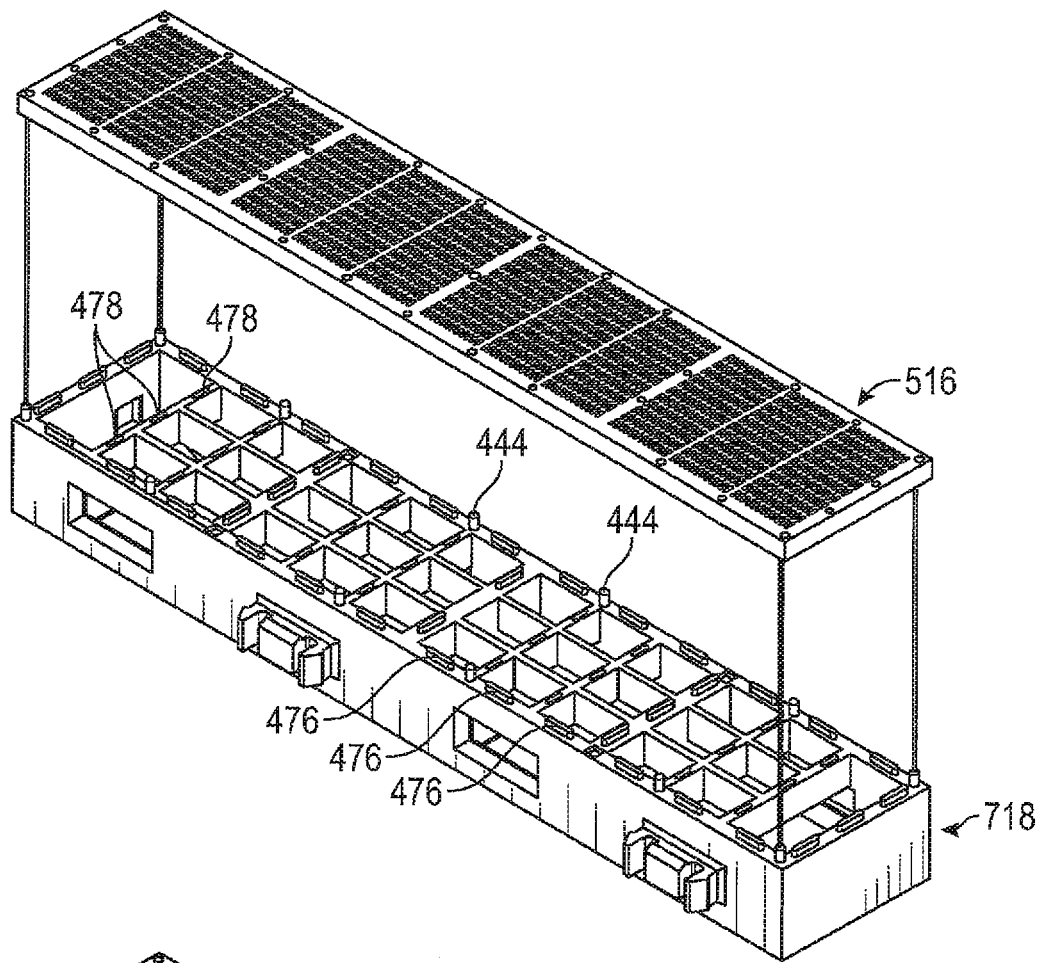

FIG. 67 is an exploded isometric view of an end subgrid showing a screen element prior to attachment to the end subgrid, according to an exemplary embodiment.

Figure 67A:
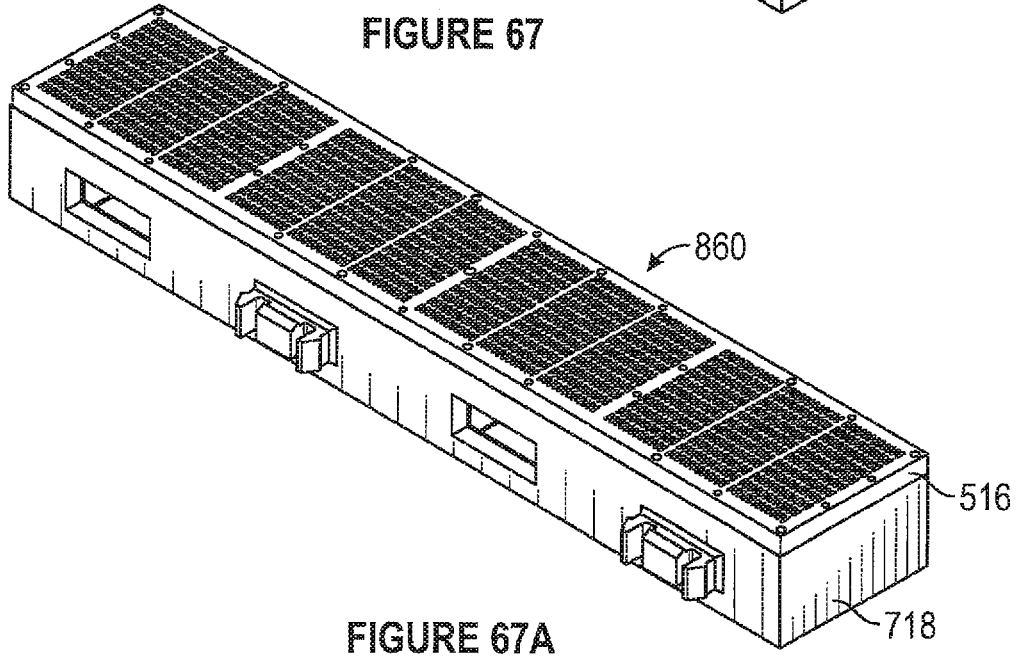

FIG. 67A is an isometric view of the end subgrid shown in FIG. 67 having the screen element attached thereto, according to an exemplary embodiment.

Figure 68:
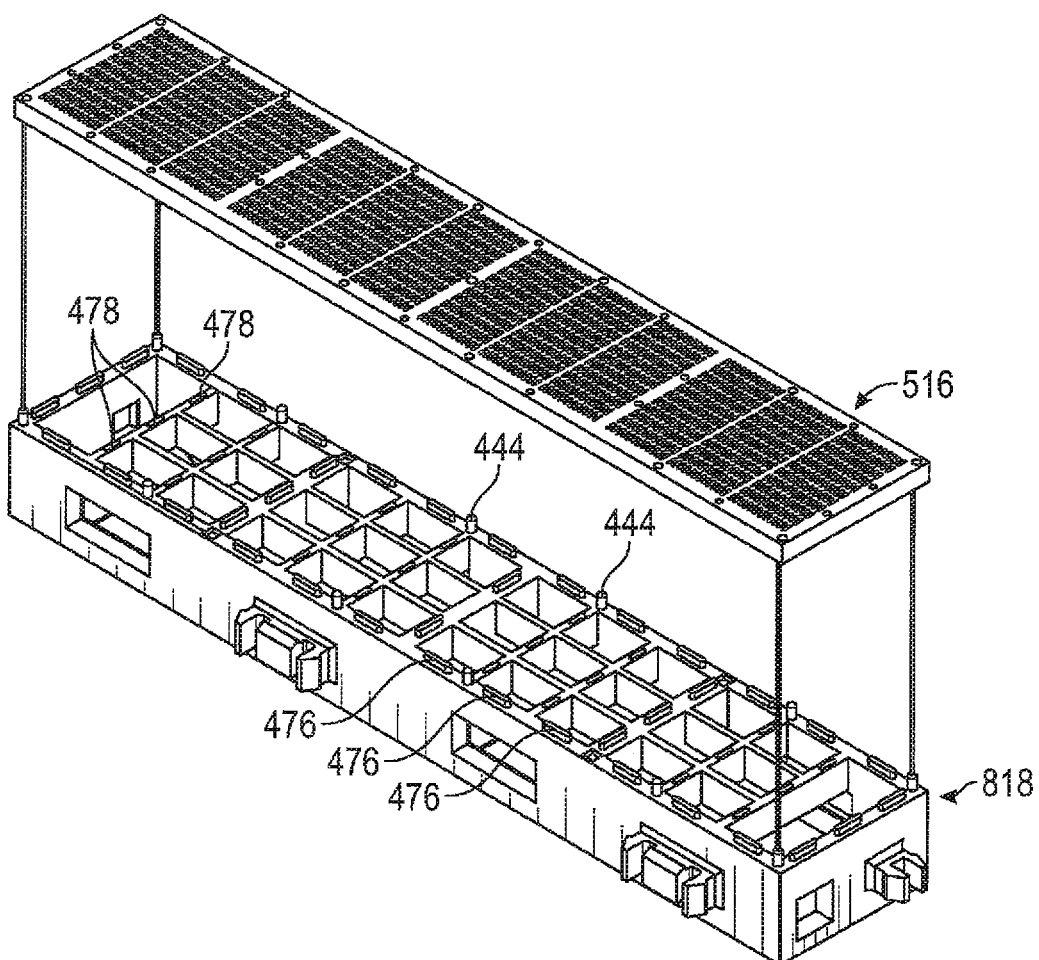

FIG. 68 is an exploded isometric view of a center subgrid showing a screen element prior to attachment to the center subgrid, according to an exemplary embodiment.

Figure 68A:
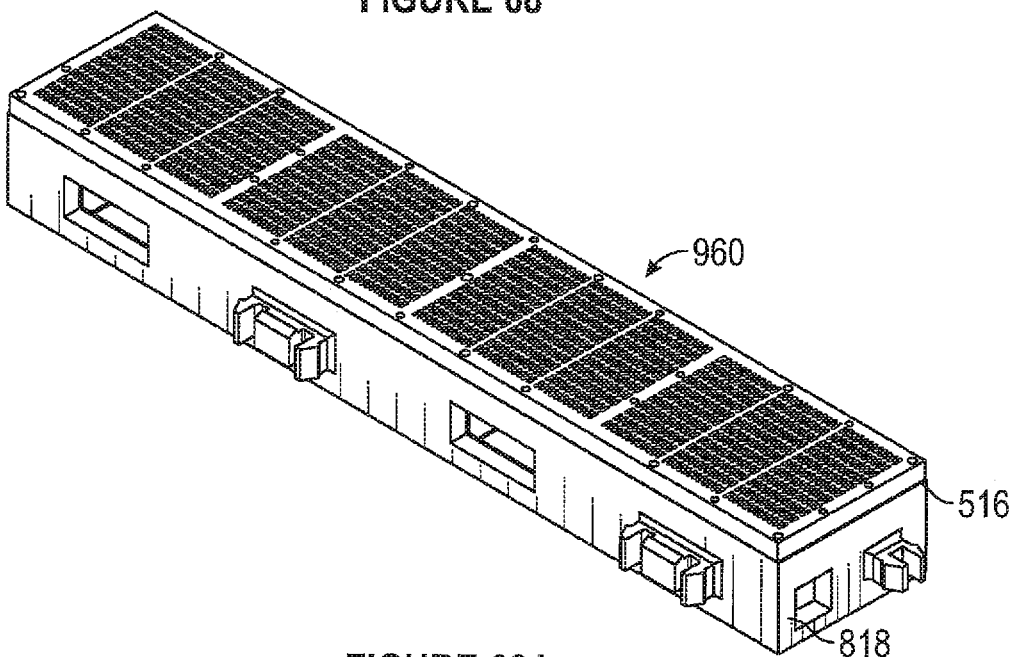

FIG. 68A is an isometric view of the center subgrid shown in FIG. 68 having the screen element attached thereto, according to an exemplary embodiment.

Figure 69:
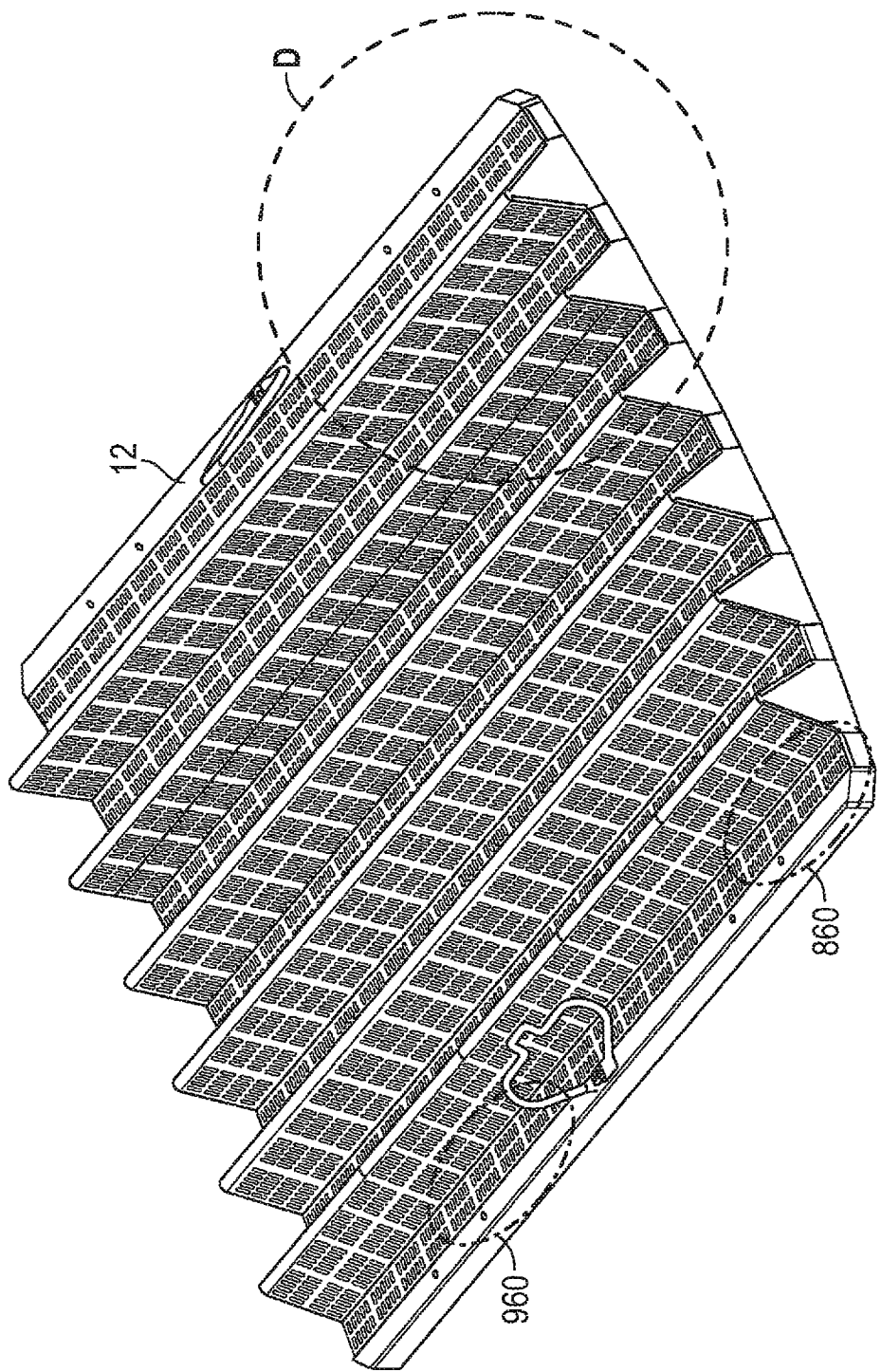

FIG. 69 is an isometric view of a screen assembly having pyramidal shaped subgrids, according to an exemplary embodiment of the present invention.

Figure 69A:
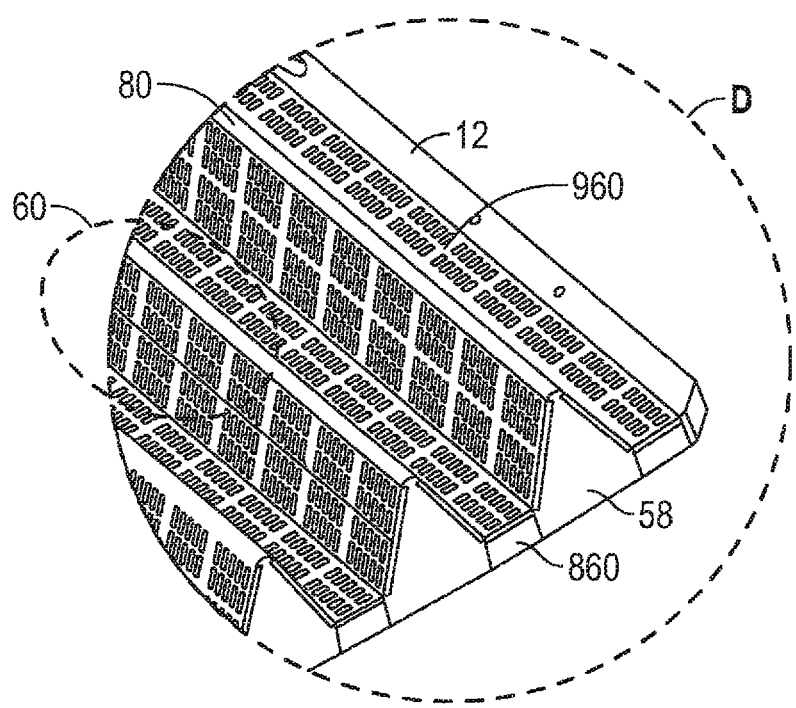

FIG. 69A is an enlarged view of section D of the screen assembly shown in FIG. 69.

Figure 66:
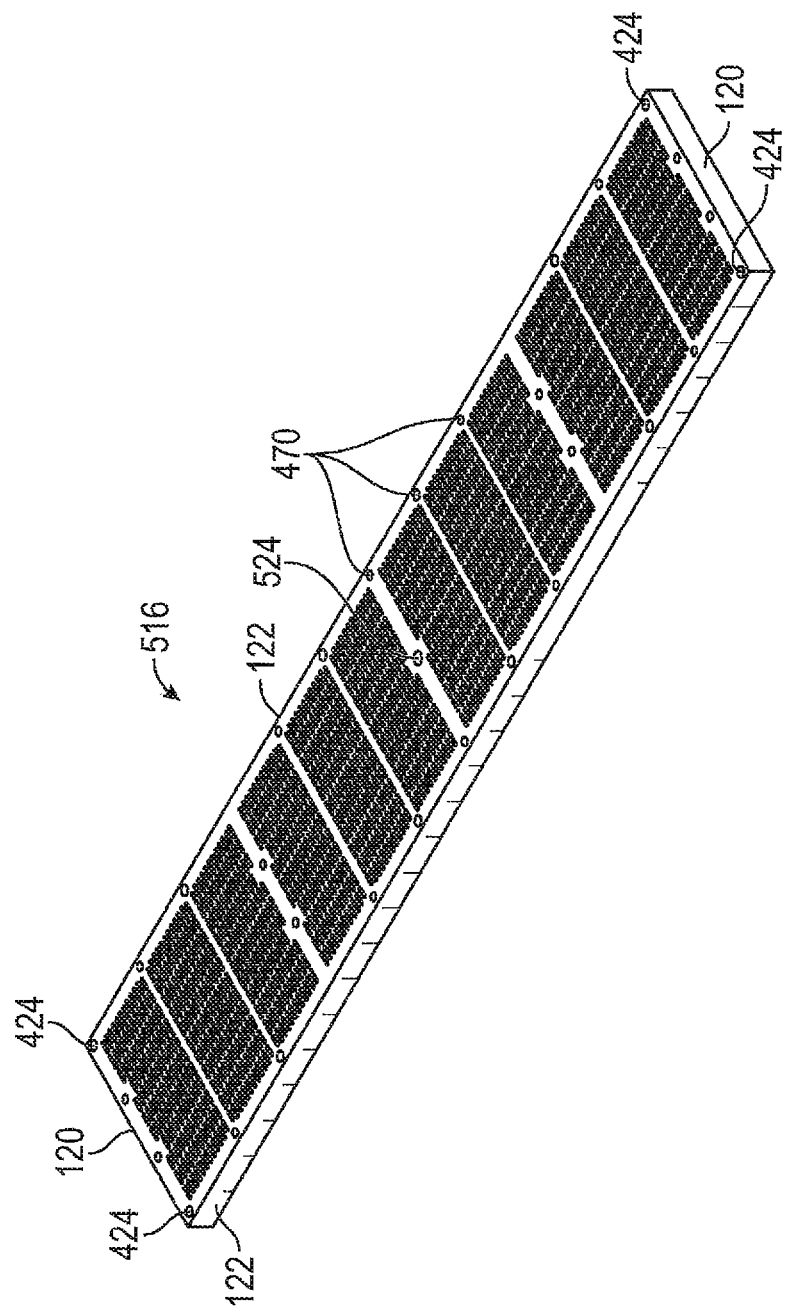
Figure 66A:
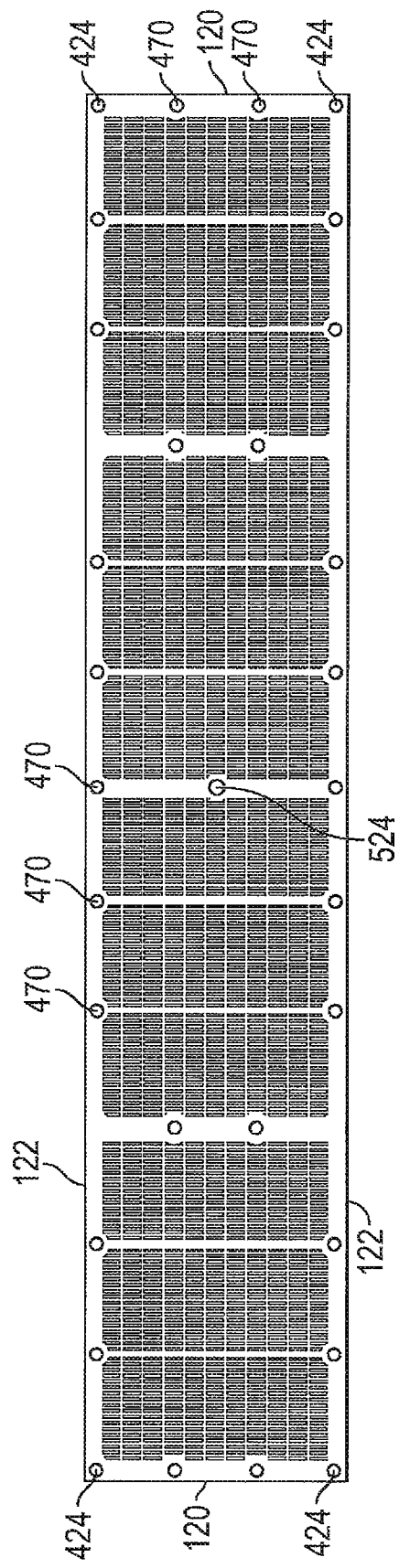
Figure 66B:
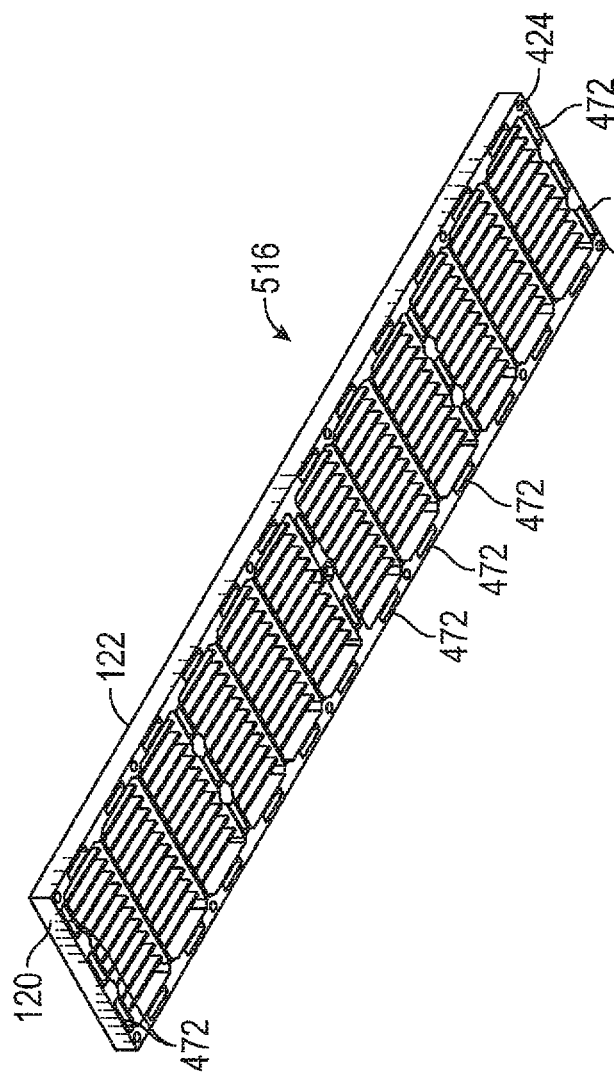
Figure 66C:
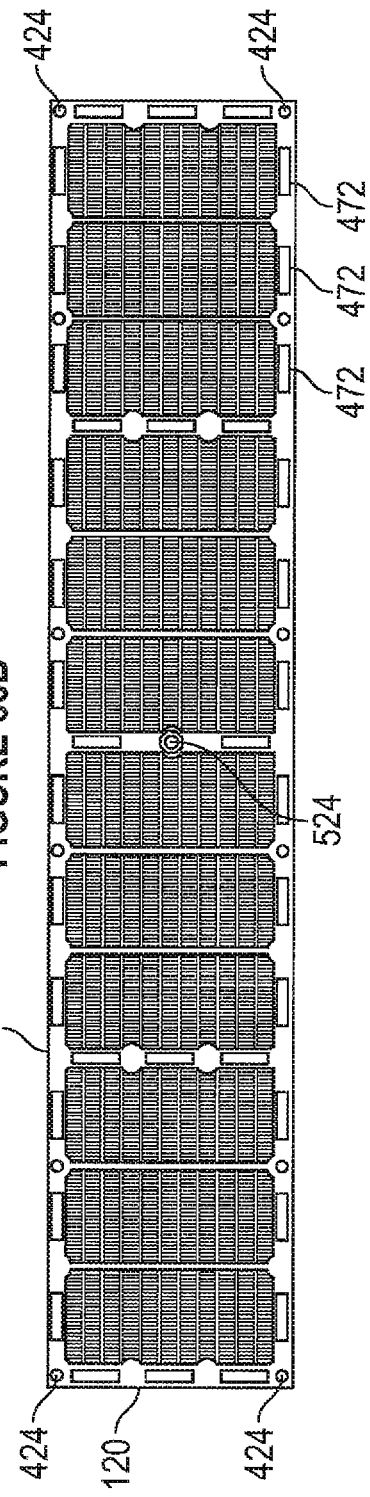

FIG. 70 is a reproduction of FIG. 66C, illustrating a bottom view of a screen element, for comparison with the screen element of FIG. 70A.

FIG. 70A is a bottom view of a screen element having smaller features than the screen element of FIGS. 70 and 66.

Figure 65:
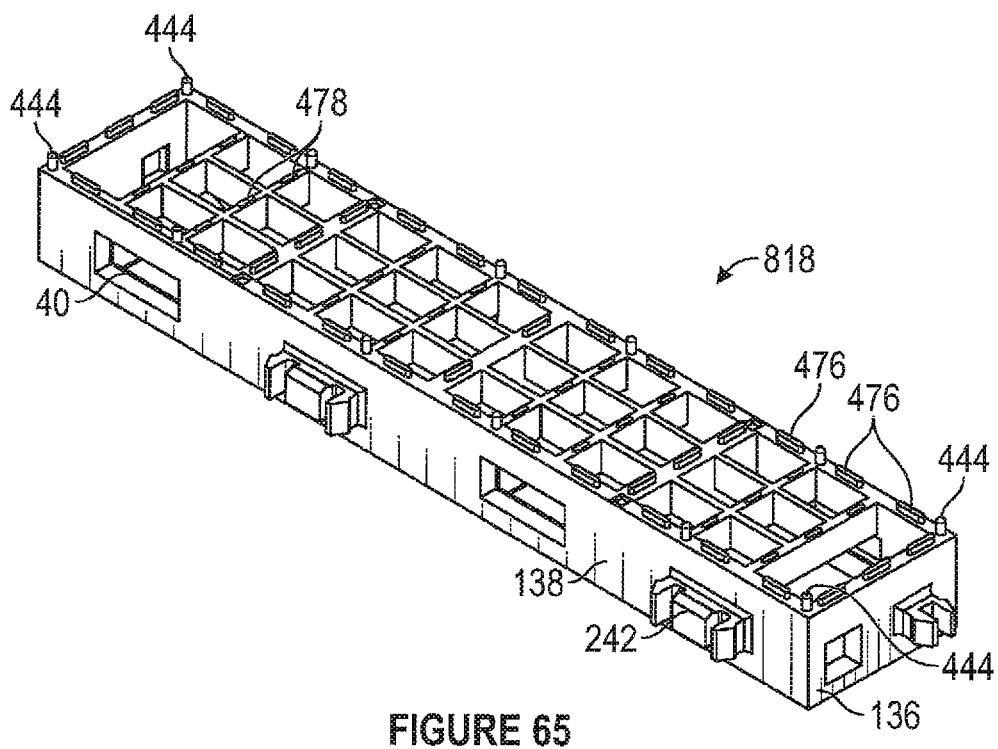
Figure 71:
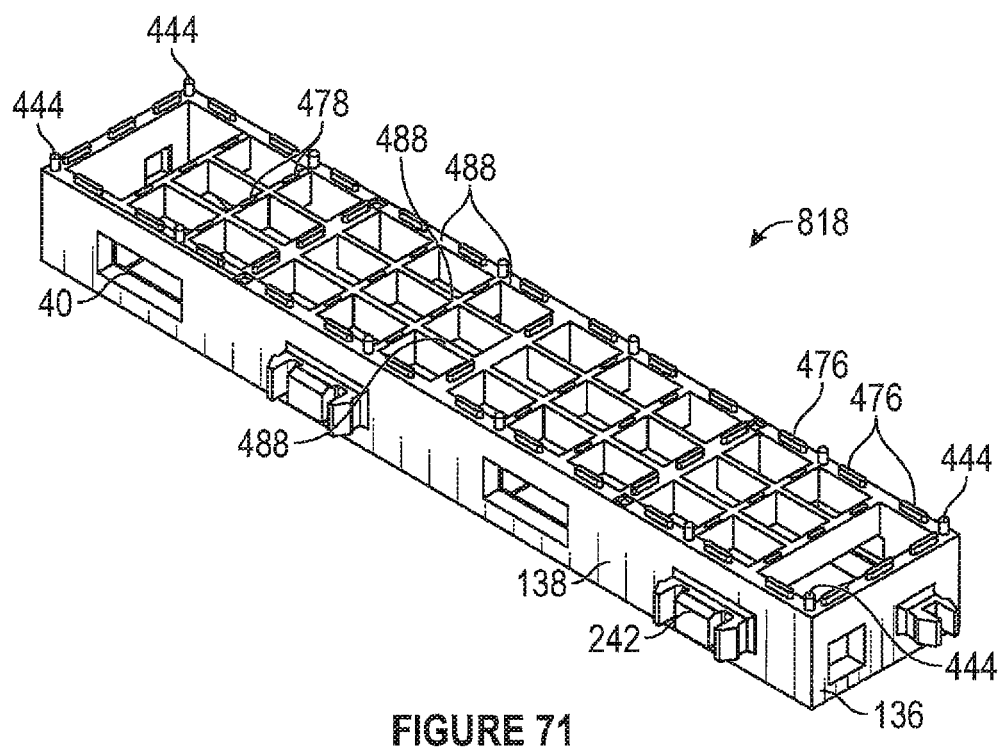
Figure 71A:
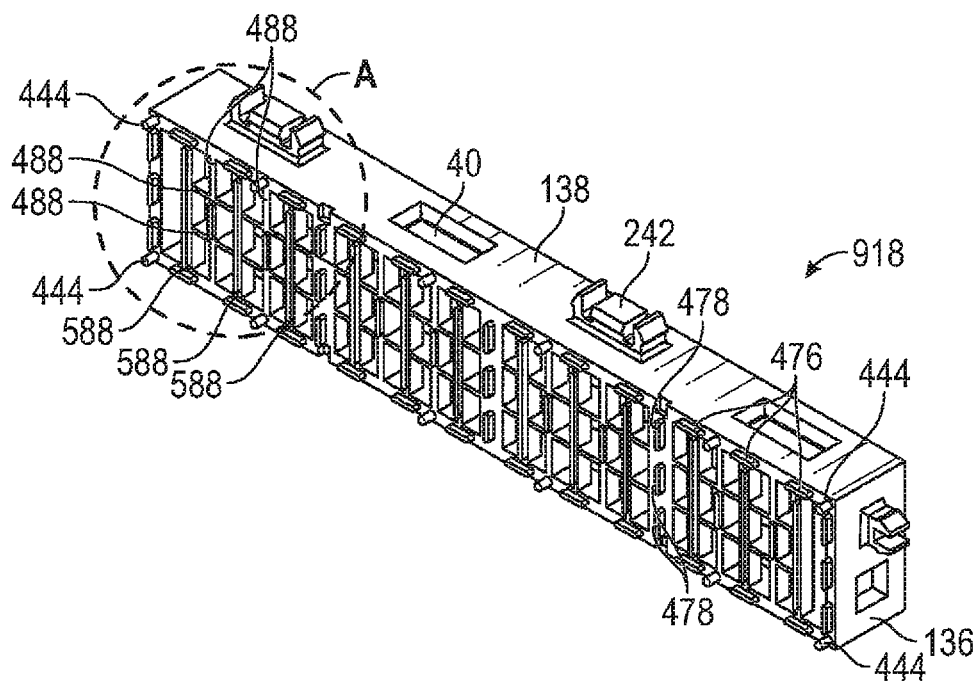

FIG. 71 is a reproduction of FIG. 65, illustrating a top isometric view of a center subgrid, for comparison with the center subgrid of FIG. 71A.

FIG. 71A is a side isometric view of a center subgrid, according to an embodiment.

Figure 71B:
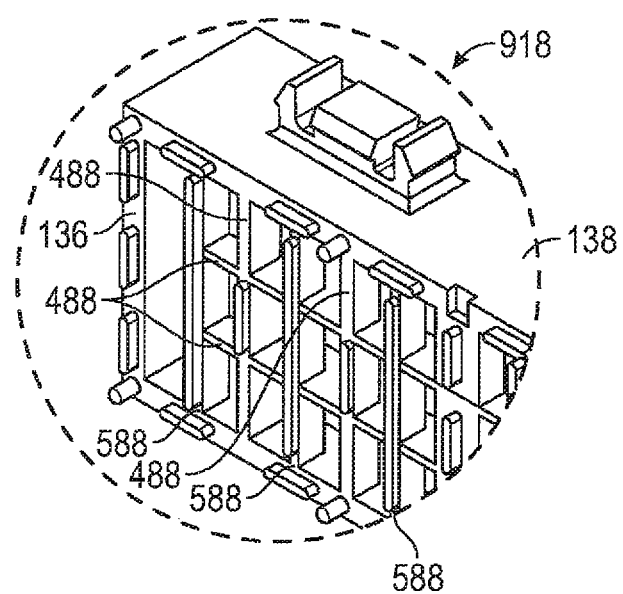

FIG. 71B is an enlarged view of region "A" of FIG. 71A, according to an embodiment.

Figure 71C:
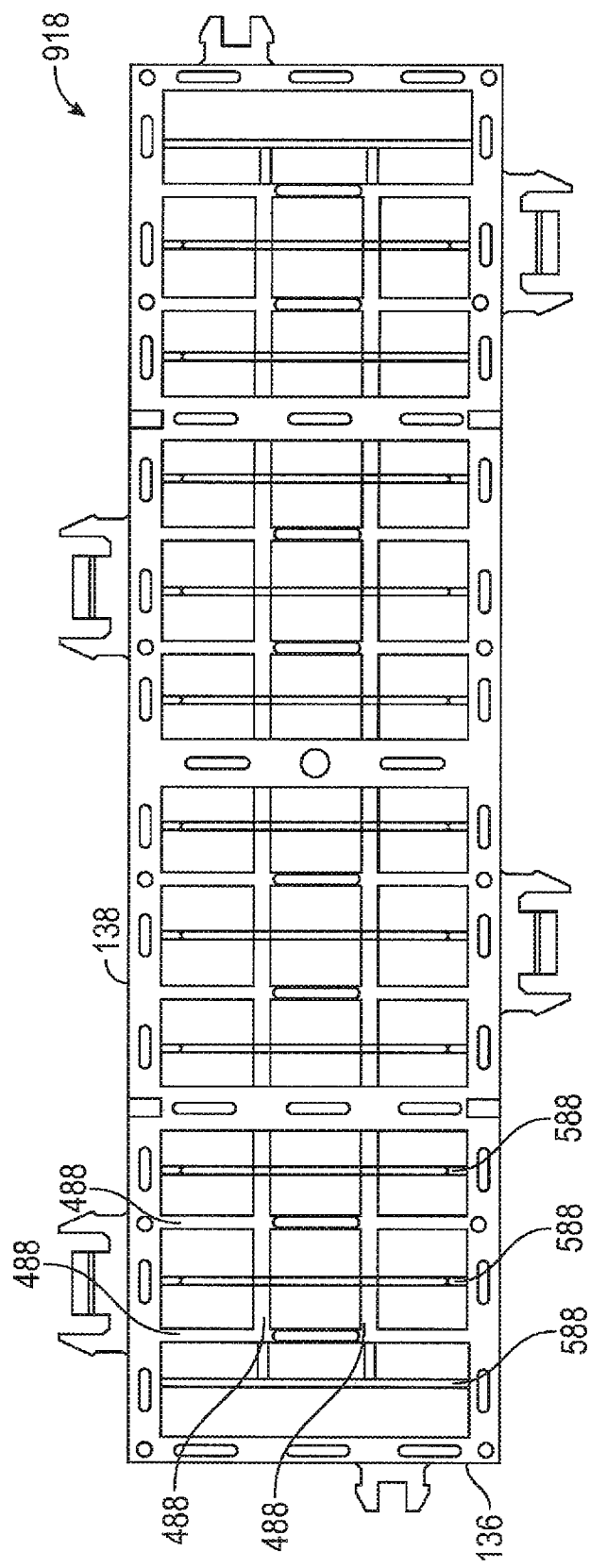

FIG. 71C is a top down view of the center subgrid of FIG. 71A, according to an embodiment.

Figure 71D:
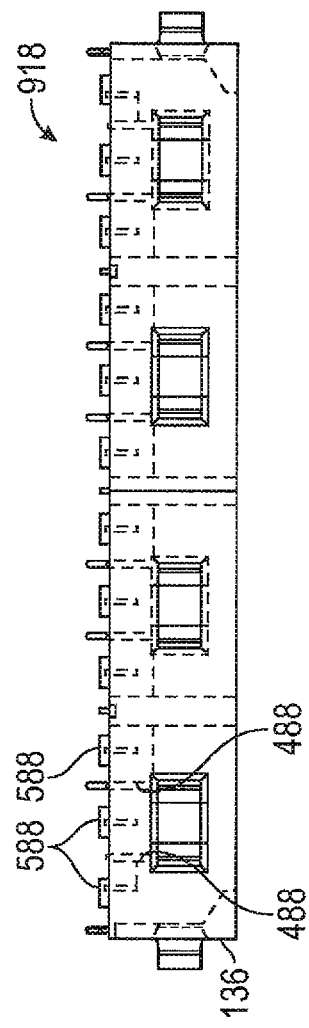

FIG. 71D is a side view of the center subgrid of FIG. 71A, according to an embodiment.

Figure 71E:
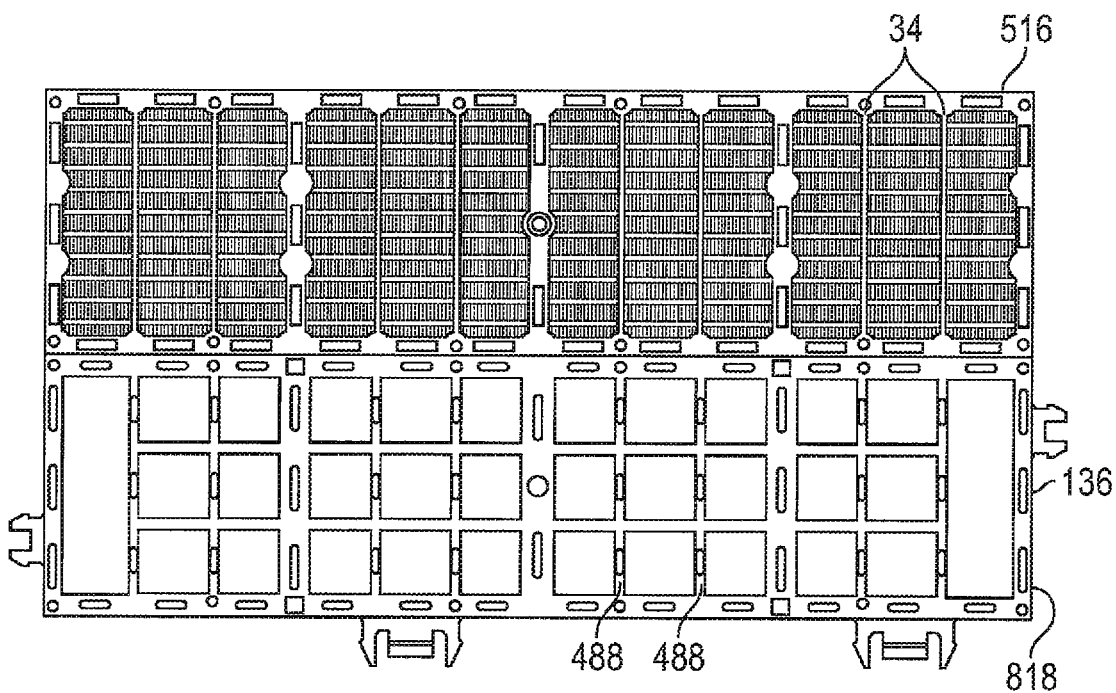

FIG. 71E illustrates features of a screen element in comparison with support features of an end subgrid, according to an embodiment.

Figure 71F:
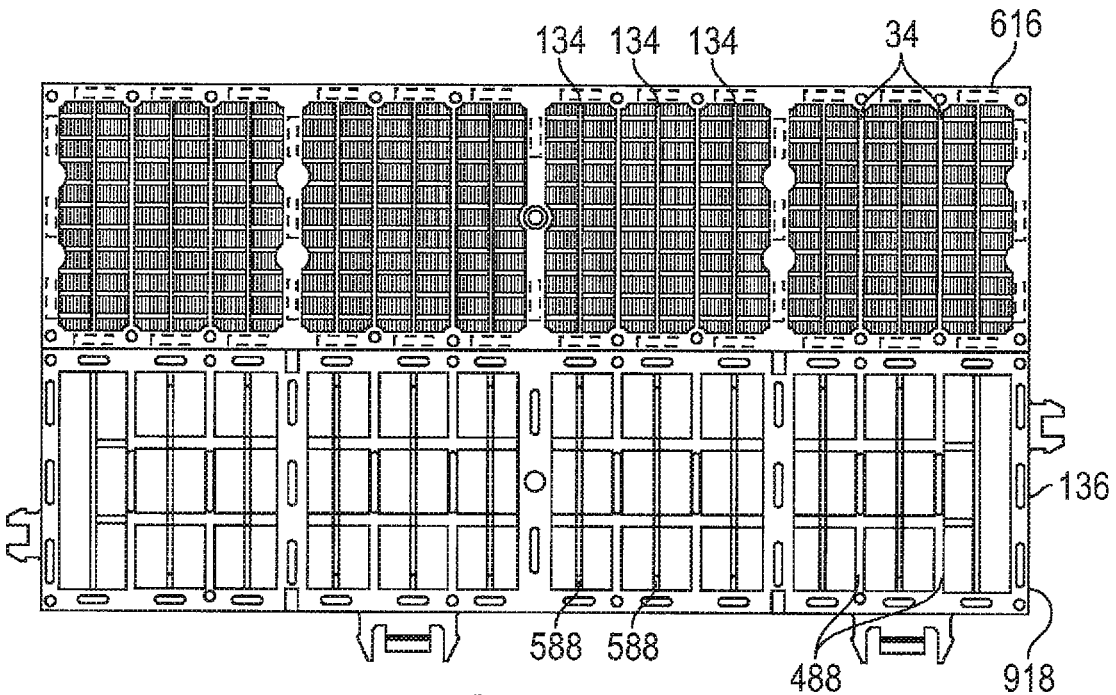

FIG. 71F illustrates features of a further screen element in comparison with support features of a further end subgrid, according to an embodiment.

Figure 63:
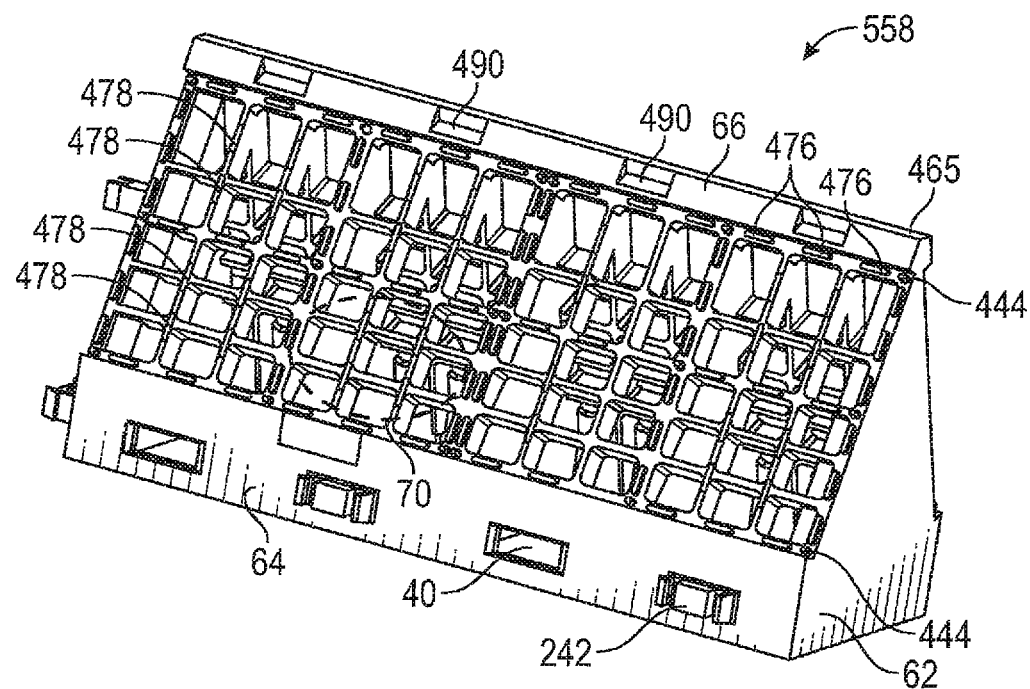
FIG. 63 is a top isometric view of a pyramidal shaped end subgrid, according to an exemplary embodiment.
Figure 72:
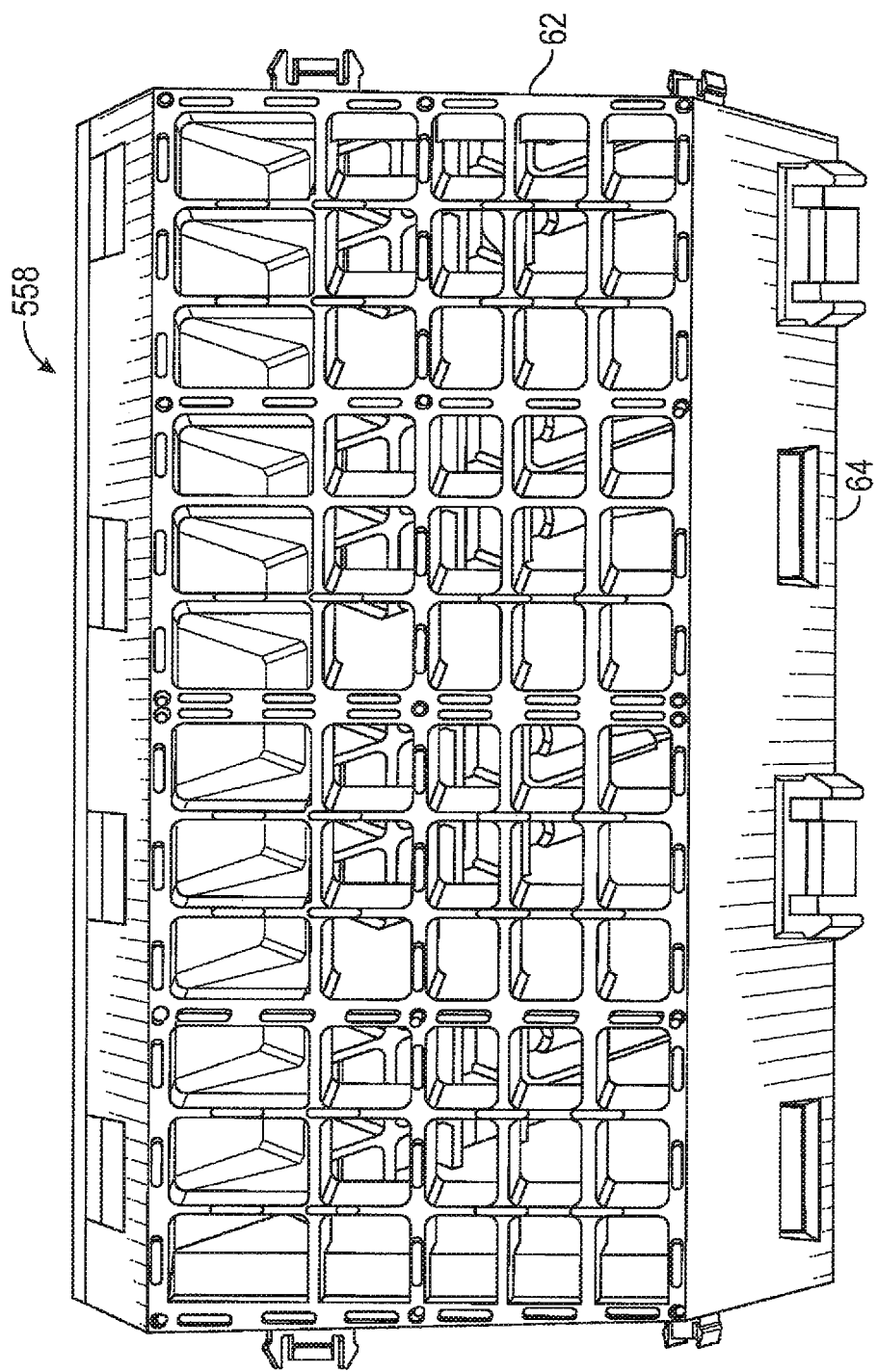
Figure 72A:
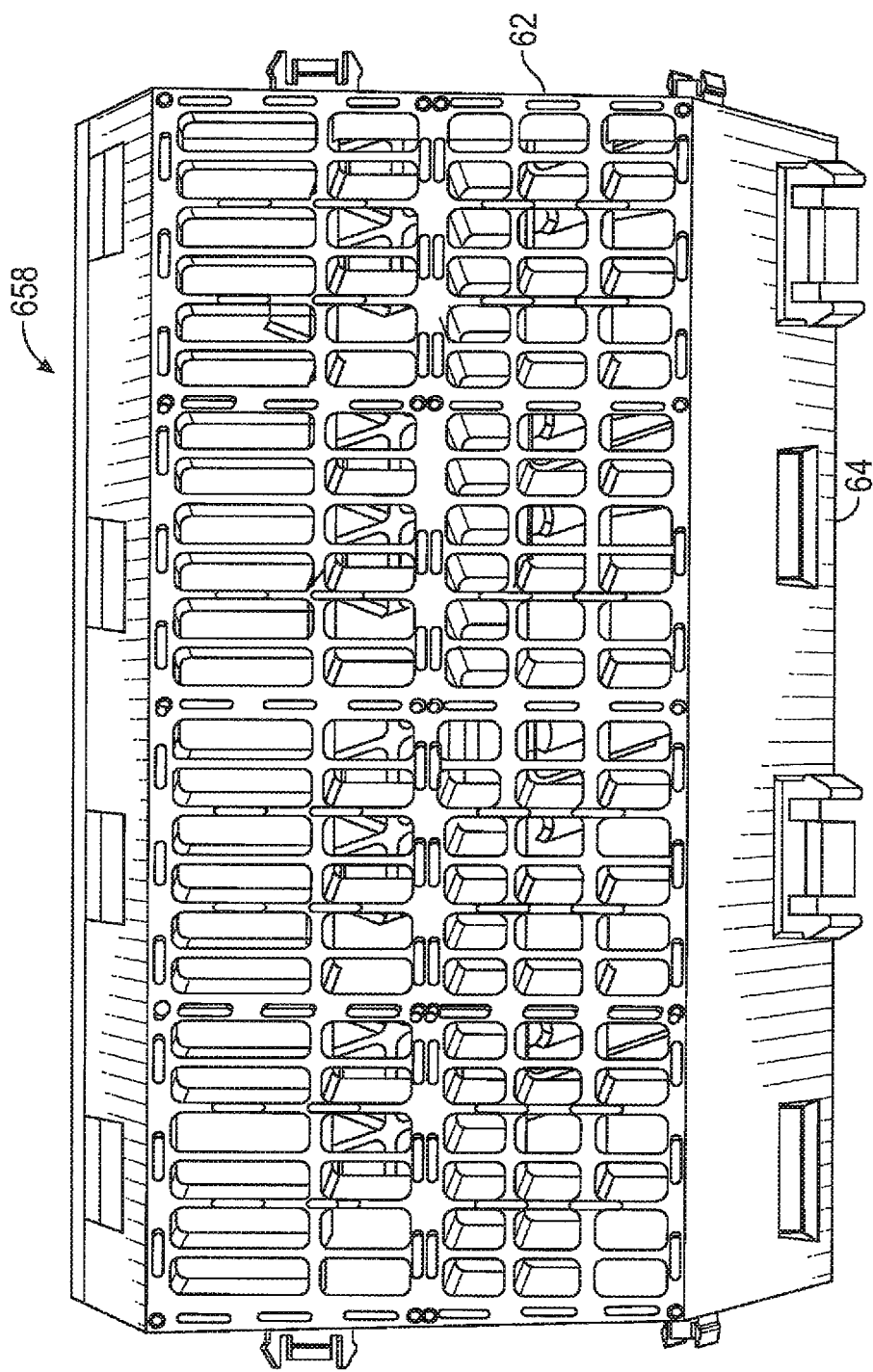

FIG. 72 illustrates a pyramidal shaped end subgrid similar to the pyramidal shaped end subgrid of FIG. 63, for comparison with the pyramidal shaped end subgrid of FIG. 72A.

FIG. 72A illustrates a pyramidal shaped end subgrid having a higher linear density of structural features than the 72, according to an embodiment.

Figure 72B:
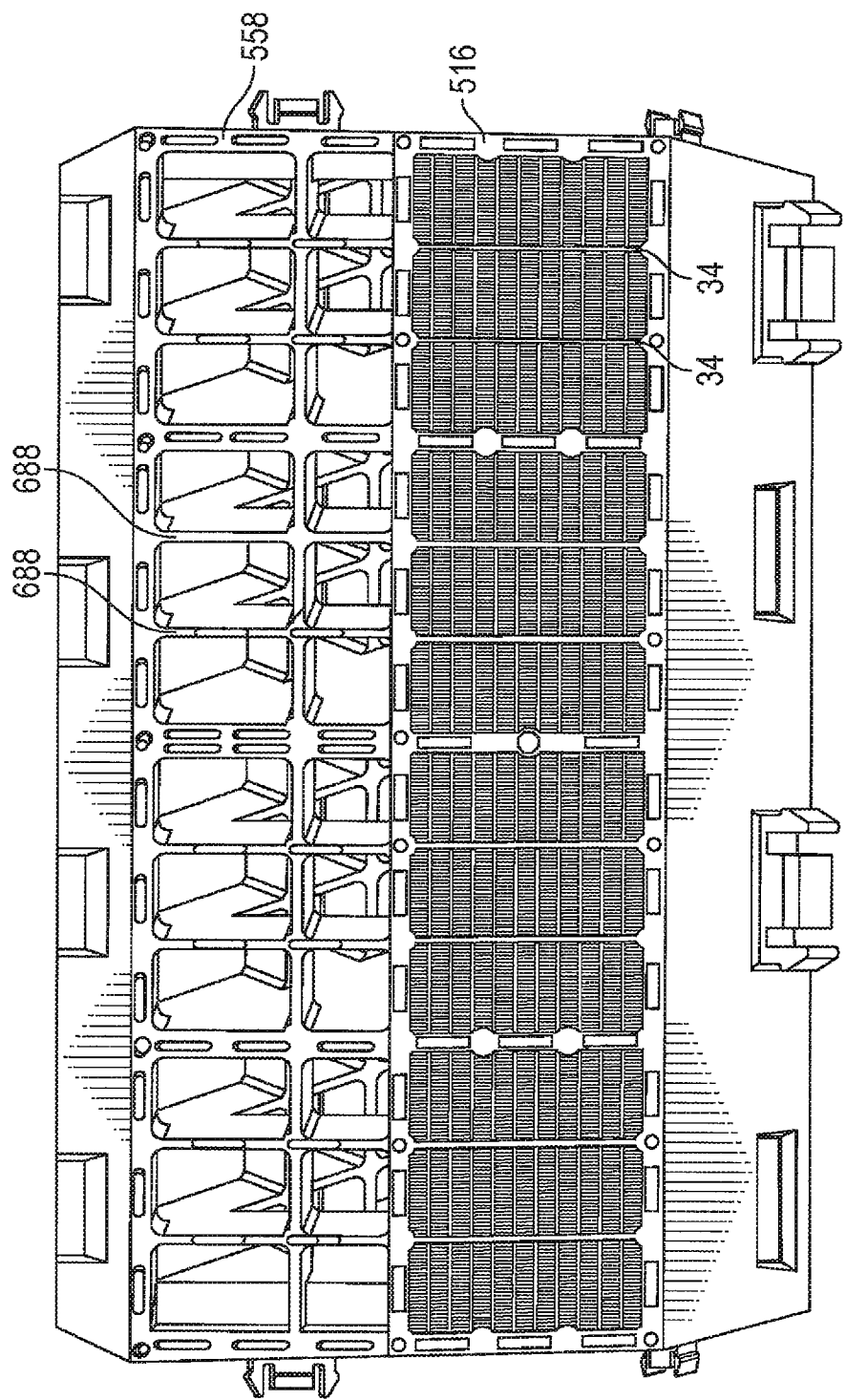

FIG. 72B illustrates features of a screen element in comparison with support features of a pyramidal shaped end subgrid, according to an embodiment.

Figure 72C:
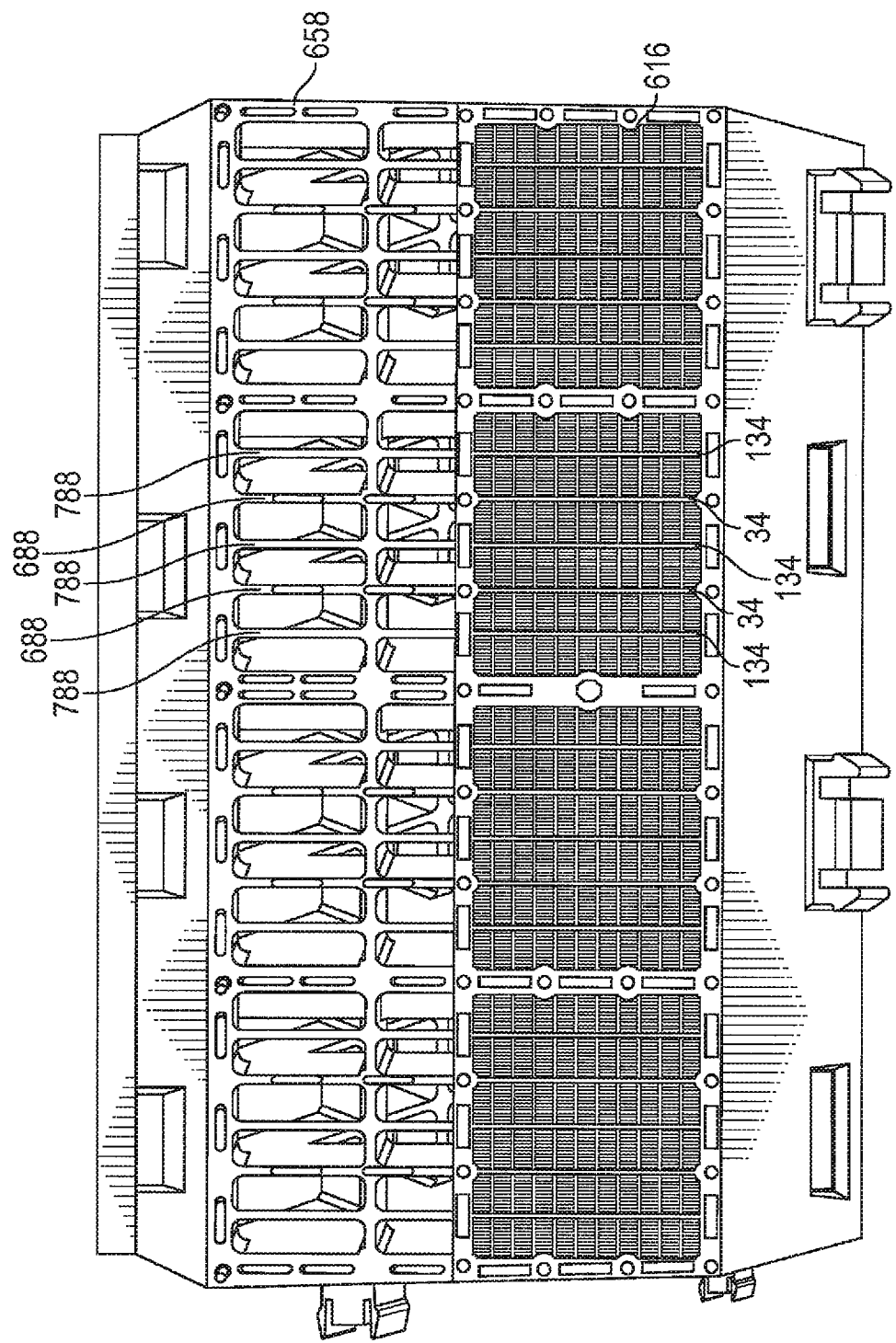

FIG. 72C illustrates features of a further screen element in comparison with support features of a further pyramidal shaped end subgrid, according to an embodiment.

FIG. 73 illustrates a top-down view of a screen element, previously illustrated in FIGS. 70A, 71F, and 72C, in which a first cross section direction A-A and a second cross section direction C-C is defined, according to an embodiment.

FIG. 73A illustrates a first cross section, defined by the first cross section direction A-A of FIG. 73, according to an embodiment.

Figure 73B:
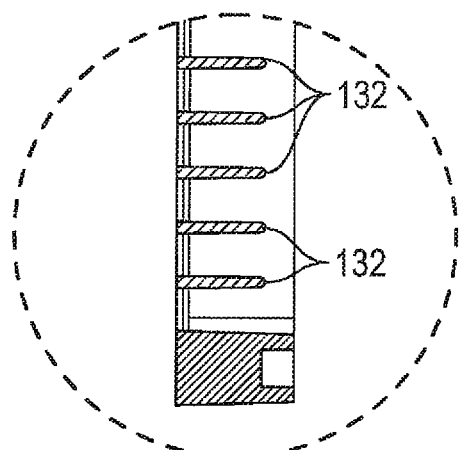

FIG. 73B illustrates an enlarged view of the first cross section illustrated in FIG. 73A, according to an embodiment.

Figure 73C:
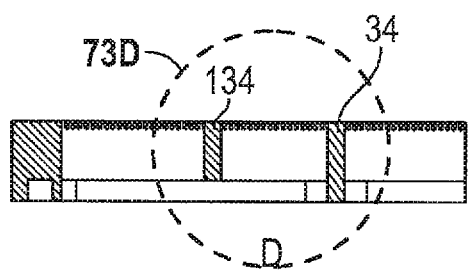

FIG. 73C illustrates a second cross section of the screen element of FIG. 73 defined by the second cross section direction C-C of FIG. 73, according to an embodiment.

Figure 73D:
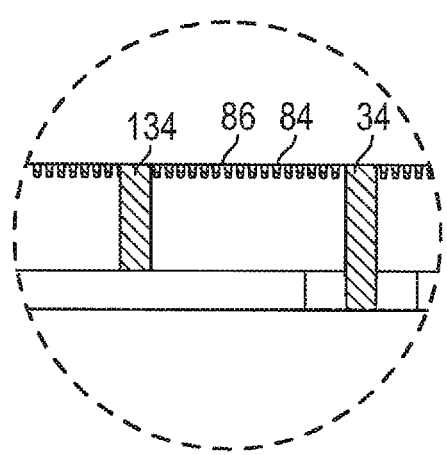

FIG. 73D illustrates an enlarged view of the second cross section illustrated in FIG. 73C, according to an embodiment.

Figure 74:
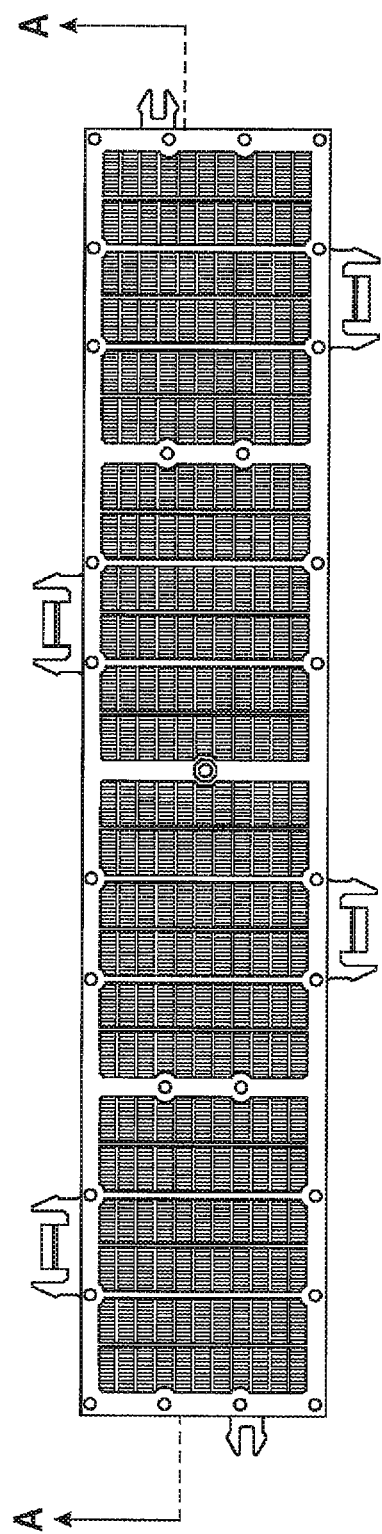

FIG. 74 illustrates a top-down view of the center screen subassembly similar to center screen subassembly of FIG. 68A, in which a cross section direction A-A is defined, according to an embodiment.

Figure 74A:
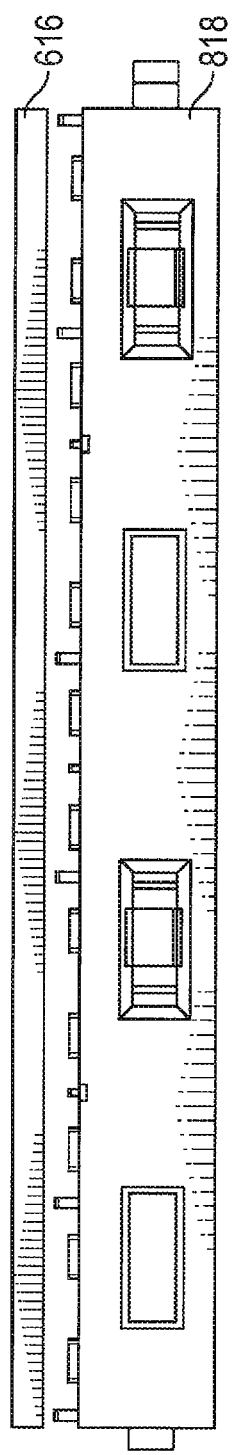

FIG. 74A illustrates a side view of the center screen subassembly of FIG. 74, according to an embodiment.

Figure 74B:
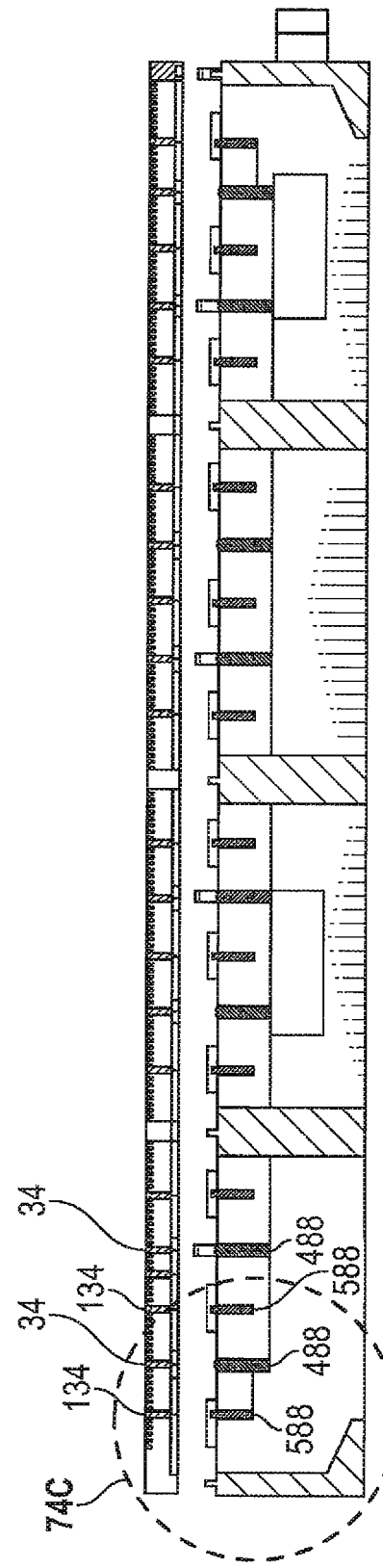

FIG. 74B illustrates a cross section, defined by the cross section direction A-A of FIG. 74, according to an embodiment.

Figure 74C:
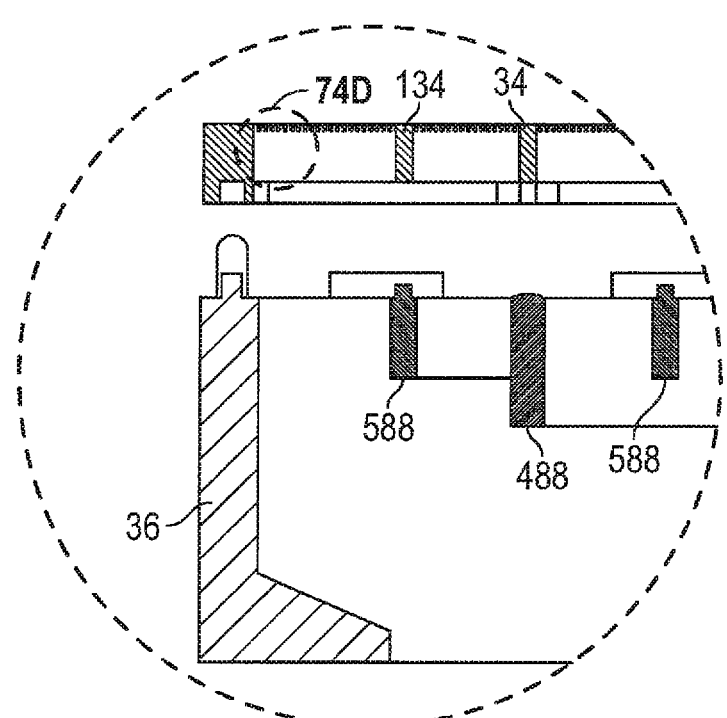

FIG. 74C illustrates a first enlarged view of a first portion of the cross section of center screen subassembly of FIG. 74B, according to an embodiment.

Figure 74D:
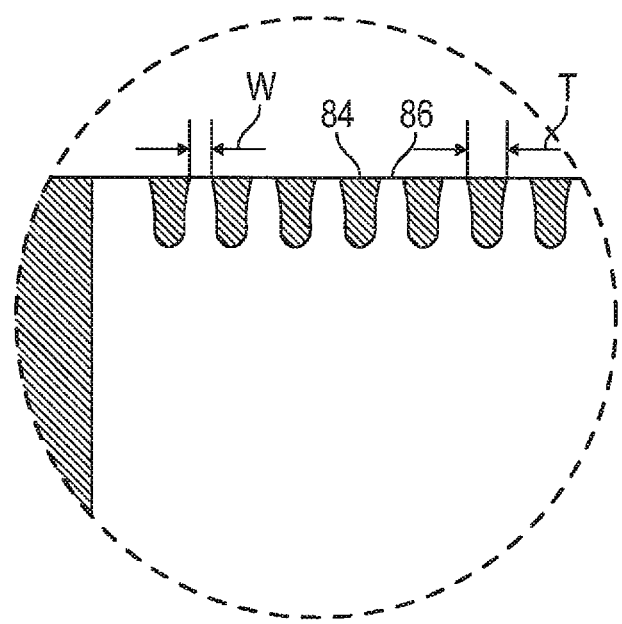

FIG. 74D illustrates a second enlarged view of a second portion of the cross section of center screen subassembly of FIG. 74C, according to an embodiment.

Figure 75:
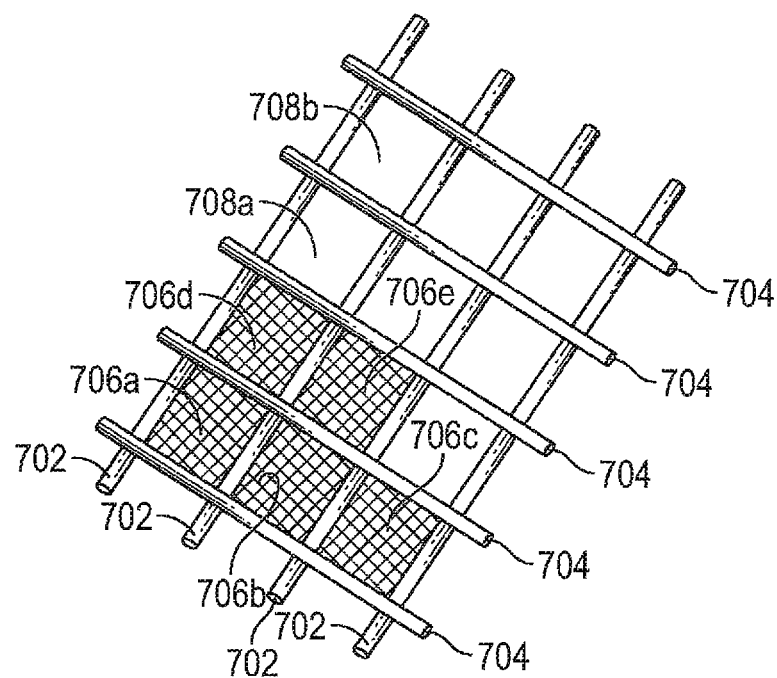

FIG. 75 illustrates screen subassemblies that have been attached to rectangular regions formed by a grid framework formed by first and second pluralities of rails, according to an embodiment.

Figure 76:
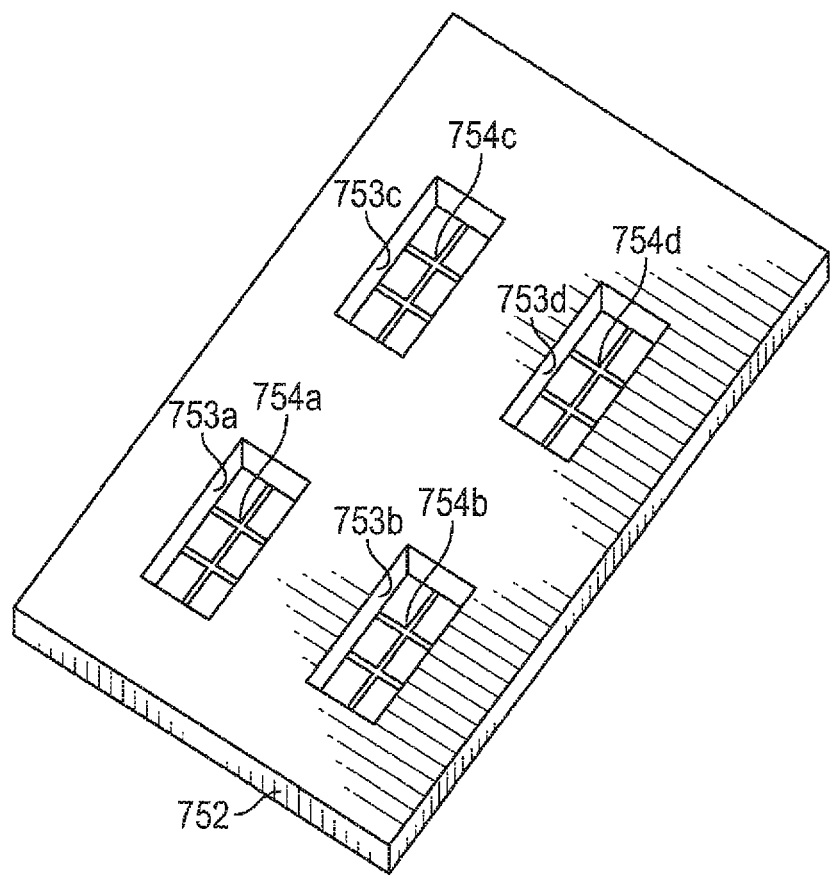

FIG. 76 illustrates screen elements directly attached to a plate structure without the need to first attach the screen elements to subgrids, according to an embodiment.

Figure 76A:
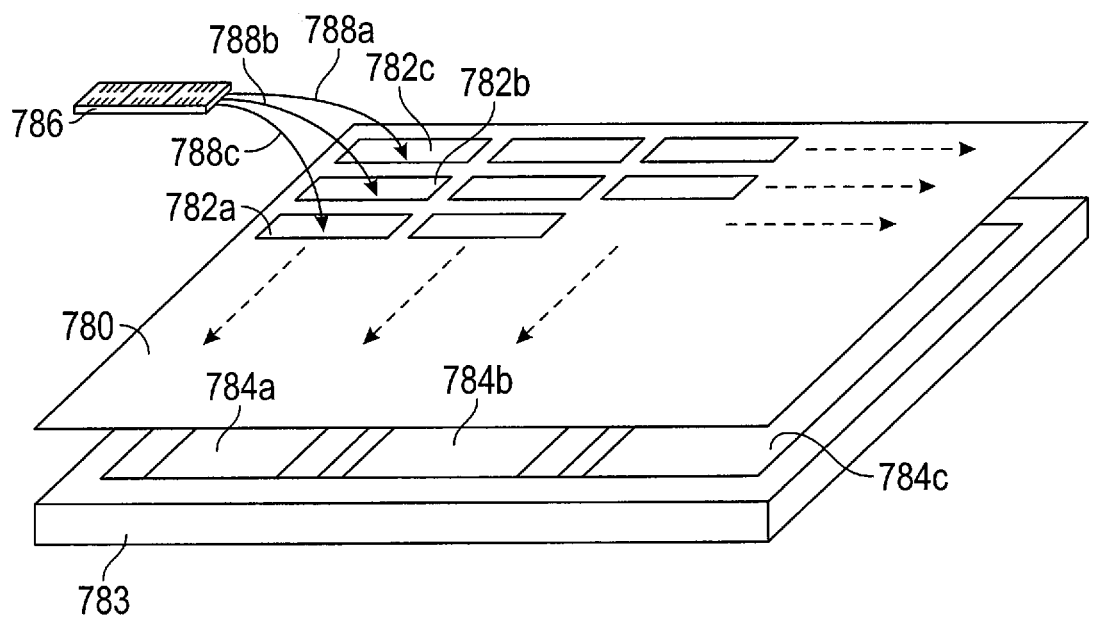

FIG. 76A illustrates screen elements configured to be directly attached to a punched plate, according to an embodiment.

Figure 76B:
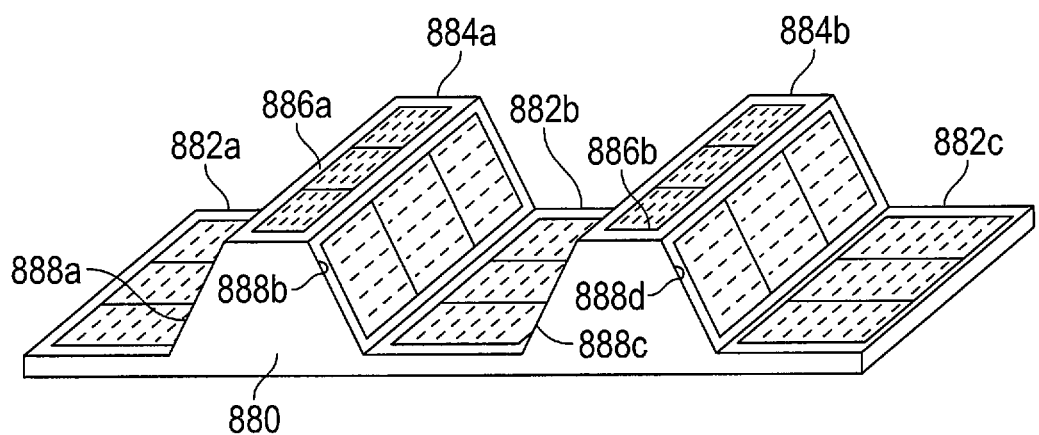

FIG. 76B illustrates screen elements configured to be directly attached to a corrugated punched plate, according to an embodiment.

Figure 76C:
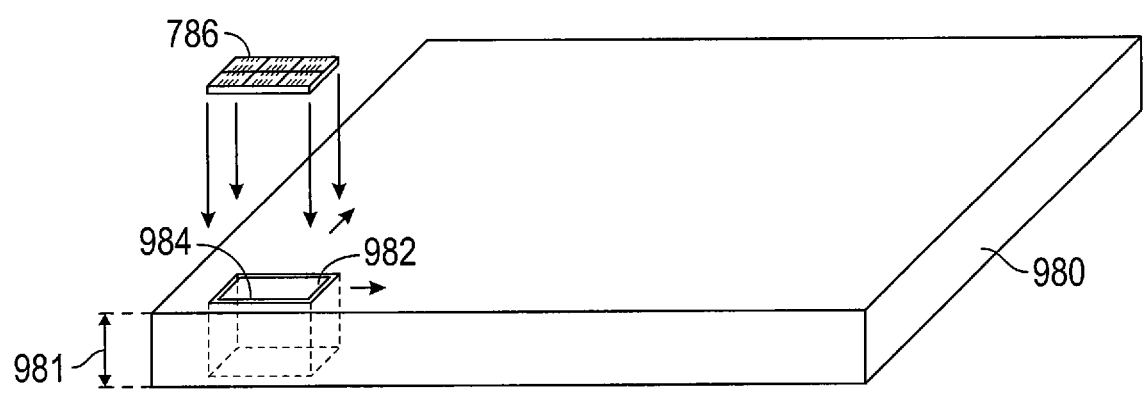

FIG. 76C illustrates a frame having pockets to accommodate screen elements, according to an embodiment.

Figure 77C:
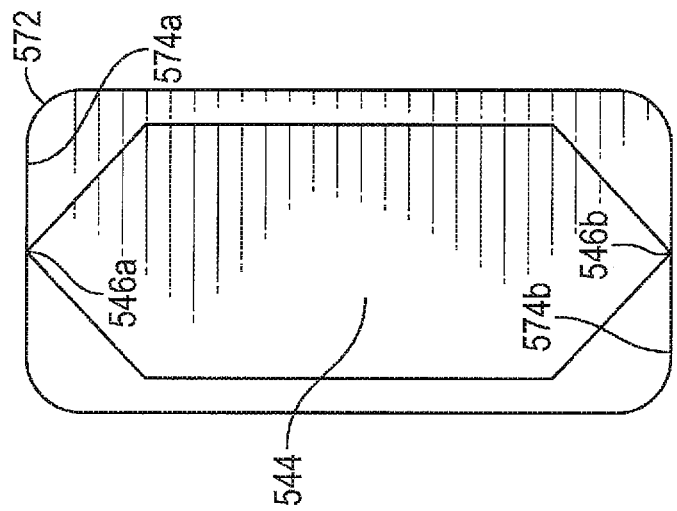
Figure 77B:
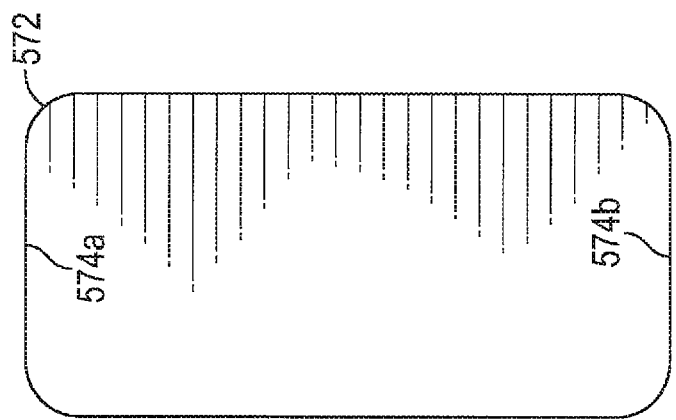
Figure 77A:
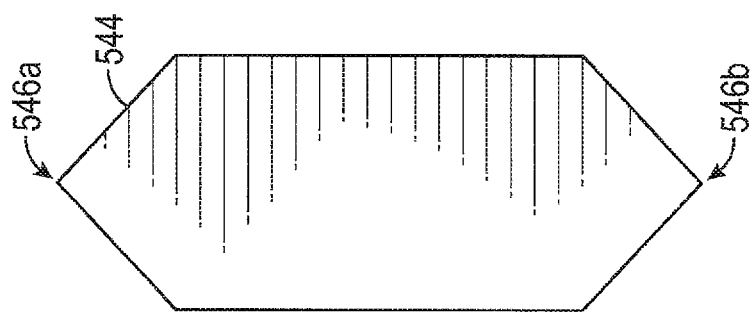

FIG. 77A illustrates an embodiment fusion bar that may serve as a location member, according to an embodiment.

FIG. 77B illustrates an embodiment cavity pocket that may serve as a location aperture, according to an embodiment.

FIG. 77C illustrates alignment of the fusion bar of FIG. 77A with the cavity pocket of FIG. 77B.

DETAILED DESCRIPTION

Like reference characters denote like parts in several drawings.

Embodiments of the present invention provide a screen assembly that includes injection molded screen elements that are mated to a subgrid. Multiple subgrids are securely fastened to each other to form the vibratory screen assembly, which has a continuous screening surface and is configured for use on a vibratory screening machine. The entire screen assembly structure is configured to withstand rigorous loading conditions encountered when mounted and operated on a vibratory screening machine. Injection molded screen elements provide for many advantages in screen assembly manufacturing and vibratory screening applications. In certain embodiments of the present invention, screen elements are injection molded using a thermoplastic material. In certain embodiments of the present invention, screen elements may have a first adhesion arrangement configured to mate with a second adhesion arrangement on a subgrid. The first and second adhesion arrangements may include different materials and may be configured such that screen elements may be fused to the subgrid via laser welding. The first adhesion arrangement may be a plurality of pocket cavities and the second adhesion arrangement may be a plurality of fusion bars, which may be configured to melt when subjected to a laser. Screen elements may include a thermoplastic polyurethane, which may be polyester based or poly-ether based. Embodiments of the present invention include screen elements secured to subgrids via a hardened mixture of separate materials. Embodiments of the present invention include methods of fabricating a screen assembly by fusing screen elements to subgrids via laser welding and attaching multiple subgrids together to form the screen assembly.

Embodiments of the present invention provide injection molded screen elements that are of a practical size and configuration for manufacture of vibratory screen assemblies and for use in vibratory screening applications. Several important considerations have been taken into account in the configuration of individual screen elements. Screen elements are provided that: are of an optimal size (large enough for efficient assembly of a complete screen assembly structure yet small enough to injection mold (micromold in certain embodiments) extremely small structures forming screening openings while avoiding freezing (i.e., material hardening in a mold before completely filling the mold)); have optimal open screening area (the structures forming the openings and supporting the openings are of a minimal size to increase the overall open area used for screening while maintaining, in certain embodiments, very small screening openings necessary to properly separate materials to a specified standard); have durability and strength, can operate in a variety of temperature ranges; are chemically resistant; are structural stable; are highly versatile in screen assembly manufacturing processes; and are configurable in customizable configurations for specific applications.

Embodiments of the present invention provide screen elements that are fabricated using extremely precise injection molding. The larger the screen element the easier it is to assemble a complete vibratory screening assembly. Simply put, the fewer pieces there are to put together, the easier the system will be to put together. However, the larger the screen element the more difficult it is to injection mold extremely small structures, i.e. the structures forming the screening openings. It is important to minimize the size of the structures forming the screening openings so as to maximize the number of screening openings on an individual screen element and thereby optimize the open screening area for the screening element and thus the overall screen assembly. In certain embodiments, screen elements are provided that are large enough (e.g., one inch by one inch, one inch by two inches, two inches by three inches, etc.) to make it practical to assemble a complete screen assembly screening surface (e.g., two feet by three feet, three feet by four feet, etc.). The relatively "small size" (e.g., one inch by one inch, one inch by two inches, two inches by three inches, etc.) is fairly large when micromolding extremely small structural members (e.g., structural members as small as 43 microns). The larger the size of the overall screen element and the smaller the size of the individual structural members forming the screening openings the more prone the injection molding process is to errors such as freezing. Thus, the size of the screen elements must be practical for screen assembly manufacture while at the same time small enough to eliminate problems such as freezing when micromolding extremely small structures. Sizes of screening elements may vary based on the material being injection molded, the size of the screening openings required and the overall open screening area desired.

Open screening area is a critical feature of vibratory screen assemblies. The average usable open screening area (i.e., actual open area after taking into account the structural steel of support members and bonding materials) for traditional 100 mesh to 200 mesh wire screen assemblies may be in the range of 16%. Specific embodiments of the present invention (e.g., screening assemblies with constructions described herein and having 100 mesh to 200 mesh screen openings) provide screen assemblies in the same range having a similar actual open screening areas. Traditional screens, however, blind fairly quickly in the field which results in the actual opening screening area being reduced fairly quickly. It is not uncommon for traditional metal screens to blind within the first 24 hours of use and to have the actual open screening area reduced by 50%. Traditional wire assemblies also frequently fail as a result of wires being subjected to vibratory forces which place bending loads of the wires. Injection molded screen assemblies, according to embodiments of the present invention, in contrast, are not subject to extensive blinding (thereby maintaining a relatively constant actual open screening area) and rarely fail because of the structural stability and configuration of the screen assembly, including the screen elements and subgrid structures. In fact, screen assemblies according to embodiments of the present invention have extremely long lives and may last for long periods of time under heaving loading. Screen assemblies according to the present invention have been tested for months under rigorous conditions without failure or blinding whereas traditional wire assemblies were tested under the same conditions and blinded and failed within days. As more fully discussed herein, traditional thermoset type assemblies could not be used in such applications.

In embodiments of the present invention a thermoplastic is used to injection mold screen elements. As opposed to thermoset type polymers, which frequently include liquid materials that chemically react and cure under temperature, use of thermoplastics is often simpler and may be provided, e.g., by melting a homogeneous material (often in the form of solid pellets) and then injection molding the melted material. Not only are the physical properties of thermoplastics optimal for vibratory screening applications but the use of thermoplastic liquids provides for easier manufacturing processes, especially when micromolding parts as described herein. The use of thermoplastic materials in the present invention provides for excellent flexure and bending fatigue strength and is ideal for parts subjected to intermittent heavy loading or constant heavy loading as is encountered with vibratory screens used on vibratory screening machines. Because vibratory screening machines are subject to motion, the low coefficient of friction of the thermoplastic injection molded materials provides for optimal wear characteristics. Indeed, the wear resistance of certain thermoplastics is superior to many metals. Further, use of thermoplastics as described herein provides an optimal material when making "snap-fits" due to its toughness and elongation characteristics. The use of thermoplastics in embodiments of the present invention also provides for resistance to stress cracking, aging and extreme weathering. The heat deflection temperature of thermoplastics is in the range of 200° F. With the addition of glass fibers, this will increase to approximately 250° F. to approximately 300° F. or greater and increase rigidity, as measured by Flexural Modulus, from approximately 400,000 PSI to over approximately 1,000,000 PSI. All of these properties are ideal for the environment encountered when using vibratory screens on vibratory screening machines under the demanding conditions encounter in the field.

Embodiments of the present invention may incorporate various materials into subgrid units and/or the screen elements depending on the desired properties of the embodiments. Thermoplastic polyurethane (TPU) may be incorporated into embodiments of the present invention (e.g., screen elements), providing elasticity, transparency, and resistance to oil, grease, and abrasion. TPU also has high shear strength. These properties of TPU are beneficial when applied to embodiments of the present invention, which are subjected to high vibratory forces, abrasive materials and high load demands. Different types of TPU may be incorporated into embodiments depending on the material being screened. For example, polyester-based TPUs may be incorporated into screen assemblies used for oil and/or gas screening because the esters provide superior abrasion resistance, oil resistance, mechanical integrity, chemical resistance and adhesion strength. Poly-ether based TPUs may be incorporated into mining applications where hydrolysis resistance (a property of ether based TPUs) is important. Para-phenylene diisocyanate (PPDI) may be incorporated into embodiments of the present invention. PPDI may provide high performance properties in a variety of screening applications. Materials for embodiments of the present invention may be selected or determined based upon a variety of factors, including performance properties of each material and costs associated with using the materials.

In embodiments of the present invention, materials for a screen element may be selected to have high temperature tolerance, chemical resistance, hydrolytic resistance, and/or abrasion resistance. Screen elements may incorporate materials, such as TPUs, providing the screen elements with a clear appearance. Clear screen elements may allow for efficient laser transmission through the screen elements for laser welding purposes. Subgrid materials may be different than the screen element material. In embodiments of the present invention, subgrids may be nylon. Subgrids may incorporate carbon or graphite. Different materials between screen elements and subgrids may be secured to each other via laser welding, which may provide a much stronger adhesion between the screen elements and the subgrids than alternative attachment methods. The stronger attachment of the screen element to the subgrid provides improved performance of the screen assemblies when subjected to the high vibratory forces of vibratory screening machines and the abrasive forces that occur on the surfaces of the screen elements during screening of materials.

Figure 1:
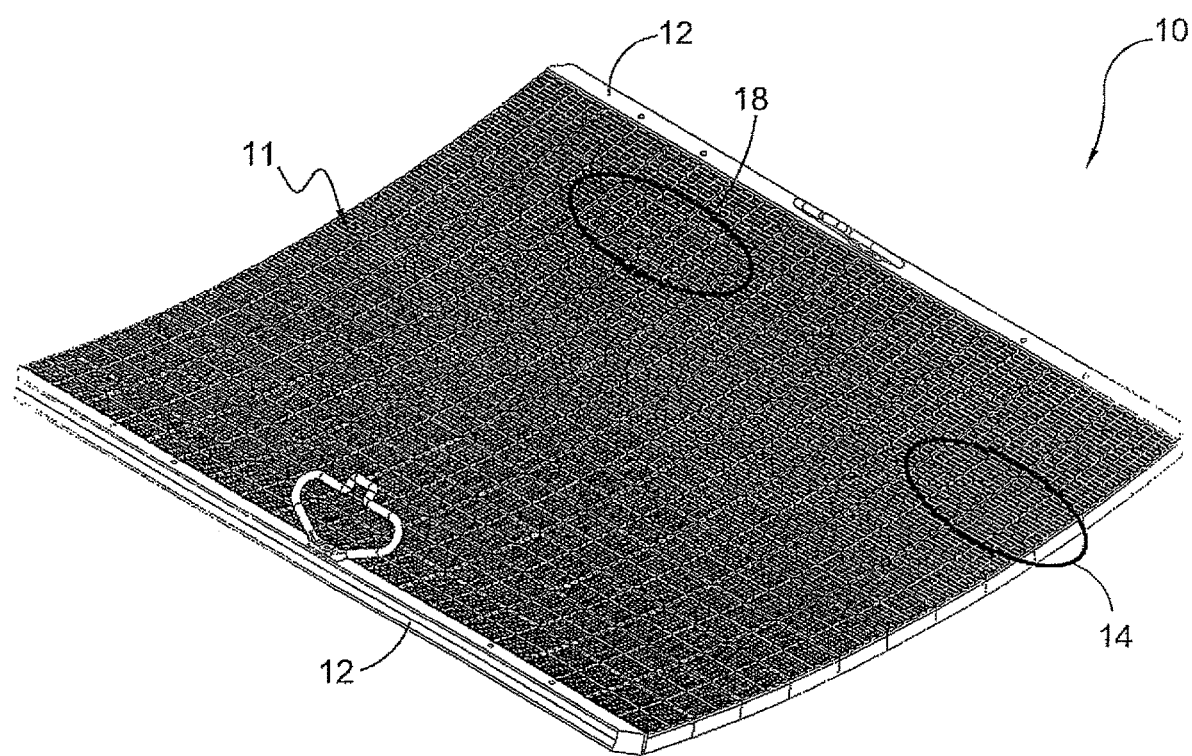
FIG. 1 is an isometric view of a screen assembly, according to an exemplary embodiment of the present invention.

FIG. 1 illustrates a screen assembly 10 for use with vibratory screening machines. Screen assembly 10 is shown having multiple screen elements 16 (See, e.g., FIGS. 2 and 2A-2D) mounted on subgrid structures. The subgrid structures include multiple independent end subgrid units 14 (See, e.g., FIG. 3) and multiple independent center subgrid units 18 (See, e.g., FIG. 4) that are secured together to form a grid framework having grid openings 50. Each screen element 16 spans four grid openings 50. Although screen element 16 is shown as a unit covering four grid openings, screen elements may be provided in larger or smaller sized units. For example, a screen element may be provided that is approximately one-fourth the size of screen element 16 such that it would span a single grid opening 50. Alternatively, a screen element may be provided that is approximately twice the size of screen element 16 such that it would span all eight grid openings of subgrid 14 or 18. Subgrids may also be provided in different sizes. For example, subgrid units may be provided that have two grid openings per unit or one large subgrid may be provided for the overall structure, i.e., a single subgrid structure for the entire screen assembly. In FIG. 1, multiple independent subgrids 14 and 18 are secured together to form the screen assembly 10. Screen assembly 10 has a continuous screen assembly screening surface 11 that includes multiple screen element screening surfaces 13. Each screen element 16 is a single thermoplastic injection molded piece.

Figure 1A:
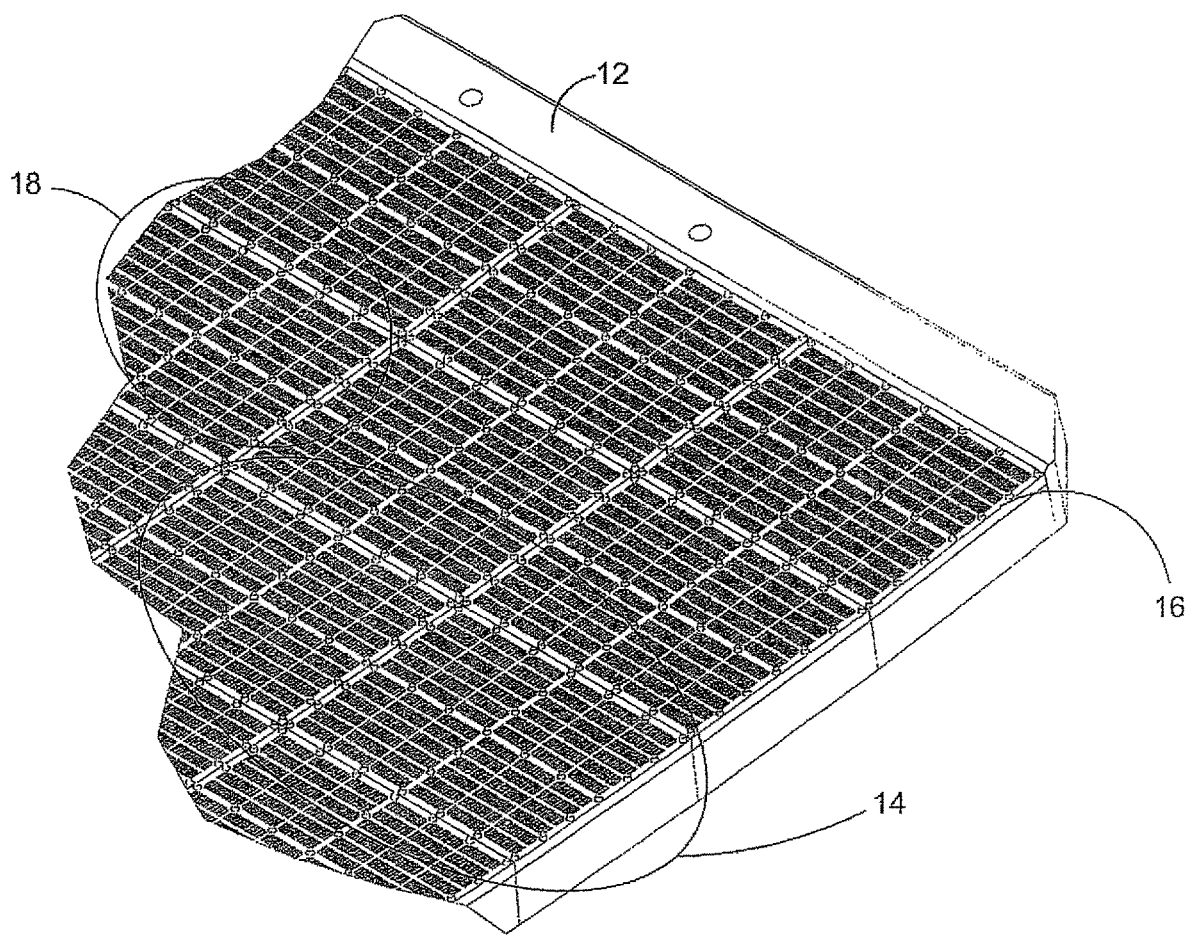
FIG. 1A is an enlarged view of a break out portion of the screen assembly shown in FIG. 1.

FIG. 1A is an enlarged view of a portion of the screen assembly 10 having multiple end subgrids 14 and center subgrids 18. As discussed below, the end subgrids 14 and center subgrids 18 may be secured together to form the screen assembly. Screen elements 16 are shown attached to the end subgrids 14 and center subgrids 18. The size of the screen assembly may be altered by attaching more or less subgrids together to form the screen assembly. When installed in a vibratory screening machine, material may be fed onto the screen assembly 10. See, e.g., FIGS. 12, 12A, 12B, 13, 13A, 14, and 15. Material smaller than the screen openings of the screen element 16, passes through the openings in screening element 16 and through the grid openings 50 thereby separating the material from that which is too big to pass through the screen openings of the screen elements 16.

Figure 1B:
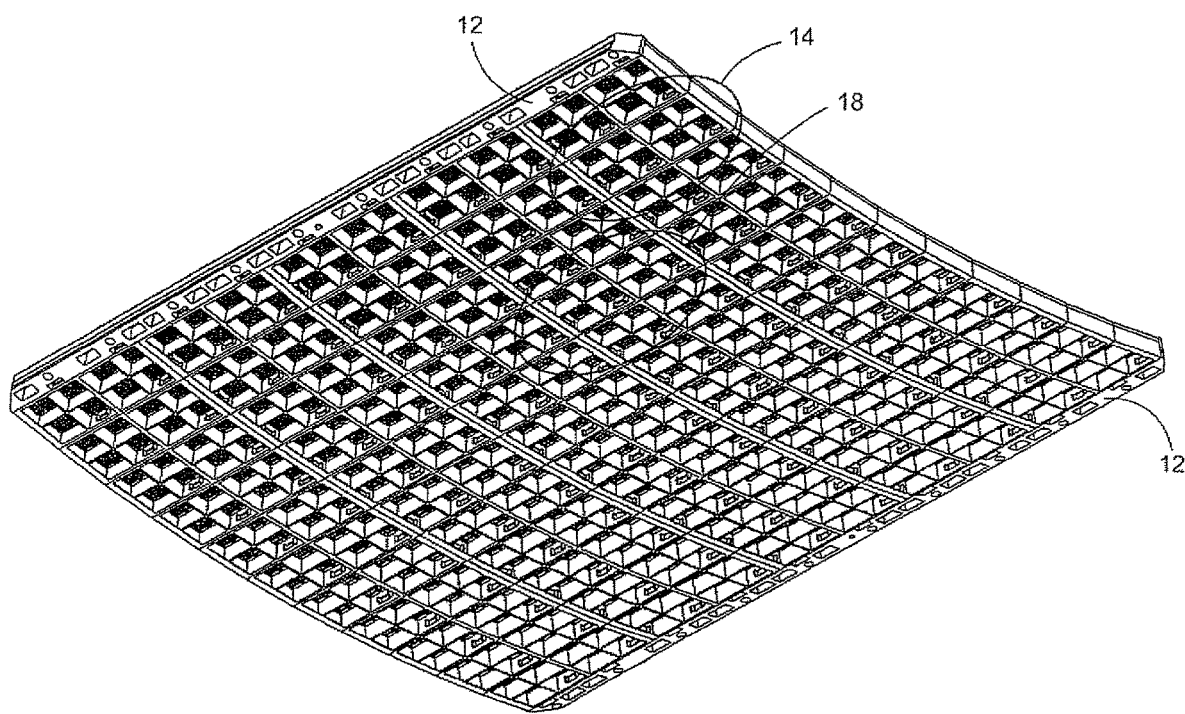
FIG. 1B is a bottom isometric view of the screen assembly shown in FIG. 1.

FIG. 1B shows a bottom view of the screen assembly 10 such that the grid openings 50 may be seen below the screen elements. Binder bars 12 are attached to sides of the grid framework. Binder bars 12 may be attached to lock subassemblies together creating the grid framework. Binder bars 12 may include fasteners that attach to fasteners on side members 38 of subgrid units (14 and 18) or fasteners on base member 64 of pyramidal subgrid units (58 and 60). Binder bars 12 may be provided to increase the stability of the grid framework and may distribute compression loads if the screen assembly is mounted to a vibratory screening machine using compression, e.g., using compression assemblies as described in U.S. Pat. No. 7,578,394 and U.S. patent application Ser. No. 12/460,200 (now U.S. Pat. No. 8,443,984). Binder bars may also be provided that include U-shaped members or finger receiving apertures, for undermount or overmount tensioning onto a vibratory screening machine, e.g., see mounting structures described in U.S. Pat. Nos. 5,332,101 and 6,669,027. The screen elements and subgrids are securely attached together, as described herein, such that, even under tensioning, the screen assembly screening surface and screen assembly maintain their structural integrity.

The screen assembly shown in FIG. 1 is slightly concave, i.e., the bottom and top surfaces of the screen assembly have a slight curvature. Subgrids 14 and 18 are fabricated such that when they are assembled together this predetermined curvature is achieved. Alternatively, a screen assembly may be flat or convex (see, e.g., FIGS. 19 and 20). As shown in FIGS. 12, 12A, 13, and 13A, screen assembly 10 may be installed upon a vibratory screening machine having one or more screening surfaces. In one embodiment, screen assembly 10 may be installed upon a vibratory screening machine by placing screen assembly 10 on the vibratory screening machine such that the binder bars contact end or side members of the vibratory screening machine. Compression force is then applied to binder bar 12. Binder bars 12 distribute the load from the compression force to the screen assembly. The screen assembly 10 may be configured such that it flexes and deforms into a predetermined concave shape when compression force is applied to binder bar 12. The amount of deformation and range of concavity may vary according to use, compression forced applied, and shape of the bed support of the vibratory screening machine. Compressing screen assembly 10 into a concave shape when installed in a vibratory screening machine provides many benefits, e.g., easy and simple installation and removal, capturing and centering of materials to be screened, etc. Further benefits are enumerated in U.S. Pat. No. 7,578,394. Centering of material streams on screen assembly 10 prevents the material from exiting the screening surface and potentially contaminating previously segregated materials and/or creating maintenance concerns. For larger material flow volumes, screen assembly 10 may be placed in greater compression, thereby increasing the amount of arc of the screen assembly 10. The greater the amount of arc in screen assembly 10 allows for greater retaining capability of material by screen assembly 10 and prevention of over spilling of material off edges of the screen assembly 10. Screen assembly 10 may also be configured to deform into a convex shape under compression or remain substantially flat under compression or clamping. Incorporating binder bars 12 into the screen assembly 10 allows for a compression load from a vibratory screening machine to be distributed across the screen assembly 10. Screen assembly 10 may include guide notches in the binder bars 12 to help guide the screen assembly 10 into place when installed upon a vibratory screening machine having guides. Alternatively, the screen assembly may be installed upon a vibratory screening machine without binder bars 12. In the alternative embodiment, guide notches may be included in subgrid units. U.S.

patent application Ser. No. 12/460,200 (now U.S. Pat. No. 8,443,984) is incorporated herein by reference and any embodiments disclosed therein may be incorporated into embodiments of the present invention described herein.

Figure 2:
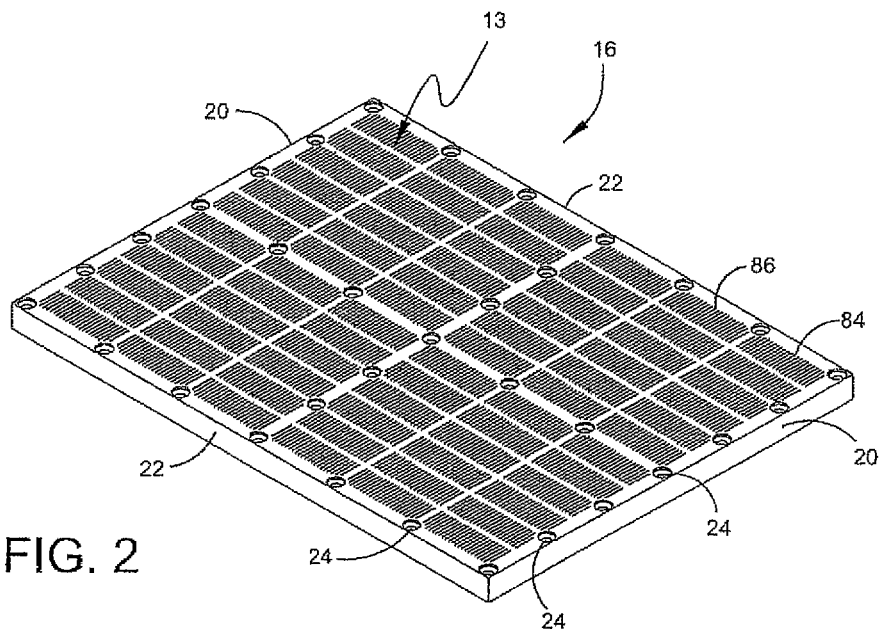
FIG. 2 is an isometric top view of a screen element, according to an exemplary embodiment of the present invention.
Figure 2A:
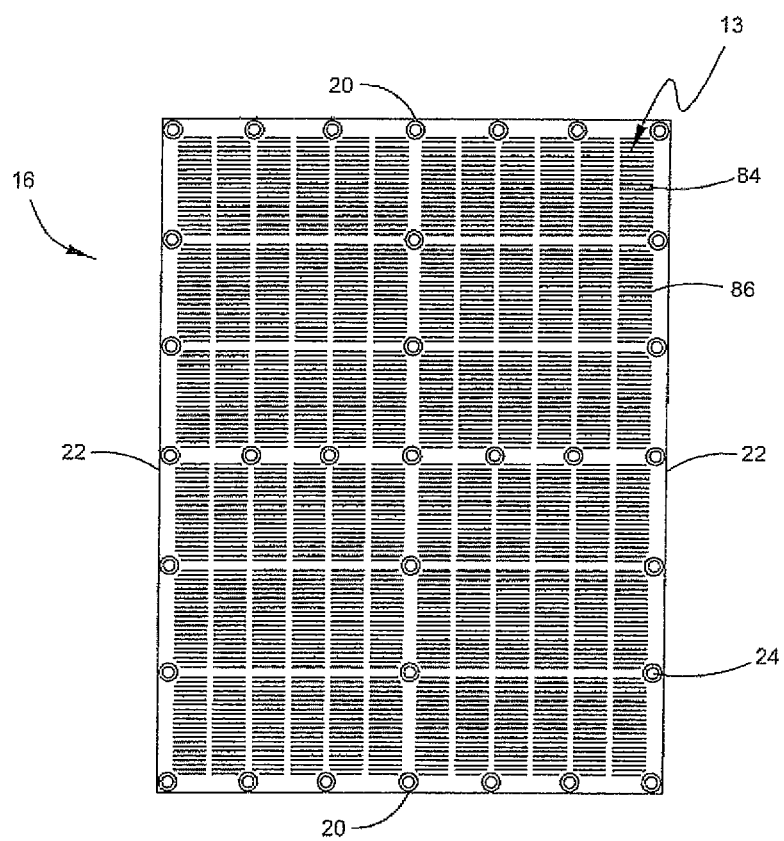
FIG. 2A is a top view of the screen element shown in FIG. 2.

FIG. 2 shows a screen element 16 having substantially parallel screen element end portions 20 and substantially parallel screen element side portions 22 that are substantially perpendicular to the screen element end portions 20. The screen element screening surface 13 includes surface elements 84 running parallel to the screen element end portions 20 and forming screening openings 86. See FIG. 2D. Surface elements 84 have a thickness T, which may vary depending on the screening application and configuration of the screening openings 86. T may be, e.g., approximately 43 microns to approximately 100 microns depending on the open screening area desired and the width W of screening openings 86. The screening openings 86 are elongated slots having a length L and a width W, which may be varied for a chosen configuration. The width may be a distance of approximately 43 microns to approximately 2000 microns between inner surfaces of each screen surface element 84. The screening openings are not required to be rectangular but may be thermoplastic injection molded to any shape suitable to a particular screening application, including approximately square, circular and/or oval. For increased stability, the screen surface elements 84 may include integral fiber materials which may run substantially parallel to end portions 20. The fiber may be an aramid fiber (or individual filaments thereof), a naturally occurring fiber or other material having a relatively high tensile strength. U.S. Pat. No. 4,819,809 and U.S. patent application Ser. No. 12/763,046 (now U.S. Pat. No. 8,584,866) are incorporated herein by reference and, as appropriate, the embodiments disclosed therein may be incorporated into the screen assemblies disclosed herein.

The screen element 16 may include attachment apertures 24 configured such that elongated attachment members 44 of a subgrid may pass through the attachment apertures 24. The attachment apertures 24 may include a tapered bore that may be filled when a portion of the elongated attachment member 44 above the screening element screening surface is melted fastening screen element 16 to the subgrid. Alternatively, the attachment apertures 24 may be configured without a tapered bore allowing formation of a bead on the screening element screening surface when a portion of an elongated attachment member 44 above a screening element screening surface is melted fastening the screen element to the subgrid. Screen element 16 may be a single thermoplastic injection molded piece. Screen element 16 may also be multiple thermoplastic injection molded pieces, each configured to span one or more grid openings. Utilizing small thermoplastic injection molded screen elements 16, which are attached to a grid framework as described herein, provides for substantial advantages over prior screen assemblies. Thermoplastic injection molding screen elements 16 allow for screening openings 86 to have widths W as small as approximately 43 microns. This allows for precise and effective screening. Arranging the screen elements 16 on subgrids, which may also be thermoplastic injection molded, allows for easy construction of complete screen assemblies with very fine screening openings. Arranging the screen elements 16 on subgrids also allows for substantial variations in overall size and/or configuration of the screen assembly 10, which may be varied by including more or less subgrids or subgrids having different shapes. Moreover, a screen assembly may be constructed having a variety of screening opening sizes or a gradient of screening opening sizes simply by incorporating screen elements 16 with the different size screening openings onto subgrids and joining the subgrids in the desired configuration.

Figure 2B:
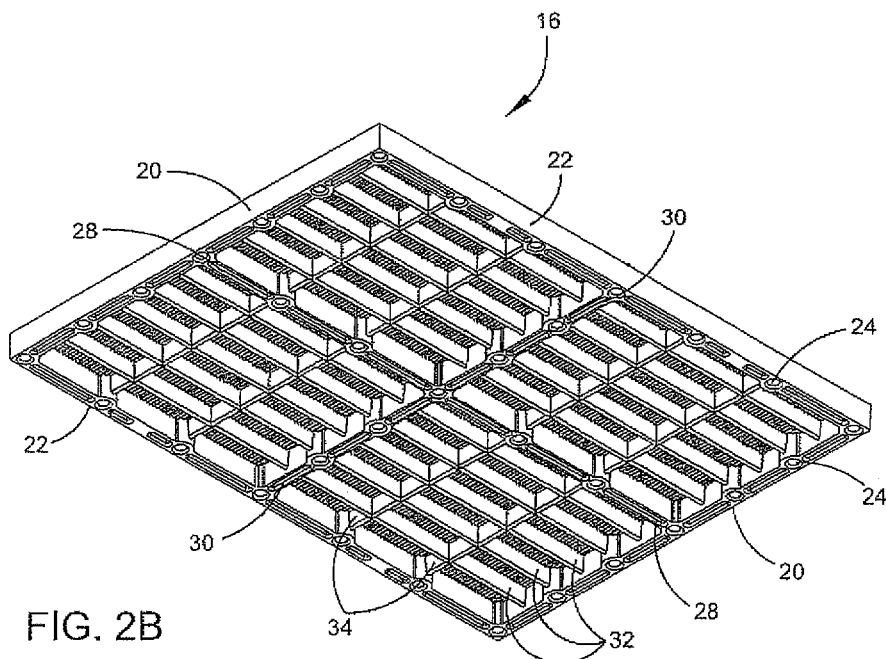
FIG. 2B is a bottom isometric view of the screen element shown in FIG. 2.
Figure 2C:
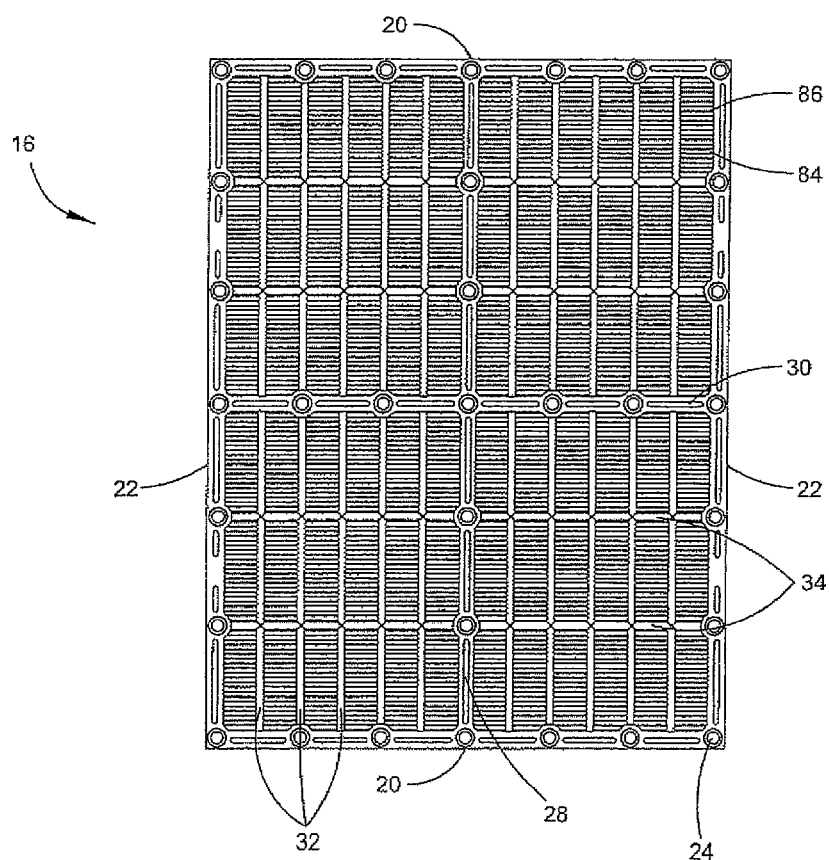
FIG. 2C is a bottom view of the screen element shown in FIG. 2.
Figure 2D:
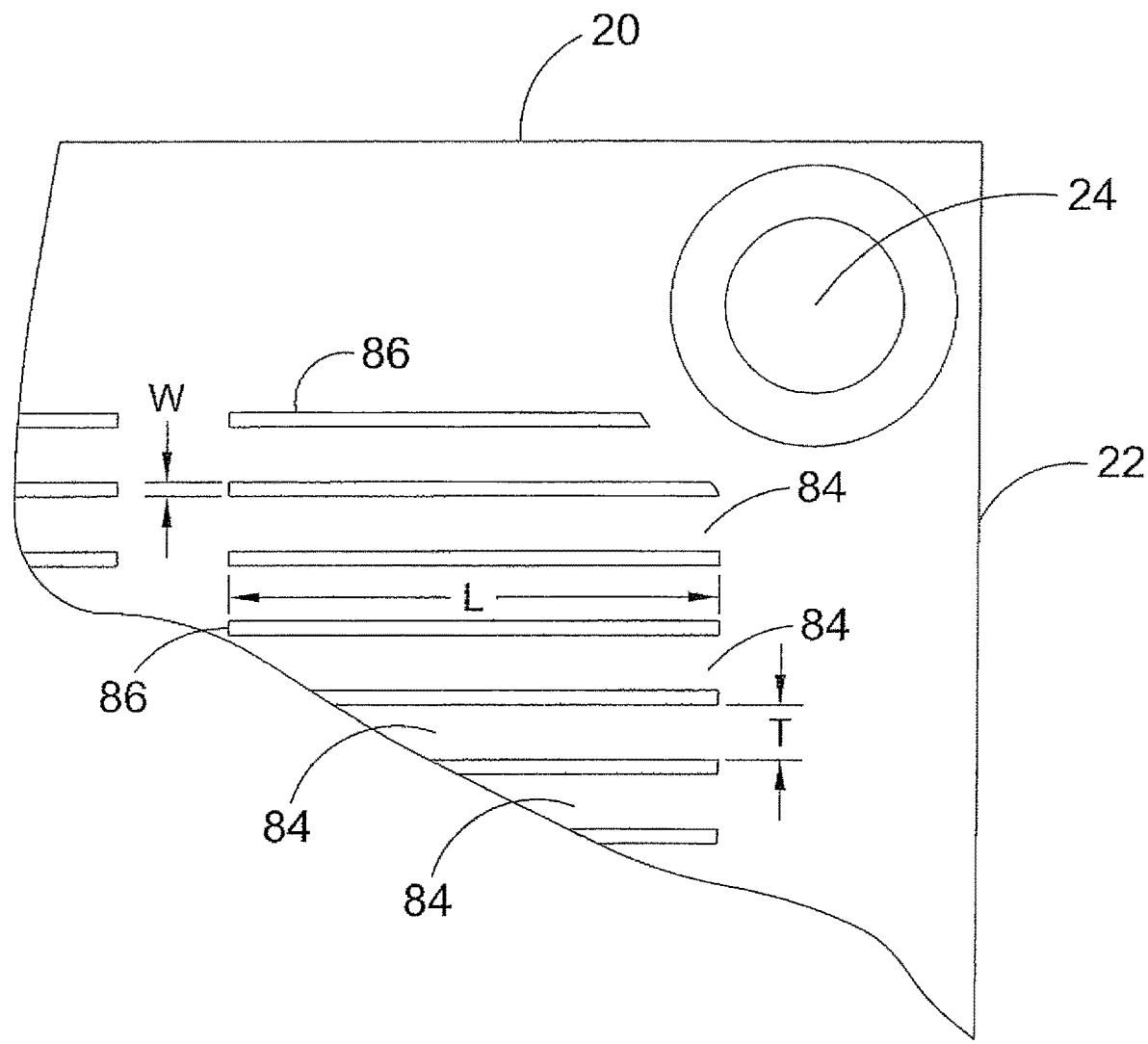
FIG. 2D is an enlarged top view of a break out portion of the screen element shown in FIG. 2.

FIG. 2B and FIG. 2C show a bottom of the screen element 16 having a first screen element support member 28 extending between the end portions 20 and being substantially perpendicular to the end portions 20. FIG. 2B also shows a second screen element support member 30 orthogonal to the first screen element support member 28 extending between the side edge portions 22 being approximately parallel to the end portions 20 and substantially perpendicular to the side portions 22. The screen element may further include a first series reinforcement members 32 substantially parallel to the side edge portions 22 and a second series of reinforcement members 34 substantially parallel to the end portions 20. The end portions 20, the side edge portions 22, the first screen element support member 28, the second screen element support member 30, the first series reinforcement members 32, and the second series of reinforcement members 34 structurally stabilize the screen surface elements 84 and screening openings 86 during different loadings, including distribution of a compression force and/or vibratory loading conditions.

Figure 3:
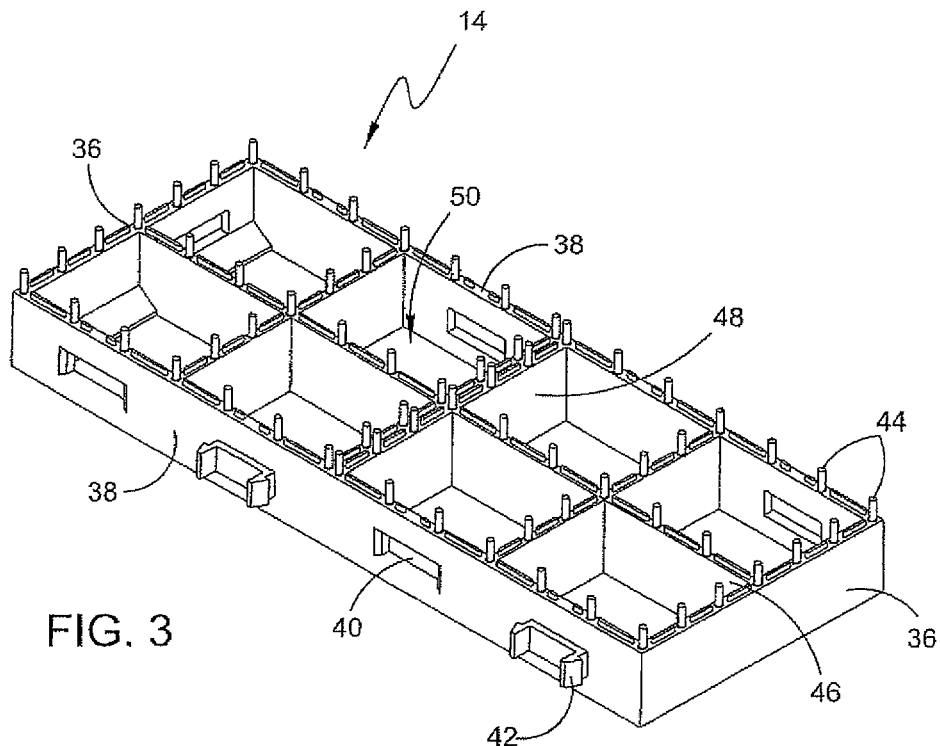
FIG. 3 is a top isometric view of an end subgrid, according to an exemplary embodiment of the present invention.
Figure 3A:
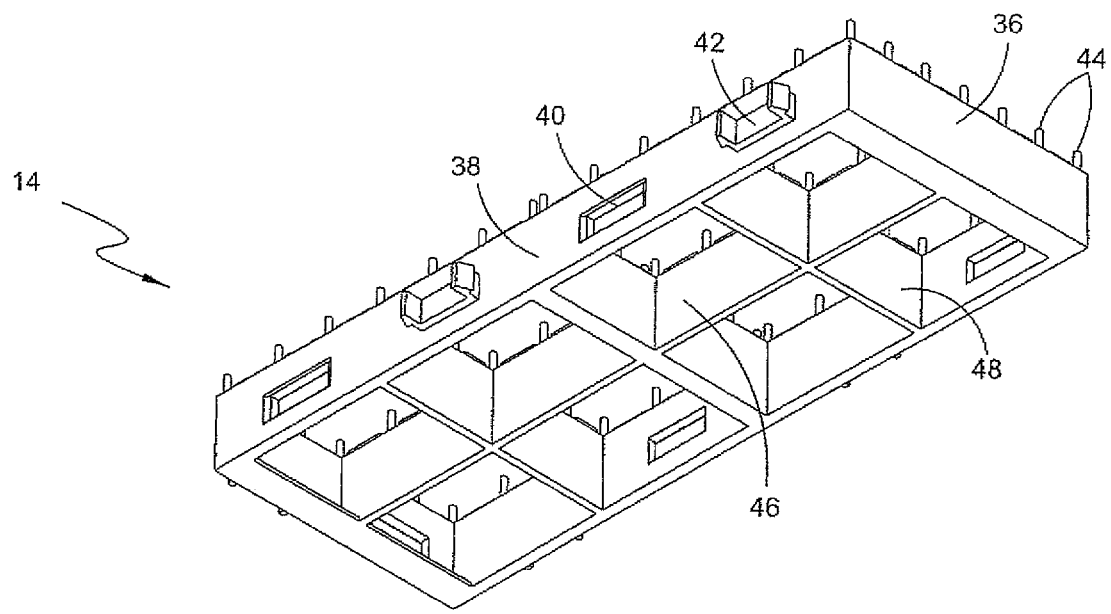
FIG. 3A is a bottom isometric view of the end subgrid shown in FIG. 3.
Figure 4:
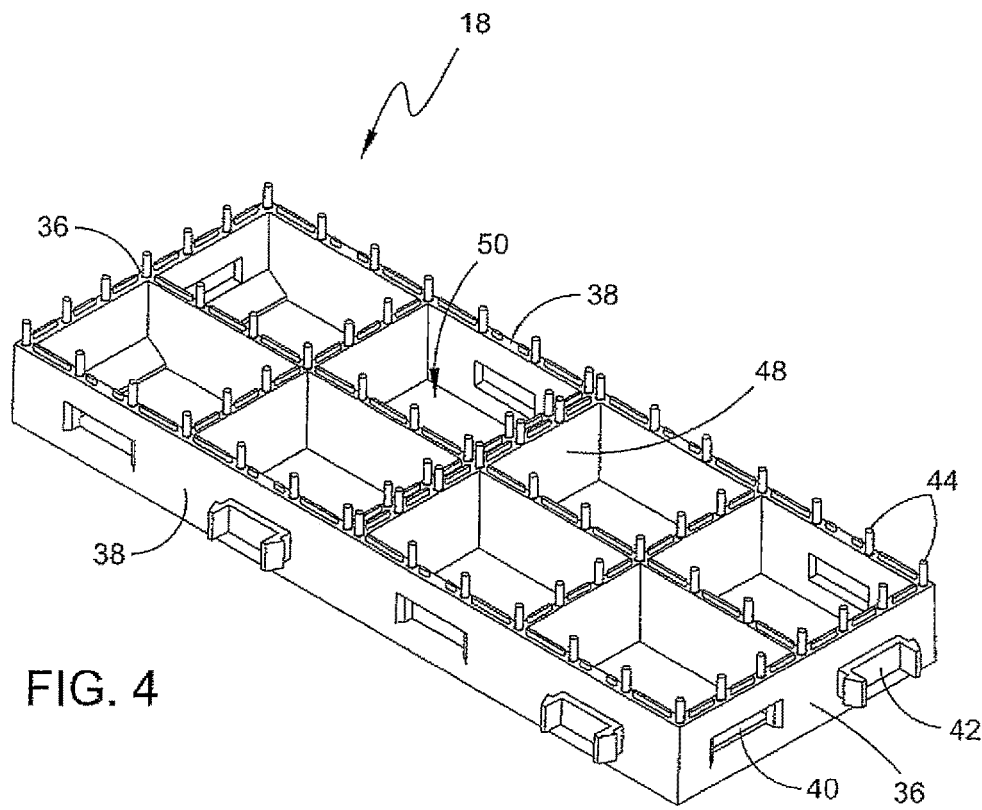
FIG. 4 is a top isometric view of a center subgrid, according to an exemplary embodiment of the present invention.

FIG. 3 and FIG. 3A illustrate an end subgrid 14 unit. The end subgrid unit 14 includes parallel subgrid end members 36 and parallel subgrid side members 38 substantially perpendicular to the subgrid end members 36. The end subgrid unit 14 has fasteners along one subgrid end member 36 and along the subgrid side members 38. The fasteners may be clips 42 and clip apertures 40 such that multiple subgrid units 14 may be securely attached together. The subgrid units may be secured together along their respective side members 38 by passing the clip 42 into the clip aperture 40 until extended members of the clip 42 extend beyond clip aperture 40 and subgrid side member 38. As the clip 42 is pushed into the clip aperture 40, the clip's extended members will be forced together until a clipping portion of each extended member is beyond the subgrid side member 38 allowing the clipping portions to engage an interior portion of the subgrid side member 38. When the clipping portions are engaged into the clip aperture, subgrid side members of two independent subgrids will be side by side and secured together. The subgrids may be separated by applying a force to the clip's extended members such that the extended members are moved together allowing for the clipping portions to pass out of the clip aperture. Alternatively, the clips 42 and clip apertures 40 may be used to secure subgrid end member 36 to a subgrid end member of another subgrid, such as a center subgrid (FIG. 4). The end subgrid may have a subgrid end member 36 that does not have any fasteners. Although the fasteners shown in drawings are clips and clip apertures, alternative fasters and alternative forms of clips and apertures may be used, including other mechanical arrangements, adhesives, etc.

Figure 22:
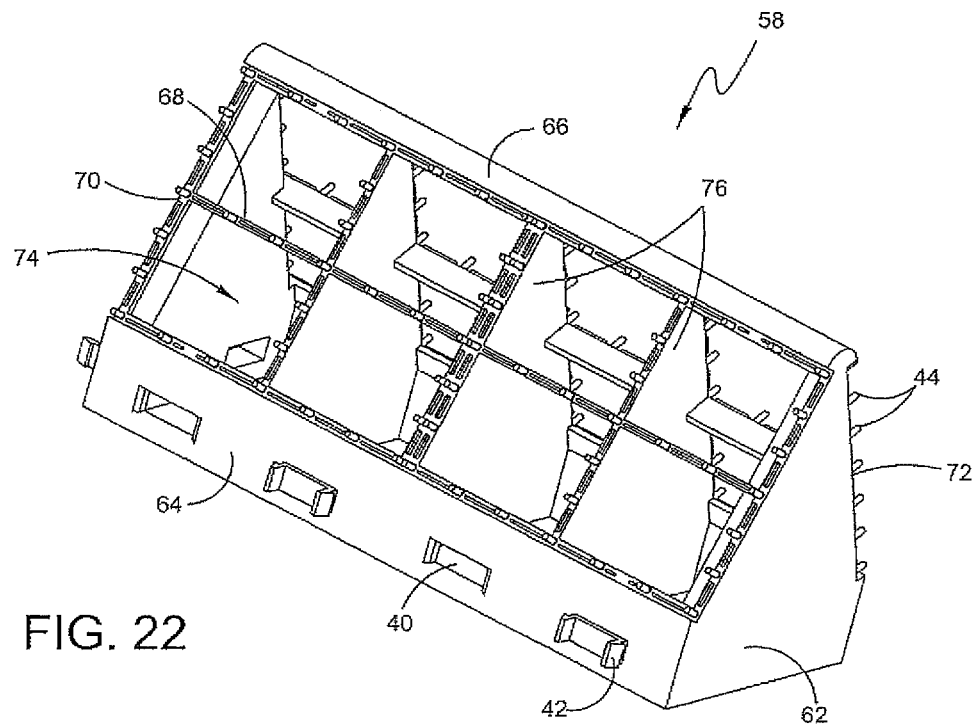
FIG. 22 is a top isometric view of a pyramidal shaped end subgrid, according to an exemplary embodiment of the present invention.
Figures 23, 23A:
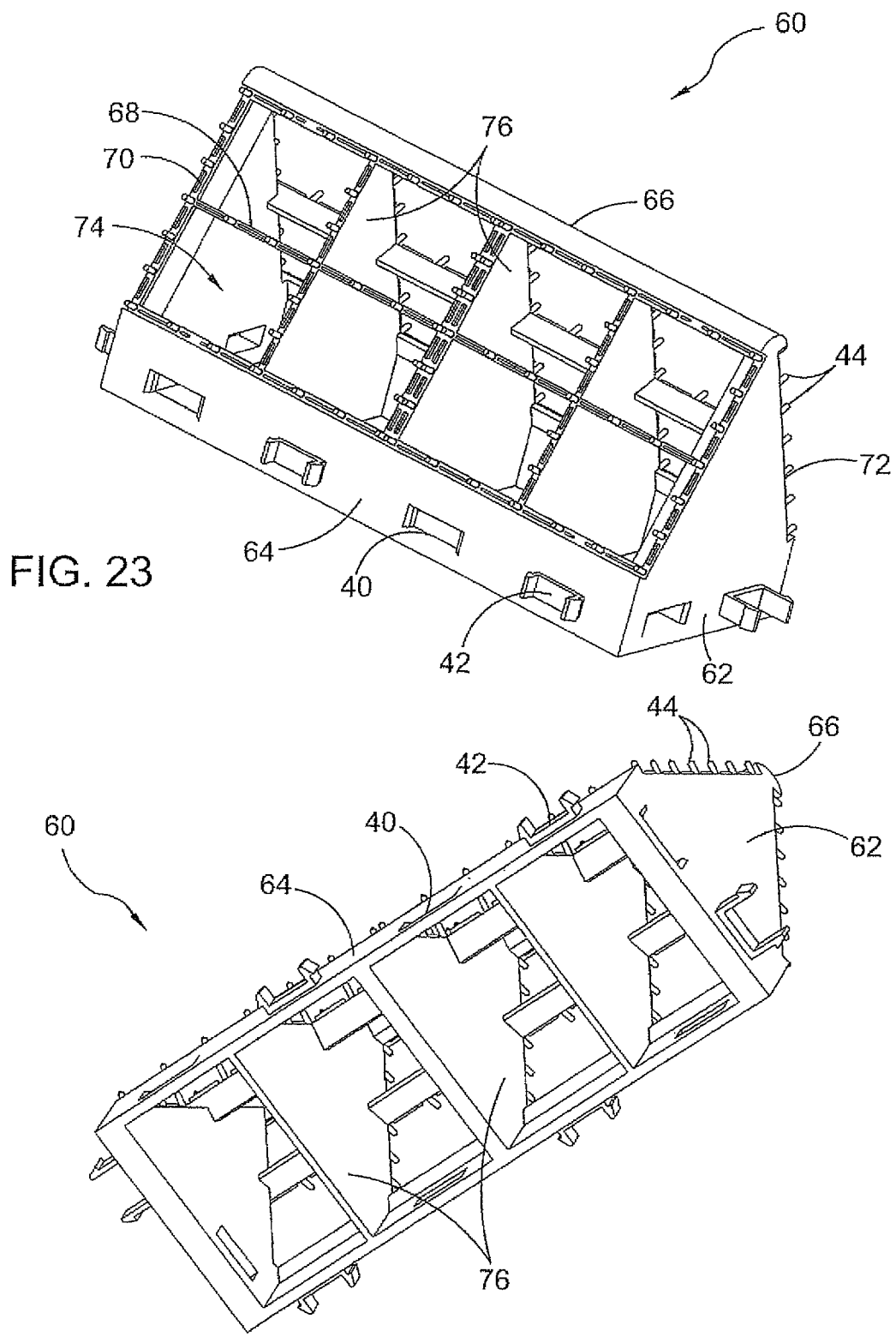
FIG. 23 is a top isometric view of a pyramidal shaped center subgrid, according to an exemplary embodiment of the present invention.
FIG. 23A is a bottom isometric view of the pyramidal shaped center subgrid shown in FIG. 23.

Constructing the grid framework from subgrids, which may be substantially rigid, creates a strong and durable grid framework and screen assembly 10. Screen assembly 10 is constructed so that it can withstand heavy loading without damage to the screening surface and supporting structure. For example, the pyramidal shaped grid frameworks shown in FIGS. 22 and 23 provide a very strong pyramid base framework that supports individual screen elements capable of very fine screening, having screening openings as small as 43 microns. Unlike the pyramidal screen assembly embodiment of the present invention described herein, existing corrugated or pyramid type wire mesh screen assemblies are highly susceptible to damage and/or deformation under heavy loading. Thus, unlike current screens, the present invention provides for screen assemblies having very small and very precise screening openings while simultaneously providing substantial structural stability and resistance to damage thereby maintaining precision screening under a variety of load burdens. Constructing the grid framework from subgrids also allows for substantial variation in the size, shape, and/or configuration of the screen assembly by simply altering the number and/or type of subgrids used to construct the grid framework.

End subgrid unit 14 includes a first subgrid support member 46 running parallel to subgrid side members 38 and a second subgrid support member 48 orthogonal to the first subgrid support member 46 and perpendicular to the subgrid side members 38. Elongated attachment members 44 may be configured such that they mate with the screen element attachment apertures 24. Screen element 16 may be secured to the subgrid 14 via mating the elongated attachment members 44 with screen element attachment apertures 24. A portion of elongated attachment member 44 may extend slightly above the screen element screening surface when the screen element 16 is attached to the end subgrid 14. The screen element attachment apertures 24 may include a tapered bore such that a portion of the elongated attachment members 44 extending above the screen element screening surface may be melted and fill the tapered bore. Alternatively, screen element attachment apertures 24 may be without a tapered bore and the portion of the elongated attachment members extending above the screening surface of the screening element 16 may be configured to form a bead on the screening surface when melted. See FIGS. 34 and 35. Once attached, the screen element 16 will span at least one grid opening 50. Materials passing through the screening openings 86 will pass through grid opening 50. The arrangement of elongated attachment members 44 and the corresponding arrangement of screen element attachment apertures 24 provide a guide for attachment of screen elements 16 to subgrids simplifying assembly of subgrids. The elongated attachment members 44 pass through the screen element attachment apertures 24 guiding the screen element into correct placement on the surface of the subgrid. Attachment via elongated attachment members 44 and screen element attachment apertures 24 further provides a secure attachment to the subgrid and strengthens the screening surface of the screen assembly 10.

FIG. 4 shows a center subgrid 18. As shown in FIG. 1 and FIG. 1A, the center subgrid 18 may be incorporated into a screen assembly. The center subgrid 18 has clips 42 and clip apertures 40 on both subgrid end members 36. The end subgrid 14 has clips 42 and clip apertures 40 on only one of two subgrid end members 36. Center subgrids 18 may be secured to other subgrids on each of its subgrid end members and subgrid side members.

FIG. 5 shows a top view of binder bar 12. FIG. 5A shows a bottom view of binder bar 12. Binder bars 12 include clips 42 and clip apertures 40 such that binder bar 12 may be clipped to a side of an assembly of screen panels (see FIG. 9). As with subgrids, fasteners on the binder bar 12 are shown as clips and clip apertures but other fasteners may be utilized to engage fasteners of the subgrids. Handles may be attached to binder bars 12 (see, e.g., FIG. 7) which may simplify transportation and installation of a screen assembly. Tags and/or labels may also be attached to binder bars. As discussed above, binder bars 12 may increase the stability of the grid framework and may distribute compression loads of a vibratory screening machine if the screen assembly is placed under compression as shown in U.S. Pat. No. 7,578,394 and U.S. patent application Ser. No. 12/460,200 (now U.S. Pat. No. 8,443,984).

The screening members, screening assemblies and parts thereof, including connecting members/fasteners as described herein, may include nanomaterial dispersed therein for improved strength, durability and other benefits associated with the use of a particular nanomaterial or combination of different nanomaterials. Any suitable nanomaterial may be used, including, but not limited to nanotubes, nanofibers and/or elastomeric nanocomposites. The nanomaterial may be dispersed in the screening members and screening assemblies and parts thereof in varying percentages, depending on the desired properties of the end product. For example, specific percentages may be incorporated to increase member strength or to make a screening surface wear resistant. Use of a thermoplastic injection molded material having nanomaterials dispersed therein may provide for increased strength while using less material. Thus, structural members, include subgrid framework supports and screen element supporting members may be made smaller and stronger and/or lighter. This is particularly beneficial when fabricating relatively small individual components that are built into a complete screen assembly. Also, instead of producing individual subgrids that clip together, one large grid structure having nanomaterials dispersed therein, may be fabricated that is relatively light and strong. Individual screen elements, with or without nanomaterials, may then be attached to the single complete grid framework structure. Use of nanomaterials in a screen element will provide increased strength while reducing the weight and size of the element. This may be especially helpful when injection molding screen elements having extremely small openings as the openings are supported by the surrounding materials/members. Another advantage to incorporating nanomaterials into the screen elements is an improved screening surface that is durable and resistant to wear. Screen surfaces tend to wear out through heavy use and exposure to abrasive materials and use of a thermoplastic and/or a thermoplastic having abrasive resistant nanomaterials, provides for a screening surface with a long life.

FIG. 6 shows a subassembly 15 of a row of subgrid units. FIG. 6A is an exploded view of the subassembly in FIG. 6 showing individual subgrids and direction of attachment to each other. The subassembly includes two end subgrid units 14 and three center subgrid units 18. The end subgrid units 14 form the ends of the subassembly while the center subgrid units 18 are used to join the two end subgrid units 14 via connections between the clips 42 and clip apertures 40. The subgrid units shown in FIG. 6 are shown with attached screen elements 16. By fabricating the screen assembly from subgrids and into the subassembly, each subgrid may be constructed to a chosen specification and the screen assembly may be constructed from multiple subgrids in a configuration required for the screening application. The screen assembly may be quickly and simply assembled and will have precise screening capabilities and substantial stability under load pressures. Because of the structure configuration of the grid framework and screen elements 16, the configuration of multiple individual screen elements forming the screening surface of the screen assembly 10 and the fact that the screen elements 16 are thermoplastic injection molded, the openings in screen elements 16 are relatively stable and maintain their opening sizes for optimal screening under various loading conditions, including compression loads and concavity deflections and tensioning.

FIG. 7 shows a screen assembly 10 with binder bars 12 having handles attached to the binder bars 12. The screen assembly is made up of multiple subgrid units secured to each other. The subgrid units have screen elements 16 attached to their top surfaces. FIG. 7A is a cross-section of Section A-A of FIG. 7 showing individual subgrids secured to screen elements forming a screening surface. As reflected in FIG. 7A, the subgrids may have subgrid support members 48 configured such that screen assembly has a slightly concave shape when the subgrid support members 48 are fastened to each other via clips 42 and clip apertures 40. Because the screen assembly is constructed with a slightly concave shape it may be configured to deform to a desired concavity upon application of a compression load without having to guide the screen assembly into a concave shape. Alternatively, the subgrids may be configured to create a slightly convex screen assembly or a substantially flat screen assembly.

Figure 8:
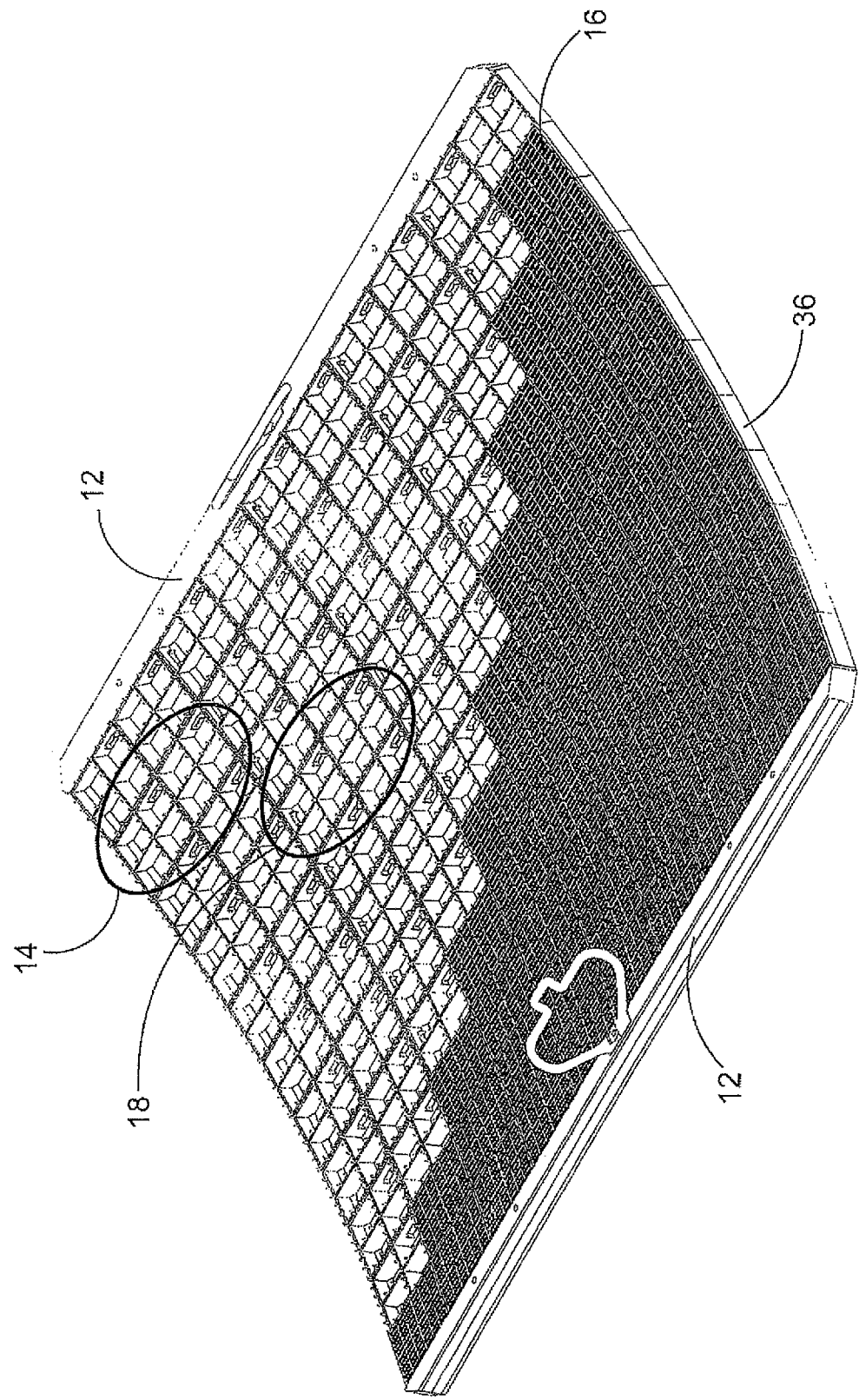
FIG. 8 is a top isometric view of a screen assembly partially covered with screen elements, according to an exemplary embodiment of the present invention.

FIG. 8 is a top isometric view of a screen assembly partially covered with screen elements 16. This figure shows end subgrid units 14 and center subgrid units 18 secured to form a screen assembly. The screening surface may be completed by attaching screen elements 16 to the uncovered subgrid units shown in the figure. Screen elements 16 may be attached to individual subgrids prior to construction of the grid framework or attached to subgrids after subgrids have been fastened to each other into the grid framework.

Figure 9:
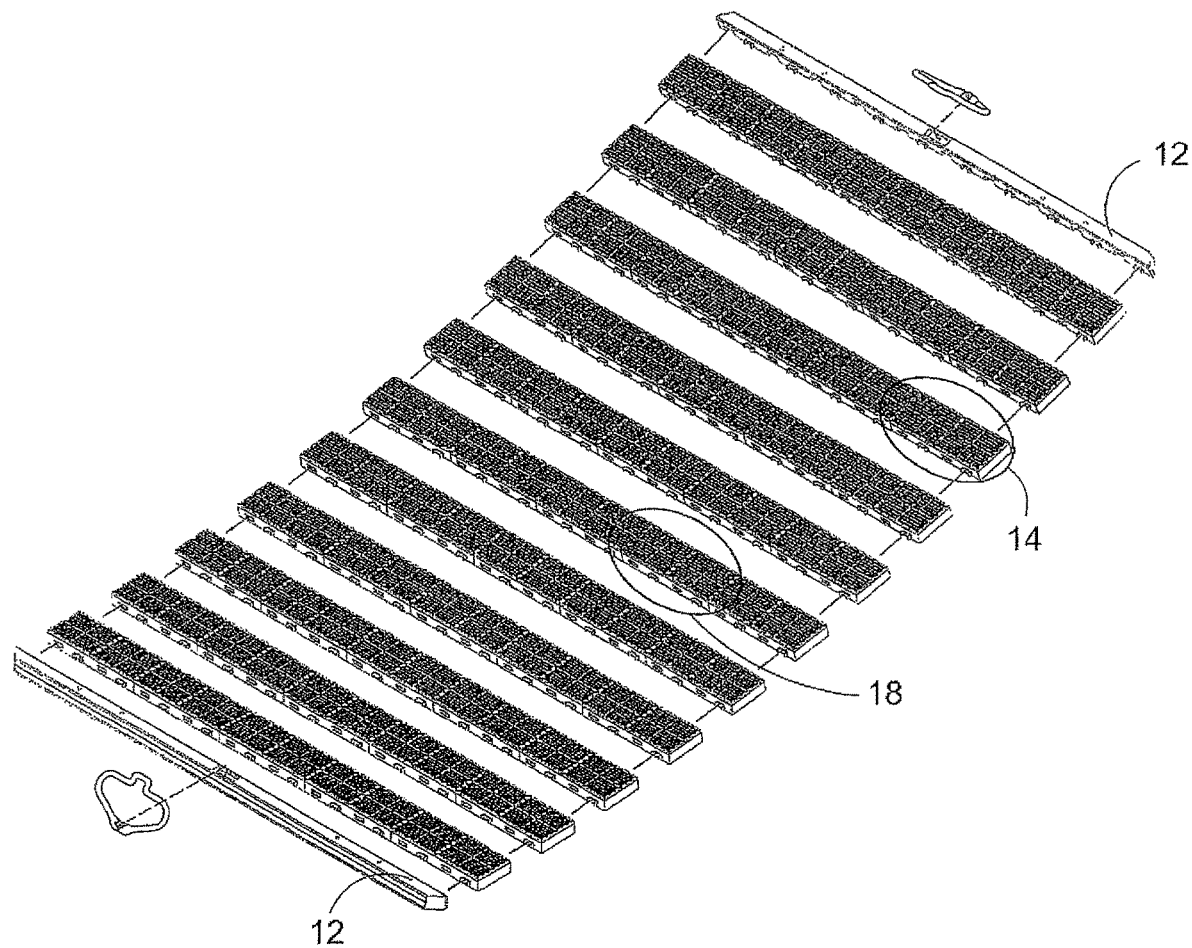
FIG. 9 is an exploded isometric view of the screen assembly shown in FIG. 1.

FIG. 9 is an exploded isometric view of the screen assembly shown in FIG. 1. This figure shows eleven subassemblies being secured to each other via clips and clip apertures along subgrid end members of subgrid units in each subassembly. Each subassembly has two end subgrid units 14 and three center subgrid units 18. Binder bars 12 are clipped at each side of the assembly. Different size screen assemblies may be created using different numbers of subassemblies or different numbers of center subgrid units in each subassembly. An assembled screen assembly has a continuous screen assembly screening surface made up of multiple screen element screening surfaces.

Figure 10:
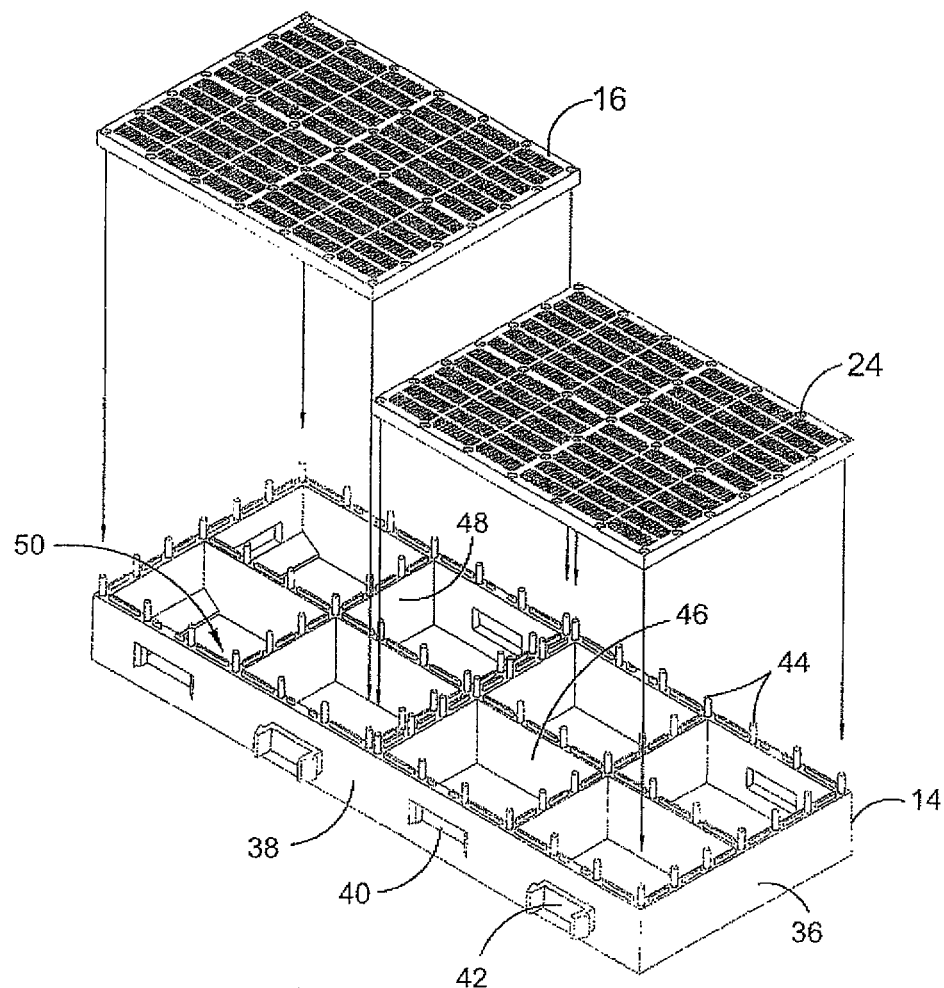
FIG. 10 is an exploded isometric view of an end subgrid showing screen elements prior to attachment to the end subgrid, according to an exemplary embodiment of the present invention.
Figure 10A:
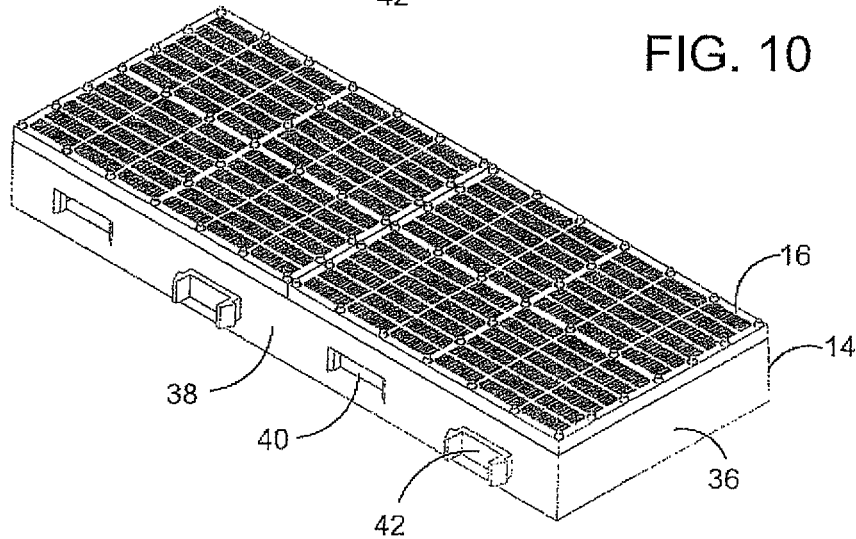
FIG. 10A is an isometric view of the end subgrid shown in FIG. 10 having the screen elements attached thereto.

FIGS. 10 and 10A illustrate attachment of screen elements 16 to end subgrid unit 14, according to an exemplary embodiment of the present invention. Screen elements 16 may be aligned with end subgrid unit 14 via the elongated attachment members 44 and the screen element attachment apertures 24 such that the elongated 20 attachment members 44 pass through the screen element attachment apertures 24 and extend slightly beyond the screen element screening surface. The elongated attachment members 44 may be melted to fill the tapered bores of the screen element attachment apertures 24 or, alternatively, to form beads upon the screen element screening surface, securing the screen element 16 to the subgrid unit 14. Attachment via elongated attachment members 44 and screen element attachment apertures 24 is only one embodiment of the present invention. Alternatively, screen element 16 may be secured to end subgrid unit 14 via adhesive, fasteners and fastener apertures, laser welding, etc. Although shown having two screen elements for each subgrid, the present invention includes alternate configurations of one screen element per subgrid, multiple screen elements per subgrid, one screen element per subgrid opening, or having a single screen element cover multiple subgrids. The end subgrid 14 may be substantially rigid and may be formed as a single thermoplastic injection molded piece.

Figure 10B:
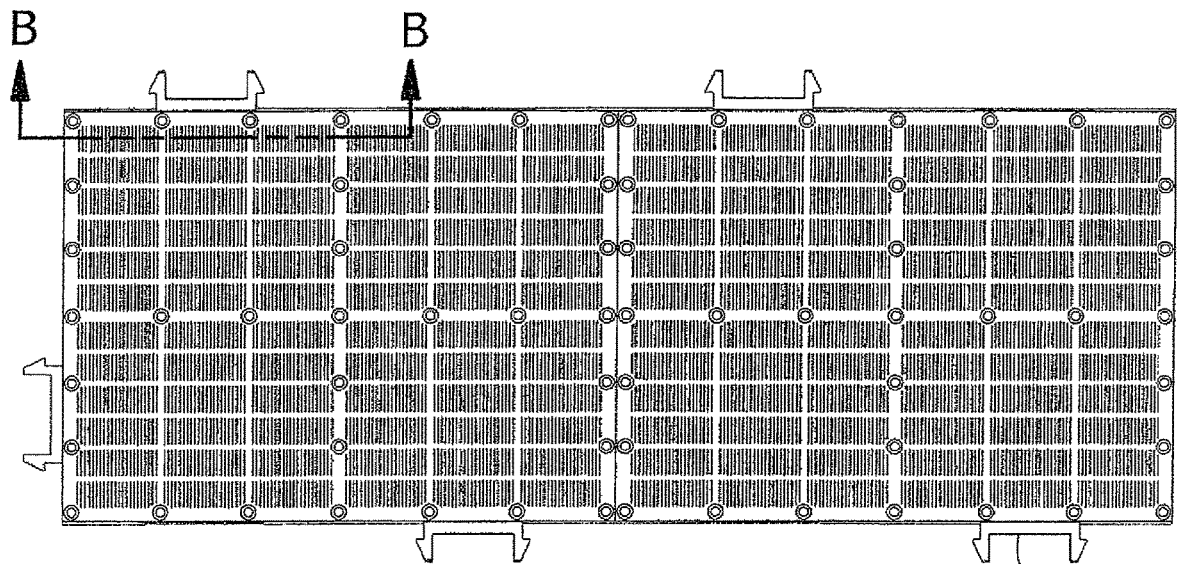
FIG. 10B is a top view of the end subgrid shown in FIG. 10A.
Figure 10C:
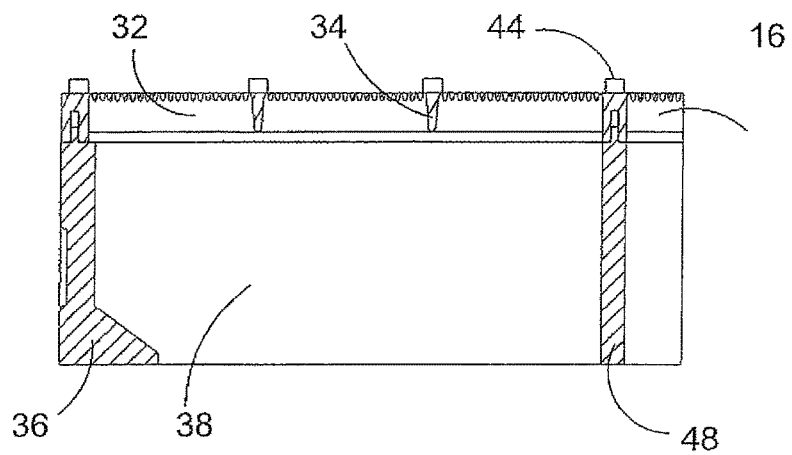
FIG. 10C is a cross-section of Section B-B of the end subgrid shown in FIG. 10A.

FIG. 10B is a top view of the end subgrid unit shown in FIG. 10A with screen elements 16 secured to the end subgrid. FIG. 10C is an enlarged cross-section of Section B-B of the end subgrid unit in FIG. 10B. Screen element 16 is placed upon the end subgrid unit such that elongated attachment member 44 passes through the attachment aperture and beyond a screening surface of the screen element. The portion of the elongated attachment member 44 passing through the attachment aperture and beyond the screening surface of the screen element may be melted to attach the screen element 16 to the end subgrid unit as described above.

Figure 11:
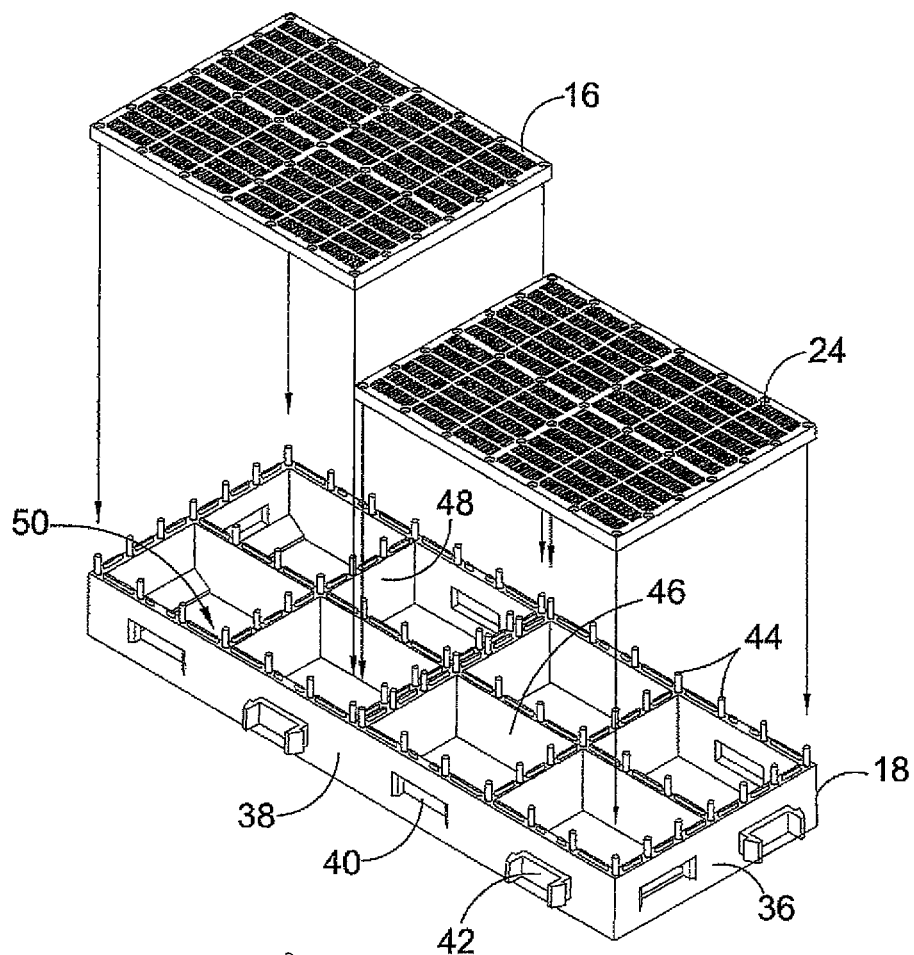
FIG. 11 is an exploded isometric view of a center subgrid showing screen elements prior to attachment to the center subgrid, according to an exemplary embodiment of the present invention.
Figure 11A:
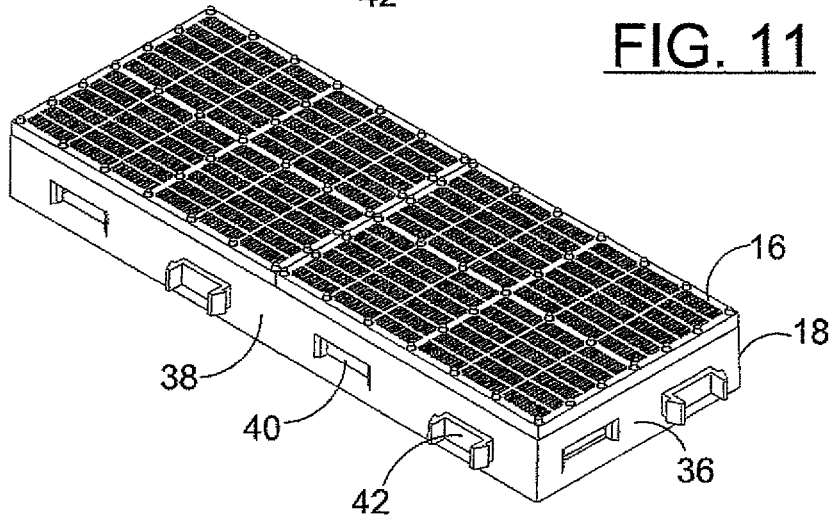
FIG. 11A is an isometric view of the center subgrid shown in FIG. 11 having the screen elements attached thereto.

FIG. 11 and FIG. 11A illustrate attachment of screen elements 16 to center subgrid unit 18, according to an exemplary embodiment of the present invention. Screen elements 16 may be aligned with center subgrid unit 18 via the elongated attachment members 44 and the screen element attachment apertures 24 such that the elongated attachment members 44 pass through the screen element attachment apertures 24 and extend slightly beyond the screen element screening surface. The elongated attachment members 44 may be melted to fill the tapered bores of the screen element attachment apertures 24 or, alternatively, to form beads upon the screen element screening surface, securing the screen element 16 to center subgrid unit 18. Attachment via elongated attachment members 44 and screen element attachment apertures 24 is only one embodiment of the present invention. Alternatively, screen element 16 may be secured to center subgrid unit 14 via adhesive, fasteners and fastener apertures, etc. Although shown having two screen elements for each subgrid, the present invention includes alternate configurations of one screen element per subgrid, one screen element per subgrid opening, multiple screen elements per subgrid, or having a single screen element cover multiple subgrid units. The center subgrid unit 18 may be substantially rigid and may be a single thermoplastic injection molded piece.

Figure 12:
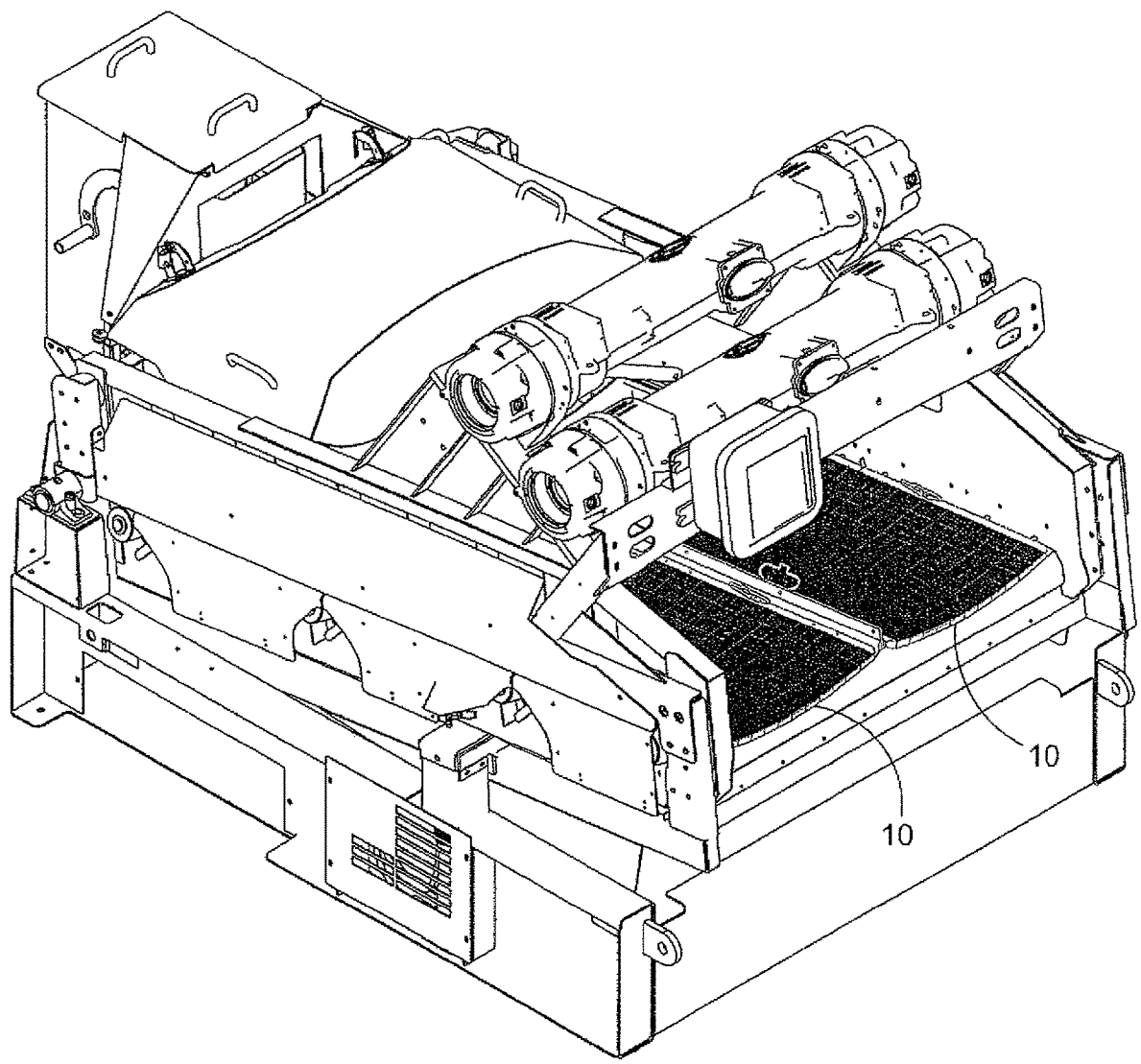
FIG. 12 is an isometric view of a vibratory screening machine having screen assemblies with concave screening surfaces installed thereon, according to an exemplary embodiment of the present invention.
Figure 12A:
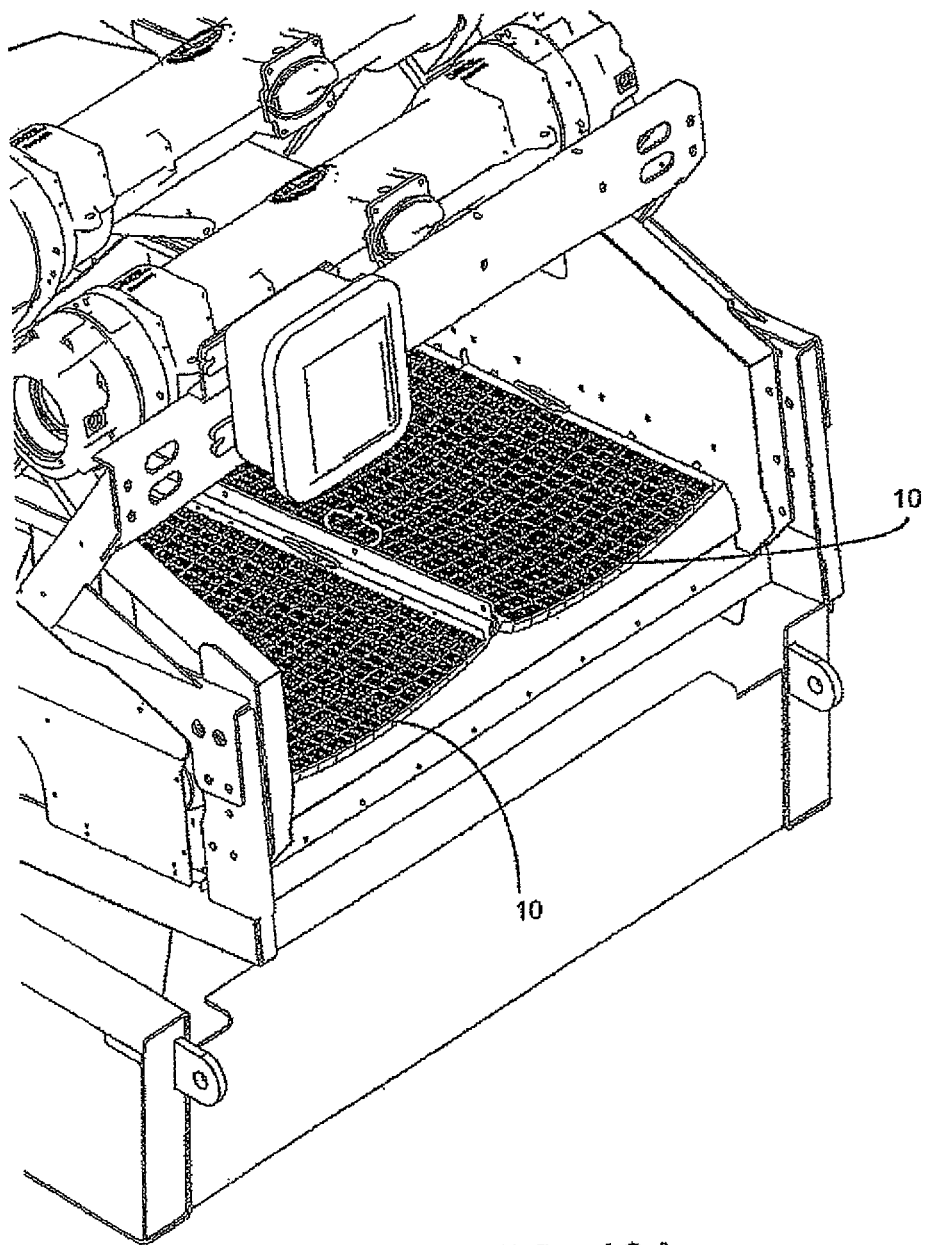
FIG. 12A is an enlarged isometric view of the discharge end of the vibratory screening machine shown in FIG. 12.

FIGS. 12 and 12A show screen assemblies 10 installed on a vibratory screening machine having two screening surfaces. The vibratory screening machine may have compression assemblies on side members of the vibratory screening machine, as shown in U.S. Pat. No. 7,578,394. A compression force may be applied to a binder bar or a side member of the screen assembly such that the screen assembly deflects downward into a concave shape. A bottom side of the screen assembly may mate with a screen assembly mating surface of the vibratory screening machine as shown in U.S. Pat. No. 7,578,394 and U.S. patent application Ser. No. 12/460,200 (now U.S. Pat. No. 8,443,984). The vibratory screening machine may include a center wall member configured to receive a binder bar of a side member of the screen assembly opposite of the side member of the screen assembly receiving compression. The center wall member may be angled such that a compression force against the screen assembly deflects the screen assembly downward. The screen assembly may be installed in the vibratory screening machine such that it is configured to receive material for screening. The screen assembly may include guide notches configured to mate with guides of the vibratory screening machine such that the screen assembly may be guided into place during installation and may include guide assembly configurations as shown in U.S. patent application Ser. No. 12/460,200 (now U.S. Pat. No. 8,443,984).

Figure 12B:
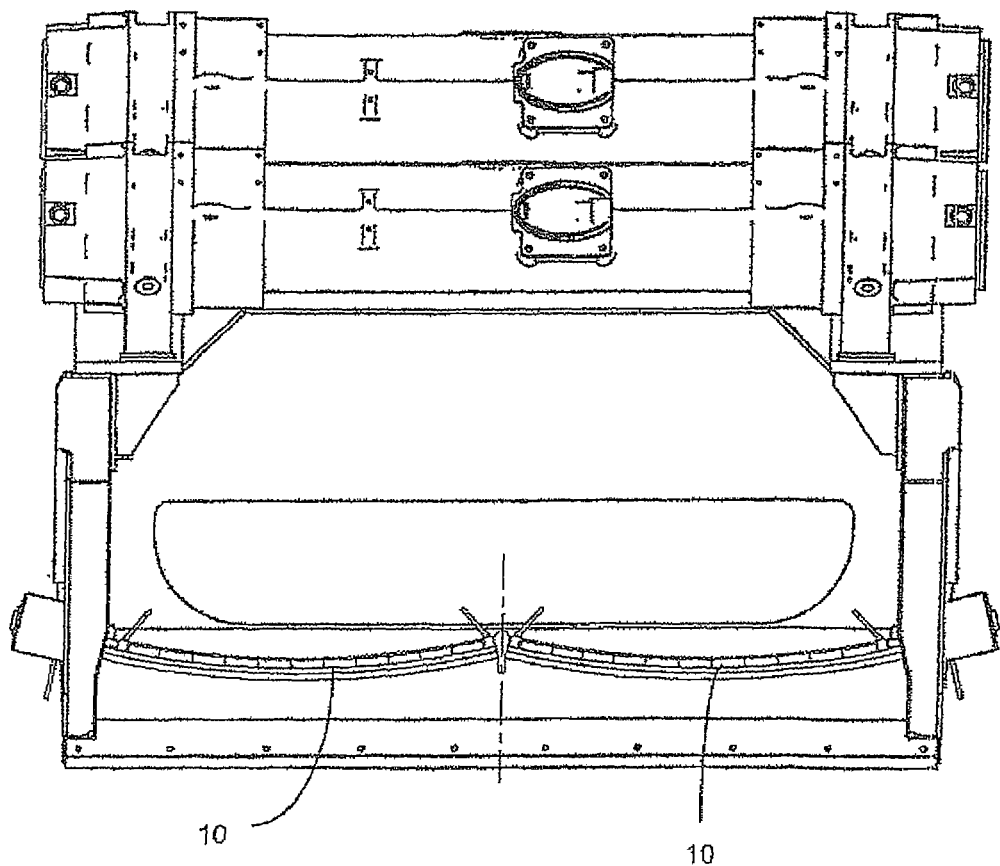
FIG. 12B is a front view of the vibratory screening machine shown in FIG. 12.

FIG. 12B is a front view of the vibratory screening machine shown in FIG. 12. FIG. 12B shows screen assemblies 10 installed upon the vibratory screening machine with compression applied to deflect the screen assemblies downward into a concave shape. Alternatively, the screen assembly may be preformed in a predetermined concave shape without compression force.

Figure 13:
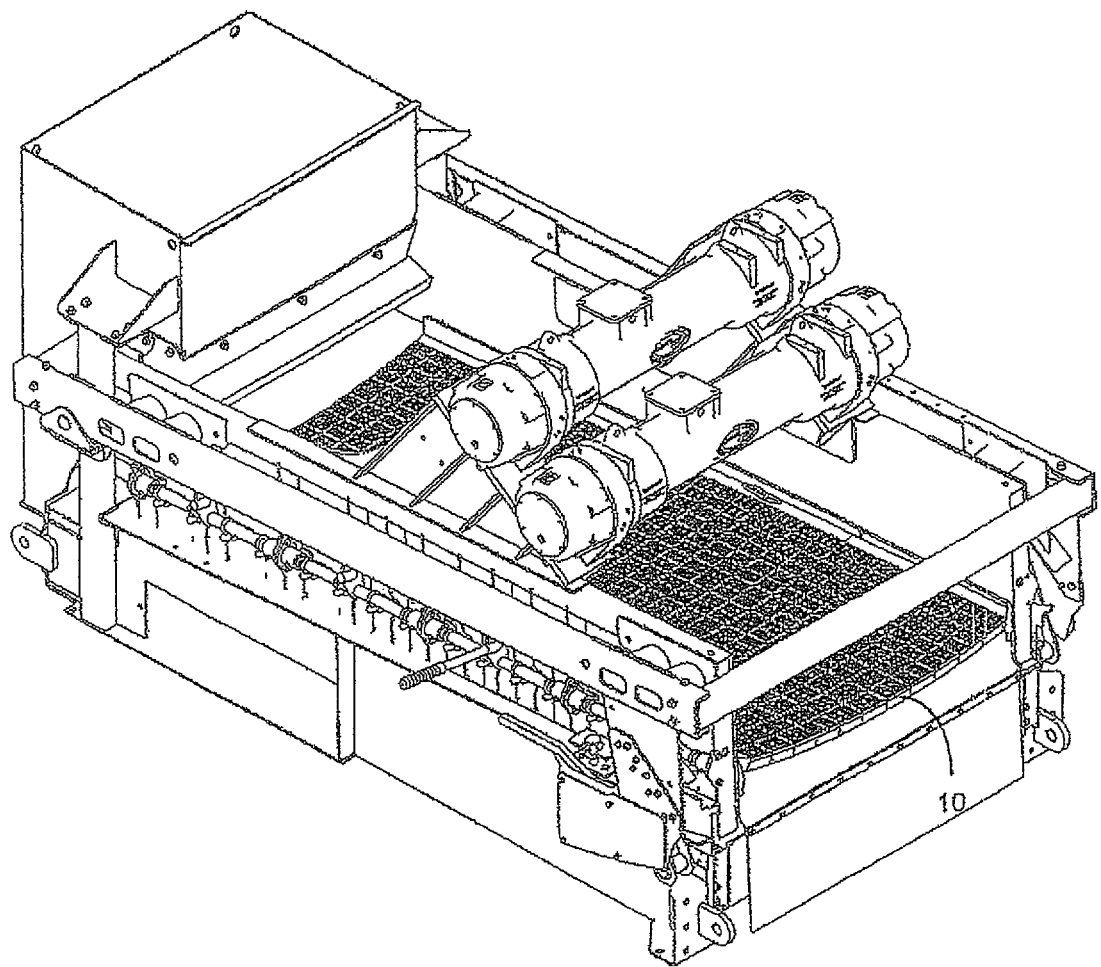
FIG. 13 is an isometric view of a vibratory screening machine with a single screening surface having screen assemblies with concave screening surfaces installed thereon, according to an exemplary embodiment of the present invention.
Figure 13A:
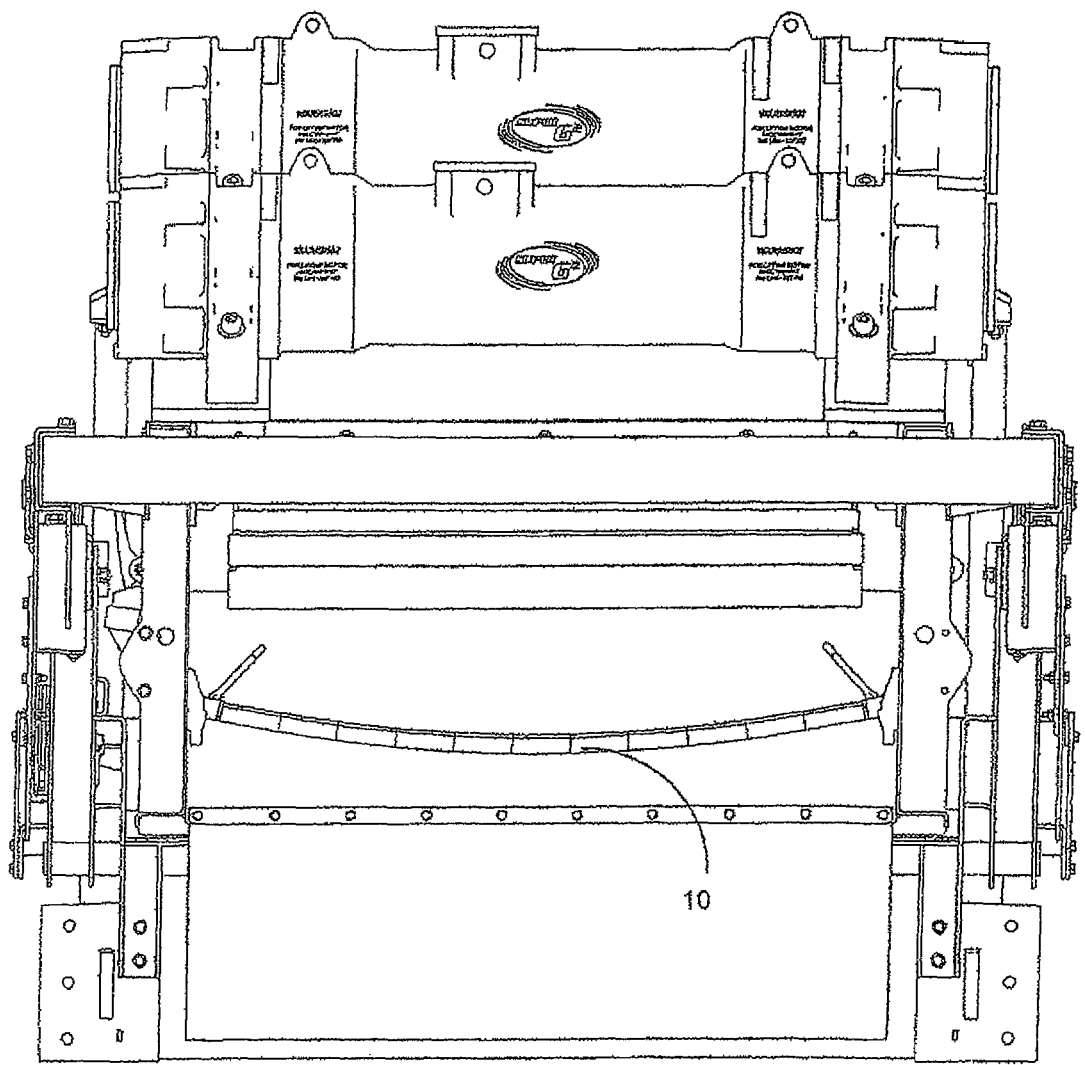
FIG. 13A is a front view of the vibratory screening machine shown in FIG. 13.

FIGS. 13 and 13A show installations of screen assembly 10 in a vibratory screening machine having a single screening surface. The vibratory screening machine may have a compression assembly on a side member of the vibratory screening machine. Screen assembly 10 may be placed into the vibratory screening machine as shown. A compression force may be applied to a binder bar or side member of the screen assembly such that the screen assembly deflects downward into a concave shape. A bottom side of the screen assembly may mate with a screen assembly mating surface of the vibratory screening machine as shown in U.S. Pat. No. 7,578,394 and U.S. patent application Ser. No. 12/460,200 (now U.S. Pat. No. 8,443,984). The vibratory screening machine may include a side member wall opposite of the compression assembly configured to receive a binder bar or a side member of the screen assembly. The side member wall may be angled such that a compression force against the screen assembly deflects the screen assembly downward. The screen assembly may be installed in the vibratory screening machine such that it is configured to receive material for screening. The screen assembly may include guide notches configured to mate with guides of the vibratory screening machine such that the screen assembly may be guided into place during installation.

Figure 14:
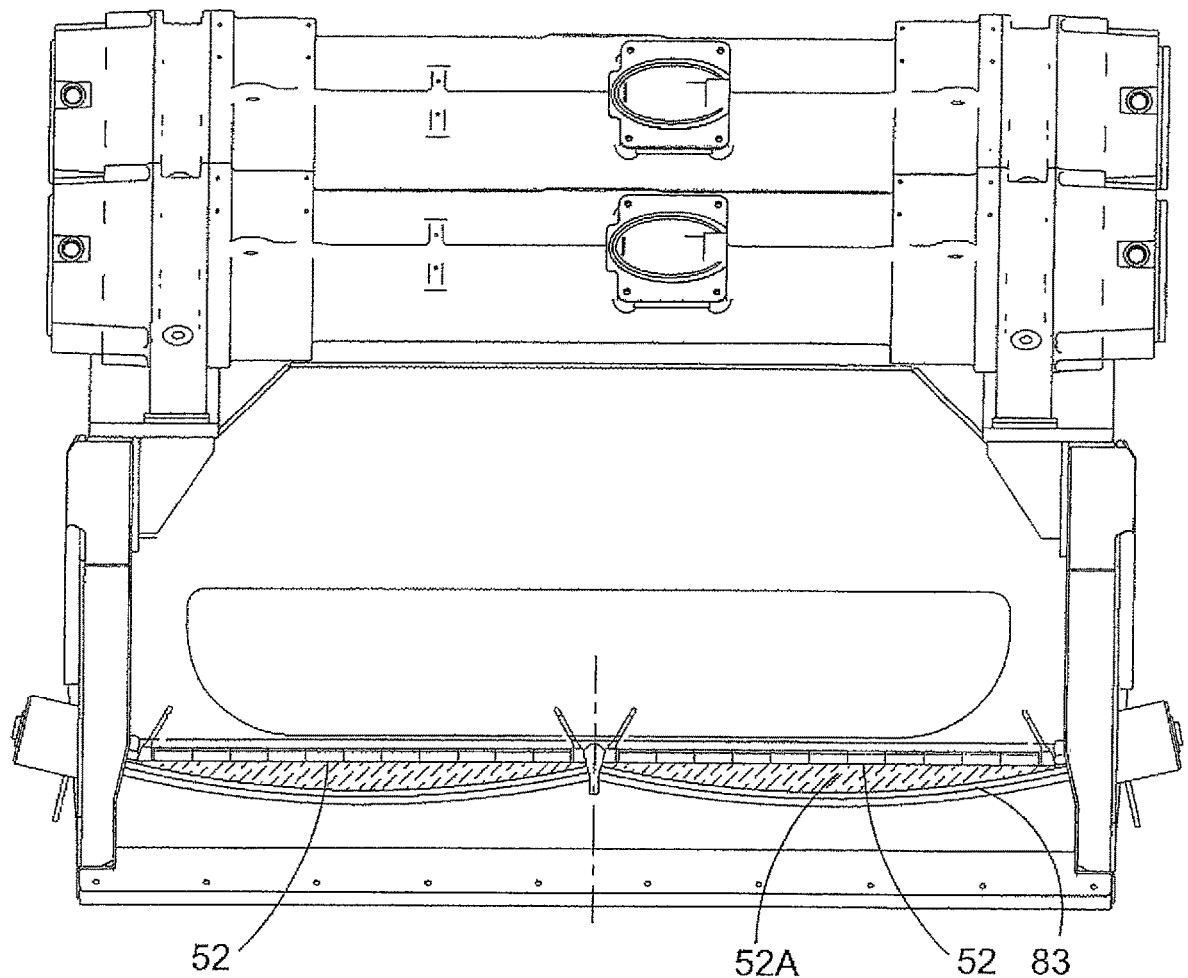
FIG. 14 is a front view of a vibratory screening machine having two separate concave screening surfaces with pre-formed screen assemblies installed upon the vibratory screening machine, according to an exemplary embodiment of the present invention.

FIG. 14 is a front view of screen assemblies 52 installed upon a vibratory screening machine having two screening surfaces, according to an exemplary embodiment of the present invention. Screen assembly 52 is an alternate embodiment where the screen assembly has been preformed to fit into the vibratory screening machine without applying a load to the screen assembly, i.e., screen assembly 52 includes a bottom portion 52A that is formed such that it mates with a bed 83 of the vibratory screening machine. The bottom portion 52A may be formed integrally with screen assembly 52 or maybe a separate piece. Screen assembly 52 includes similar features as screen assembly 10, including subgrids and screen elements but also includes bottom portion 52A that allows it to fit onto bed 83 without being compressed into a concave shape. A screening surface of screen assembly 52 may be substantially flat, concave or convex. Screen assembly 52 may be held into place by applying a compression force to a side member of screen assembly 52. A bottom portion of screen assembly 52 may be preformed to mate with any type of mating surface of a vibratory screening machine.

Figure 15:
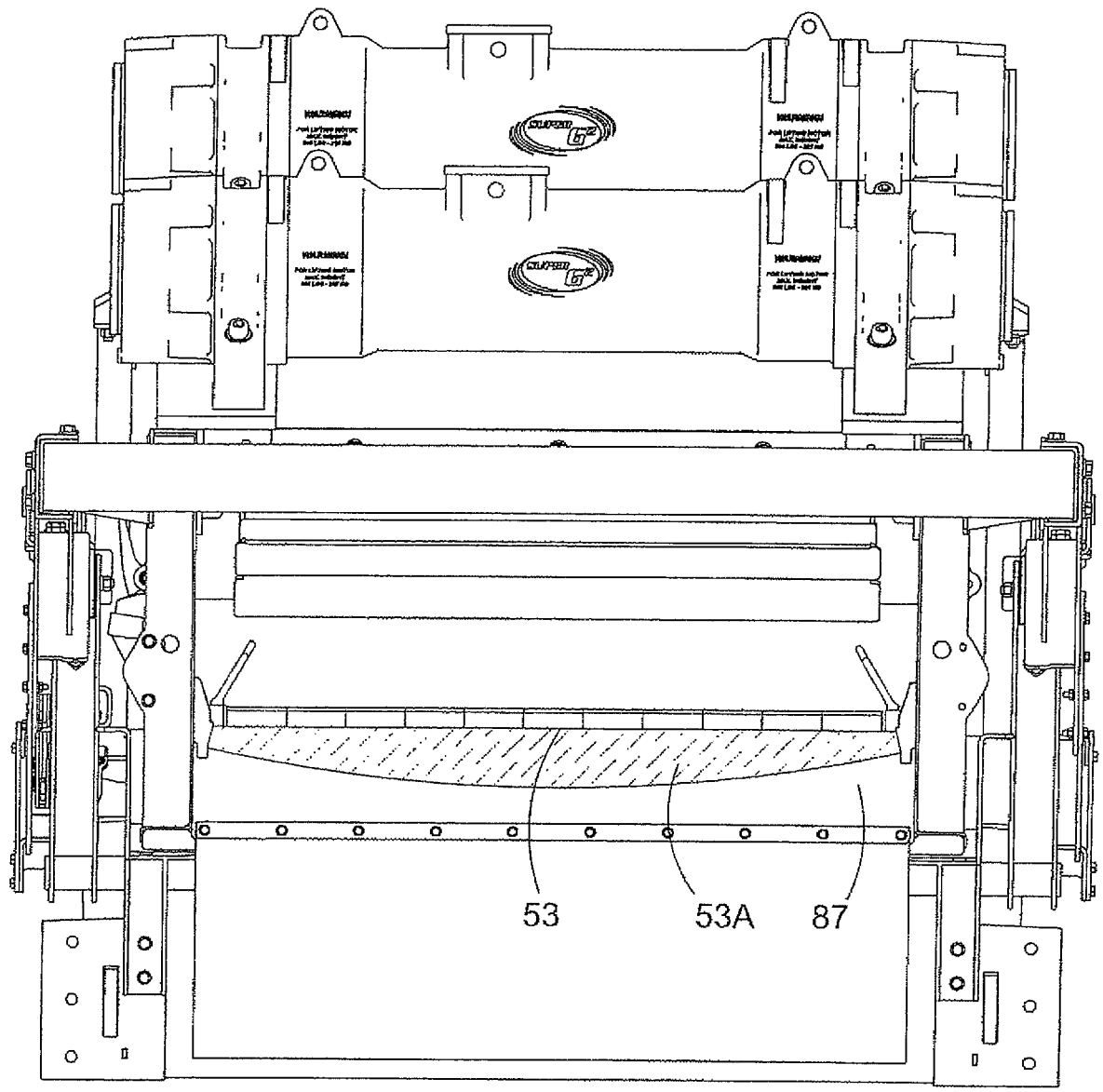
FIG. 15 is a front view of a vibratory screening machine having a single screening surface with a preformed screen assembly installed upon the vibratory screening machine, according to an exemplary embodiment of the present invention.

FIG. 15 is a front view of screen assembly 53 installed upon a vibratory screening machine having a single screening surface, according to an exemplary embodiment of the present invention. Screen assembly 53 has similar features of screen assembly 52 described above, including a bottom portion 53A that is formed such that it mates with a bed 87 of the vibratory screening machine.

Figure 16:
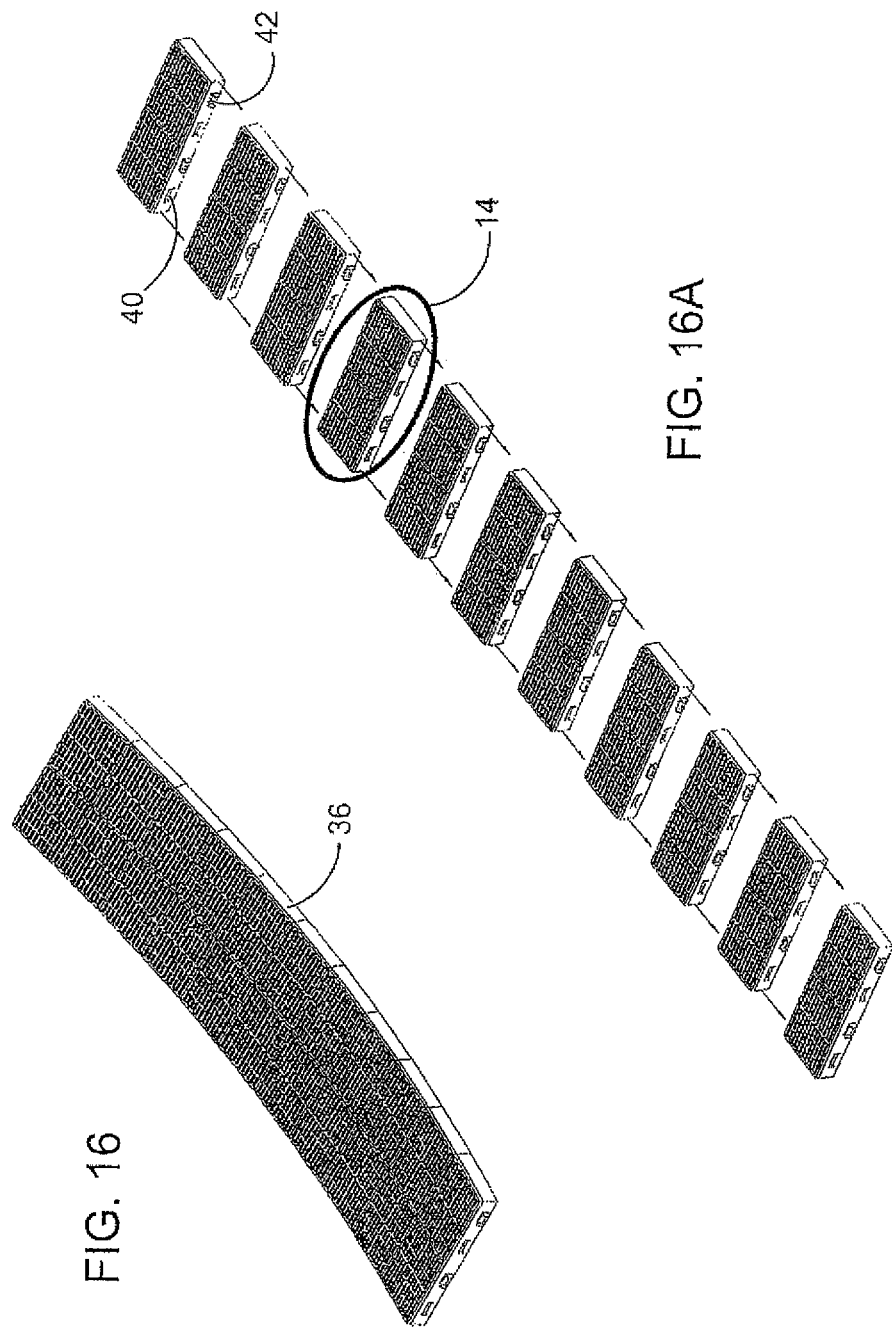
FIG. 16 is an isometric view of an end support frame subassembly, according to an exemplary embodiment of the present invention.

FIG. 16 shows an end support frame subassembly and FIG. 16A shows an exploded view of the end support frame subassembly shown in FIG. 16. The end support frame subassembly shown in FIG. 16 incorporates eleven end subgrid units 14. Alternate configurations having more or less end subgrid units may be utilized. The end subgrid units 14 are secured to each other via clips 42 and clip apertures 40 along side members of the end subgrid units 14. FIG. 16A shows attachment of individual end subgrid units such that the end support frame subassembly is created. As shown, the end support frame subassembly is covered in screen elements 16. Alternatively, the end support frame subassembly may be constructed from end subgrids prior to attachment of screen elements or partially from pre-covered subgrid units and partially from uncovered subgrid units.

Figure 17:
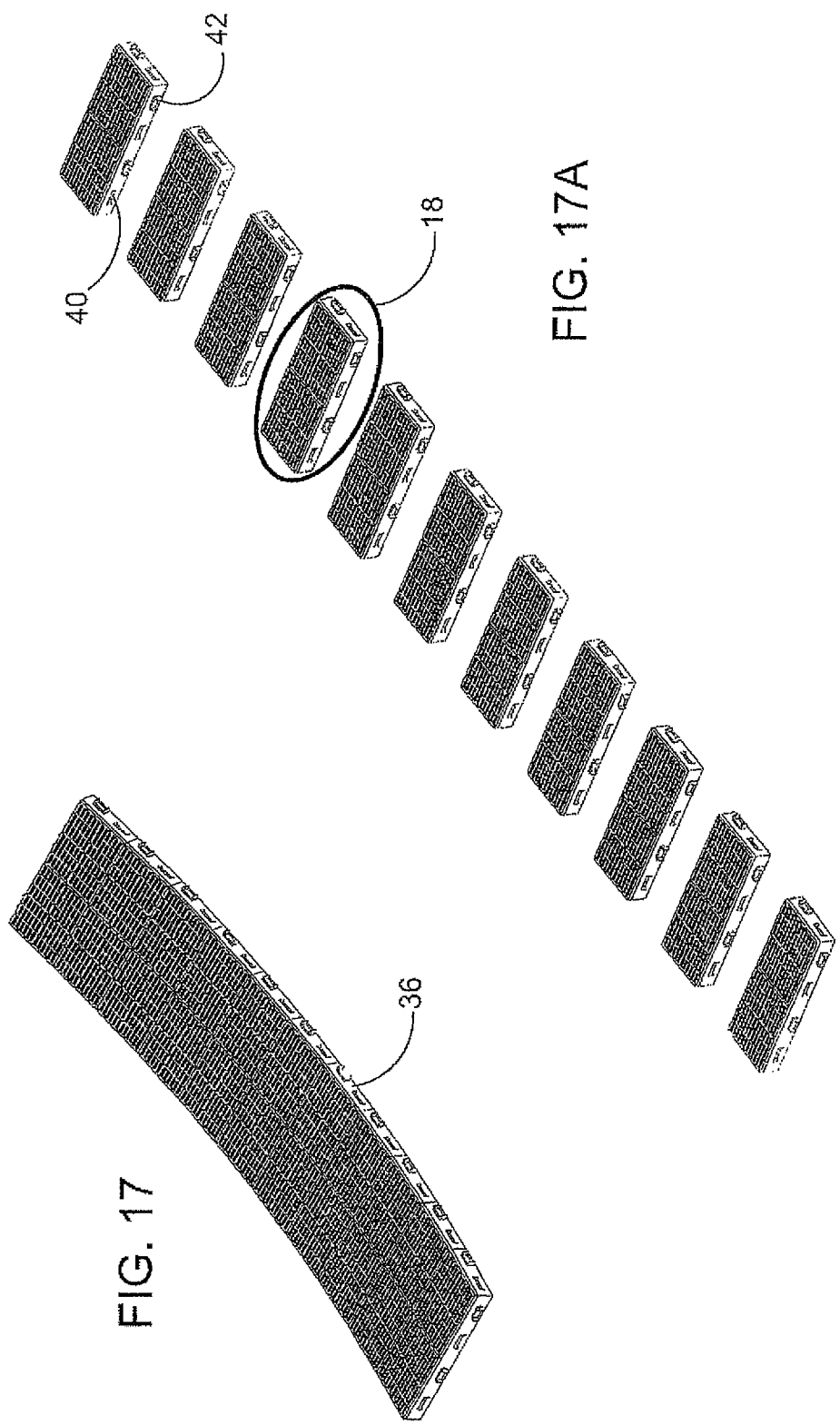
FIG. 17 is an isometric view of a center support frame subassembly, according to an exemplary embodiment of the present invention.

FIG. 17 shows a center support frame assembly and FIG. 17A shows an exploded view of the center support frame subassembly shown in FIG. 17. The center support frame assembly shown in FIG. 17 incorporates eleven center subgrid units 18. Alternate configurations having more or less center subgrid units may be utilized. The center subgrid units 18 are secured to each other via clips 42 and clip apertures 40 along side members of the center subgrid units 18. FIG. 17A shows attachment of individual center subgrid units such that the center support frame subassembly is created. As shown, the center support frame subassembly is covered in screen elements 16. Alternatively, the center support frame subassembly may be constructed from center subgrids prior to attachment of screen elements or partially from pre-covered subgrid units and partially from uncovered subgrid units.

Figure 18:
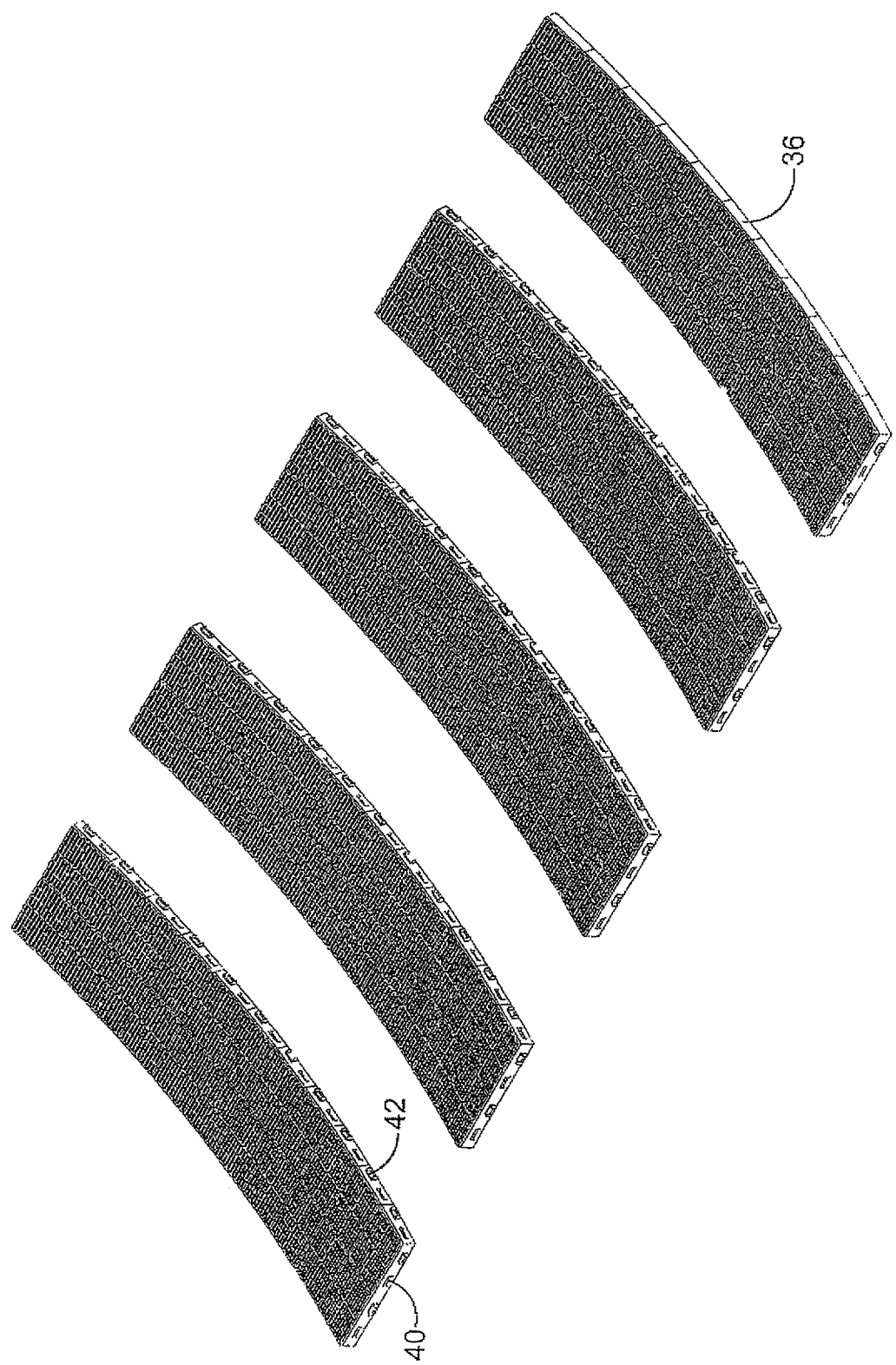
FIG. 18 is an exploded isometric view of a screen assembly, according to an exemplary embodiment of the present invention.

FIG. 18 shows an exploded view of a screen assembly having three center support frame subassemblies and two end support frame subassemblies. The support frame assemblies are secured to each other via the clips 42 and clip apertures 40 on the subgrid end members. Each center subgrid unit is attached to two other subgrid units via end members. End members 36 of end subgrid units having no clips 42 or clip apertures 40 form the end edges of the screen assembly. The screen assembly may be made with more or less center support frames subassemblies or larger or smaller frame subassemblies. Binder bars may be added to side edges of the screen assembly. As shown, the screen assembly has screen elements installed upon the subgrid units prior to assembly. Alternatively, screen elements 16 may be installed after all or a portion of assembly.

Figure 19:
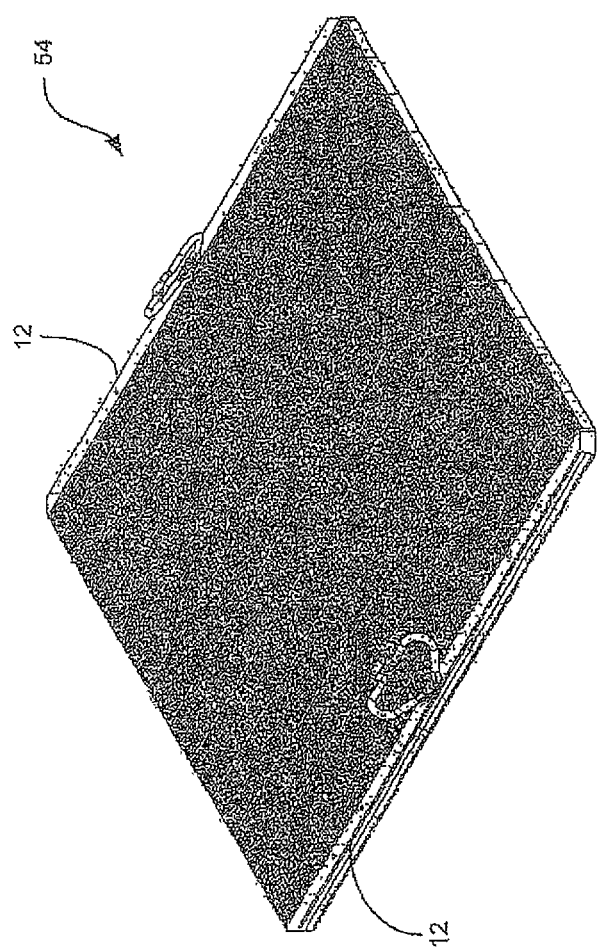
FIG. 19 is a top isometric view of a flat screen assembly, according to an exemplary embodiment of the present invention.

FIG. 19 illustrates an alternative embodiment of the present disclosure where screen assembly 54 is substantially flat. Screen assembly 54 may be flexible such that it can be deformed into a concave or convex shape or may be substantially rigid. Screen assembly 54 may be used with a flat screening surface. See FIG. 39. As shown, screen assembly 54 has binder bars 12 attached to side portions of the screen assembly 54. Screen assembly 54 may be configured with the various embodiments of the grid structures and screen elements described herein.

Figure 20:
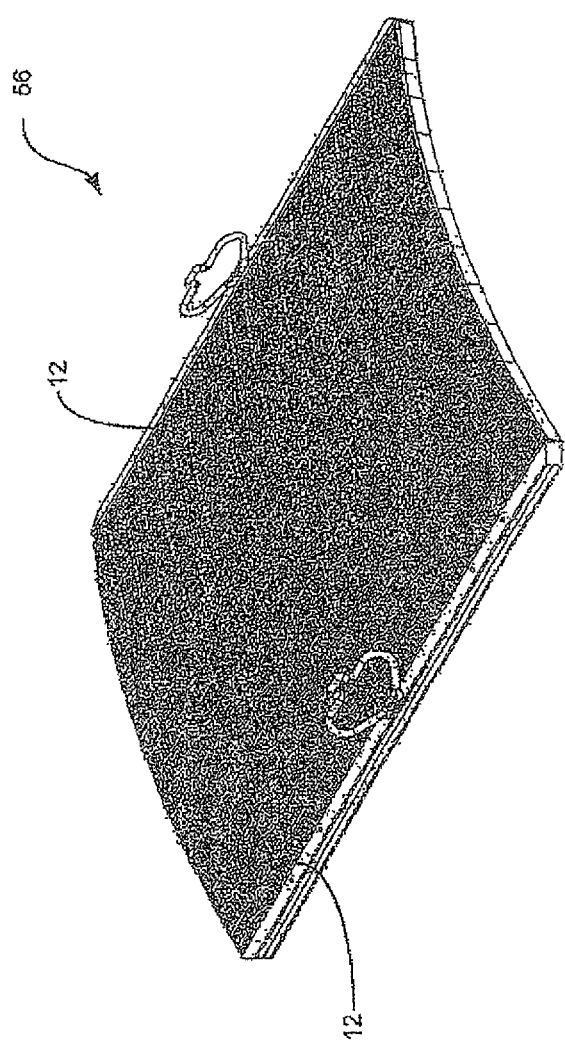
FIG. 20 is a top isometric view of a convex screen assembly, according to an exemplary embodiment of the present invention.

FIG. 20 illustrates an alternative embodiment of the present disclosure wherein screen assembly 56 is convex. Screen assembly 56 may be flexible such that it can be deformed into a more convex shape or may be substantially rigid. As shown, screen assembly 56 has binder bars 12 attached to side portions of the screen assembly. Screen assembly 56 may be configured with the various embodiments of the grid structures and screen elements described herein.

Figure 47:
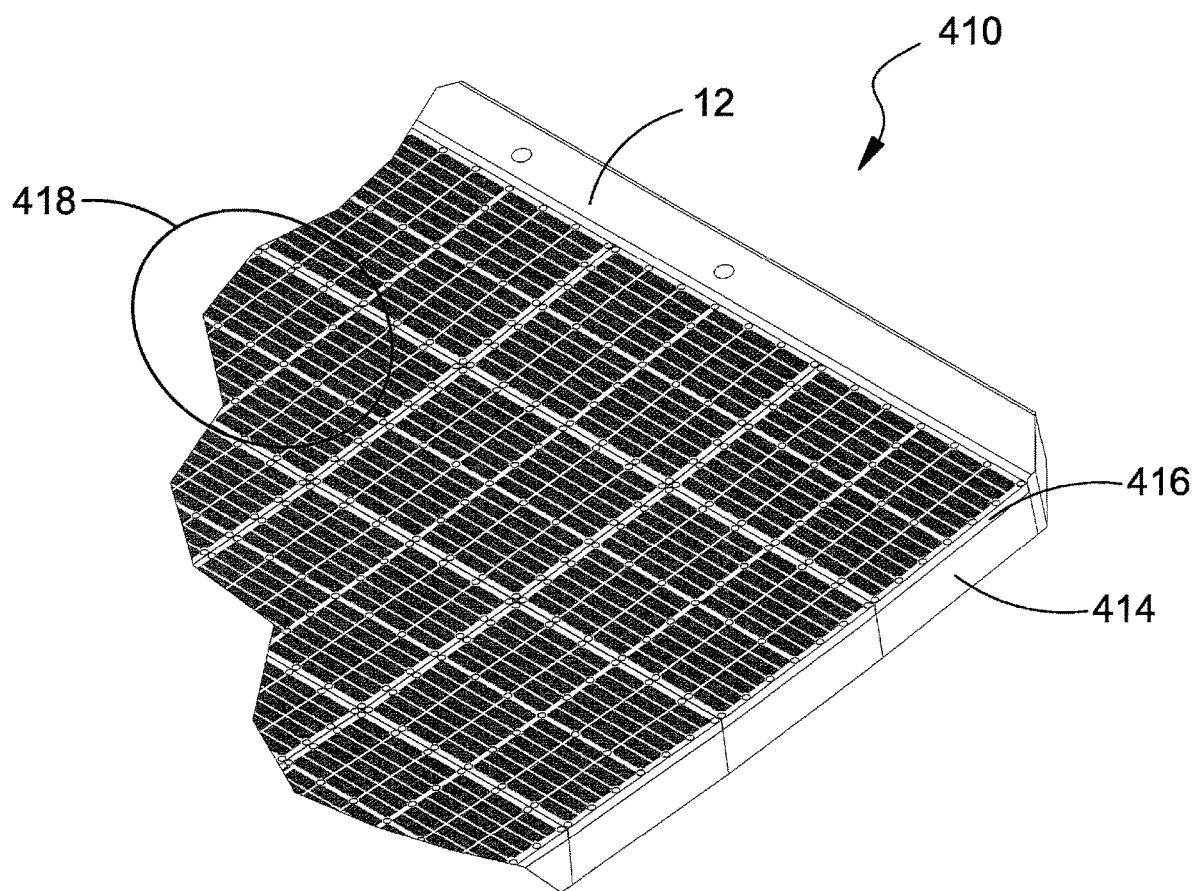
FIG. 47 is a top isometric view of a portion of a screen assembly, according to an exemplary embodiment of the present invention.

In alternative embodiments of the present disclosure, screen assembly 410 is provided having screen elements 416, center subgrid units 418, and end subgrid units 414. See, e.g., FIG. 47. Screen element 416 may be thermoplastic injection molded and may include all of the features of screen element 16 provided above. Screen element 416 may be incorporated into any of the screen assemblies disclosed herein (e.g., screen assemblies 10 and 52-54, illustrated in FIGS. 1, 14, 15, and 19, respectively) and is interchangeable with screen element 16. Screen element 416 may include location apertures 424, which may be located at a center of screen element 416 and at 10 each of the four corners of screen element 416. See, e.g., FIGS. 48 and 48A. More or less location apertures 424 may be provided on screen element 416 and multiple configurations may be provided. The location apertures 424 may be substantially the same as attachment apertures 24 and may be utilized to locate the screen element 416 on a subgrid. Alternatively, screen element 416 may be located without location apertures 424. Screen element 416 may include a plurality of tapered counter bores 470, which may facilitate extraction of screen element 416 from a mold, which mold may have injector pins configured to push the screen element out of the mold. See, e.g., FIGS. 48 and 48A.

On a bottom side of screen element 416, a first adhesion arrangement may be incorporated, which may be a plurality of extensions, cavities or a combination of extensions and cavities. The first adhesion arrangement of screen element 416 may be configured to mate with a complementary second adhesion arrangement on a top surface of a subgrid unit. For example, in FIGS. 48B and 48C a plurality of cavity pockets 472 are provided. The plurality of cavity pockets 472 may be arranged along end portions 20 and side portions 22 between the location apertures 424. Additional cavity pockets 272 may be arranged along all or a portion of first support screen element member 28 and along all or a portion of second screen element support member 30. Although shown as elongated cavities, cavity pockets 472 may have a variety of configurations, sizes, and depths. Moreover, the first adhesion arrangement on screen element 416 may be extensions rather than cavities. The first adhesion arrangement of screen element 416 may be configured to mate with a complimentary second adhesion arrangement on a subgrid unit such that a portion of screen element 416 overlaps at least a portion the subgrid unit regardless of whether the screen element 416 or the subgrid unit has extensions or cavities.

End subgrid unit 414 and center subgrid unit 418 may be incorporated into screen assembly 410. See, e.g., FIGS. 49, 49A, 50, and 50A. End subgrid unit 414 and center subgrid unit 418 may be thermoplastic injection molded and may include all of the features of end subgrid unit 14 and center subgrid unit 18 discussed above. End subgrid unit 414 and center subgrid unit 418 may be interchangeably used wherever end subgrid unit 14 and center subgrid unit 18 are indicated. End subgrid unit 414 and center subgrid unit 418 may have a plurality elongated location members 444, which may be substantially the same as attachment members 44. The arrangement of location members 444 may correspond to the location apertures 424 of screen elements 416 such that screen elements 416 may be located onto end subgrid unit 414 and center subgrid unit 418 for attachment.

End subgrid unit 414 and center subgrid unit 418 may include a second adhesion arrangement on a top surface of each of end subgrid unit 414 and center subgrid unit 418, which second adhesion arrangement may be complimentary to the first adhesion arrangement of screen element 416 such that the screen element may be mated to a subgrid unit via the mating of the first and second adhesion arrangements. In one embodiment of the present invention, the second adhesion arrangement may be a plurality of fusion bars 476 arranged along a top surface of subgrid side members 38 and subgrid end members 36. End subgrid unit 414 and center subgrid unit 418 may also include a plurality of fusion bars 478, which may be shortened fusion bars having heights less than heights of fusion bars 476, arranged along a top surface of first subgrid support member 46 and second subgrid support member 48. See, e.g., FIGS. 49 to 50A. Although shown as elongated extensions, fusion bars 476 (and 478) may be various shapes and sizes and may be arranged in a variety of configurations. Alternatively, the second adhesion arrangement may be cavities, pockets, or similar and may be configured to receive extensions from a screen element. The second adhesion arrangement could include both extensions and cavities.

Each of the plurality of cavity pockets 472 is configured to receive fusion bars 476 and shorted fusion bars 478 arranged on subgrids (414, 418, 458, and 460). See, e.g., FIGS. 45A to 45E and 46. As shown in FIGS. 45B to 45E, fusion bars 476 fit within the plurality of cavity pockets 472 when screen element 416 is placed upon a subgrid. Cavity pockets 472 may have a width C that is slightly larger than width D of fusion bar 476. Cavity pocket 472 may have a depth A that is slightly smaller than a height B of fusion bar 476. See, e.g., FIG. 47. Height B of fusion bar 476 may be approximately 0.056 inches. Prior to melting of fusion bars 476, screen element 416 may rest upon fusion bars 476 without contacting the rest of a subgrid. Screen element 416 and the subgrids may be bonded together via laser welding. Bonding may be accomplished through chemical bonding between the cavity pockets 472 and the fusion bars (476 or 478) or melting portions of the materials of each component such that the components harden together. In one embodiment, when screen element 416 is located on a subgrid, fusion bar 476 (or shortened fusion bar 478) may be melted, allowing for a melted portion of the fusion bar 476 to fill all or a portion of width C of the cavity pocket 472. In certain embodiments approximately 0.006 inches of fusion bar 476 may be melted and allowed to fill all or a portion of the width of cavity pocket 472. Melting of fusion bar 476 may be performed via laser welding, which may secure screen element 416 to a subgrid. A laser 500 may be configured and controlled to reach a specific depth of fusion bar 476.

Fusion bars 476 (or shortened fusion bars 478) may include carbon, graphite or other materials configured to respond to a specific laser wavelength. The fusion bars may be further configured to correspond to a laser to be used for laser welding. Fusion bars may have specific lengths to correspond to a laser 500. Although shown as elongated protrusions, other shapes and/or designs may be incorporated for fusion bars subject to the requirements of a chosen laser. In embodiments having fusion bars on subgrids, screen elements 416 typically do not include carbon or graphite. Screen element 416 and the fusion bars may be made of different materials such that a selected laser 500 may travel through screen element 416 without melting screen element 416 and contact the fusion bars. See, e.g., FIGS. 45B and C. Screen element 416 may be made of a TPU or similar material having performance properties desired for a screening application. Screen element 416 may be substantially clear. Subgrids (414 and 418) may be made from nylon or similar materials. The fusion bars may have a higher melting point than the material of screen element 416 such that, when the fusion bars are melted, a portion of the screen element 416 also melts, which may be accomplished by heat transfer from the melted portion of fusion bar 476 that contacts screen element 416 in the cavity pocket 472. In this way, screen element 416 is welded to a subgrid. See, e.g., FIGS. 51, 51A, 52, and 52A.

Laser welding is typically performed by focusing a laser beam toward a seam or area to transform material from a solid to a liquid, and after removal of the laser beam, the material return to a solid. Laser welding is a type of fusion welding and can be performed through conduction or penetration. Conduction welding relies upon conductivity of the material being welded to generate heat and melt the material. Laser welding of screen element 416 to a subgrid having fusion bars provides for laser welding of two different materials together. Typically, this cannot be accomplished with laser welding; however, applying the laser 500 through the screen element 416 to the fusion bars, which have conductive properties to generate heat upon the application of the selected laser 500, cause the fusion bars (476 or 478) to melt. Similarly, the heat produced by the conduction and/or from the melted fusion bar material causes a portion of the screen element to melt. The two liquid materials combine and create a strong solid attachment between the subgrid and the screen element when the laser is removed and the combined materials return to a solid. By forming laser welded bonds between the screen element and the subgrids, the attachment between the components is very strong, which is essential for components of screen assemblies used in vibratory screening machines. The screen assemblies can be subjected to vibratory forces in excess of 8 Gs, abrasive materials and chemicals, and very high load requirements. Therefore, screen assemblies must be very strong and durable. Embodiments of the present invention provide screen assemblies made from multiple parts secured together. Creating screen assemblies from smaller subparts allows for micro injection molding of screen elements with very small openings, e.g. having a thickness of approximately 43 microns to approximately 100 microns. The strength of the laser welding adds overall strength to the screen assemblies, allowing for the benefits of micro injection molding the screen elements while maintaining durable screen assemblies. Laser welding also provides a more efficient attachment procedure than other attachment procedures such as heat staking. In certain embodiments, laser welding may be accomplished in approximately 8 to 10 seconds where heat staking involving other embodiments may require approximately 1.5 minutes.

End subgrid unit 414 (or 14) and center subgrid unit 418 (or 18) may include secondary support framework 488 spanning across grid openings 50. Secondary support framework 488 may span all or only a portion of a grid opening 50. Secondary support framework 488 increases the strength and durability of end subgrid unit 414 (or 14) and center subgrid unit 418 (or 18). Secondary support framework 488 increases the overall strength of screen assembly 410 allowing it to withstand vibratory forces in excess of 8 Gs.

Figure 21A:
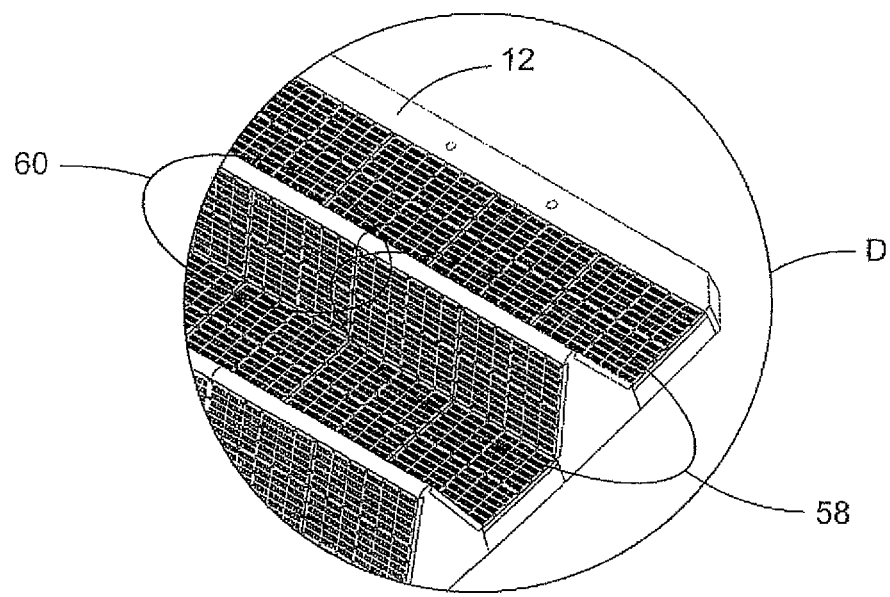
FIG. 21A is an enlarged view of section D of the screen assembly shown in FIG. 21.
Figure 21:
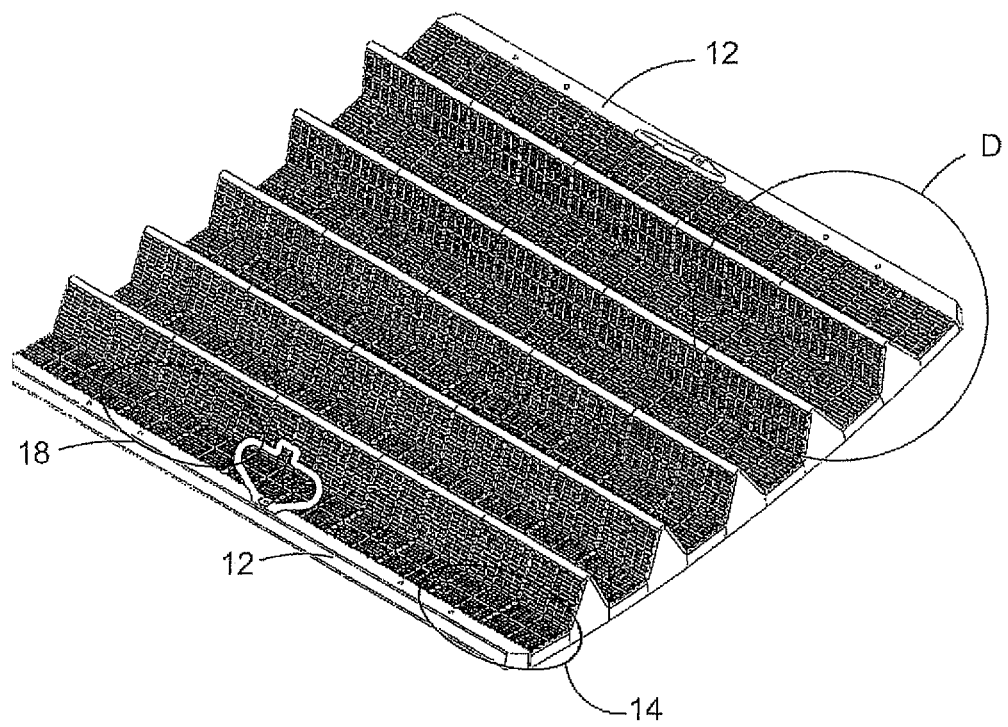
FIG. 21 is an isometric view of a screen assembly having pyramidal shaped subgrids, according to an exemplary embodiment of the present invention.

FIGS. 21 and 21A show an alternative embodiment of the present disclosure incorporating pyramidal shaped subgrid units. A screen assembly is shown with binder bars 12 attached. The screen assembly incorporates center and end subgrid units 14 and 18 (or 414 and 418) and center and end pyramidal shaped subgrid units 58 and 60 (or 458 and 460). By incorporating the pyramidal shaped subgrid units 58 and 60 into the screen assembly, an increased screening surface may be achieved. Additionally, material being screened may be controlled and directed. The screen assembly may be concave, convex, or flat. The screen assembly may be flexible and may be deformed into a concave or convex shape upon the application of a compression force. The screen assembly may include guide notches capable of mating with guide mating surfaces on a vibratory screening machine. Different configurations of subgrid units and pyramid subgrid units may be employed which may increase or decrease an amount of screening surface area and flow characteristics of the material being processed. Unlike mesh screens or similar technology, which may incorporate corrugations or other manipulations to increase surface area, the screen assembly shown is supported by the grid framework, which may be substantially rigid and capable of withstanding substantial loads without damage or destruction. Under heavy material flows, traditional screen assemblies with corrugated screening surfaces are frequently flattened or damaged by the weight of the material, thereby impacting the performance and reducing the screening surface area of such screen assemblies. The screen assemblies disclosed herein are difficult to damage because of the strength of the grid framework, and the benefits of increased surface area provided by incorporating pyramidal shaped subgrids may be maintained under substantial loads.

Figure 22A:
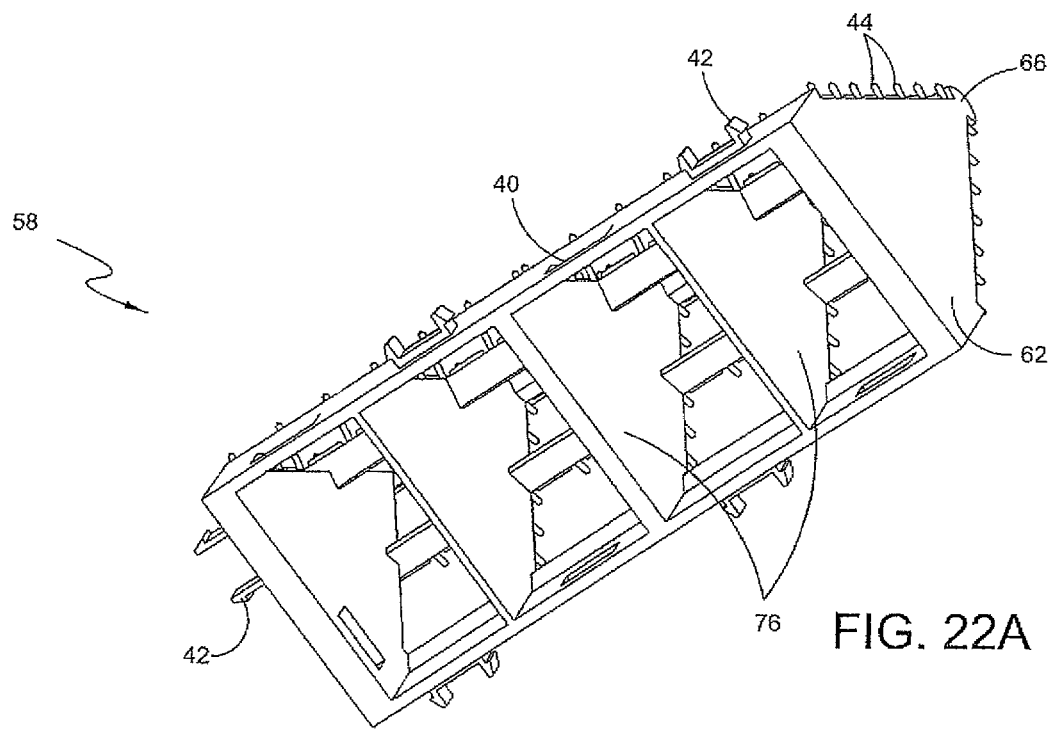
FIG. 22A is a bottom isometric view of the pyramidal shaped end subgrid shown in FIG. 22.

A pyramidal shaped end subgrid 58 is illustrated in FIG. 22 and FIG. 22A. Pyramidal shaped end subgrid 58 includes a first and a second grid framework forming first and second sloped surface grid openings 74. Pyramidal shaped end subgrid 58 includes a ridge portion 66, subgrid side members/base members 64, and first and second angular surfaces 70 and 72, respectively, that peak at ridge portion 66 and extend downwardly to side member 64. Pyramidal shaped subgrids 58 and 60 have triangular end members 62 and triangular middle support members 76. Angles shown for first and second angular surface 70 and 72 are exemplary only. Different angles may be employed to increase or decrease surface area of screening surface. Pyramidal shaped end subgrid 58 has fasteners along side members 64 and at least one triangle end member 62. The fasteners may be clips 42 and clip apertures 40 such that multiple subgrid units 58 may be secured together. Alternatively, the clips 42 and clip apertures 40 may be used to secure pyramidal shaped end subgrid 58 to end subgrid 14, center subgrid 18, or pyramidal shaped center subgrid 60. Elongated attachment members 44 may be configured on first and second sloped surfaces 70 and 72 such that they mate with the screen element attachment apertures 24. Screen element 16 may be secured to pyramidal shaped end subgrid 58 via mating elongated attachment members 44 with the screen element attachment apertures 24. A portion of the elongated attachment member 44 may extend slightly above the screen element screening surface when the screen element 16 is attached to pyramidal shaped end subgrid 58. The screen element attachment apertures 24 may include a tapered bore such that a portion of the elongated attachment members 44 extending above the screen element screening surface may be melted and fill the tapered bore. Alternatively, the screen element attachment apertures 24 may be without a tapered bore and the portion of the elongated attachment members extending above the screening surface of the screening element 16 may be melted to form a bead on the screening surface. Once attached, screen element 16 may span first 74 and second sloped grid openings. Materials passing through the screening openings 86 will pass through the first 74 and second grid openings.

A pyramidal shaped center subgrid 60 is illustrated in FIG. 23 and FIG. 23A. Pyramidal shaped center subgrid 60 includes a first and a second grid framework forming a first and second sloped surface grid opening, 74. Pyramidal shaped center subgrid 60 includes a ridge portion 66, a subgrid side members/base members 64, and first and second angular surfaces 70 and 72 that peak at the ridge portion 66 and extend downwardly to the side member 64. Pyramidal shaped center subgrid 60 has triangular end members 62 and triangular middle members 76. Angles shown for first and second angular surface 70 and 72 are exemplary only. Different angles may be employed to increase or decrease surface area of screening surface. The pyramidal shaped center subgrid 60 has fasteners along side members 64 and both triangle end members 62. The fasters may be clips 42 and clip apertures 40 such that multiple pyramidal shaped center subgrids 60 may be secured together. Alternatively, the clips 42 and clip apertures 40 may be used to secure pyramidal shaped center subgrid 60 to end subgrid 14, center subgrid 18, or pyramidal shaped end subgrid 58. Elongated attachment members 44 may be configured on first and second sloped surfaces 70 and 72 such that they mate with the screen element attachment apertures 24. Screen element 16 may be secured to pyramidal shaped center subgrid 60 via mating elongated attachment members 44 with the screen element attachment apertures 24. A portion of the elongated attachment member 44 may extend slightly above the screen element screening surface when the screen element 16 is attached to pyramidal shaped center subgrid 60. The screen element attachment apertures 24 may include a tapered bore such that the portion of the elongated attachment members 44 extending above the screen element screening surface may be melted and fill the tapered bore. Alternatively, the screen element attachment apertures 24 may be without a tapered bore and the portion of the elongated attachment members extending above the screening surface of the screening element 16 may be melted to form a bead on the screening surface. Once attached, screen element 16 will span sloped grid opening 74. Materials passing through the screening openings 86 will pass through the grid opening 74. While pyramid and flat shaped grid structures are shown, it will be appreciated that various shaped subgrids and corresponding screen elements may be fabricated in accordance with the present disclosure.

FIG. 24 shows a subassembly of a row of pyramidal shaped subgrid units. FIG. 24A is an exploded view of the subassembly in FIG. 24 showing the individual pyramidal shaped subgrids and direction of attachment. The subassembly includes two pyramidal shaped end subgrids 58 and three pyramidal shaped center subgrids 60. The pyramidal shaped end subgrids 58 form ends of the subassembly while pyramidal shaped center subgrids 60 are used to join the two end subgrids 58 via connections between the clips 42 and clip apertures 40. The pyramidal subgrids shown in FIG. 24 are shown with attached screen elements 16. Alternatively, the subassembly may be constructed from subgrids prior to attachment of screen elements or partially from pre-covered pyramidal shaped subgrid units and partially from uncovered pyramidal shaped subgrid units.

Figure 24B:
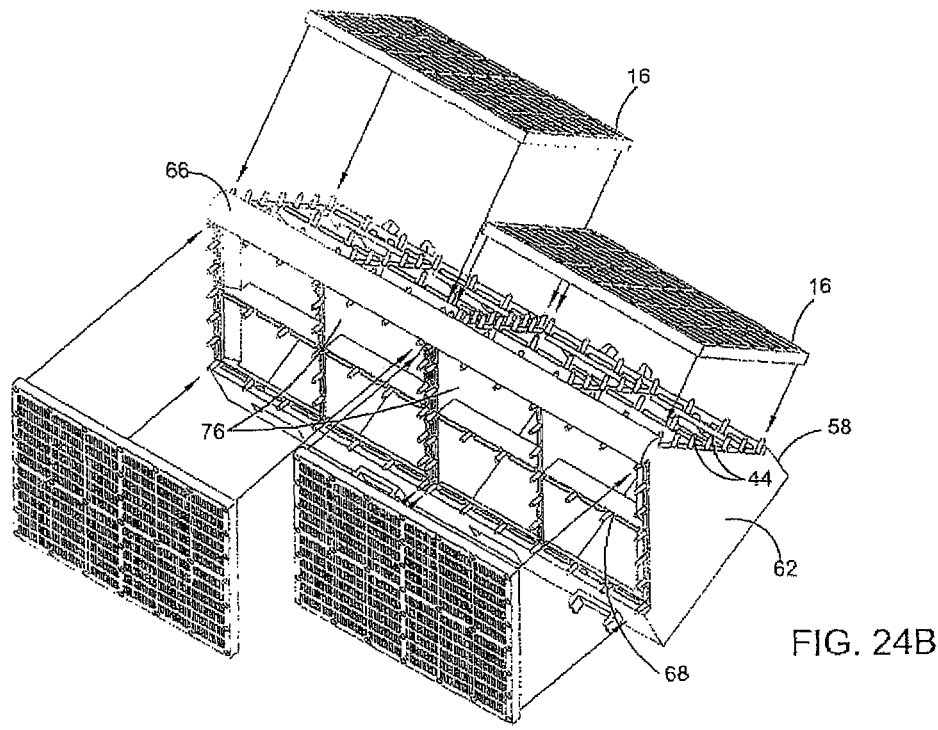
FIG. 24B is an exploded isometric view of a pyramidal shaped end subgrid showing screen elements prior to attachment to the pyramidal shaped end subgrid.
Figure 24C:
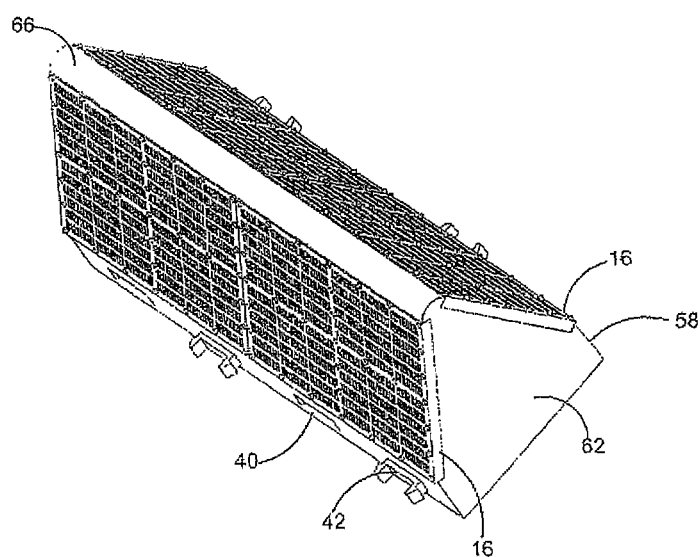
FIG. 24C is an isometric view of the pyramidal shaped end subgrid shown in FIG. 24B having the screen elements attached thereto.

FIGS. 24B and 24C illustrate attachment of screen elements 16 to pyramidal shaped end subgrid 58, according to an exemplary embodiment of the present invention. Screen elements 16 may be aligned with pyramidal shaped end subgrid 58 via elongated attachment members 44 and screen element attachment apertures 24 such that the elongated attachment members 44 pass through the screen element attachment apertures 24 may extend slightly beyond the screen element screening surface. The portion of elongated attachment members 44 extending beyond screen element screening surface may be melted to fill tapered bores of the screen element attachment apertures 24 or, alternatively, to form beads upon the screen element screening surface, securing the screen element 16 to pyramidal shaped subgrid 58. Attachment via elongated attachment members 44 and screen element attachment apertures 24 is only one embodiment of the present invention. Alternatively, screen element 16 may be secured to pyramidal shaped end subgrid 58 via adhesive, fasteners and fastener apertures, etc. Although shown having four screen elements for each pyramidal shaped end subgrid 58, the present invention includes alternate configurations of two screen elements per pyramidal shaped end subgrid 58, multiple screen elements per pyramidal shaped end subgrid 58, or having a single screen element cover a sloped surface of multiple pyramidal shaped subgrid units. Pyramidal shaped end subgrid 58 may be substantially rigid and may be a single thermoplastic injection molded piece.

Figure 24D:
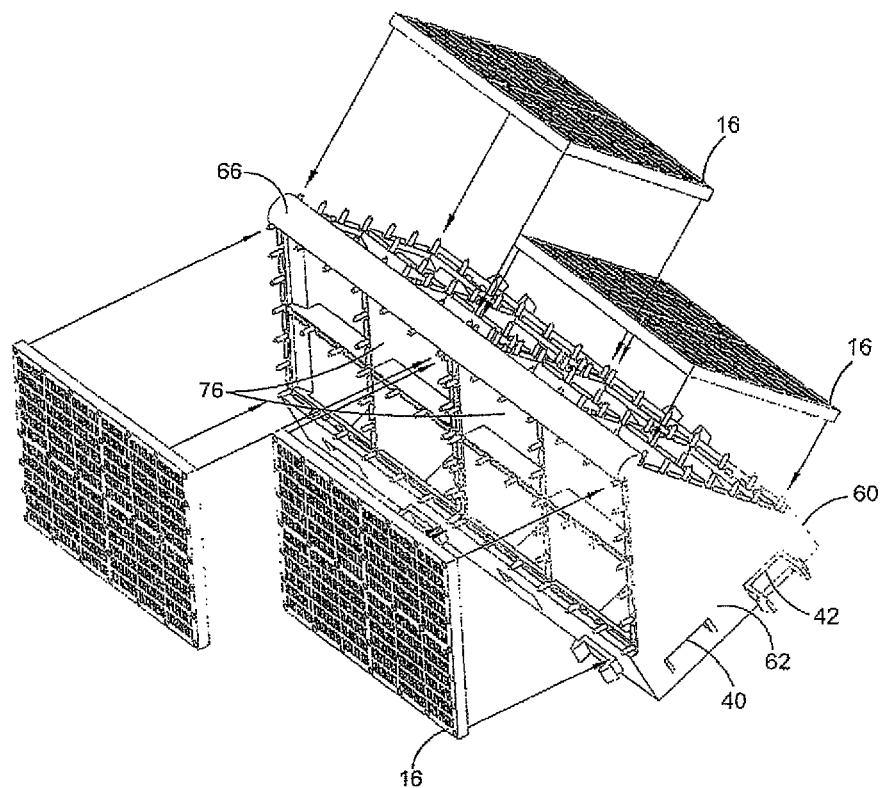
FIG. 24D is an exploded isometric view of a pyramidal shaped center subgrid showing screen elements prior to attachment to the pyramidal shaped center subgrid, according to an exemplary embodiment of the present invention.
Figure 24E:
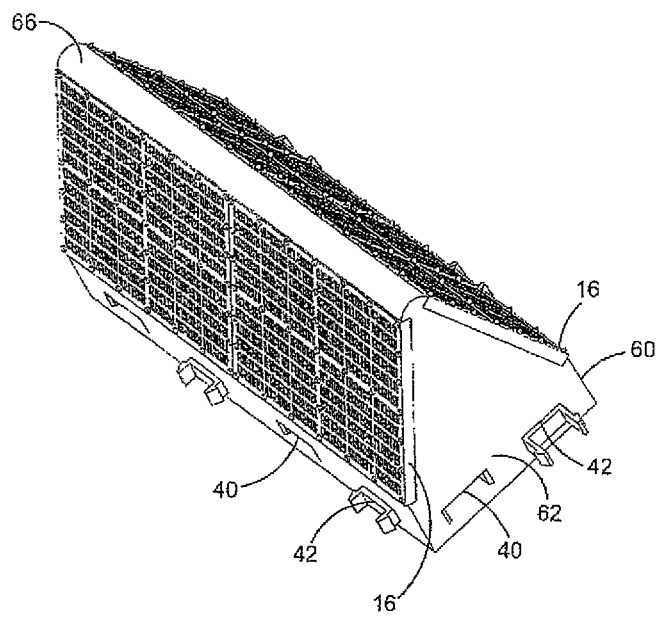
FIG. 24E is an isometric view of the pyramidal shaped center subgrid shown in FIG. 24D having the screen elements attached thereto.

FIGS. 24D and 24E illustrate attachment of screen elements 16 to pyramidal shaped center subgrid 60, according to an exemplary embodiment of the present invention. Screen elements 16 may be aligned with pyramidal shaped center subgrid 60 via elongated attachment members 44 and screen element attachment apertures 24 such that the elongated attachment members 44 may pass through the screen element attachment apertures 24 and may extend slightly beyond the screen element screening surface. The portion of the elongated attachment members 44 extending beyond screen element screening surface may be melted to fill tapered bores of the screen element attachment apertures 24 or, alternatively, to form beads upon the screen element screening surface, securing the screen element 16 to pyramidal shaped subgrid unit 60. Attachment via elongated attachment members 44 and screen element attachment apertures 24 is only one embodiment of the present invention. Alternatively, screen element 16 may be secured to pyramidal shaped center subgrid 60 via adhesive, fasteners and fastener apertures, etc. Although shown having four screen elements for each pyramidal shaped center subgrid 60, the present invention includes alternate configurations of two screen elements per pyramidal shaped center subgrid 60, multiple screen elements per pyramidal shaped center subgrid 60, or having a single screen element cover a sloped surface of multiple pyramidal shaped subgrids. Pyramidal shaped center subgrid 60 may be substantially rigid and may be a single thermoplastic injection molded piece. While pyramid and flat shaped grid structures are shown, it will be appreciated that various shaped subgrids and corresponding screen elements may be fabricated in accordance with the present disclosure.

FIGS. 53 to 56A show end and center pyramidal shaped subgrids 458 and 460, respectively, according to exemplary embodiments of the present disclosure. End and center pyramidal shaped subgrids 458 and 460 may be thermoplastic injection molded and may have all of the features of end and center pyramidal shaped subgrids 58 and 60 discussed herein above. As with end subgrid unit 414 and center subgrid unit 418, end and center pyramidal shaped subgrids 458 and 460 may have location members 444 corresponding to the location apertures 424 of screen element 416 such that screen elements 416 may be located onto end and center pyramidal shaped subgrids 458 and 460 for attachment. End and center pyramidal shaped subgrids 458 and 460 may have second adhesion arrangements such as a plurality of fusion bars 476 and shorted fusion bars 478. The second adhesion arrangements may be configured to mate with complimentary first adhesion arrangements on screen elements 416 such as a plurality of pocket cavities. Screen elements 416 may be laser welded to the pyramidal subgrids. End and center pyramidal shaped subgrids 458 and 460 may include secondary support framework 488 spanning across grid openings 74. Secondary support framework 488 may span all or only a portion of a grid opening 74. Secondary support framework 488 increases the strength and durability of end and center pyramidal shaped subgrids 458 and 460. End and center pyramidal shaped subgrids 458 and 460 may include a flattened ridge portion 465 and may have fixture locators 490 in ridge 66. See, e.g., FIG. 53. Flattened ridge portion 465 may allow for easier molding than rounded or pointed embodiments and may allow for easier release and/or extraction of the subgrids from molds. Embodiments may include one or more fixture locators 490 which may be utilized in alignment and/or assembly during laser welding. Fixtures may engage subgrids at fixture locators 490 allowing for alignment of laser welding. Flattened ridge portion 465 may provide easier engagement of the fixture locators 490.

Figure 25A:
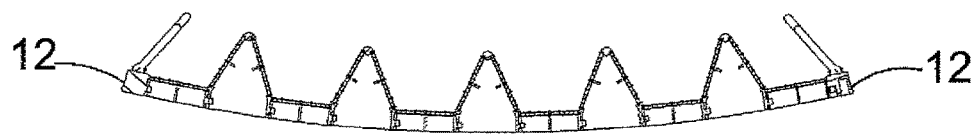
FIG. 25A is a cross-section view of Section C-C of the screen assembly shown in FIG. 25.
Figure 25:
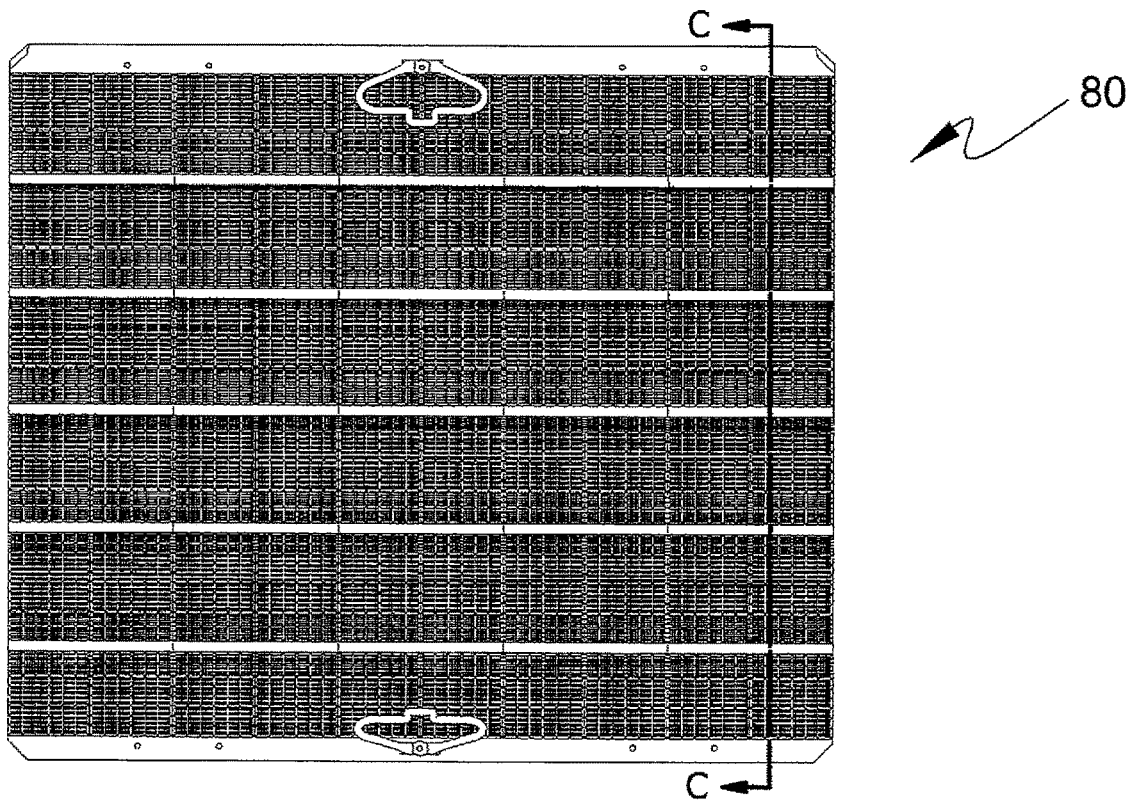
FIG. 25 is a top view of a screen assembly having pyramidal shaped subgrids, according to an exemplary embodiment of the present invention.
Figure 25B:
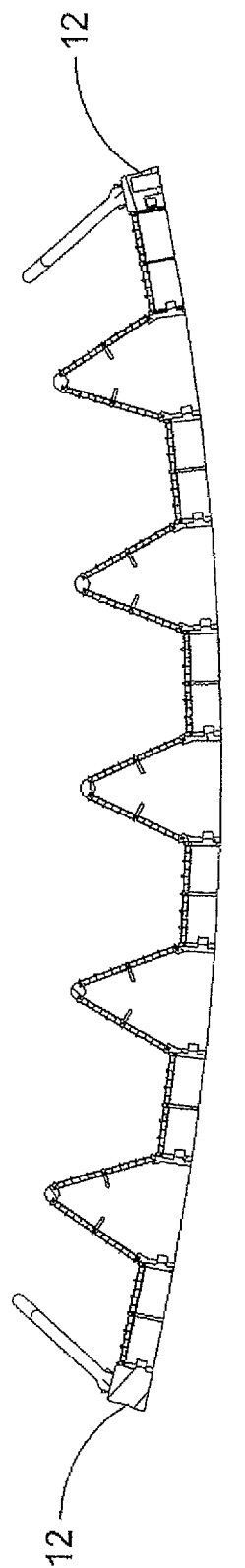
FIG. 25B is an enlarged view of Section C-C shown in FIG. 25A.

FIG. 25 is a top view of a screen assembly 80 having pyramidal shaped subgrids, which may be any of subgrids 14, 18, 414, and 418. As shown, the screen assembly 80 is formed from screen subassemblies attached to each other alternating from flat subassemblies to pyramidal shaped subassemblies. Alternatively, pyramidal shaped subassemblies may be attached to each other or less or more pyramidal shaped subassemblies may be used. FIG. 25A is a cross-section of Section C-C of the screen assembly shown in FIG. 25. As shown, the screen assembly has five rows of pyramidal shaped subgrid units and six rows of flat subgrids, with the rows of flat subgrid units in between each row of the pyramidal shaped subgrids. Binder bars 12 are attached to the screen assembly. Any combination of flat subgrid rows and pyramidal shaped subgrid rows may be utilized. FIG. 25B is a larger view of the cross-section shown in FIG. 25A. In FIG. 25B, attachment of each subgrid to another subgrid and/or binder bar 12 is visible via clips and clip apertures.

Figure 26:
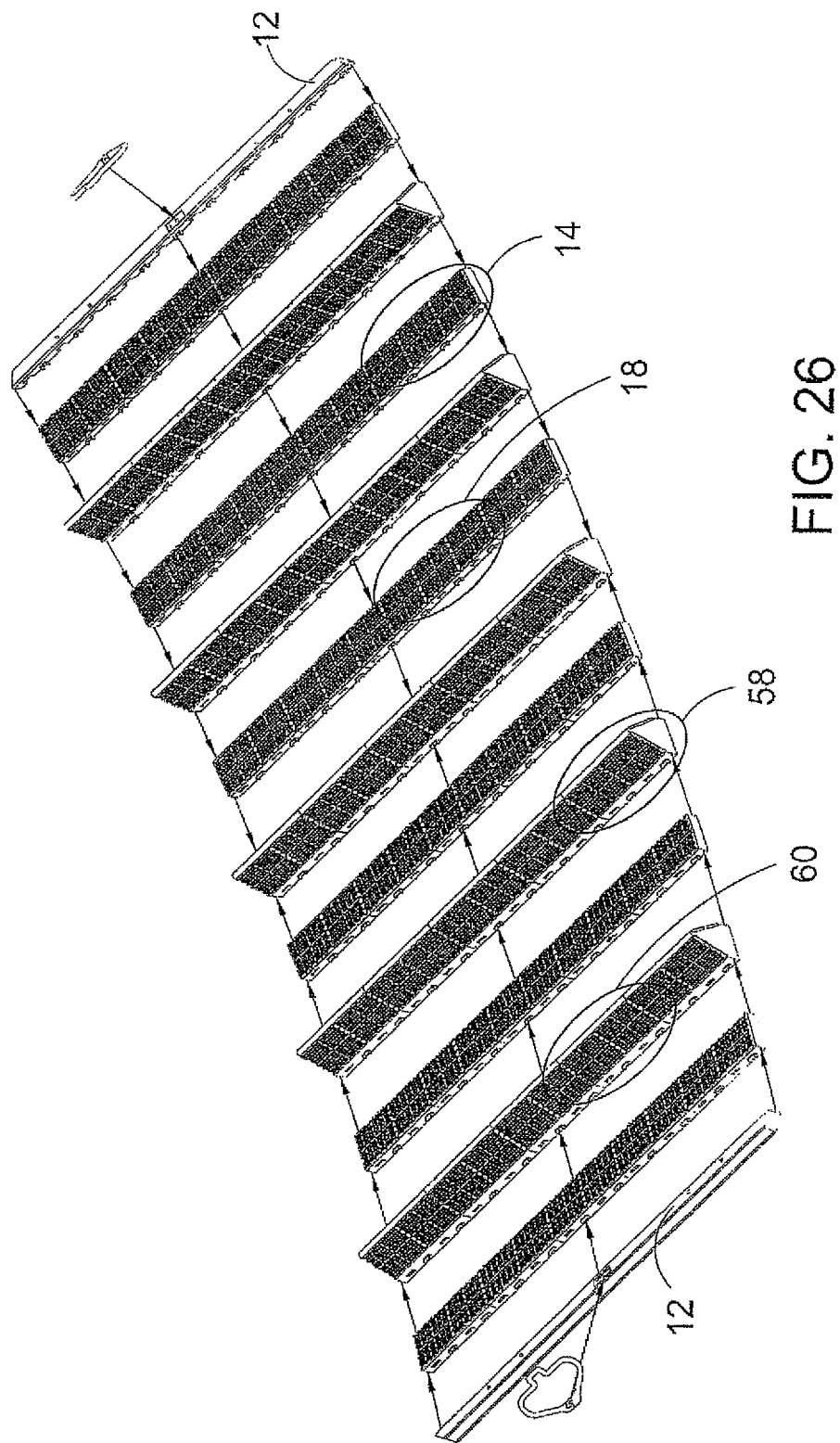
FIG. 26 is an exploded isometric view of a screen assembly having pyramidal shaped and flat subassemblies, according to an exemplary embodiment of the present invention.

FIG. 26 is an exploded isometric view of a screen assembly having pyramidal shaped subgrid units. This figure shows eleven subassemblies being secured to each other via clips and clip apertures along subgrid side members of subgrid units in each subassembly. Each flat subassembly has two end subgrids (14 or 414) and three center subgrids (18 or 418). Each pyramidal shaped subassembly has two pyramidal shaped end subgrids (58 or 458) and three pyramidal shaped center subgrids (60 or 460). Binder bars 12 are fastened at each end of the assembly. Different size screen assemblies may be created using different numbers of subassemblies or different numbers of center subgrid units. Screening surface area may be increased by incorporating more pyramidal shaped subassemblies or decreased by incorporating more flat assemblies. An assembled screen assembly has a continuous screen assembly screening surface made up of multiple screen element screening surfaces.

Figure 27:
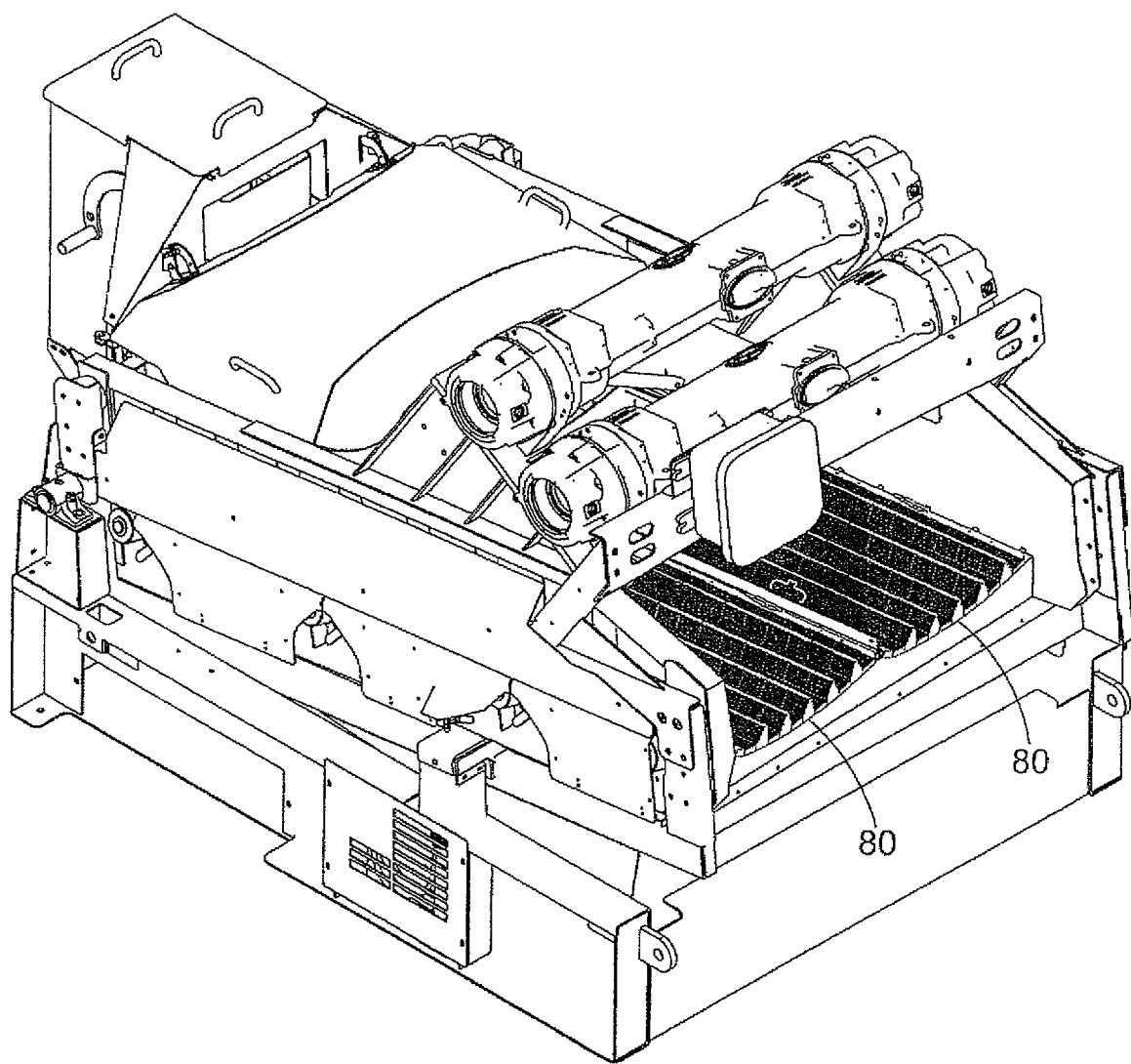
FIG. 27 is an isometric view of a vibratory screening machine with two screening surfaces having assemblies with concave screening surfaces installed thereon wherein the screen assemblies include pyramidal shaped and flat subassemblies, according to an exemplary embodiment of the present invention.
Figure 30:
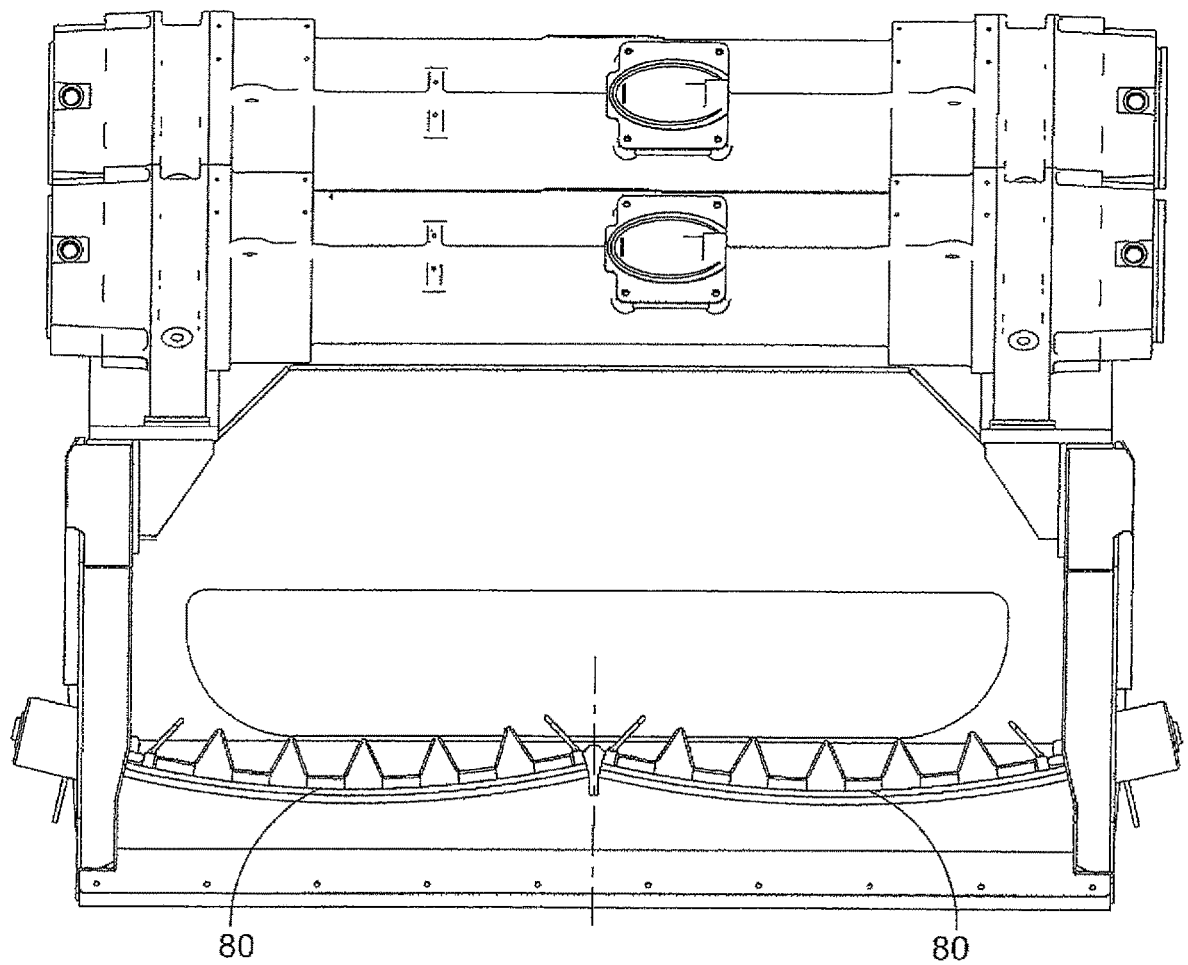
FIG. 30 is a front view of a vibratory screening machine with two screening surfaces having assemblies with concave screening surfaces installed thereon where the screen assemblies include pyramidal shaped and flat subgrids, according to an exemplary embodiment of the present invention.

FIG. 27 shows installation of screen assemblies 80 upon a vibratory screening machine having two screening surfaces. FIG. 30 is a front view of the vibratory machine shown in FIG. 27. The vibratory screening machine may have compression assemblies on side members of the vibratory screening machine. The screen assemblies may be placed into the vibratory screening machine as shown. A compression force may be applied to a side member of the screen assembly such that the screen assembly deflects downward into a concave shape. A bottom side of the screen assembly may mate with a screen assembly mating surface of the vibratory screening machine as shown in U.S. Pat. No. 7,578,394 and U.S. patent application Ser. No. 12/460,200 (now U.S. Pat. No. 8,443,984). The vibratory screening machine may include a center wall member configured to receive a side member of the screen assembly opposite of the side member of the screen assembly receiving compression. The center wall member may be angled such that a compression force against the screen assembly deflects the screen assembly downward. The screen assembly may be installed in the vibratory screening machine such that it is configured to receive material for screening. The screen assembly may include guide notches configured to mate with guides of the vibratory screening machine such that the screen assembly may be guided into place during installation.

Figure 28:
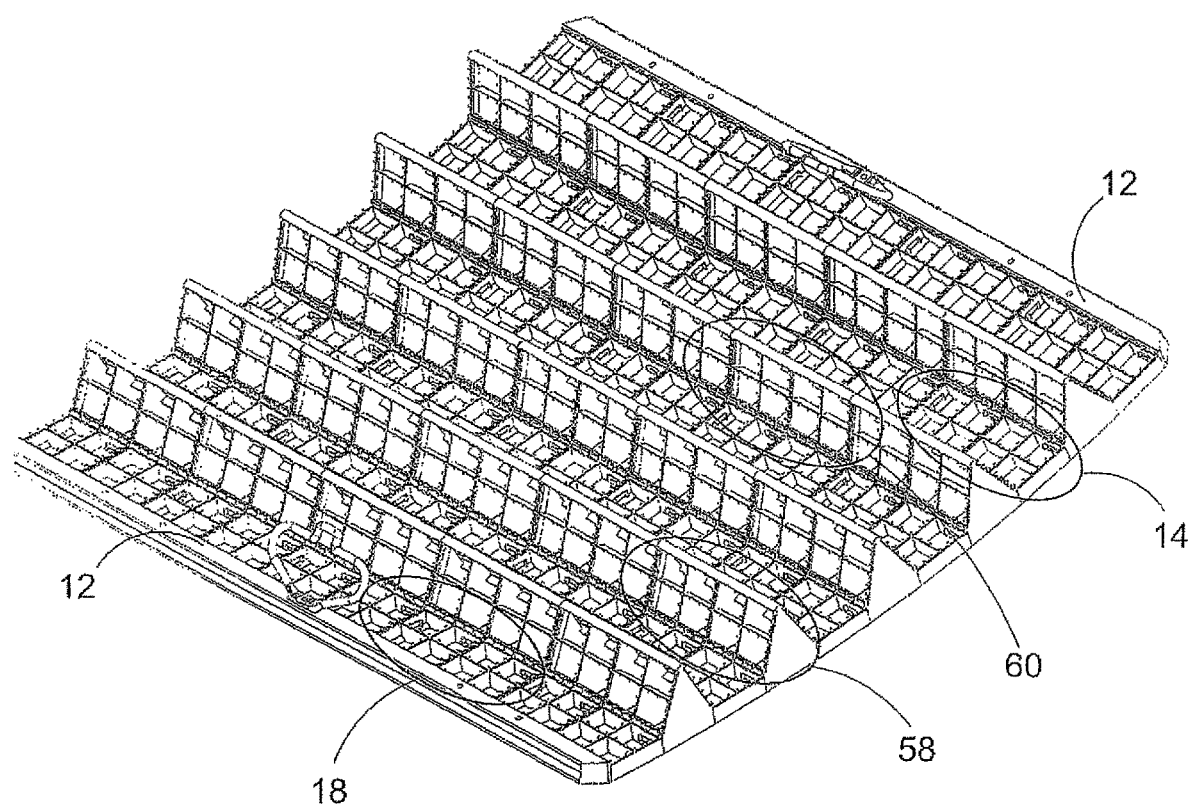
FIG. 28 is a top isometric view of a screen assembly having pyramidal shaped and flat subgrids without screen elements, according to an exemplary embodiment of the present invention.
Figure 29:
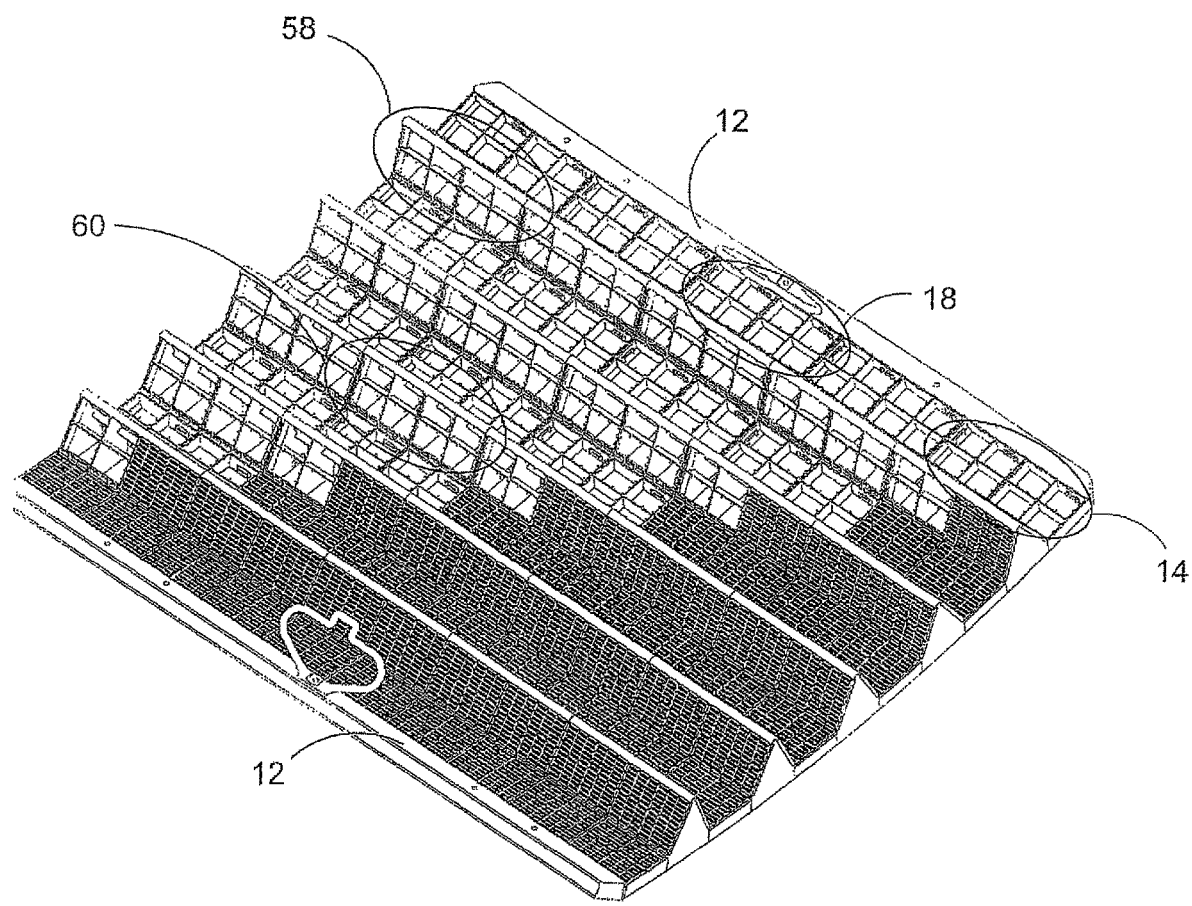
FIG. 29 is a top isometric view of the screen assembly shown in FIG. 28 where the subgrids are partially covered with screen elements.

FIG. 28 shows an isometric view of a screen assembly having pyramidal shaped subgrids where screen elements have not been attached. The screen assembly shown in FIG. 28 is slightly concave, however, the screen assembly may be more concave, convex or flat. The screen assembly may be made from multiple subassemblies, which may be any combination of flat subassemblies and pyramidal shaped subassemblies. As shown, eleven subassemblies are included, however, more or less subassemblies may be included. The screen assembly is shown without screen elements 16 (or 416). The subgrids may be assembled together before or after attachment of screen elements to subgrids or any combination of subgrids having attached screen elements and subgrids without screen elements may be fastened together. FIG. 29 shows the screen assembly of FIG. 28 partially covered in screen elements. Pyramidal shaped subassemblies include pyramidal shaped end subgrids 58 and pyramidal shaped center subgrids 60. Flat subassemblies include flat end subgrids 14 and flat center subgrids 18. The subgrid units may be secured to each other via clips and clip apertures.

Figure 31:
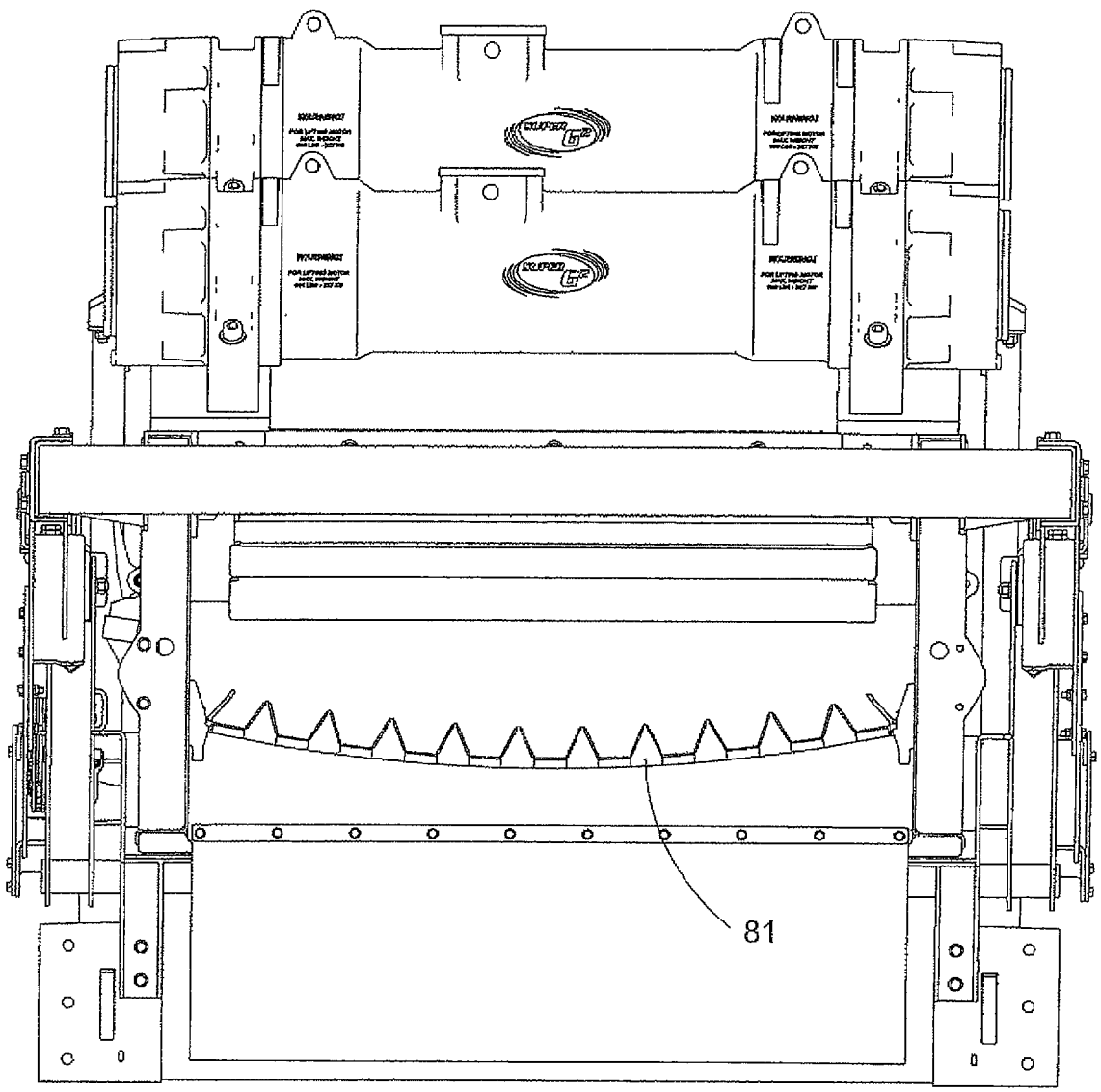
FIG. 31 is a front view of a vibratory screening machine with a single screen surface having an assembly with a concave screening surface installed thereon where the screen assembly includes pyramidal shaped and flat subgrids, according to an exemplary embodiment of the present invention.

FIG. 31 shows installation of screen assembly 81 in a vibratory screening machine having a single screening surface, according to an exemplary embodiment of the present invention. Screen assembly 81 is similar in configuration to screen assembly 80 but includes additional pyramid and flat assemblies. The vibratory screening machine may have a compression assembly on a side member of the vibratory screening machine. Screen assembly 81 may be placed into the vibratory screening machine as shown. A compression force may be applied to a side member of screen assembly 81 such that screen assembly 81 deflects downward into a concave shape. A bottom side of the screen assembly may mate with a screen assembly mating surface of the vibratory screening machine as shown in U.S. Pat. No. 7,578,394 and U.S. patent application Ser. No. 12/460,200 (now U.S. Pat. No. 8,443,984). The vibratory screening machine may include a side member wall opposite of the compression assembly configured to receive a side member of the screen assembly. The side member wall may be angled such that a compression force against the screen assembly deflects the screen assembly downward. The screen assembly may be installed in the vibratory screening machine such that it is configured to receive material for screening. The screen assembly may include guide notches configured to mate with guides of the vibratory screening machine such that the screen assembly may be guided into place during installation.

Figure 32:
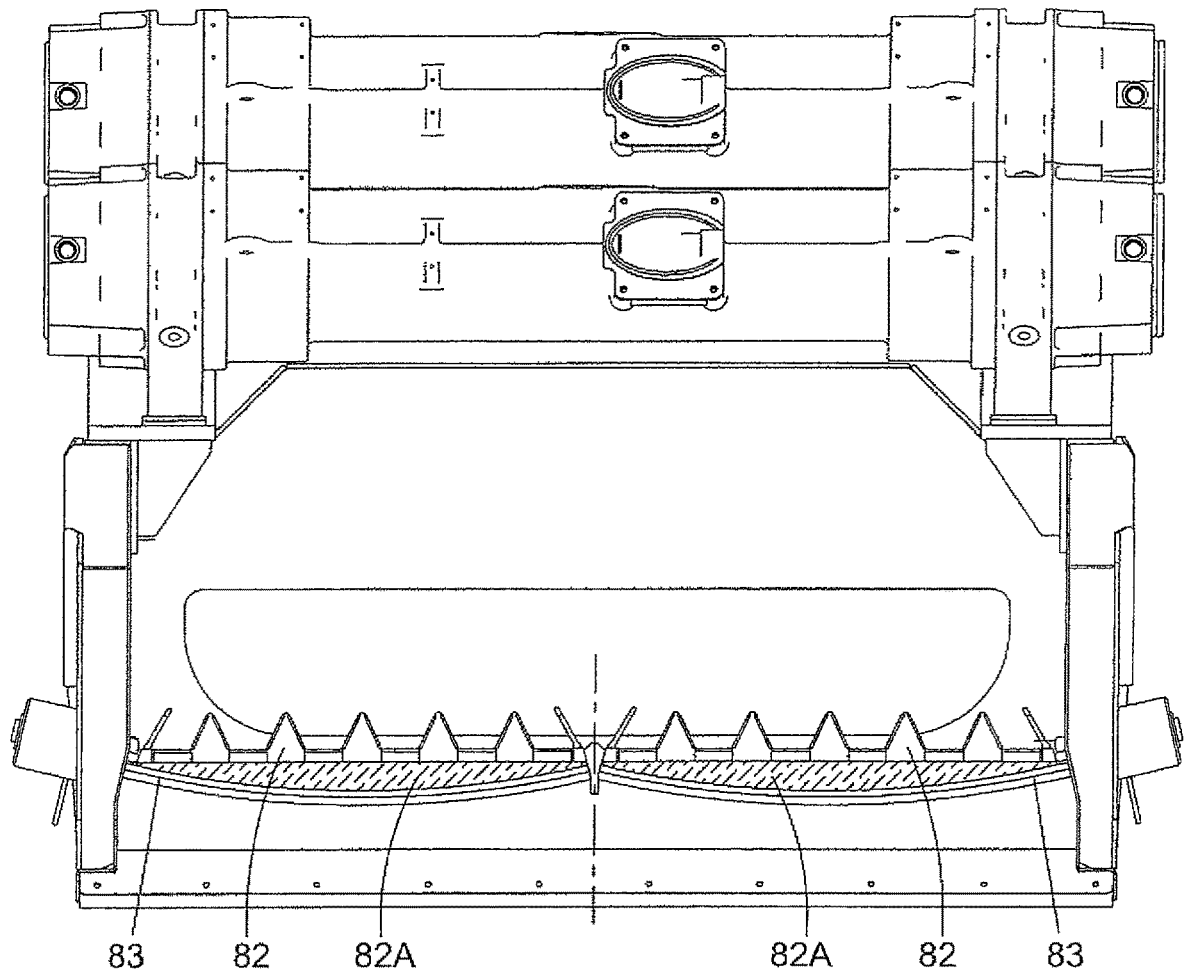
FIG. 32 is a front view of a vibratory screening machine with two screening surfaces having preformed screen assemblies with flat screening surfaces installed thereon where the screen assemblies include pyramidal shaped and flat subgrids, according to an exemplary embodiment of the present invention.

FIG. 32 is a front view of screen assemblies 82 installed upon a vibratory screening machine having two screening surfaces, according to an exemplary embodiment of the present invention. Screen assembly 82 is an alternate embodiment where the screen assembly has been preformed to fit into the vibratory screening machine without applying a load to the screen assembly, i.e., screen assembly 82 includes a bottom portion 82A that is formed such that it mates with a bed 83 of the vibratory screening machine. The bottom portion 82A may be formed integrally with screen assembly 82 or it may be a separate piece. Screen assembly 82 includes similar features as screen assembly 80, including subgrids and screen elements but also includes bottom portion 82A that allows it to fit onto bed 83 without being compressed into a concave shape. A screening surface of screen assembly 82 may be substantially flat, concave or convex. Screen assembly 82 may be held into place by applying a compression force to a side member of screen assembly 82 or may simply be held in place. A bottom portion of screen assembly 82 may be preformed to mate with any type of mating surface of a vibratory screening machine.

Figure 33:
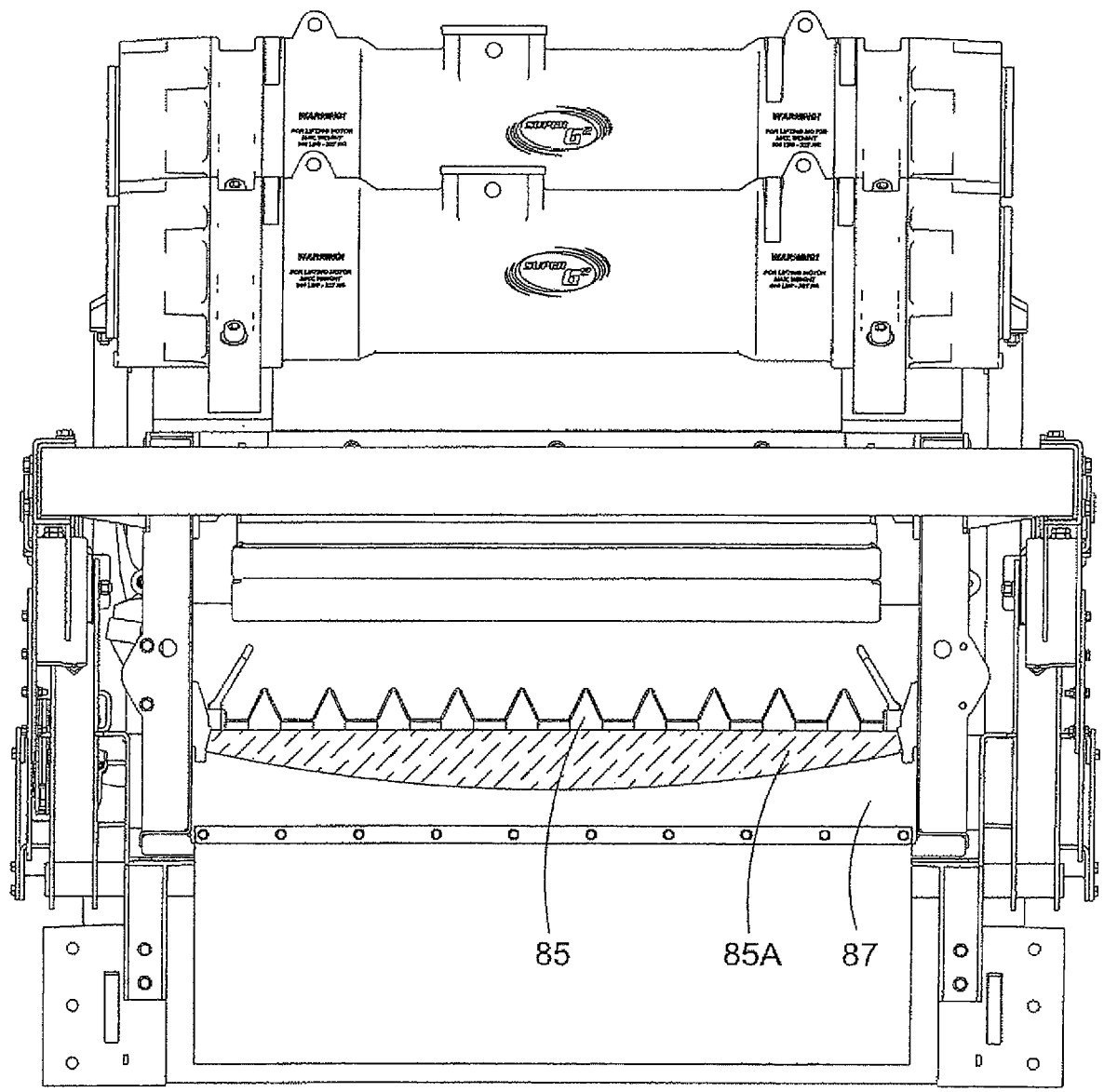
FIG. 33 is a front view of a vibratory screening machine with a single screening surface having a preformed screen assembly with a flat screening surface installed thereon where the screen assembly includes pyramidal shaped and flat subgrids, according to an exemplary embodiment of the present invention.

FIG. 33 is a front view of screen assembly 85 installed upon a vibratory screening machine having a single screening surface, according to an exemplary embodiment of the present invention. Screen assembly 85 is an alternate embodiment where the screen assembly has been preformed to fit into the vibratory screening machine without applying a load to the screen assembly i.e., screen assembly 85 includes a bottom portion 85A that is formed such that it mates with a bed 87 of the vibratory screening machine. The bottom portion 85A may be formed integrally with screen assembly 85 or it may be a separate piece. Screen assembly 85 includes similar features as screen assembly 80, including subgrids and screen elements but also includes bottom portion 85A that allows it to fit onto bed 87 without being compressed into a concave shape. A screening surface of screen assembly 85 may be substantially flat, concave or convex. Screen assembly 85 may be held into place by applying a compression force to a side member of screen assembly 85 or may simply be held in place. A bottom portion of screen assembly 85 may be preformed to mate with any type of mating surface of a vibratory screening machine.

FIG. 34 is an isometric view of the end subgrid shown in FIG. 3 having a single screen element partially attached thereto. FIG. 35 is an enlarged view of break out section E of the end subgrid shown in FIG. 34. In FIGS. 34 and 35, screen element 16 is partially attached to end subgrid 38. Screen element 16 is aligned with subgrid 38 via elongated attachment members 44 and screen element attachment apertures 24 such that the elongated attachment members 44 pass through the screen element attachment apertures 24 and extend slightly beyond the screen element screening surface. As shown along the end edge portion of screen element 16, the portions of the elongated attachment members 44 extending beyond screen element screening surface are melted to form beads upon the screen element screening surface, securing the screen element 16 to end subgrid unit 38.

Figure 36:
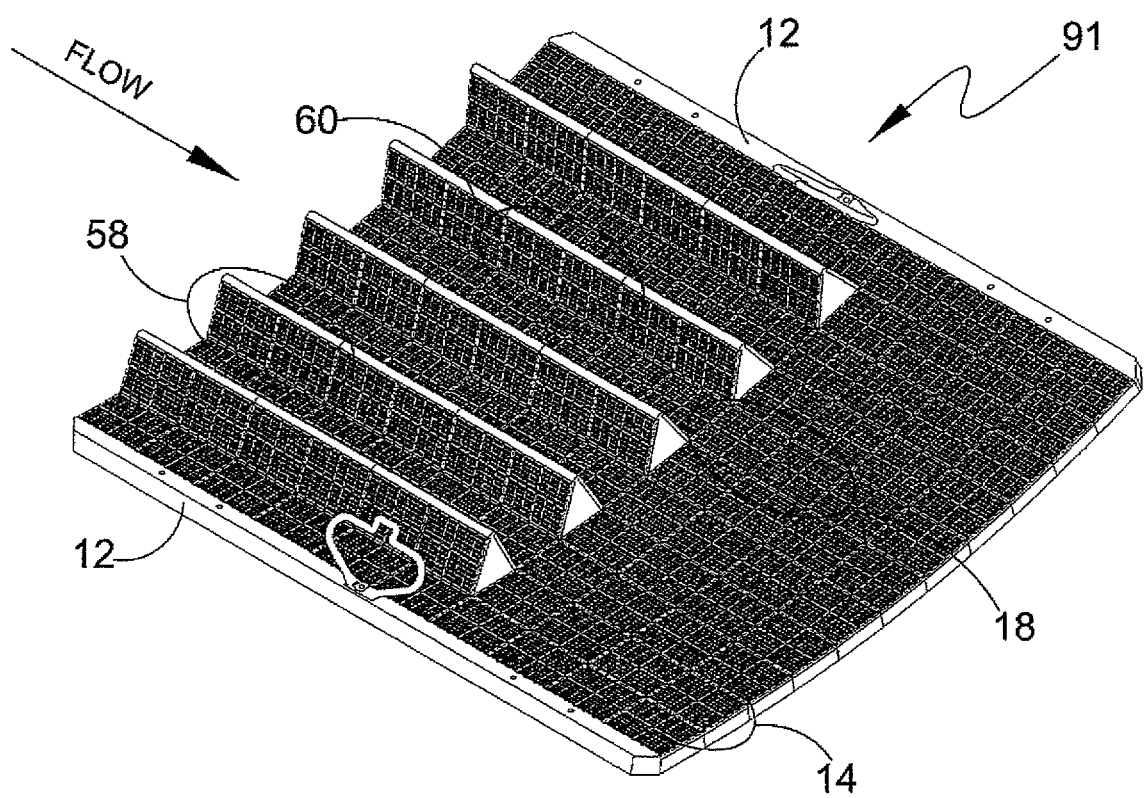
FIG. 36 is an isometric view of a screen assembly having pyramidal shaped subgrids in a portion of the screen assembly, according to an exemplary embodiment of the present invention.

FIG. 36 shows a slightly concave screen assembly 91 having pyramidal shaped subgrids incorporated into a portion of screen assembly 91 according to an exemplary embodiment of the present invention. A screening surface of the screen assembly may be substantially flat, concave or convex. The screen assembly 91 may be configured to deflect to a predetermined shape under a compression force. The screen assembly 91, as shown in FIG. 36, incorporates pyramidal shaped subgrids in the portion of the screen assembly installed nearest the inflow of material on the vibratory screening machine. The portion incorporating the pyramidal shaped subgrids allows for increased screening surface area and directed material flow. A portion of the screen assembly installed nearest a discharge end of the vibratory screening machine incorporates flat subgrids. On the flat portion, an area may be provided such that material may be allowed to dry and/or cake on the screen assembly. Various combinations of flat and pyramidal subgrids may be included in the screen assembly depending on the configuration desired and/or the particular screening application. Further, vibratory screening machines that use multiple screen assemblies may have individual screen assemblies with varying configurations designed for use together on specific applications. For example, screen assembly 91 may be used with other screen assemblies such that it is positioned near the discharge end of a vibratory screening machine such that it provides for caking and/or drying of a material.

Figure 37:
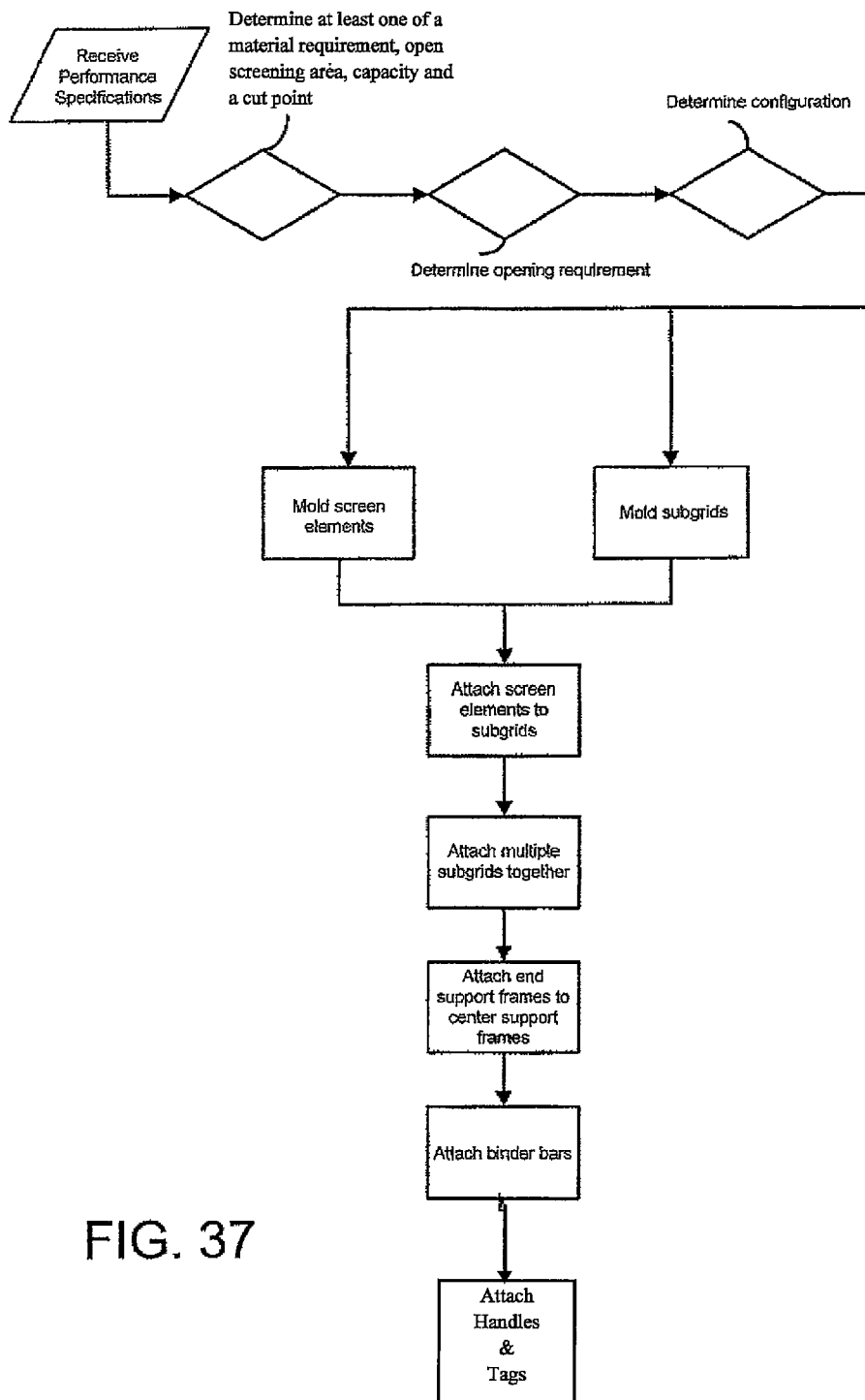
FIG. 37 is a flow chart of a screen assembly fabrication, according to an exemplary embodiment of the present invention.

FIG. 37 is a flow chart showing steps to fabricate a screen assembly, according to an exemplary embodiment of the present invention. As shown in FIG. 37, a screen fabricator may receive screen assembly performance specifications for the screen assembly. The specifications may include at least one of a material requirement, open screening area, capacity and a cut point for a screen assembly. The fabricator may then determine a screening opening requirement (shape and size) for a screen element as described herein. The fabricator may then determine a screen configuration (e.g., size of assembly, shape and configuration of screening surface, etc.). For example, the fabricator may have the screen elements arranged in at least one of a flat configuration and a nonflat configuration. A flat configuration may be constructed from center subgrids (18 or 418) and end subgrids (14 or 414). A nonflat configuration may include at least a portion of pyramidal shaped center subgrids (60 or 460) and/or pyramidal shaped end subgrids (58 or 458). Screen elements may be injection molded. Subgrid units may also be injection molded but are not required to be injection molded. Screen elements and subgrids may include a nanomaterial, as described herein, dispersed within. After both screen elements and subgrid units have been created, screen elements may be attached to subgrid units. The screen elements and subgrids may be attached together using connection materials having a nanomaterial dispersed within. Screen elements may be attached to subgrids using laser welding. Multiple subgrid units may be attached together forming support frames. Center support frames are formed from center subgrids and end support frames are formed from end subgrids. Pyramidal shaped support frames may be created from pyramidal shaped subgrid units. Support frames may be attached such that center support frames are in a center portion of the screen assembly and end support frames are on an end portion of the screen assembly. Binder bars may be attached to the screen assembly. Different screening surface areas may be accomplished by altering the number of pyramidal shaped subgrids incorporated into the screen assembly. Alternatively, screen elements may be attached to subgrid units after attachment of multiple subgrids together or after attachment of multiple support frames together. Instead of multiple independent subgrids that are attached together to form a single unit, one subgrid structure may be fabricated that is the desired size of the screen assembly. Individual screen elements may then be attached to the one subgrid structure.

Figure 38:
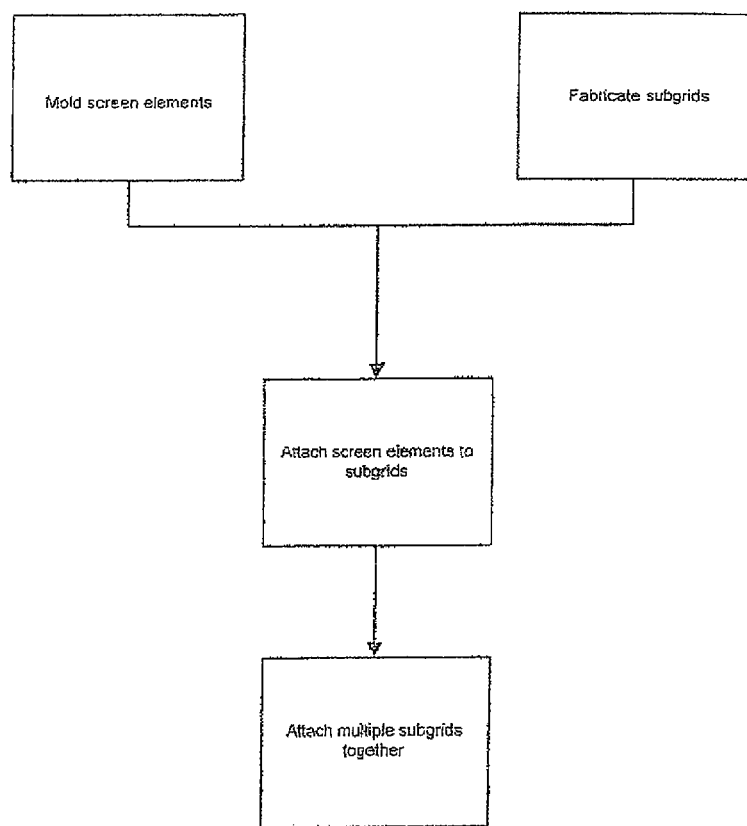
FIG. 38 is a flow chart of a screen assembly fabrication, according to an exemplary embodiment of the present invention.

FIG. 38 is a flow chart showing steps to fabricate a screen assembly, according to an exemplary embodiment of the present invention. A thermoplastic screen element may be injection molded. Subgrids may be fabricated such that they are configured to receive the screen elements. Screen elements may be attached to subgrids and multiple subgrid assemblies may be attached, forming a screening surface. Alternatively, the subgrids may be attached to each other prior to attachment of screen elements.

In another exemplary embodiment, a method for screening a material is provided, including attaching a screen assembly to a vibratory screening machine and forming a top screening surface of the screen assembly into a concave shape, wherein the screen assembly includes a screen element having a series of screening openings forming a screen element screening surface and a subgrid including multiple elongated structural members forming a grid framework having grid openings. The screen elements span grid openings and are secured to a top surface of the subgrid. Multiple subgrids are secured together to form the screen assembly and the screen assembly has a continuous screen assembly screening surface comprised of multiple screen element screening surfaces. The screen element is a single thermoplastic injection molded piece.

Figure 39:
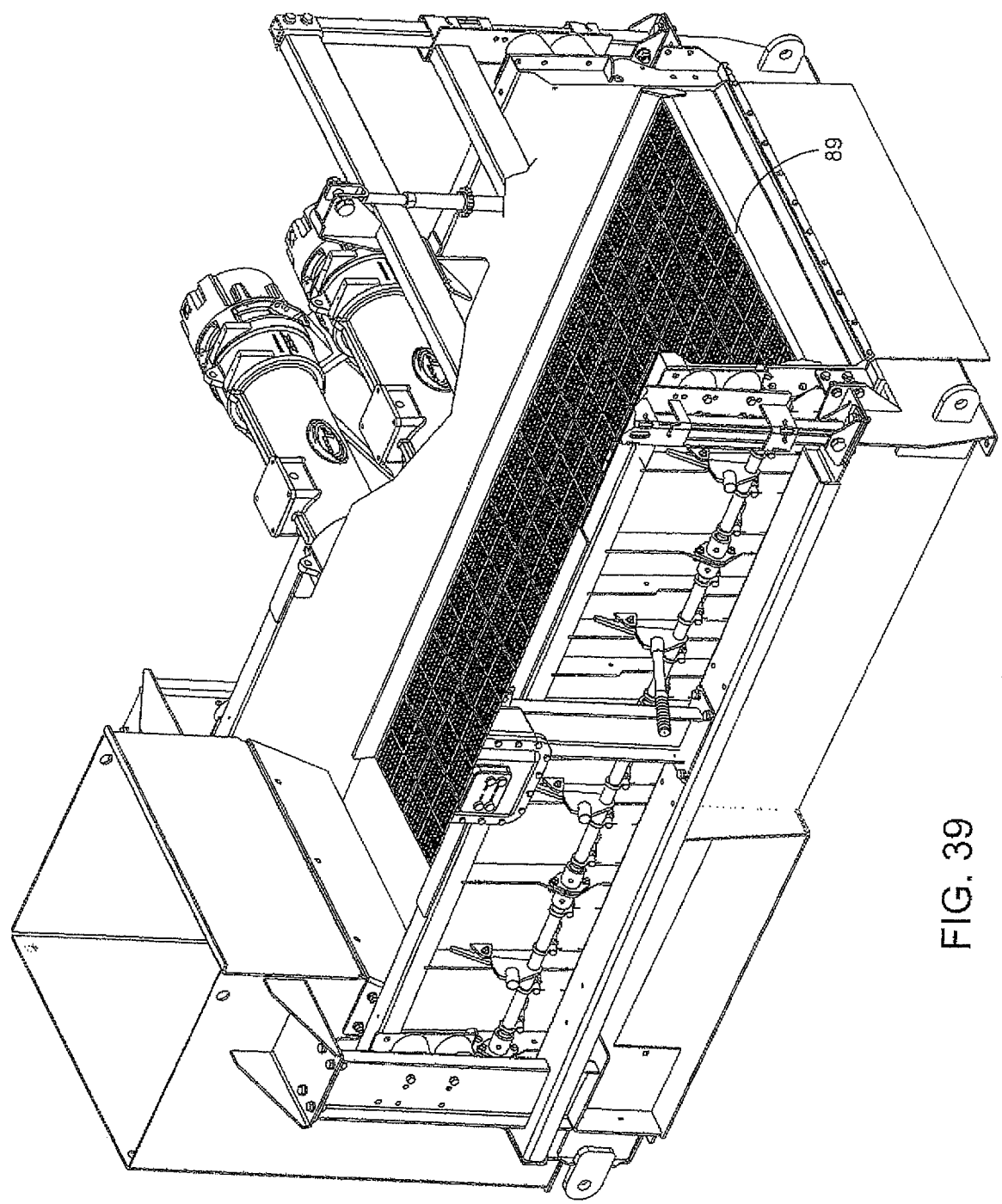
FIG. 39 an isometric view of a vibratory screening machine having a single screen assembly with a flat screening surface installed thereon with a portion of the vibratory machine cut away showing the screen assembly, according to an exemplary embodiment of the present invention.

FIG. 39 is an isometric view of a vibratory screening machine having a single screen assembly 89 with a flat screening surface installed thereon with a portion of the vibratory machine cut away showing the screen assembly. Screen assembly 89 is a single unit that includes a subgrid structure and screen elements as described herein. The subgrid structure may be one single unit or may be multiple subgrids attached together. While screen assembly 89 is shown as a generally flat type assembly, it may be convex or concave and may be configured to be deformed into a concave shape from a compression assembly or the like. It may also be configured to be tensioned from above or below or may be configured in another manner for attachment to different types of vibratory screening machines. While the embodiment of the screen assembly shown covers the entire screening bed of the vibratory screening machine, screen assembly 89 may also be configured in any shape or size desired and may cover only a portion of the screening bed.

Figure 40B:
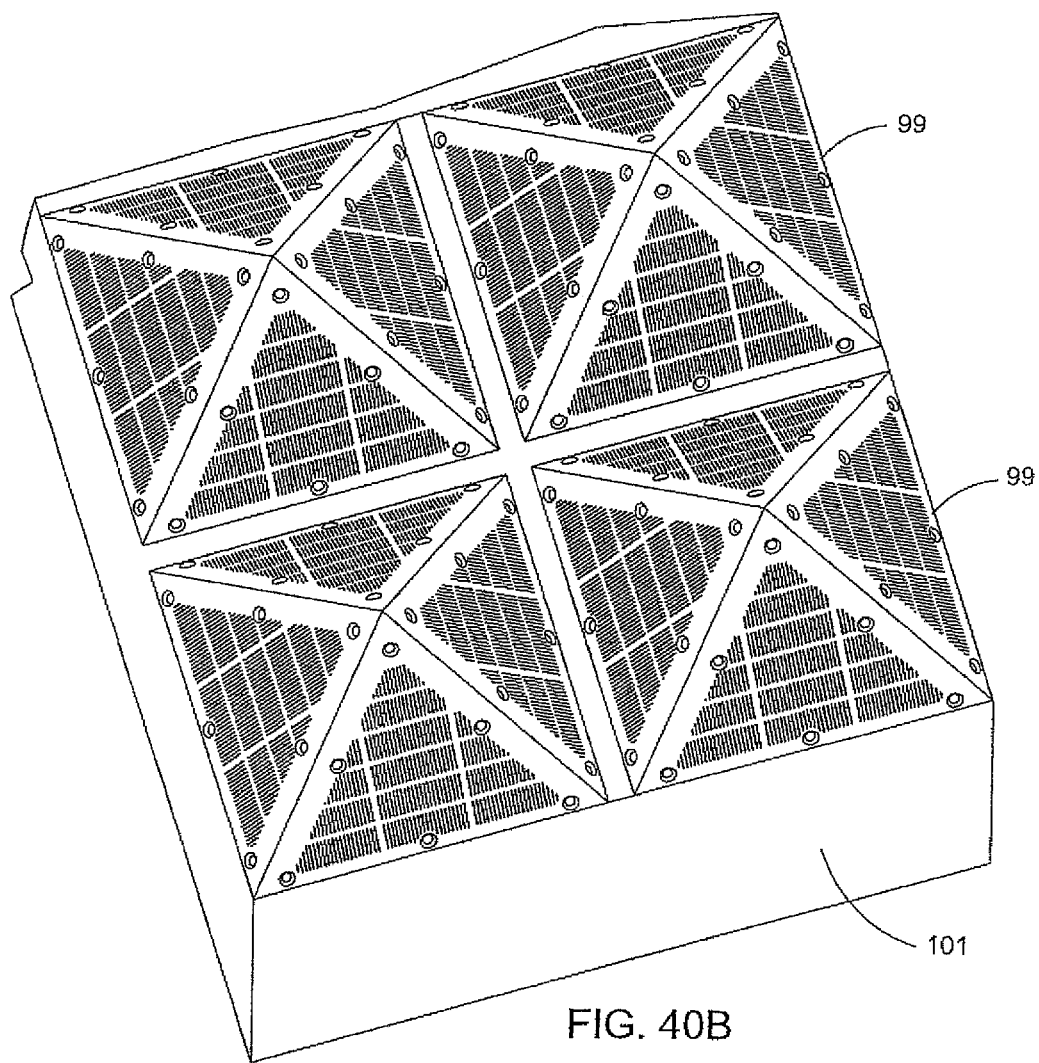
FIG. 40B is an isometric top view of four of the screen element pyramids shown in FIG. 40A.
Figure 40:
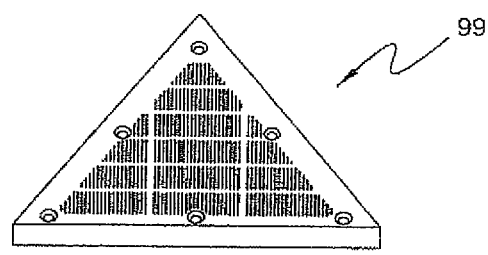
FIG. 40 is an isometric top view of an individual screen element, according to an exemplary embodiment of the present invention.

FIG. 40 is an isometric view of a screen element 99 according to an exemplary embodiment of the present invention. Screen element 99 is substantially triangular in shape. Screen element 99 is a single thermoplastic injection molded piece and has similar features (including screening opening sizes) as screen elements 16 and 416 as described herein. Alternatively, the screen element may be rectangular, circular, triangular, square, etc. Any shape may be used for the screen element and any shape may be used for the subgrid as long as the subgrid has grid openings that correspond to the shapes of the screen elements.

Figure 40A:
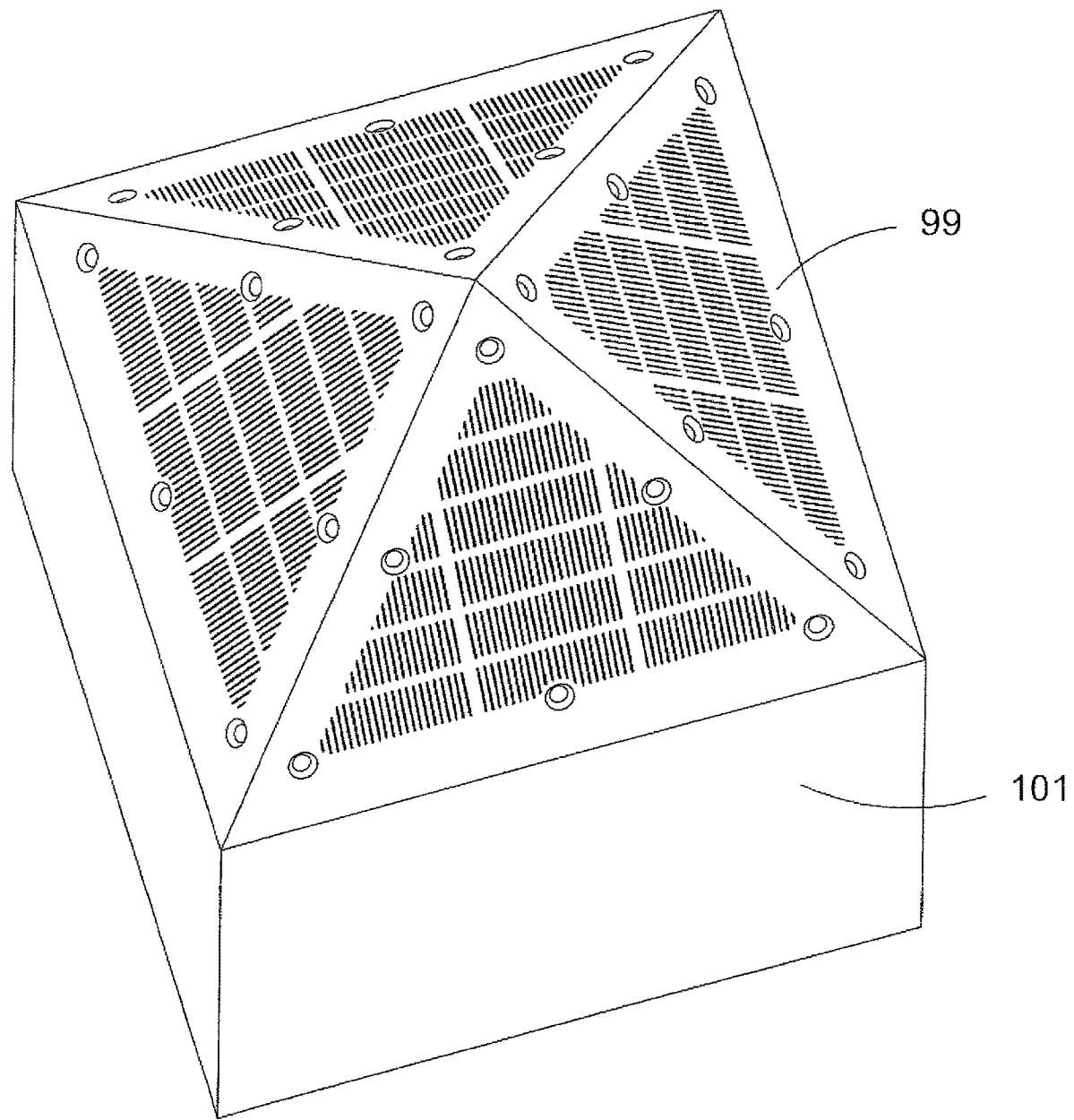
FIG. 40A is an isometric top view of a screen element pyramid, according to an exemplary embodiment of the present invention.

FIGS. 40A and 40B show screen element structure 101, which may be a subgrid type structure, with screen elements 99 attached thereto forming a pyramid shape. In an alternative embodiment the complete pyramid structure of screen element structure 101 may be thermoplastic injection molded as a single screen element having a pyramid shape. In the configuration shown, the screen element structure has four triangular screen element screening surfaces. The bases of two of the triangular screening surfaces begin at the two side members of the screen element and the bases of the other two triangular screening surfaces begin at the two end members of the screen element. The screening surfaces all slope upward to a center point above the screen element end members and side members. The angle of the sloped screening surfaces may be varied. Screen element structure 101 (or alternatively single screen element pyramids) may be attached to a subgrid structure as described herein.

Figure 40C:
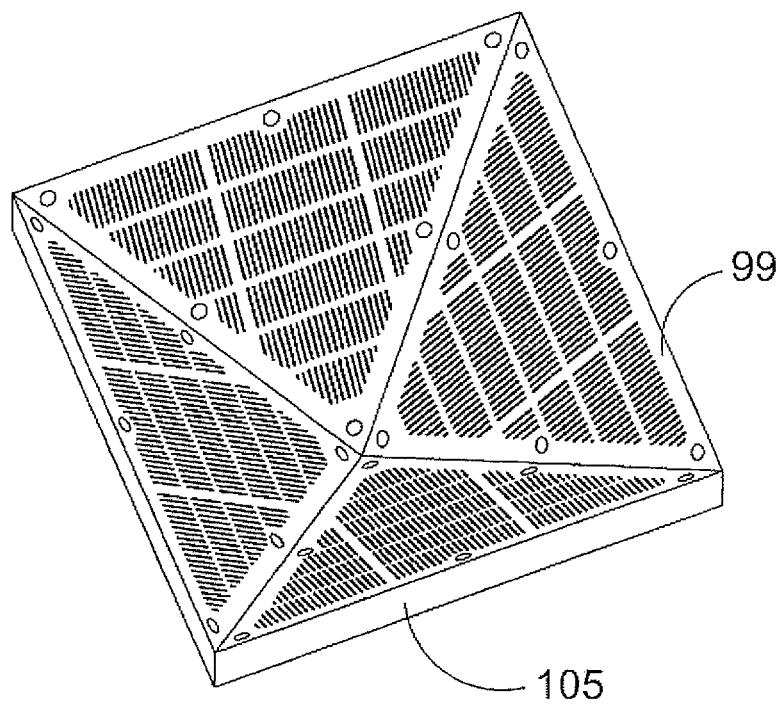
FIG. 40C is an isometric top view of an inverted screen element pyramid, according to an exemplary embodiment of the present invention.
Figure 40D:
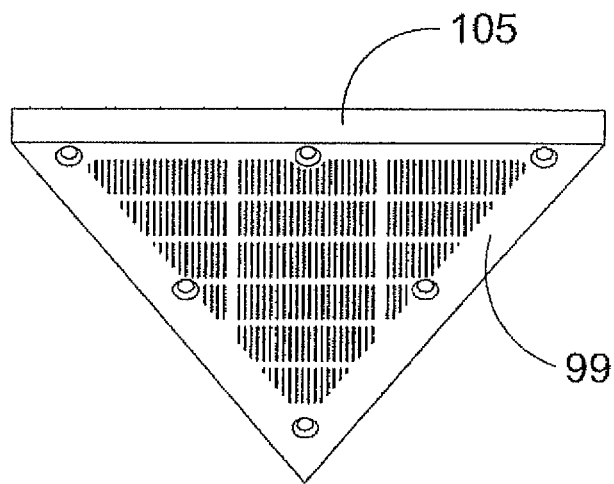
FIG. 40D is a front view of the screen element shown in FIG. 40C.

FIGS. 40C and 40D show a screen element structures 105 with screen elements 99 attached and having a pyramidal shape dropping below side members and edge members of the screen element structure 105. Alternatively, the entire pyramid may be thermoplastic injection molded as a single pyramid shaped screen element. In the configuration shown, individual screen elements 99 form four triangular screening surfaces. The bases of two of the triangular screening surfaces begin at the two side members of the screen element and the bases of the other two triangular screening surfaces begin at the two end members of the screen element. The screening surfaces all slope downward to a center point below the screen element end members and side members. The angle of the sloped screening surfaces may be varied. Screen element structure 105 (or alternatively single screen element pyramids) may be attached to a subgrid structure as described herein.

Figure 40E:
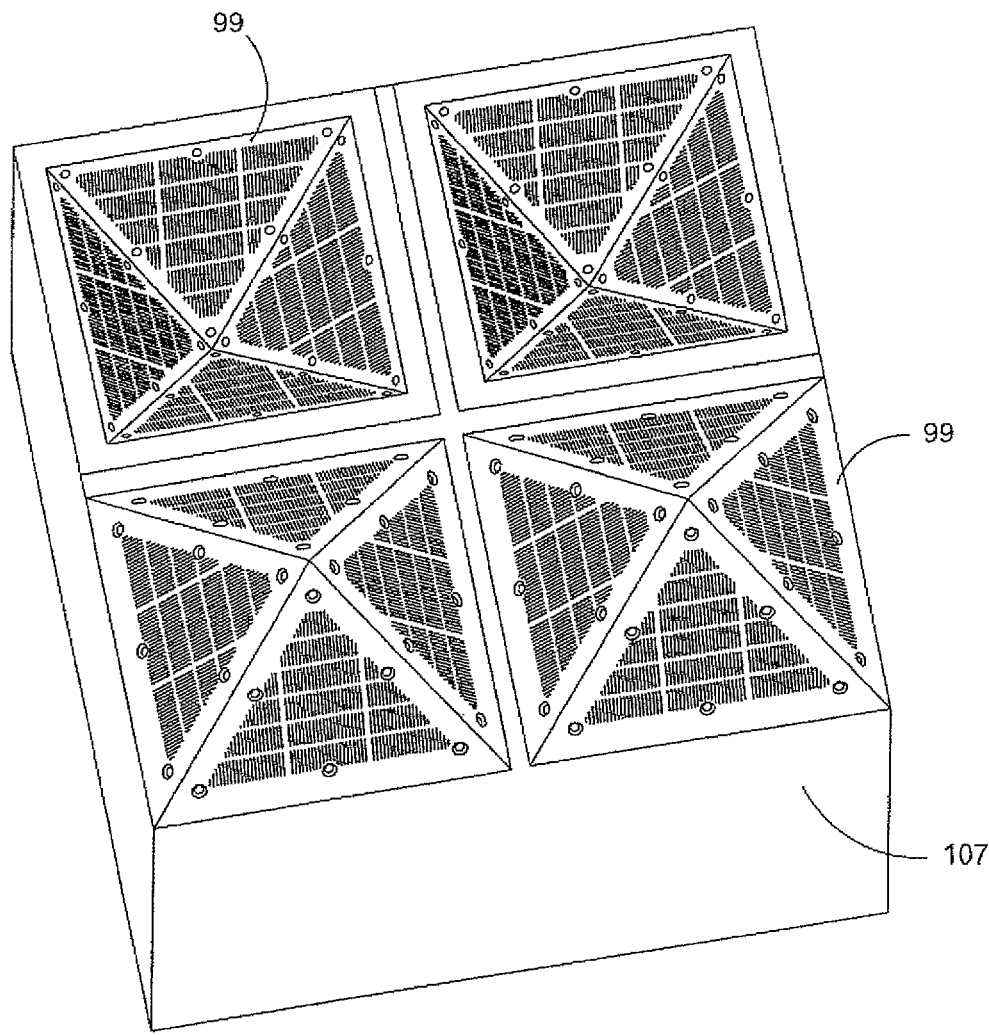
FIG. 40E is an isometric top view of a screen element structure, according to an exemplary embodiment of the present invention.
Figure 40F:
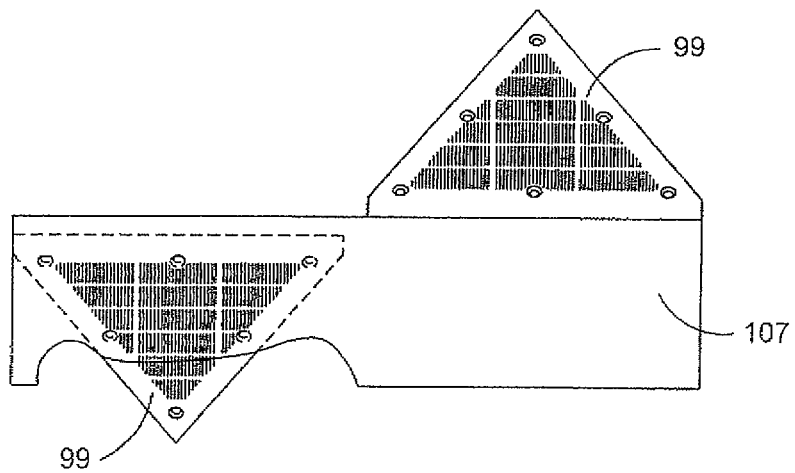
FIG. 40F is a front view of the screen element structure shown in FIG. 40E.

FIGS. 40E and 40F show a screen element structure 107 having multiple pyramidal shapes dropping below and rising above the side members and edge members of screen element structure 107. Each pyramid includes four individual screen elements 99 but may also be formed as single screen element pyramid. In the configuration shown, each screen element has sixteen triangular screening surfaces forming four separate pyramidal screening surfaces. The pyramidal screening surfaces may slope above or below the screen element end members and side members. Screen element structure 107 (or alternatively single screen element pyramids) may be attached to a subgrid structure as described herein. FIGS. 40 through 40F are exemplary only as to the variations that may be used for the screen elements and screen element support structures.

Figure 41:
FIGS. 41 to 43 are front cross-sectional profile views of screen elements, according to exemplary embodiments of the present invention.
Figure 42:
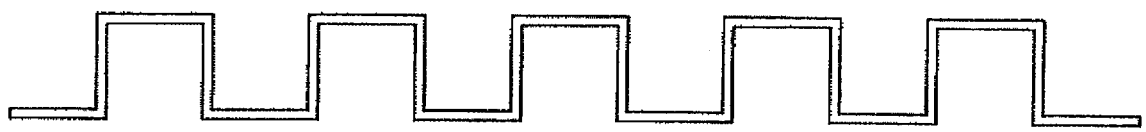
Figure 43:
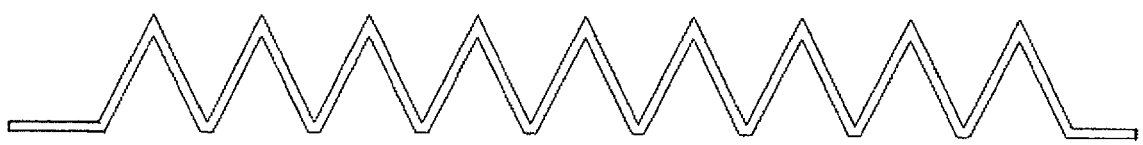

FIGS. 41 to 43 show cross-sectional profile views of exemplary embodiments of thermoplastic injection molded screen element surface structures that may be incorporated into the various embodiments of the present invention discussed herein. The screen element is not limited to the shapes and configurations identified herein. Because the screen element is thermoplastic injection molded, multiple variations may be easily fabricated and incorporated into the various exemplary embodiments discussed herein.

Figure 44:
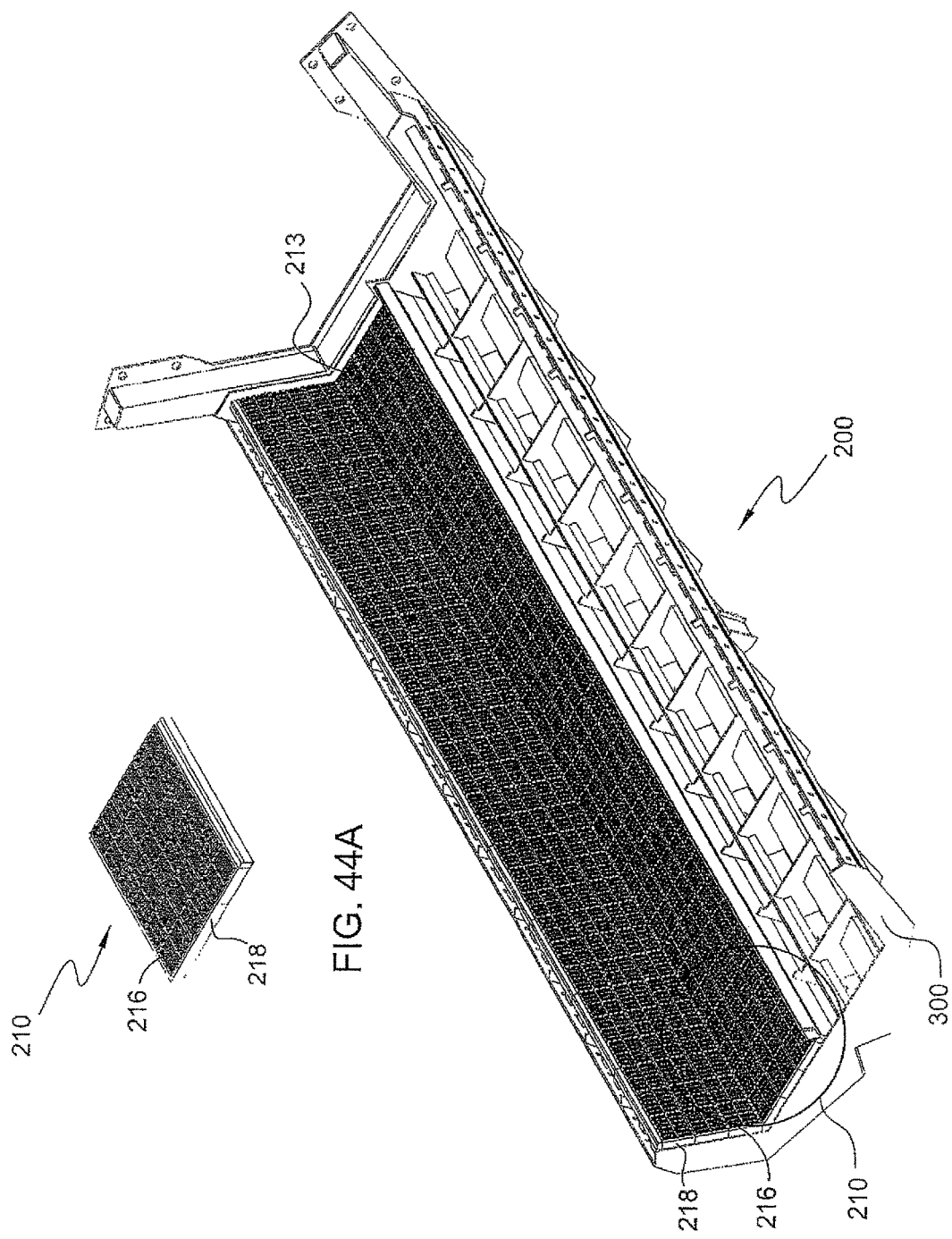
FIG. 44 is an isometric top view of a prescreening structure with prescreen assemblies according to an exemplary embodiment of the present invention.
Figure 45:
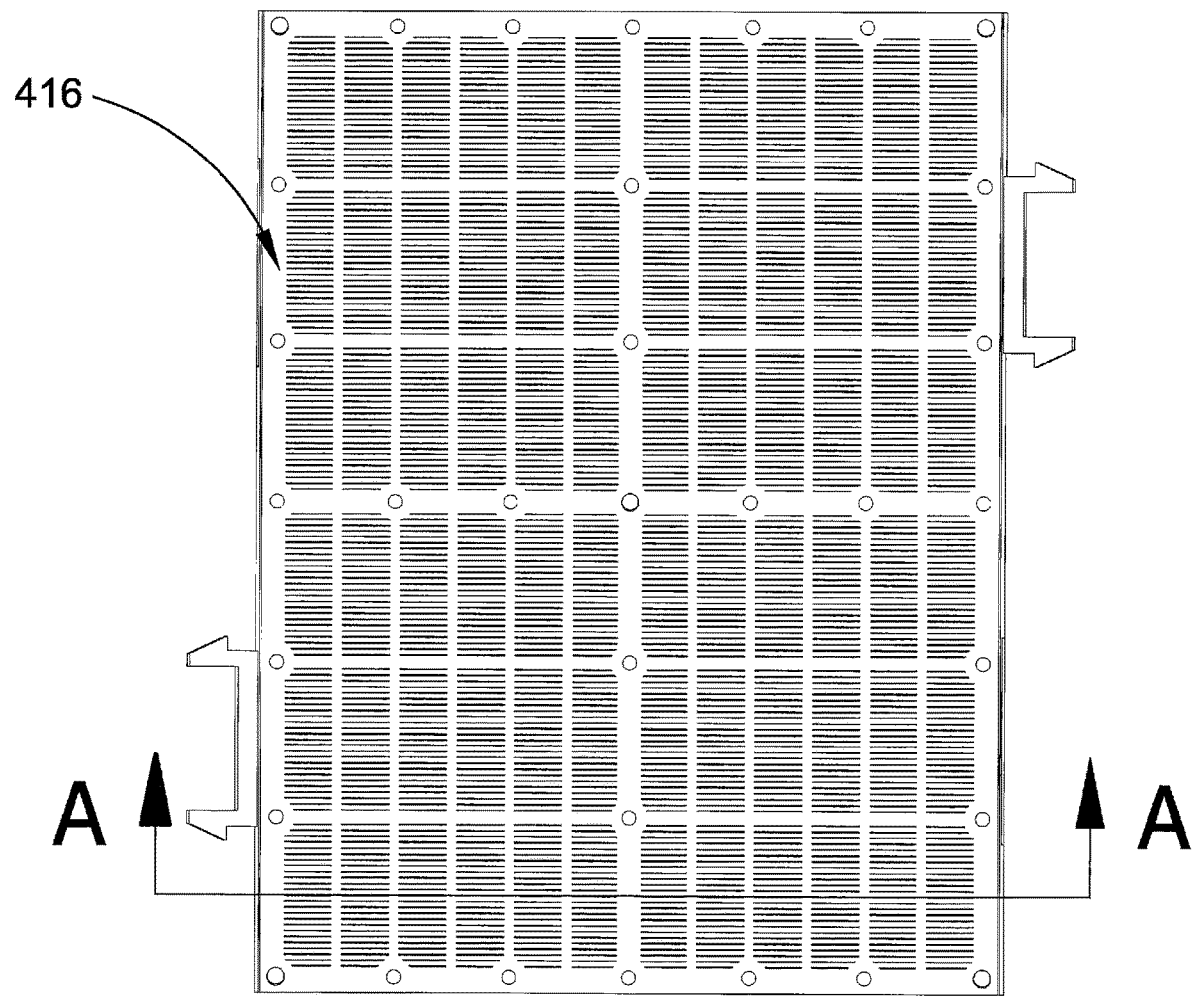
FIG. 45 is a top view of a screen element above a portion of a subgrid, according to an exemplary embodiment of the present invention.
Figure 45A:
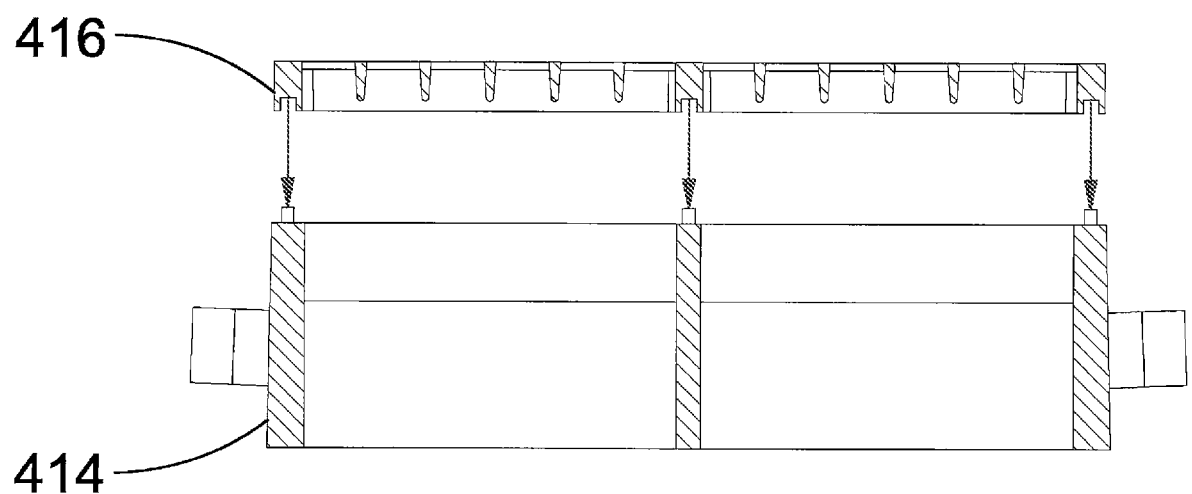
FIG. 45A is an exploded side view of cross section A-A showing the screen element above the portion of the subgrid of FIG. 45.

FIG. 44 shows a prescreen structure 200 for use with vibratory screening machines. Prescreen structure 200 includes a support frame 300 that is partially covered with individual prescreen assemblies 210. Prescreen assemblies 210 are shown having multiple prescreen elements 216 mounted on prescreen subgrids 218. Although, prescreen assemblies 210 are shown including six prescreen subgrids 218 secured together, various numbers and types of subgrids may be secured together to form various shapes and sizes of prescreen assemblies 210. The prescreen assemblies 210 are fastened to support frame 300 and form a continuous prescreening surface 213. Prescreen structure 200 may be mounted over a primary screening surface. Prescreen assemblies 210, prescreen elements 216 and the prescreen subgrids 218 may include any of the features of the various embodiments of screen assemblies, screen elements and subgrid structures described herein and may configured to be mounted on prescreen support frame 300, which may have various forms and configurations suitable for prescreening applications. Prescreen structure 200, prescreen assemblies 210, prescreen elements 216 and the prescreen subgrids 218 may be configured to be incorporated into the prescreening technologies (e.g., compatible with the mounting structures and screen configurations) described in U.S. patent application Ser. No. 12/051,658 (now U.S. Pat. No. 8,439,203).

FIG. 44A shows an enlarged view of prescreen assembly 210.

Figure 58:
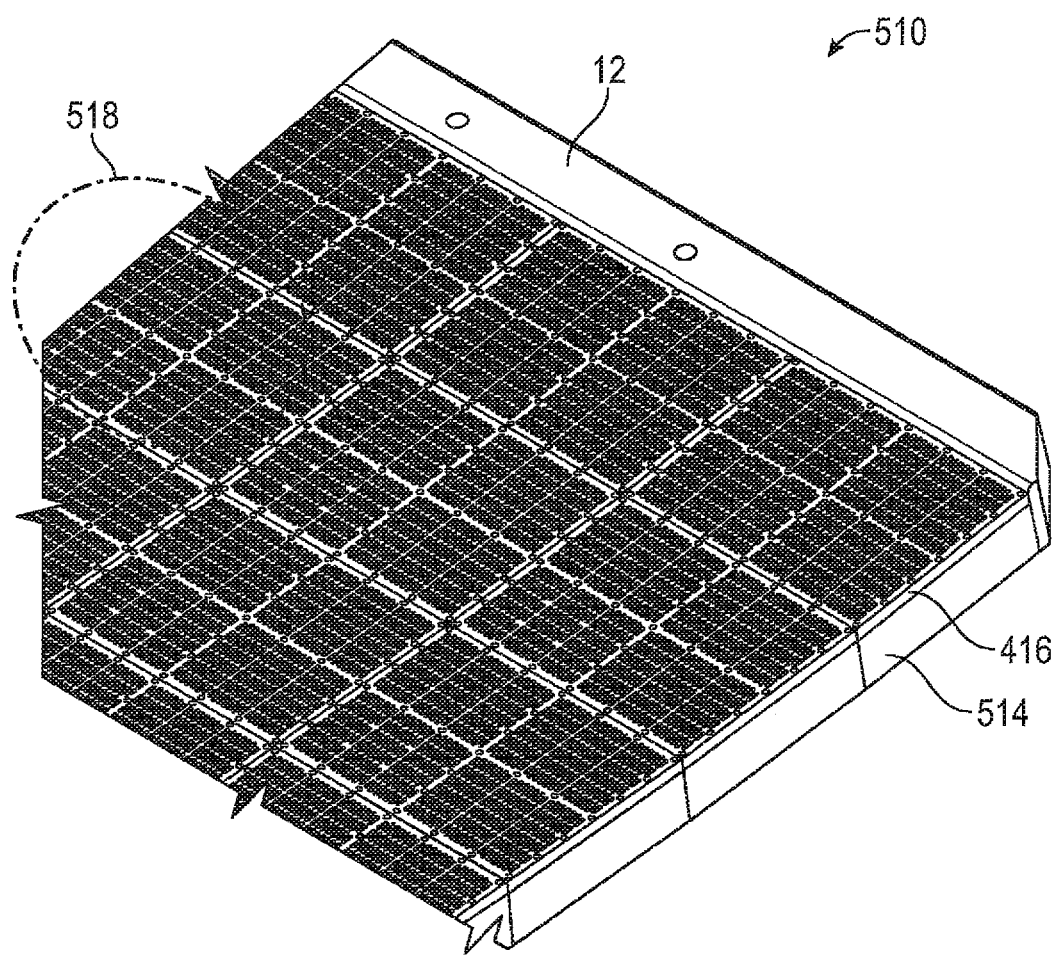
FIG. 58 is a top isometric view of a portion of a screen assembly, according to an exemplary embodiment.

FIG. 58 is a top isometric view of a portion of a screen assembly 510. Screen assembly 510 includes screen elements 416, center subgrid units 518, and end subgrid units 514. Screen elements 416 were described in detail above with reference to FIGS. 48, 48A, 48B, and 48C. End subgrid units 514 are described in greater detail below with reference to FIGS. 59 and 59A, and center subgrid units 518 are described in greater detail below with reference to FIGS. 60 and 60A. Screen assembly 510 is similar to screen element 410 described above with reference to FIG. 47. Like screen assembly 410, screen assembly includes binder bars 12 that are attached to ends of the screen assembly.

Figure 59:
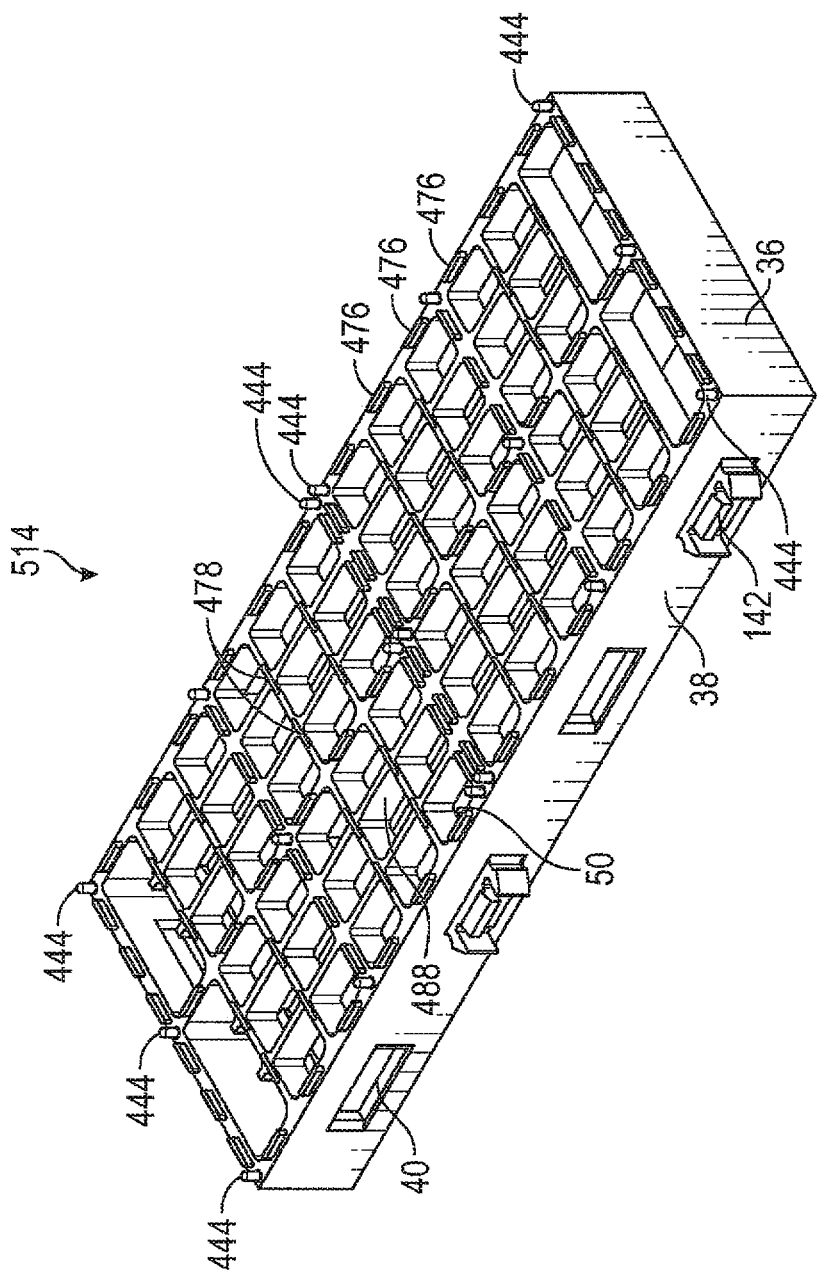
FIG. 59 is a top isometric view of an end subgrid, according to an exemplary embodiment.
Figure 59A:
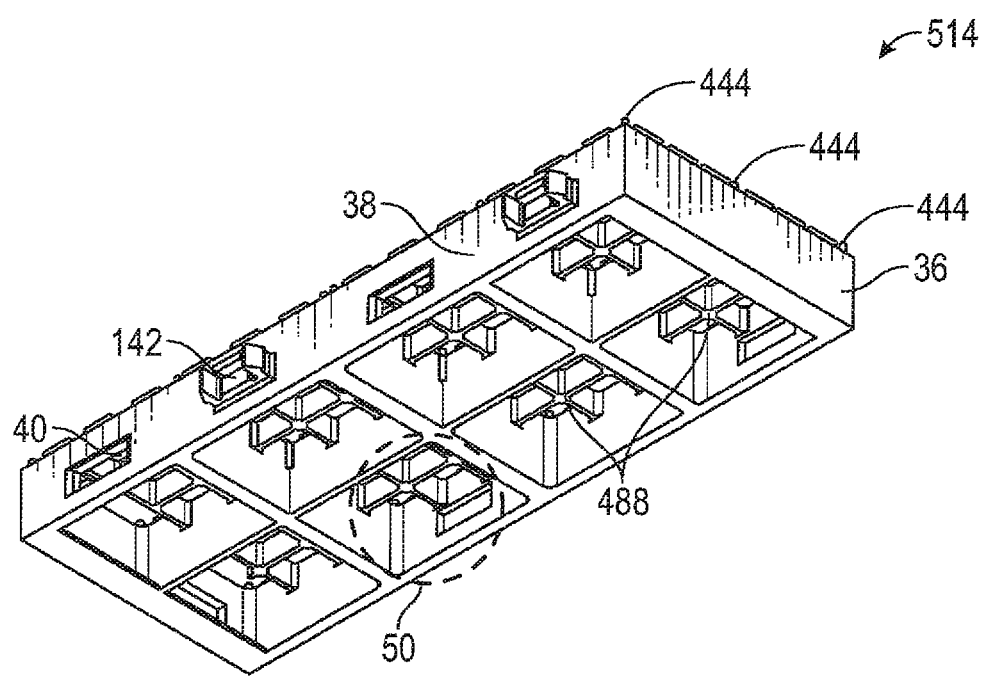
FIG. 59A is a bottom isometric view of the end subgrid shown in FIG. 59.
Figure 65A:
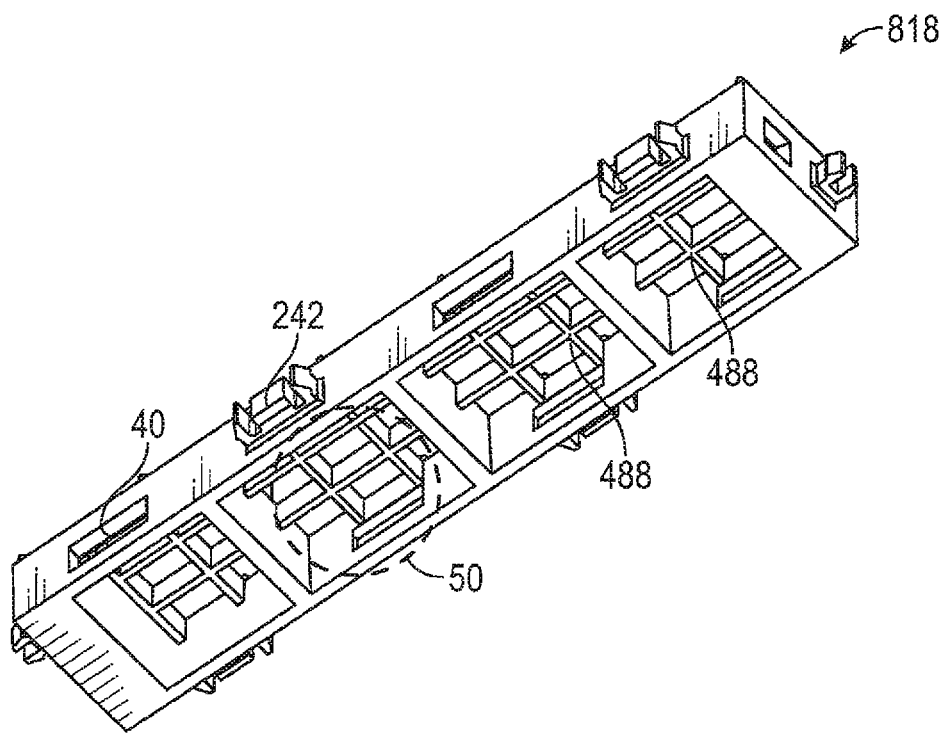

In further embodiments, screen assemblies similar to screen assembly 510 of FIG. 58 (or screen assembly 410 of FIG. 47) may be formed by mixing and matching various screen elements (e.g., 416 of FIGS. 48-48C, 516 of FIGS. 66-66C, and 616 of FIG. 70A) with various subgrid structures (e.g., 14 of FIGS. 3 and 3A, 514 of FIGS. 59 and 59A, 818 of FIGS. 65 and 65A, 918 of FIGS. 71A-71D, etc.). As described in greater detail below, screen element 516 has similar features to screen element 416 but screen elements 516 and 416 have different sizes. In an example embodiment, screen element 416 may be a 2"×3" screen element while screen elements 516 and 616 may be 1"×6" screen elements. As described in greater detail below, screen element 616 has smaller features than screen element 516. Further, the smaller width of screen elements 516 and 616, and associated structures, allows smaller features to be manufactured.

FIG. 59 is a top isometric view of an end subgrid 514, and FIG. 59A is a bottom isometric view of end subgrid 514 shown in FIG. 59. End subgrid 514 is an alternative embodiment to end subgrid 414 shown in FIGS. 49 and 49A. End subgrid 514 may be thermoplastic (or other suitably chosen material) injection molded and may include all of the features of end subgrid unit 414 with the exception of clips 42 of end subgrid unit 414. End subgrid unit 514 includes clips 142 as discussed in greater detail below.

With the exception of clips 142, end subgrids 514 (e.g., see FIGS. 59, 59A, 61, and 61A) include structural features similar to those found in end subgrids 414 (e.g., see FIGS. 49, 49A, 51, and 51A). For example, end subgrid 514 includes a plurality elongated location members 444, a secondary support framework 488 spanning across grid openings 50, a plurality of fusion bars 476, and a plurality of shortened fusion bars 478. Further, end subgrid 514 includes parallel subgrid end members 36, and parallel subgrid side members 38 that are substantially perpendicular to the subgrid end members 36.

Figure 61:
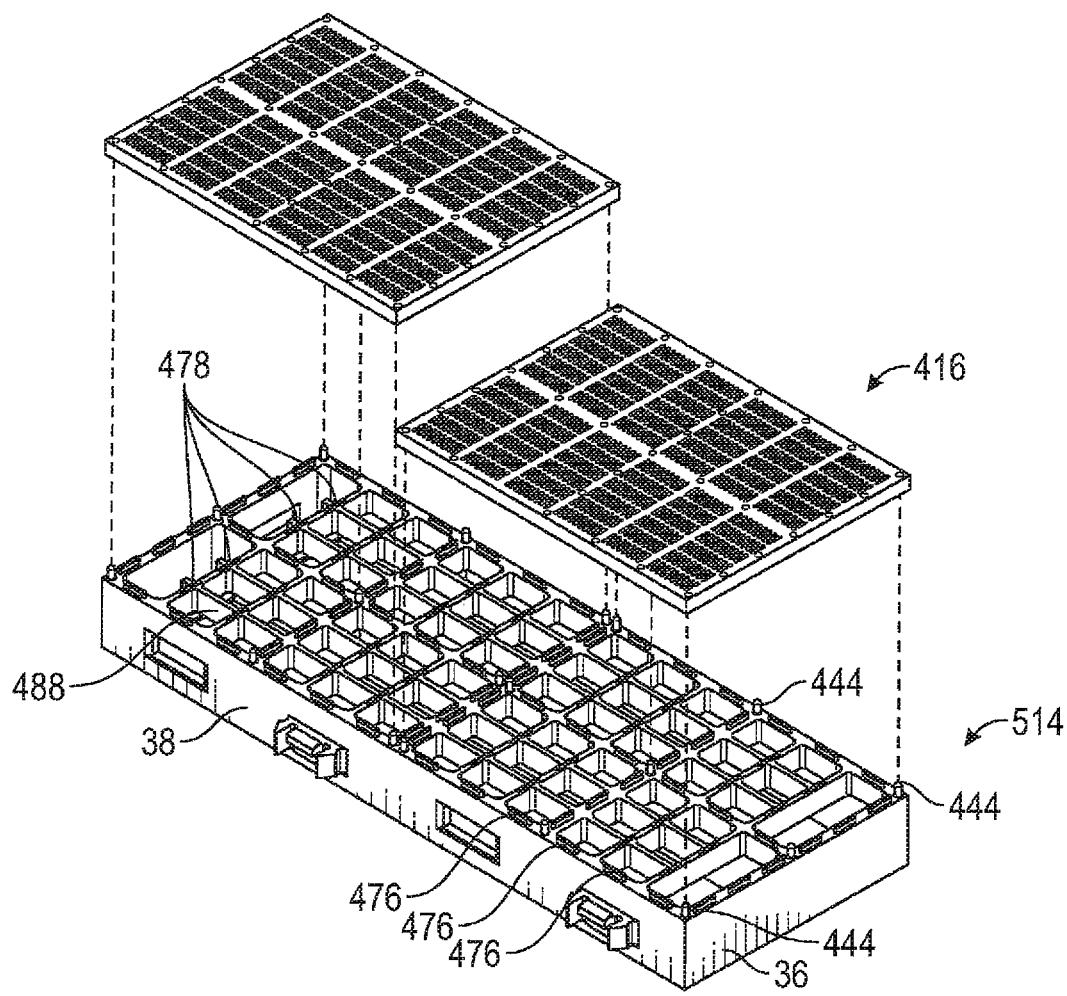
FIG. 61 is an exploded isometric view of an end subgrid showing screen elements prior to attachment to the end subgrid, according to an exemplary embodiment.

Screen elements 416 (e.g., see FIGS. 61 and 61A) may be attached to end subgrids 514, using methods similar to those described herein, including methods above with reference to FIGS. 51 and 51A for attaching screen element 416 to end subgrids 414. For example, as shown in FIG. 61, two screen elements 416 may be positioned over an end subgrid unit 514. Fusion bars 476 and 478 may be melted (e.g., using laser welding, heat staking, etc.) to fuse the two screen elements 416 to end subgrid unit 514 to form the end subassembly 660 shown in FIG. 61A. Further details describing this technique of fusing a screen element to a subgrid unit are described above with reference to FIGS. 51 and 51A. In other embodiments, other methods may be used to fuse a screen element to a subgrid. For example, screen elements may be affixed to the subgrids by at least one of a mechanical arrangement, an adhesive, heat staking, and ultrasonic welding, as described above.

Figure 60:
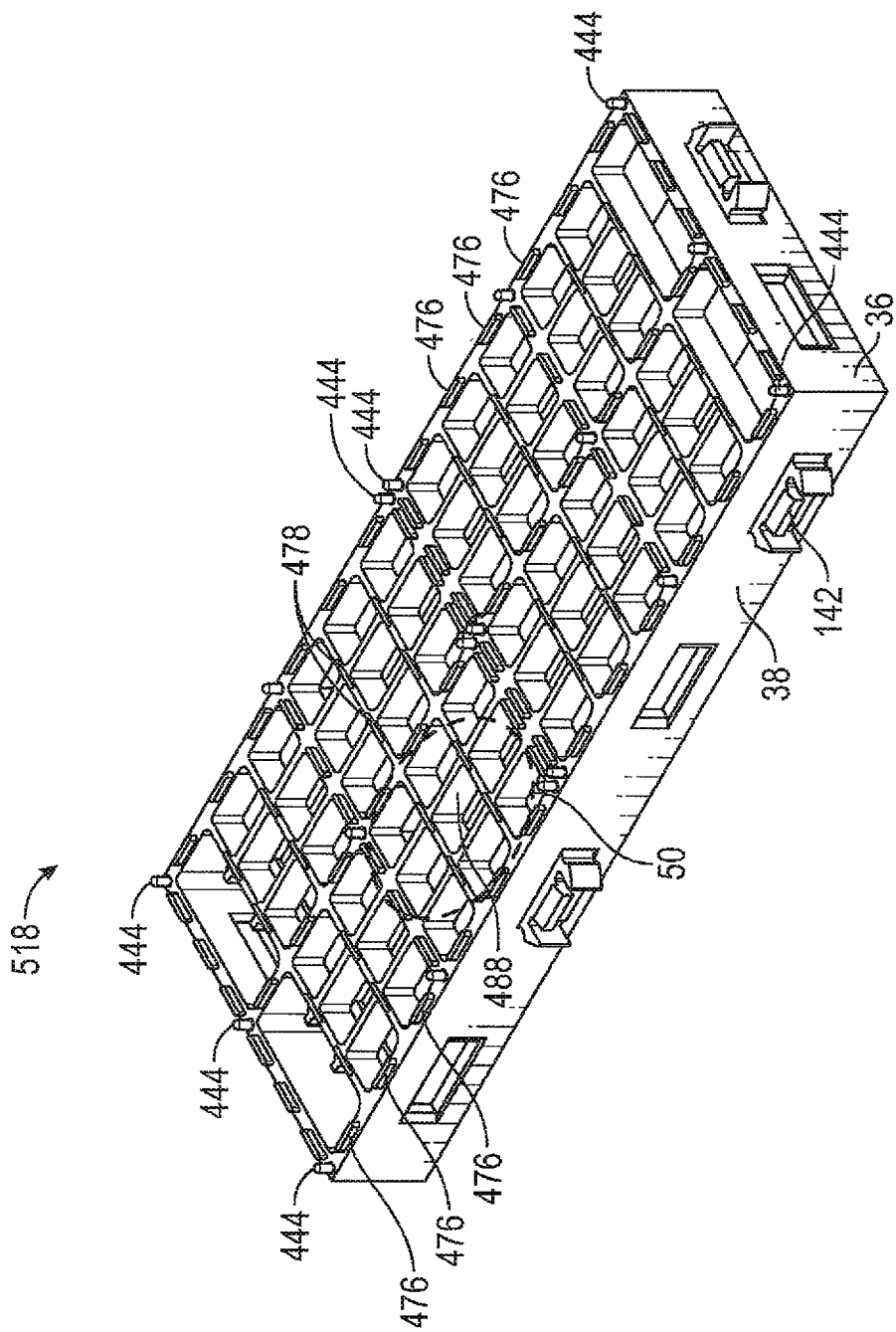
FIG. 60 is a top isometric view of a center subgrid, according to an exemplary embodiment.
Figure 60A:
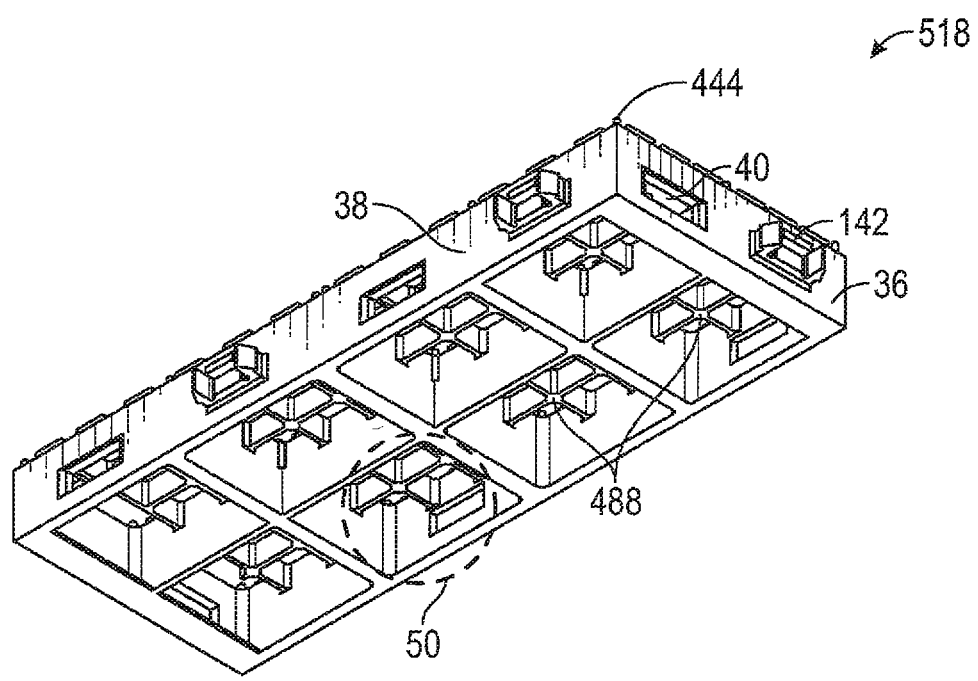
FIG. 60A is a bottom isometric view of the center subgrid shown in FIG. 60.

FIG. 60 is a top isometric view of a center subgrid 518, and FIG. 60A is a bottom isometric view of center subgrid 518 shown in FIG. 60. Center subgrid 518 is an alternative embodiment to center subgrid 418 shown in FIGS. 50 and 50A. Center subgrid 518 may be thermoplastic (or other suitably chosen material) injection molded and may include all of the features of center subgrid unit 418 with the exception of clips 42 of center subgrid unit 418. Center subgrid unit 518 includes clips 142 as discussed in greater detail below.

Similarly, with the exception of clips 142, center subgrids 518 (e.g., see FIGS. 60, 60A, 62, and 62A) include structural features similar to those found in center subgrids 418 (e.g., see FIGS. 50, 50A, 52, and 52A). For example, center subgrid 518 includes a plurality elongated location members 444, a secondary support framework 488 spanning across grid openings 50, a plurality of fusion bars 476, and a plurality of shortened fusion bars 478. Further, center subgrid 518 includes parallel subgrid end members 36, and parallel subgrid side members 38 that are substantially perpendicular to the subgrid end members 36.

Figure 62:
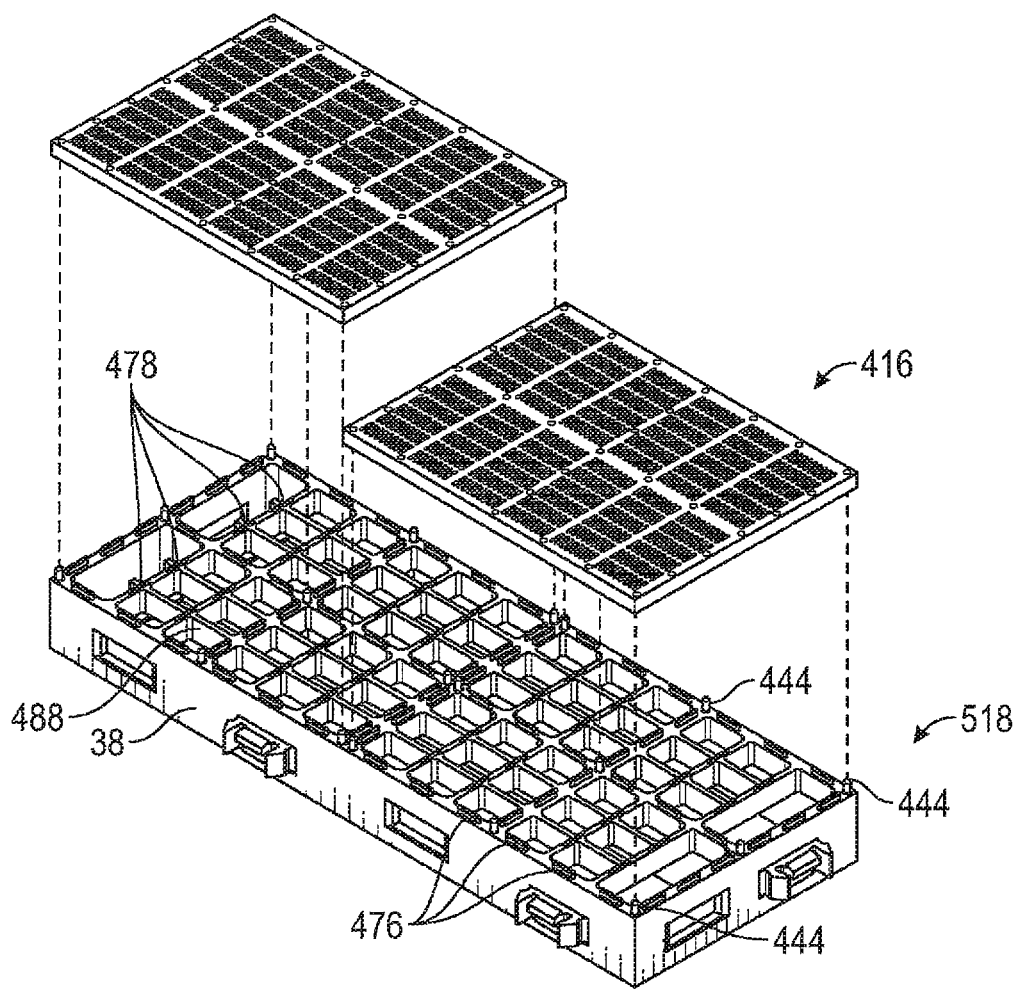
FIG. 62 is an exploded isometric view of a center subgrid showing screen elements prior to attachment to the center subgrid, according to an exemplary embodiment.

Screen elements 416 (e.g., see FIGS. 62 and 62A) may be attached to center subgrids 518, using methods similar to those discussed above with reference to FIGS. 52 and 52A for attaching screen element 416 to center subgrids 418. For example, as shown in FIG. 62, two screen elements 416 may be positioned over a center subgrid unit 518. Fusion bars 476 and 478 may be melted to fuse the two screen elements 416 to center subgrid unit 518 to form the center subassembly 760 shown in FIG. 62A, as described in greater detail above with reference to FIGS. 52 and 52A. Further details describing this technique of fusing a screen element to a subgrid unit are described above with reference to FIGS. 52 and 52A.

Clips 142 (e.g., see FIGS. 59, 59A, 60, 60A, and 63C) include similar extended members to those of clips 42. In addition to the two extended members of clips 42 (e.g. see FIGS. 3, 3A, 49, 49A, 50 and 50A) clips 142 have an additional extended member for a total of three extended members (e.g., see FIG. 63 and related discussion below). The presence of three extended members allows clips 142 to make a stronger and more rugged connection between end subgrid units 514 relative to the connection between end subgrid units 414 (e.g., see FIGS. 49 and 49A) provided by clips 42. Similarly, clips 142 provide stronger and more rugged connections between end subgrid units 514 and center subgrids 518, and between neighboring center subgrid units 518, relative to connections provided by clips 42.

The use of clips 142 (e.g., see FIGS. 59, 59A, 60, 60A, and 63C) is similar to the use of clips 42 (e.g. see FIGS. 3, 3A, and related discussion). In this regard, subgrid units (e.g., end subgrid units 514 and/or center subgrid units 518) may be secured together along their respective side members 38 by passing clip 142 into clip aperture 40 until the three extended members of clip 142 extend beyond clip aperture 40 and subgrid side member 38. As clip 142 is pushed into clip aperture 40, extended members of clip 142 will be forced together until a clipping portion of each extended member is beyond subgrid side member 38 allowing the clipping portions of clip 142 to engage an interior portion of subgrid side member 38.

As described above with reference to FIGS. 3 and 3A, when the clipping portions of clip 142 are engaged into clip aperture 40, subgrid side members of two independent end subgrids 514 will be side by side and secured together (e.g. see FIGS. 3, 3A, and related discussion). Similarly, when the clipping portions of clip 142 are engaged into the clip aperture 40, subgrid side members of two independent center subgrids 518 will be side by side and secured together. An end member 36 of end subgrid 514 may similarly be secured to an end member 36 of a center subgrid 518. Likewise end members 36 of two neighboring center subgrids 518 may be secured together. The subgrids may be separated by applying a force to the extended members of clip 142 such that the extended members are moved together allowing for the clipping portions to pass out of clip aperture 40.

In further embodiments, clips 142 may be configured to form a permanent connection between subgrids that once connected cannot be disconnected without breaking the clips 142 or one or more of the subgrids. Such embodiments having clips 142 that may form permanent connections may be advantageous for generating screen assemblies that may be secured into a vibratory screening machine based on compressive forces as described, for example, in U.S. Pat. Nos. 7,578,394 and 9,027,760, the disclosure of each of which is incorporated herein by reference. In this regard, screen assemblies may be generated that can withstand compressive forces in a range of 2000-3000 lb applied to edges of screen assemblies. Further, such screen assemblies may be configured to operate in a vibratory screening machine with vibrational accelerations in a range of 3-9 G.

Figure 63A:
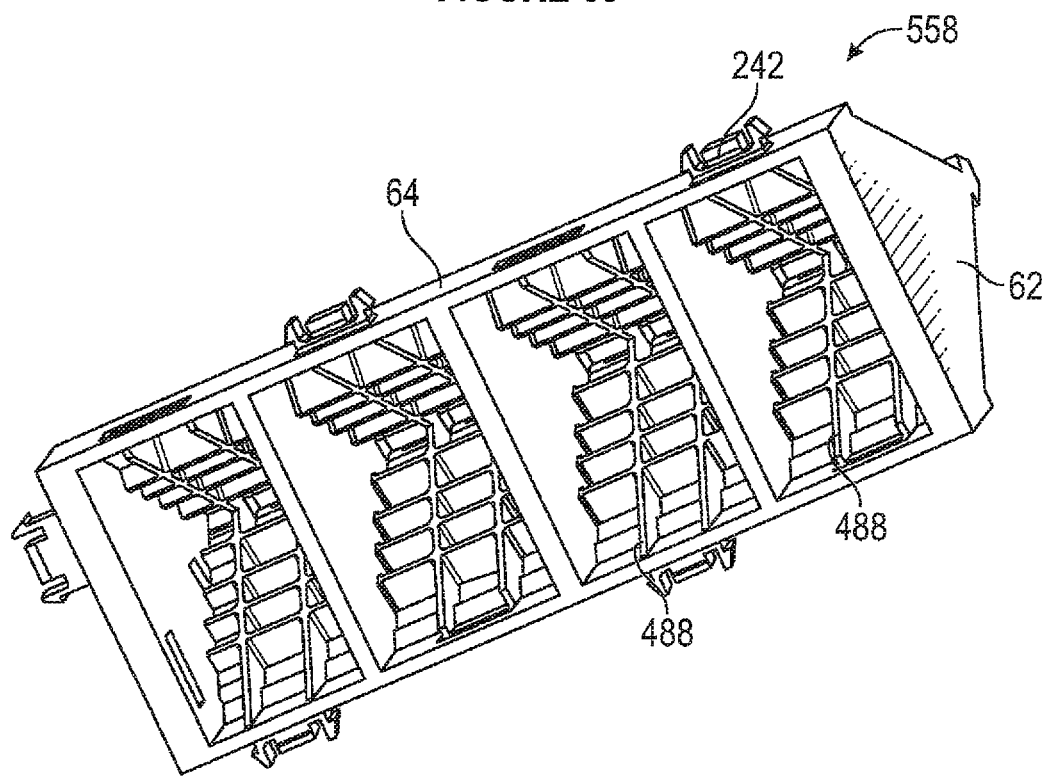

FIG. 63 is a top isometric view of a pyramidal shaped end subgrid 558, and FIG. 63A is a bottom isometric view of the pyramidal shaped end subgrid 558 shown in FIG. 63. Pyramidal shaped subgrid 558 of FIGS. 63 and 63A is an alternative embodiment to pyramidal shaped end subgrid 458 shown in FIGS. 53 and 53A. Pyramidal shaped subgrid 558 may be thermoplastic (or other suitably chosen material) injection molded and may include all of the features of pyramidal shaped end subgrid 458 with the exception of clips 42 of pyramidal shaped end subgrid unit 458. Pyramidal shaped subgrid 558 includes clips 242.

Figure 53:
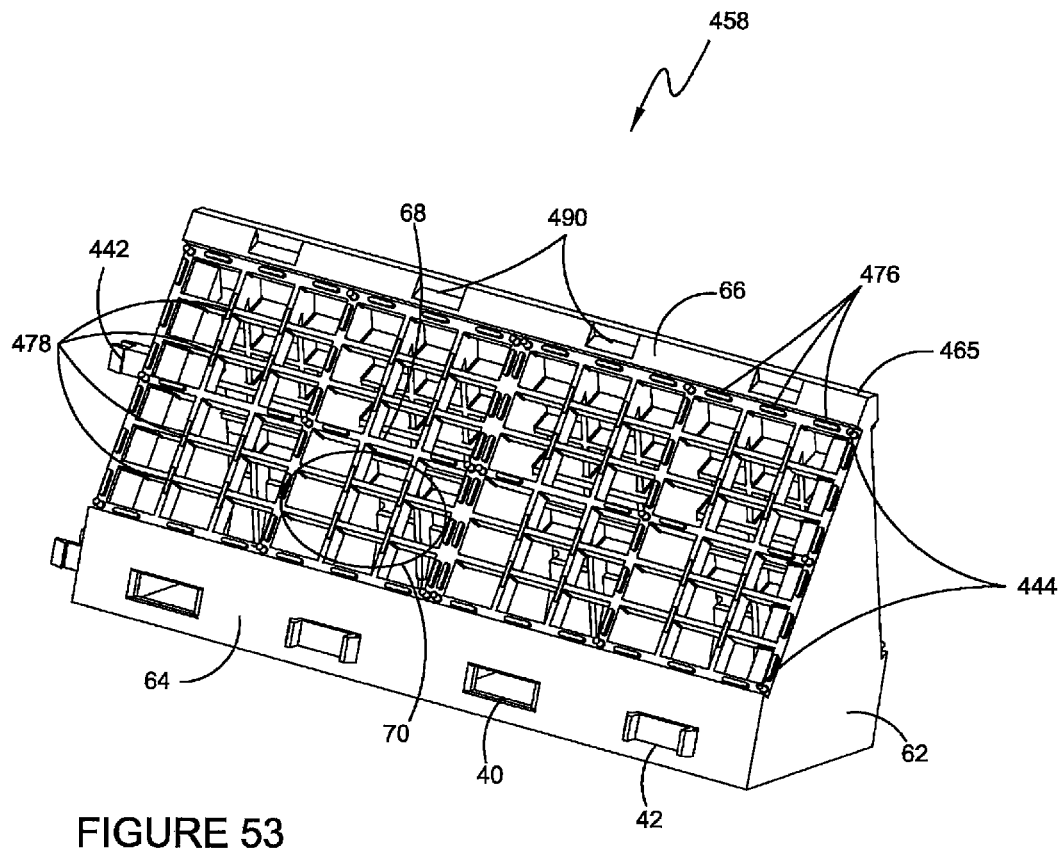
FIG. 53 is a top isometric view of a pyramidal shaped end subgrid, according to an exemplary embodiment of the present invention.
Figure 53A:
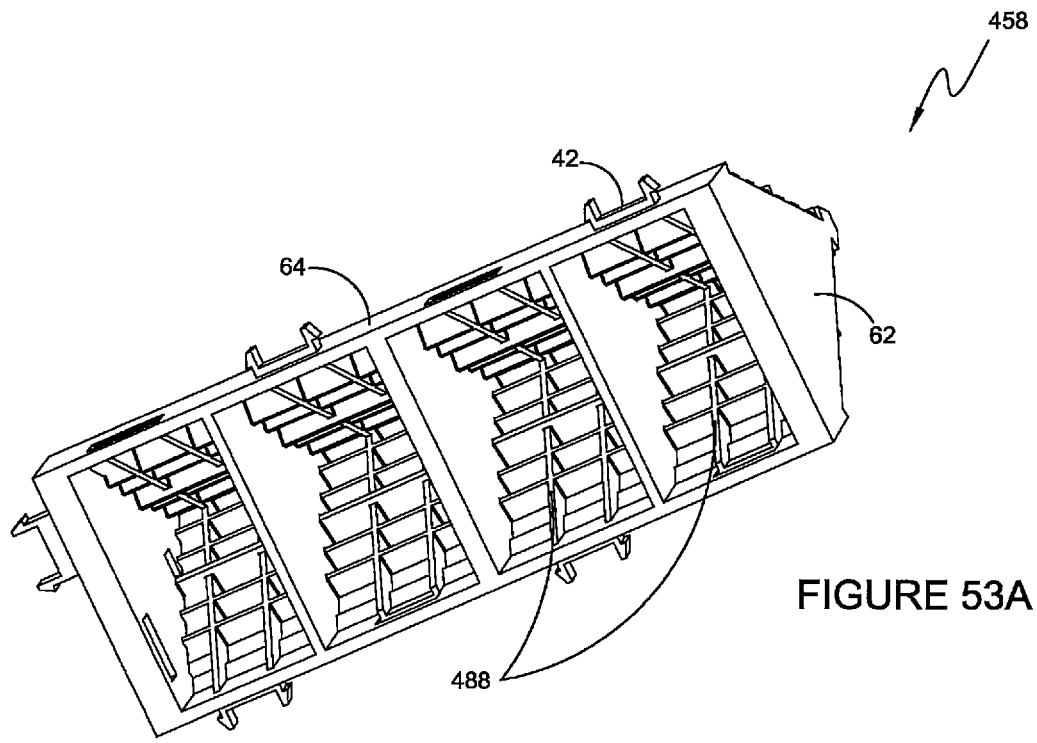
FIG. 53A is a bottom isometric view of the pyramidal shaped end subgrid shown in FIG. 53.

Similarly, with the exception of clips 242, pyramidal shaped subgrid 558 (e.g., see FIGS. 63 and 63A) includes structural features similar to those found in pyramidal shaped end subgrid 458 (e.g., see FIGS. 53 and 53A. For example, pyramidal shaped end subgrid 558 includes a ridge portion 66, subgrid side members/base members 64, and angular surfaces 70 that peak at ridge portion 66 and extend downwardly to side member 64. Pyramidal shaped subgrid 558 also has triangular end members 62. Pyramidal shaped end subgrid 558 may have a plurality elongated location members 444, and second adhesion arrangements such as a plurality of fusion bars 476 and shorted fusion bars 478. Pyramidal shaped end subgrid 558 may include secondary support framework 488 spanning across grid openings, and may include a flattened ridge portion 465 and may have fixture locators 490 in ridge 66.

Clips 242 are similar to clips 142 in that they have additional structure that provides for a stronger and more rugged connection between neighboring pyramidal shaped end subgrids 458. For example, clips 242 have two similar extended members that are structurally similar to the two extended members of clips 42 and 142. Clips 242 also have an additional central extended member (e.g., see FIG. 63D below) that likewise engages an interior portion of subgrid side member 64.

Clips 142 and 242 provide additional structure to form strong connections between subgrid units and may withstand compression forces in a range from 2000-3000 lb compression force on a screening assembly. Further, when screening subassemblies are formed into screening assemblies, the resulting assemblies that utilize clips 142 and 242 provide strong binding forces between subassemblies so that the resulting screening assembly may withstand large vibrational accelerations on the order of 3G to 9G. Disclosed screening assemblies are further designed to support abrasive materials (e.g., fluids having several percent to up to 65 percent abrasive solids) and high load demands (e.g, fluids having specific gravity up to 3 pounds per gallon), as described in greater detail below.

Figure 62A:
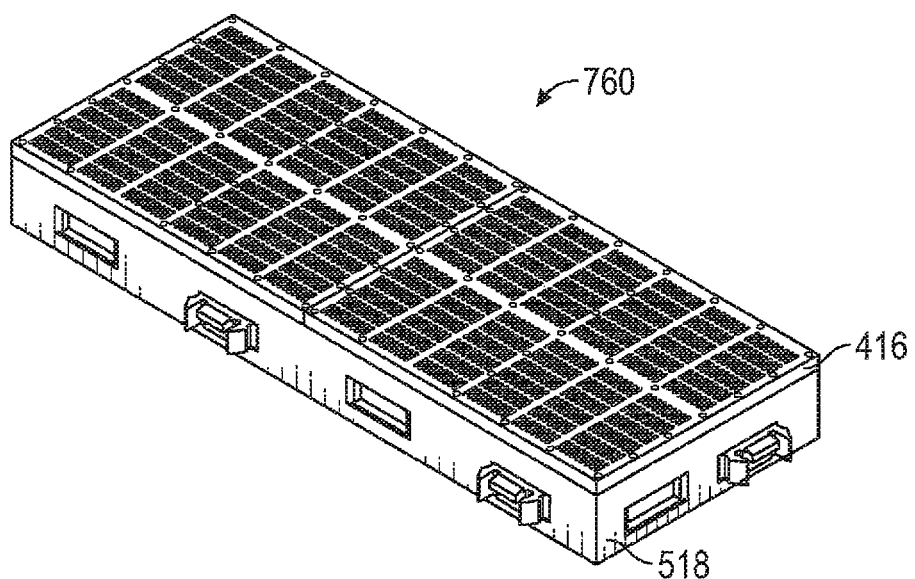
FIG. 62A is an isometric view of the center subgrid shown in FIG. 62 having the screen elements attached thereto, according to an exemplary embodiment.
Figure 63B:
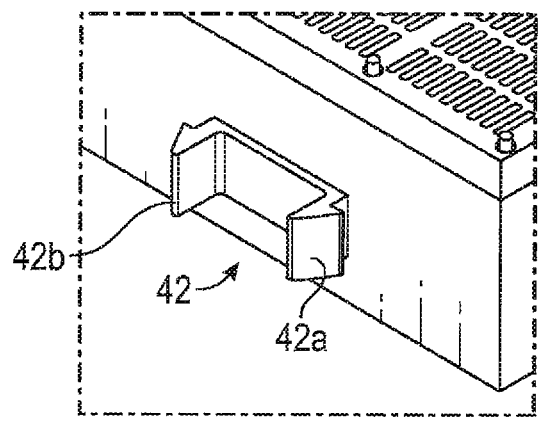
Figure 63C:
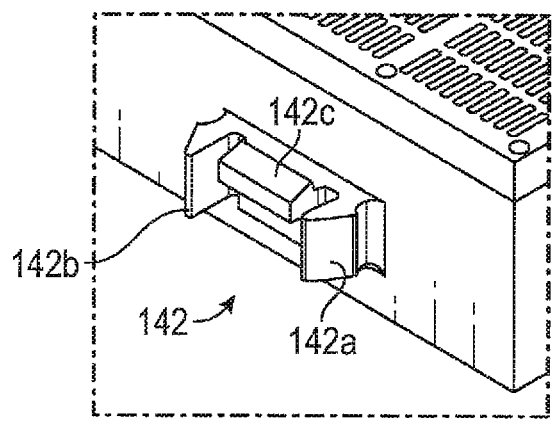
Figure 63D:
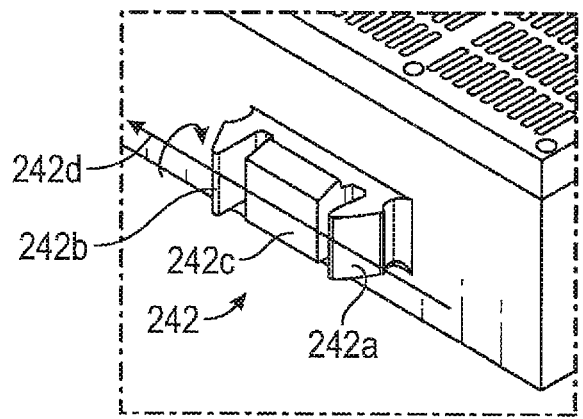

FIGS. 63B, 63C, and 63D compare structural features of clips 42 (e.g., see FIGS. 3 and 3A), 142 (e.g. see FIGS. 59-62A), and 242 (e.g., see FIGS. 63 and 63A), respectively. FIG. 63B illustrates an isometric view of clip 42. As shown in FIG. 63B, clip 42 has first 42a and second 42b extended members that engage with a clipping aperture 40 (e.g., see FIG. 59). FIG. 63C illustrates an isometric view of clip 142, which has first 142a and second 142b extended members that are similar to corresponding first 42a and second 42b extended members of clip 42 of FIG. 63B (see also FIGS. 3 and 3A). Clip 142, however, provides third 142c extended member as shown in FIG. 63C. The three extended members, 142a, 142b, and 142c, of clip 142 provide a stronger and more rugged connection between subgrids, as described above.

FIG. 63D illustrates an isometric view of clip 242. As shown in FIG. 63D, clip 142 has first 242a and second 242b extended members that are similar to first 42a and second 42b extended members of clip 42 (e.g., see FIGS. 3, 3A, 63B), and are similar to first 142a and second 142b extended members of clip 142 (e.g., see FIG. 63C). As mentioned above, however, clip 142 of FIG. 63D also has a central extended member 242c that engages with upper and lower edges of clip aperture 40 (e.g., see FIG. 63). Clip 242 provides additional stability for connections between subgrids in that central extended member 242c hinders rotational motion about an axis 242d of two subgrids bound by clip 242, as shown in FIG. 63D.

Figure 54:
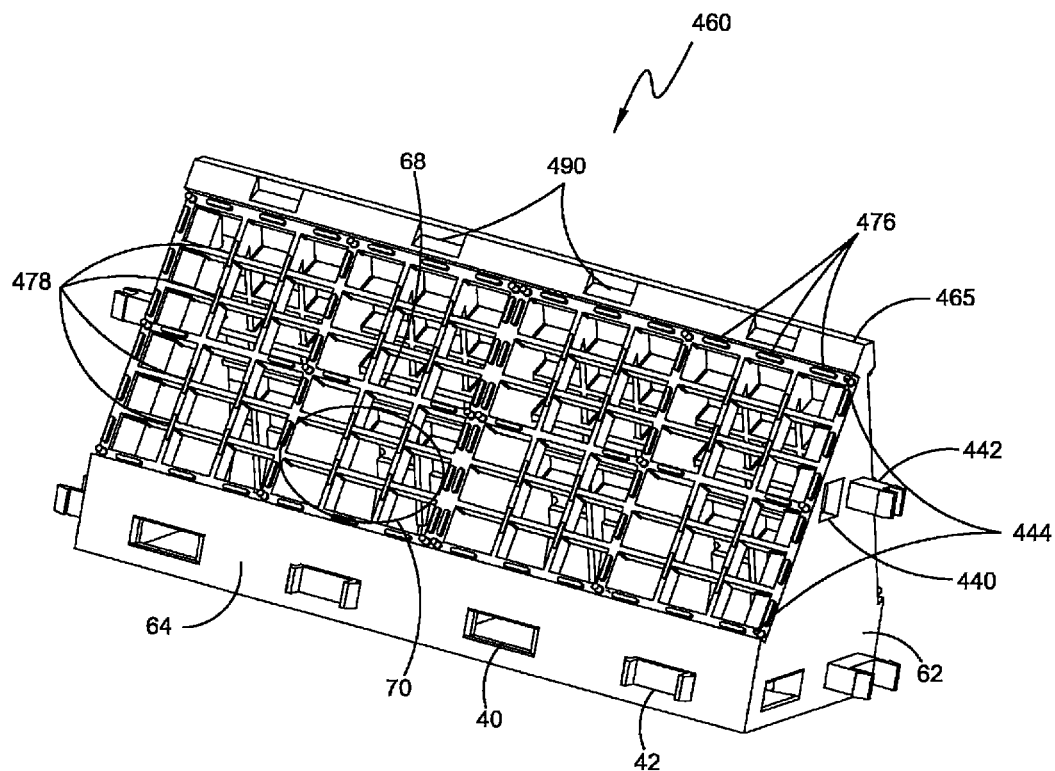
FIG. 54 is a top isometric view of a pyramidal shaped center subgrid, according to an exemplary embodiment of the present invention.
Figure 54A:
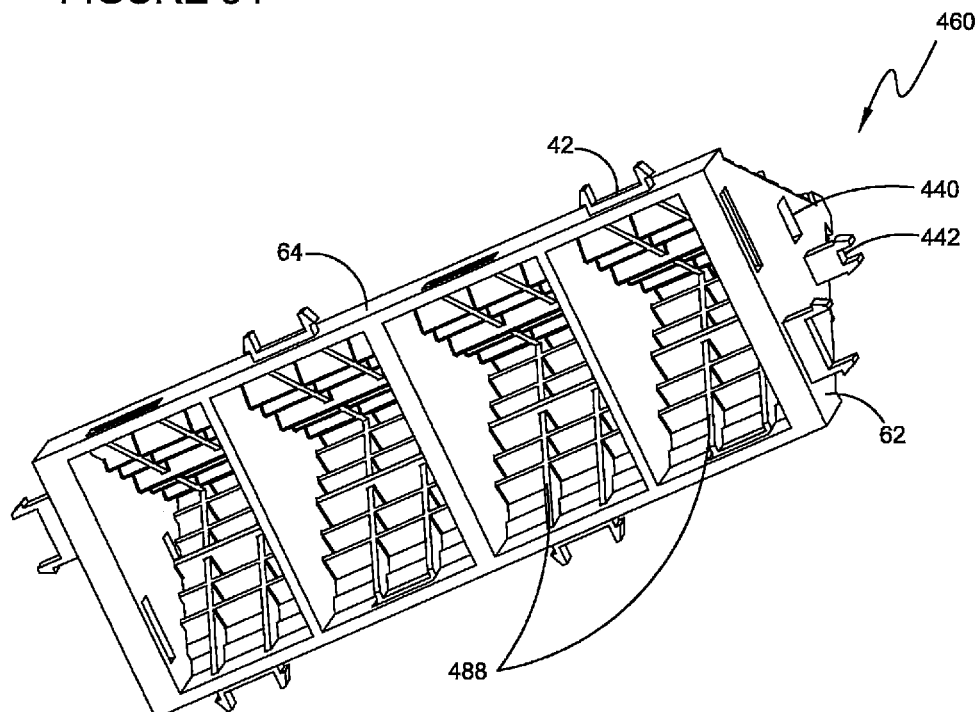
FIG. 54A is a bottom isometric view of the pyramidal shaped center subgrid shown in FIG. 54.
Figure 55:
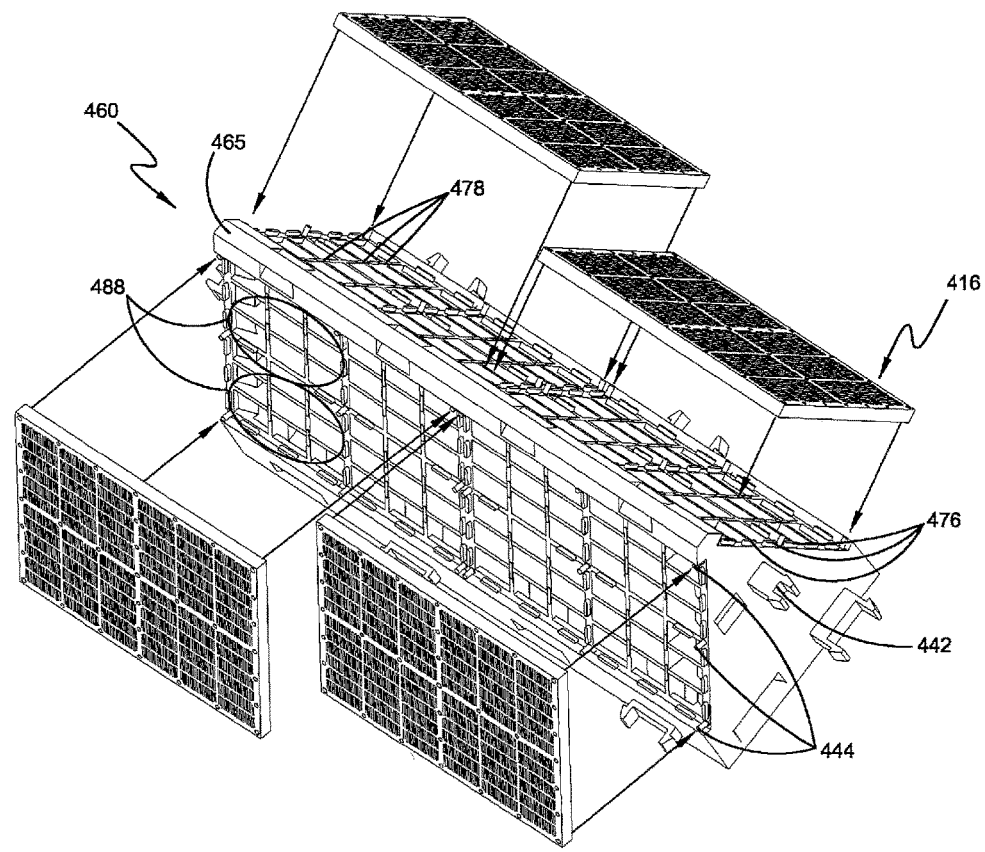
FIG. 55 is an exploded isometric view of a pyramidal shaped end subgrid showing screen elements prior to attachment to the pyramidal shaped end subgrid, according to an exemplary embodiment of the present invention.
Figure 55A:
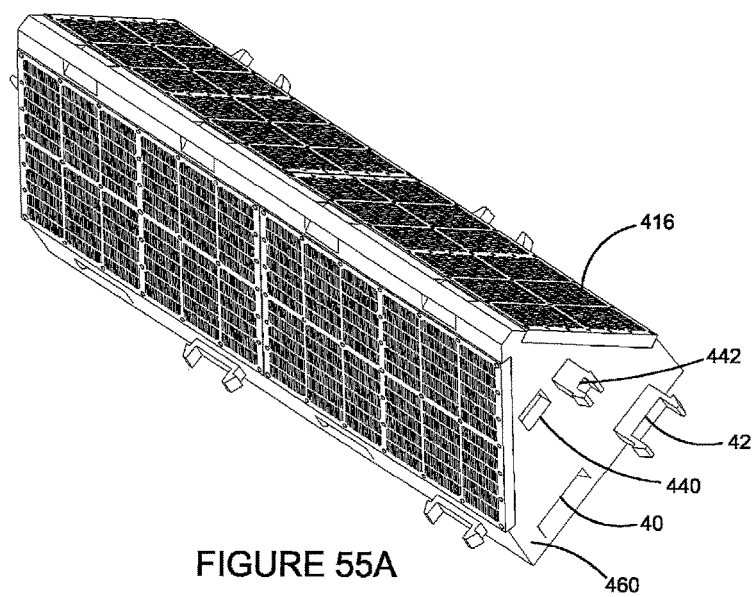
FIG. 55A is an isometric view of the pyramidal shaped end subgrid shown in FIG. 55 having the screen elements attached thereto.
Figure 56:
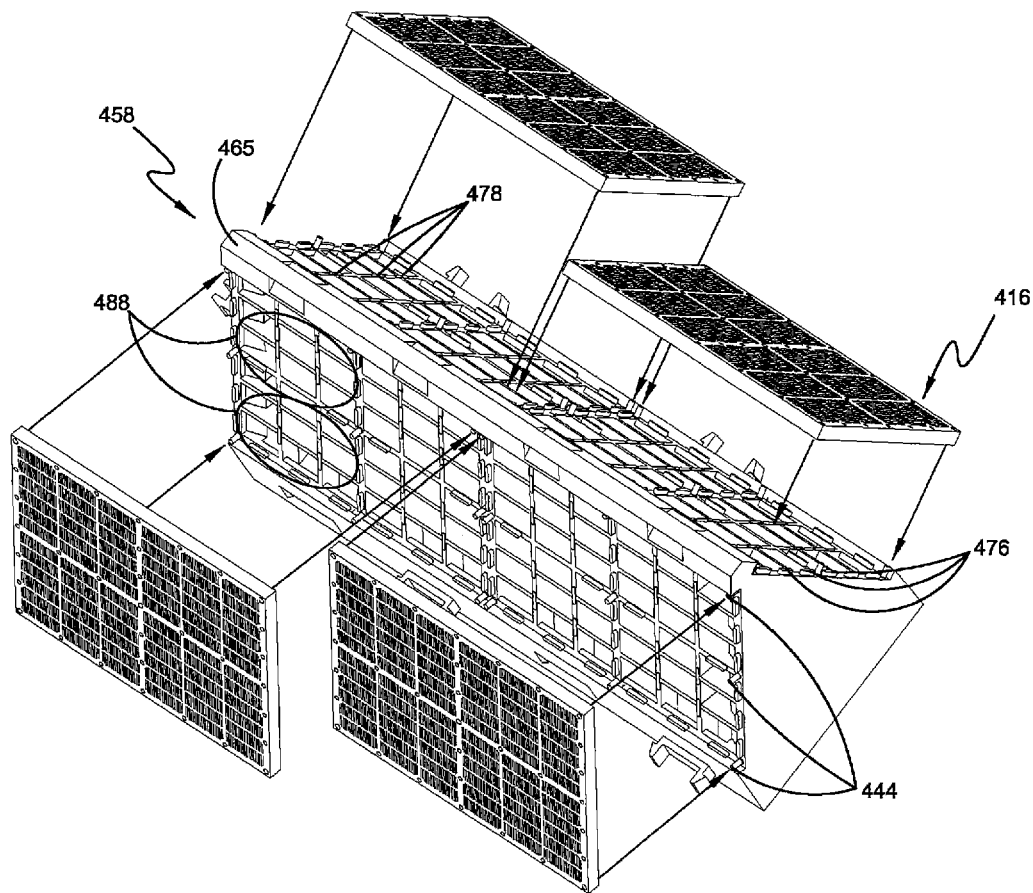
FIG. 56 is an exploded isometric view of a pyramidal shaped center subgrid showing screen elements prior to attachment to the pyramidal shaped center subgrid, according to an exemplary embodiment of the present invention.
Figure 56A:
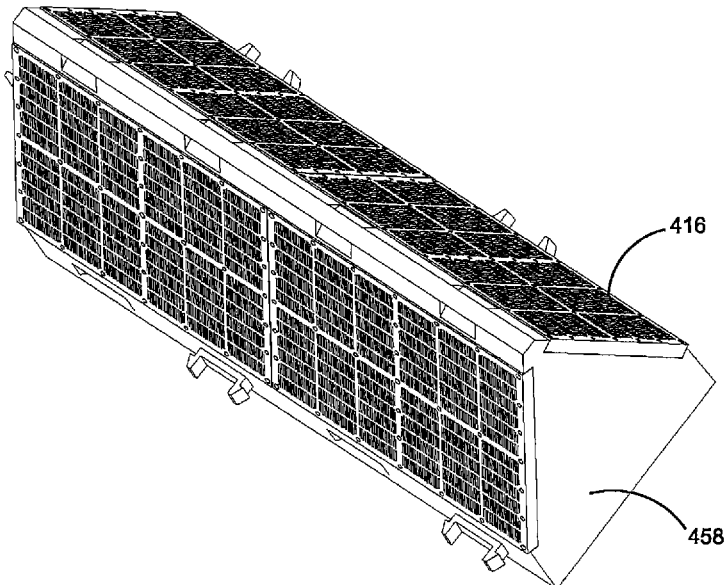
FIG. 56A is an isometric view of the pyramidal shaped center subgrid shown in FIG. 56 having the screen elements attached thereto.
Figures 57, 57A:
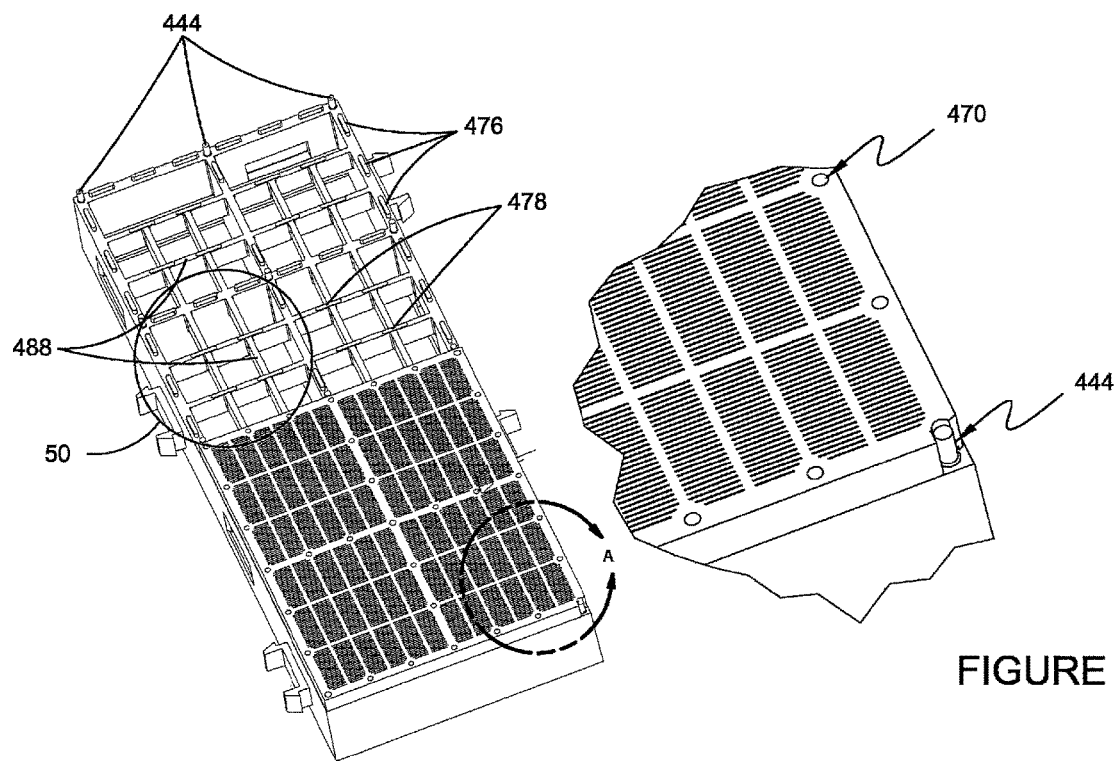
FIG. 57 is an isometric view of the end subgrid shown in FIG. 50 having a single screen element partially attached thereto, according to an exemplary embodiment of the present invention.
FIG. 57A is an enlarged view of section A of the end subgrid shown in FIG. 57.

The above discussion may be generalized straightforwardly in that any structure having clips 42 may be generalized to a similar structure having clips 142 or 242 (e.g., see FIGS. 63C and 63D). For example, pyramidal shaped center subgrid 460 shown in FIGS. 54 and 54A may similarly be generalized to a pyramidal shaped center subgrid structure having clips 142 or 242 (not shown). Similarly, the methods for attaching screening members 416 to such pyramidal shaped subgrids described above with reference to FIGS. 55, 55A, 56 and 56A may be employed to attach screening members 416 to the generalized pyramidal shaped center subgrids since clips 42, 142, and 242 play no role in the process of attaching screening members 416.

Figure 64:
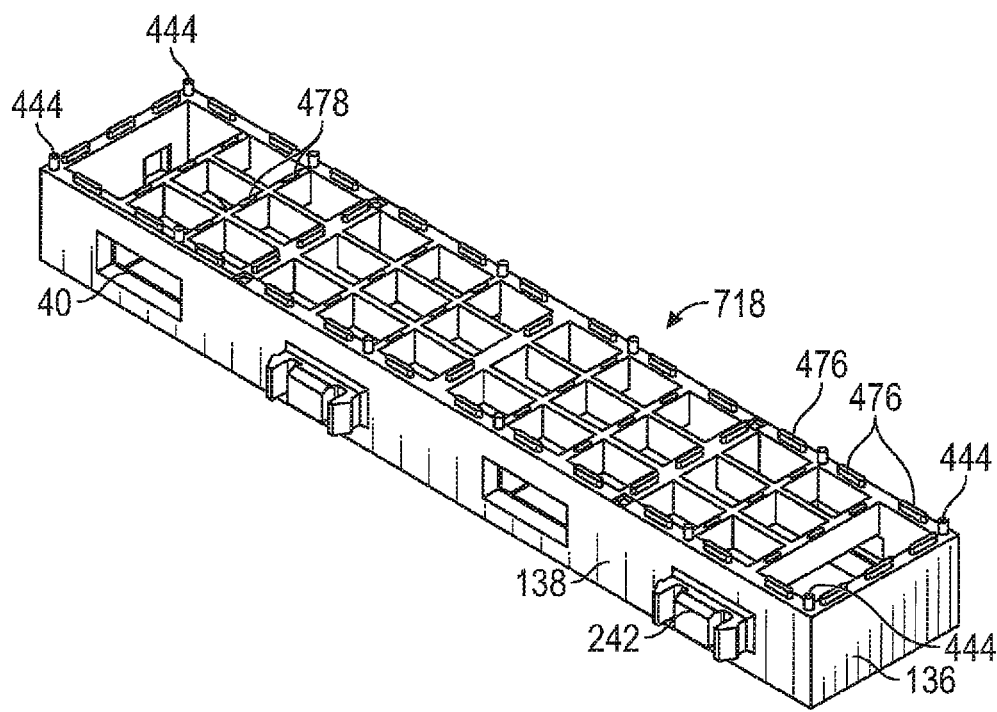
Figure 64A:
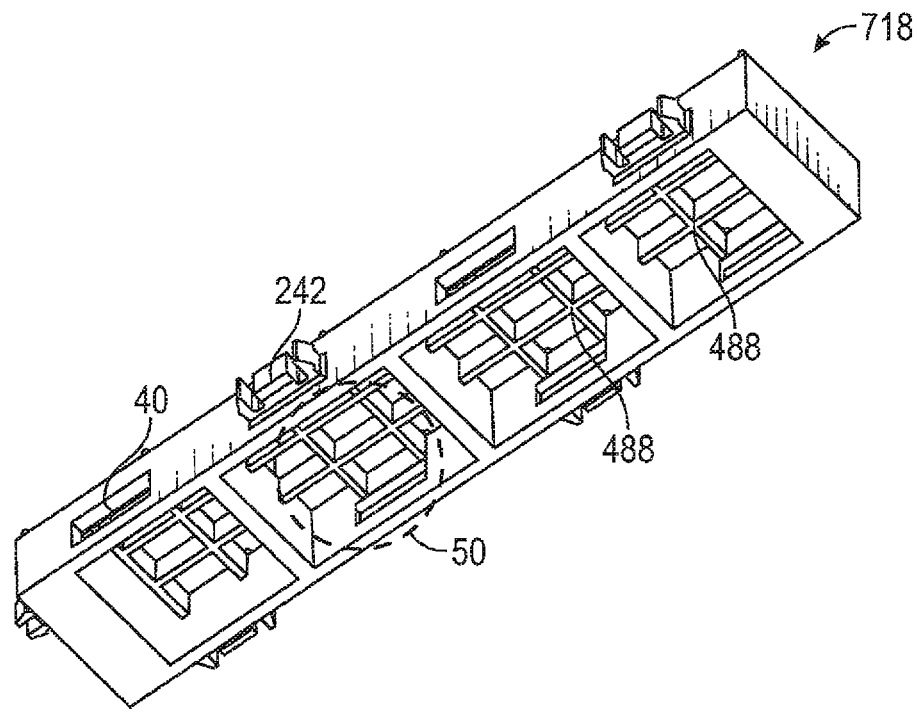

FIG. 64 is a top isometric view of an end subgrid 718, and FIG. 64A is a bottom isometric view of end subgrid 718 shown in FIG. 64. End subgrid 718 is an alternative embodiment to end subgrid 514 shown in FIGS. 59 and 59A. End subgrid 718 may be thermoplastic (or other suitably chosen material) injection molded and may include similar features to those found in end subgrid unit 514. For example, end subgrid 718 includes a plurality elongated location members 444, a secondary support framework 488 spanning across grid openings 50, a plurality of fusion bars 476, and a plurality of shortened fusion bars 478. Further, end subgrid 718 includes parallel subgrid end members 136, and parallel subgrid side members 138 that are substantially perpendicular to the subgrid end members 136. End subgrid 718 may also have clips 242 similar to those of pyramidal shaped end subgrid 558 (e.g., see FIGS. 63 and 63A). Alternatively, in an embodiment end subgrid 718 may employ other clips such as clips 142 of end subgrid 514 (e.g., see FIGS. 59 and 59A) or clips 42 of end subgrid 14 (e.g., see FIGS. 3 and 3A).

In contrast to end subgrid 514, however, end subgrid 718 has about the same length as end subgrid 514 but about half the width of end subgrid 514. In other words, a length measured along the parallel subgrid side members 138 for end subgrid 718 is substantially equal to a length measured along the parallel subgrid side members 38 for end subgrid 514, but the a distance measured along parallel subgrid end member 136 for subgrid 718 is substantially equal to half the distance measured along the subgrid end member 36 of end subgrid 514. The shorter width of end subgrid 718 provides an advantage in that it may support corresponding screen elements 516 (e.g., see FIGS. 66, 66A, 66B, and 66C) having half the width of screen elements 416 (e.g., see FIGS. 48, 48A, 48B, and 48C). Screen elements 516 having a shorter width allows manufacturing of screen elements 516 having smaller features such as smaller screening openings 86, and smaller surface elements 84 (e.g., see FIG. 2D), as described in greater detail below.

Figure 4A:
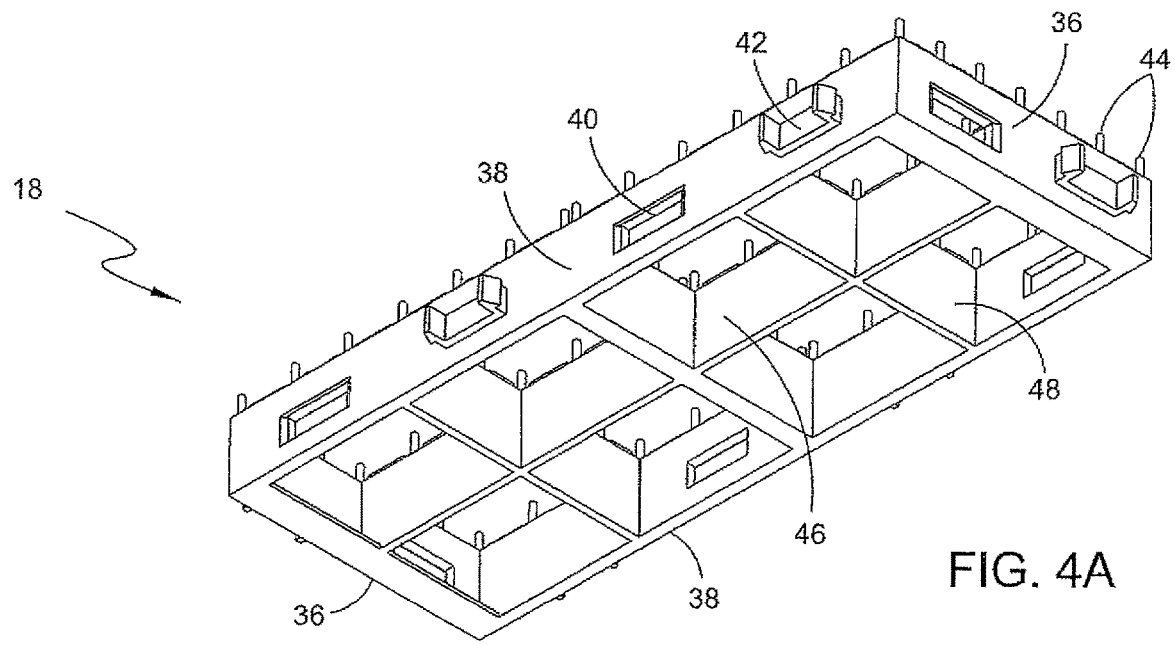
FIG. 4A is a bottom isometric view of the center subgrid shown in FIG. 4.

FIG. 65 is a top isometric view of a center subgrid 818, and FIG. 65A is a bottom isometric view of the center subgrid 818 shown in FIG. 65. Center subgrid 818 is an alternative embodiment to center subgrid 518 shown in FIGS. 60 and 60A. Center subgrid 818 may be thermoplastic (or other suitably chosen material) injection molded and may include similar features to those found in center subgrid unit 518. For example, center subgrid 818 includes a plurality of elongated location members 444, a secondary support framework 488 spanning across grid openings 50, a plurality of fusion bars 476, and a plurality of shortened fusion bars 478. Further, center subgrid 818 includes parallel subgrid end members 136, and parallel subgrid side members 138 that are substantially perpendicular to the subgrid end members 136. Center subgrid 818 may also have clips 242 similar to those of pyramidal shaped center subgrid 558 (e.g., see FIGS. 63 and 63A). Alternatively, in an embodiment center subgrid 818 may employ other clips such as clips 142 of center subgrid 518 (e.g., see FIGS. 60 and 60A) or clips 42 of center subgrid 18 (e.g., see FIGS. 4 and 4A).

In contrast to center subgrid 518, however, center subgrid 818 has about the same length as center subgrid 518 but about half the width of center subgrid 518 (e.g., compare FIGS. 65 and 65A with FIGS. 60 and 60A). In other words, a length measured along parallel subgrid side members 138 for center subgrid 818 is substantially equal to a length measured along parallel subgrid side member 38 for center subgrid 518, but the a distance measured along parallel subgrid end members 136 for subgrid 818 is substantially equal to half a distance measured along the subgrid end members 36 of center subgrid 518. The shorter width of center subgrid 818 provides an advantage in that it may support corresponding screen elements 516 (e.g., see FIGS. 66, 66A, 66B, and 66C) having half the width of screen elements 416 (e.g., see FIGS. 48, 48A, 48B, and 48C). Screen elements 516 having a shorter width allows manufacturing of screen elements 516 having smaller features such as smaller screening openings 86, and smaller surface elements 84 (e.g., see FIG. 2D), as described in greater detail below.

As described in greater detail below (e.g., with reference to FIGS. 70-74D), screen elements (e.g., see FIG. 70A) having smaller features such as smaller screening openings 86, and smaller surface elements 84 (e.g., see FIG. 2D, and Tables I.-IV. below), are designed to be supported by corresponding subgrid structures having additional structural features (e.g., see FIGS. 71-71D, 72, and 72A) that support corresponding reinforcement members (e.g., see FIGS. 71E, 71F, 72B, 72C, 74B, and 74C) of screening elements. The smaller screening features of screen elements that are supported by additional structure of the subgrids may be assembled into screening assemblies having increased open screening area.

In this way, screen elements are provided that: are of an optimal size (large enough for efficient assembly of a complete screen assembly structure yet small enough to injection mold (micromold in certain embodiments) extremely small structures forming screening openings while avoiding freezing (i.e., material hardening in a mold before completely filling the mold)); have optimal open screening area (the structures forming the openings and supporting the openings are of a minimal size to increase the overall open area used for screening while maintaining, in certain embodiments, very small screening openings necessary to properly separate materials to a specified standard); have durability and strength, can operate in a variety of temperature ranges; are chemically resistant; are structurally stable; are highly versatile in screen assembly manufacturing processes; and are configurable in customizable configurations for specific applications.

Further, screening elements, subgrids, and screen assemblies may have different shapes and sizes as long as structural support members of subgrids are provided to support corresponding reinforcement members of screening elements. Screens, subgrids, and screen assemblies are designed to withstand high vibratory forces (e.g., accelerations in a range of 3-9G), abrasive materials (e.g., fluids having several percent to up to 65 percent abrasive solids) and high load demands (e.g, fluids having specific gravity up to 3 pounds per gallon). Screen assemblies are also designed to withstand up to 2000-3000 lb compressive loading of screen assembly edges as described, for example, in U.S. Pat. Nos. 7,578,394 and 9,027,760, the entire disclosure of each of which is hereby incorporated by references. Further, the disclose screening assemblies are designed so that a size of screening openings is maintained under service conditions including the above-mentioned compressive loading, high vibratory forces, and in the presence of heavy fluids.

FIGS. 66, 66A, 66B, and 66C illustrate a screen element 516 that is similar to screen element 416 (e.g., see FIGS. 48, 48A, 48B, and 48C). For example, screen element 516 may include location apertures 424, which may be located at four corners of screen element 516 and at various places along end member 120 and side member 122 of screen element 516 (e.g., see FIGS. 66 and 66A). Greater or fewer location apertures 424 may be provided on screen element 516 and multiple configurations may be provided. The location apertures 424 may be utilized to locate the screen element 516 on a subgrid (e.g., such as on end subgrid 718 of FIGS. 64 and 64A or on center subgrid 818 of FIGS. 65 and 65A). Screen element 516 may further include a center location aperture 524. Alternatively, in an embodiment screen element 516 may be located without location apertures 424. Screen element 516 may include a plurality of tapered counter bores 470, which may facilitate extraction of screen element 516 from a mold, wherein the mold may have injector pins configured to push the screen element out of the mold (e.g., see FIGS. 66 and 66A).

Figure 48:
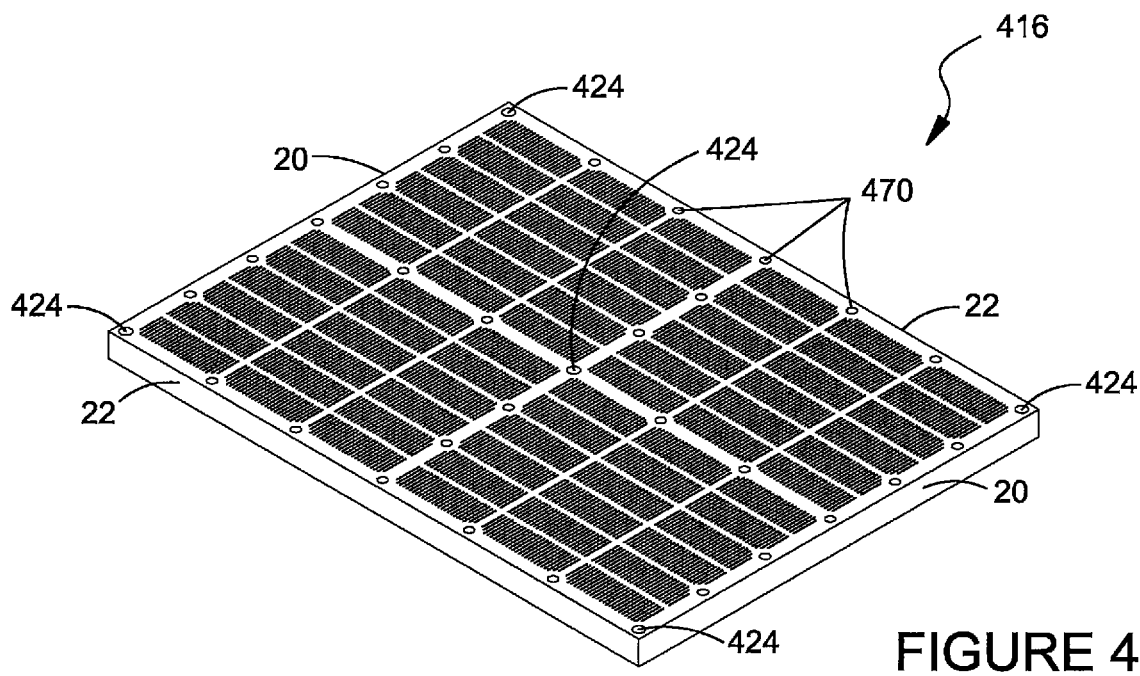
FIG. 48 is an isometric top view of a screen element, according to an exemplary embodiment of the present invention.
Figure 48A:
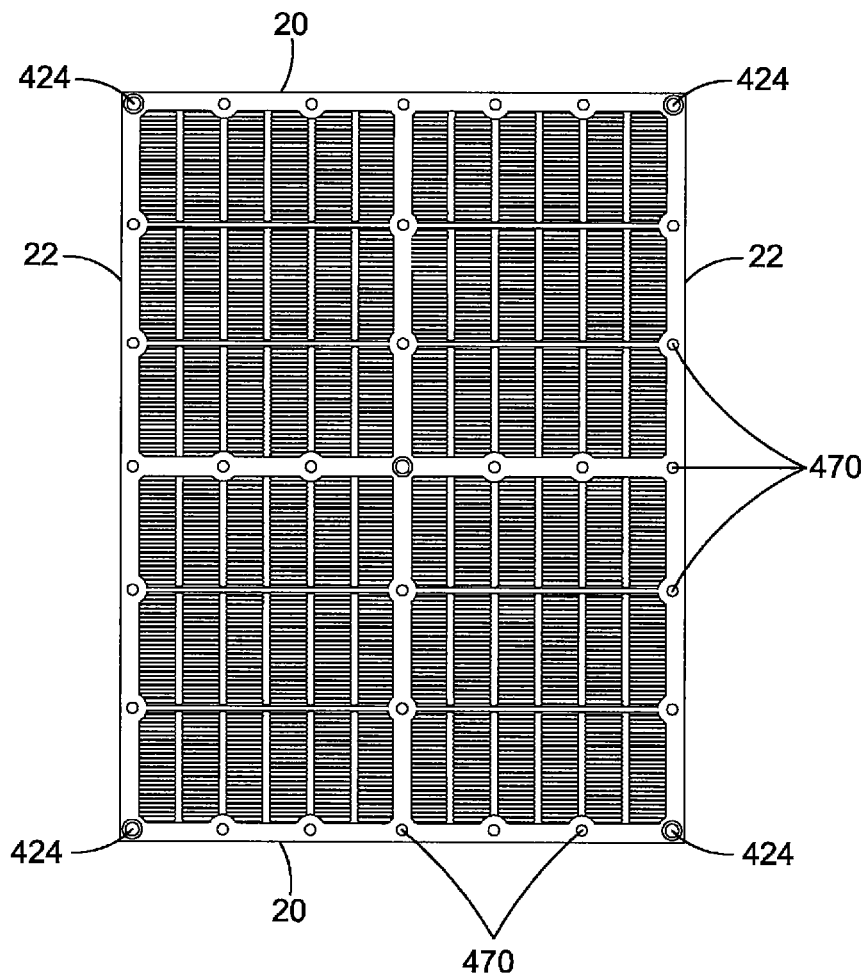
FIG. 48A is a top view of the screen element shown in FIG. 48.
Figure 48B:
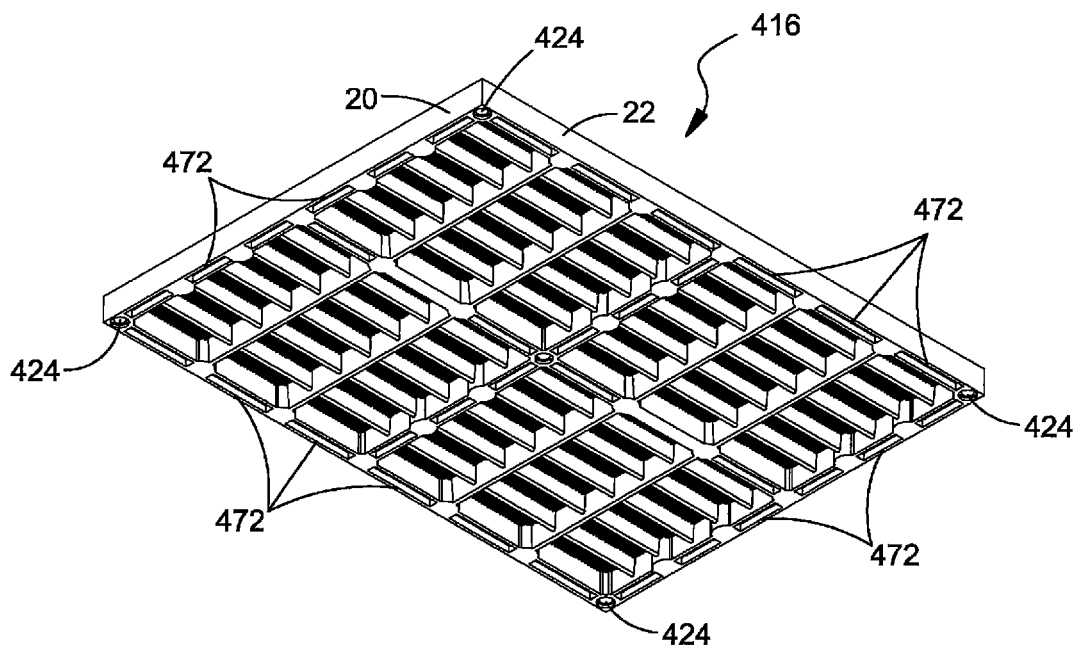
FIG. 48B is a bottom isometric view of the screen element shown in FIG. 48.
Figure 48C:
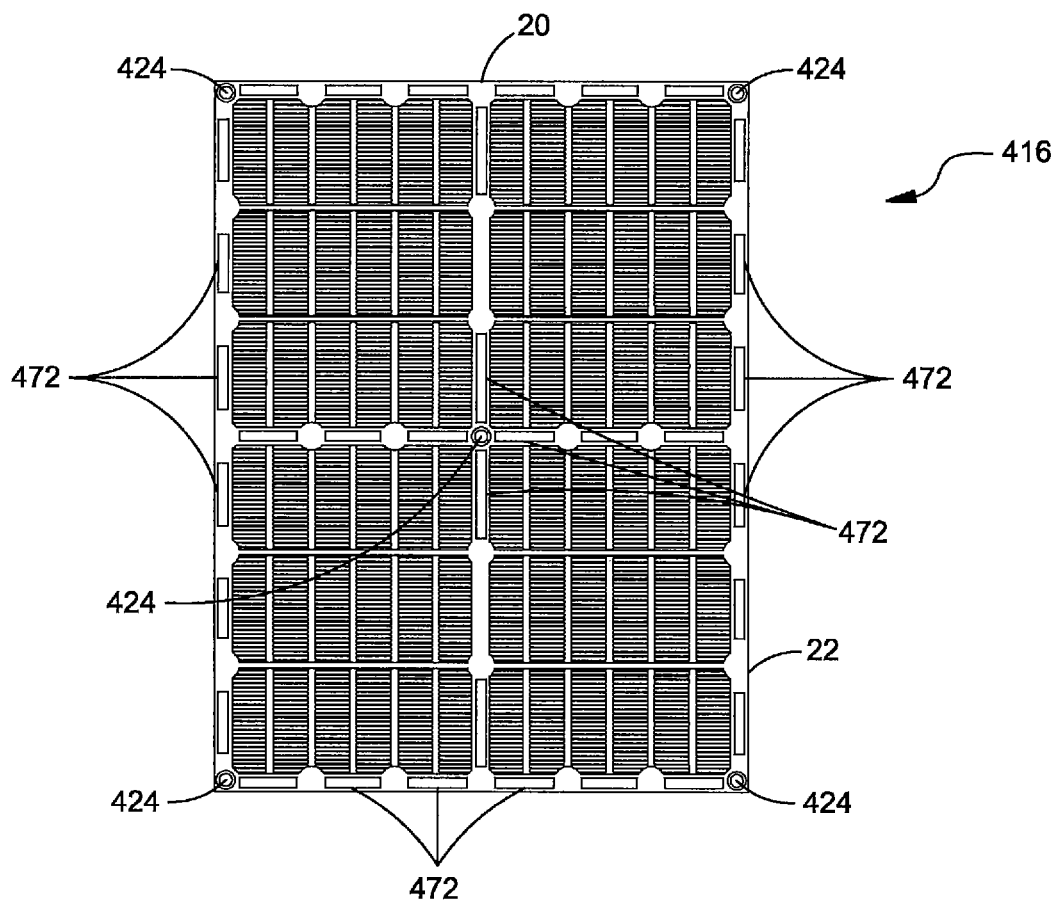
FIG. 48C is a bottom view of the screen element shown in FIG. 48.
Figure 49:
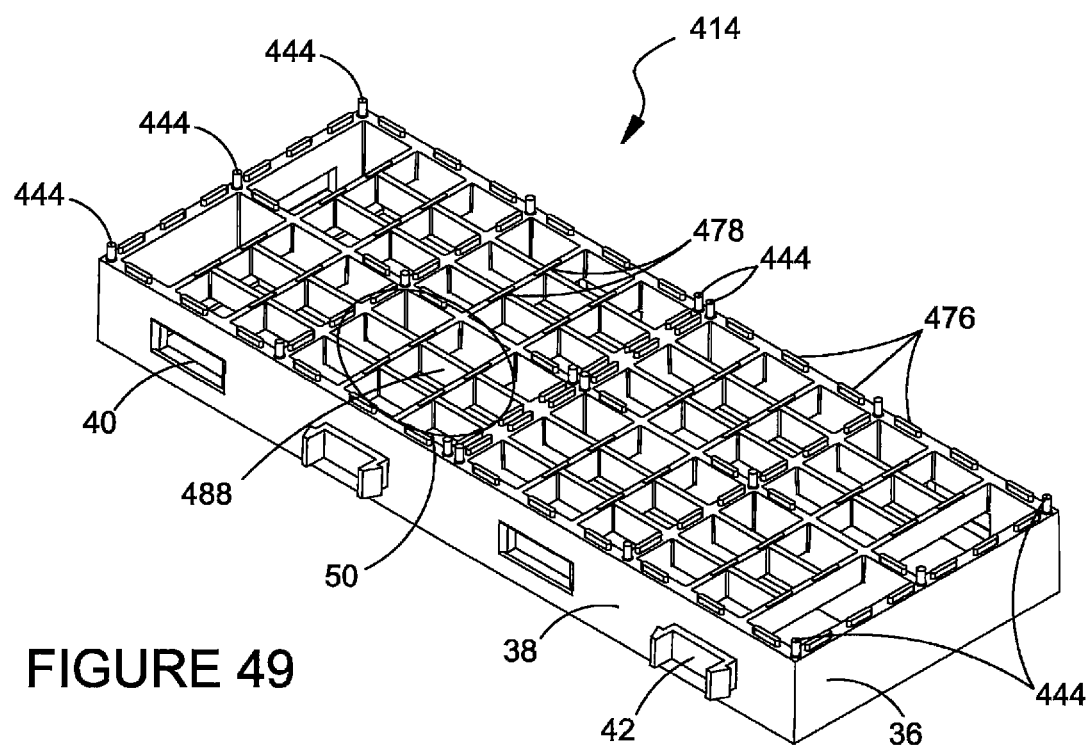
FIG. 49 is a top isometric view of an end subgrid, according to an exemplary embodiment of the present invention.
Figure 49A:
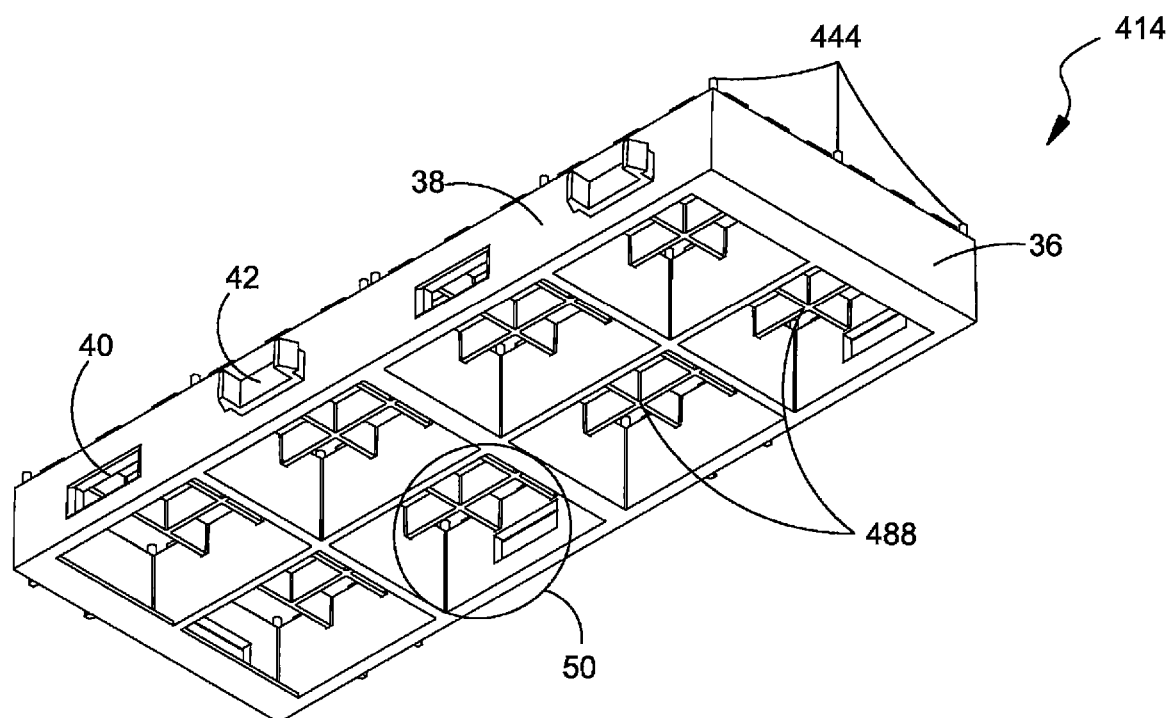
FIG. 49A is a bottom isometric view of the end subgrid shown in FIG. 49.
Figure 50:
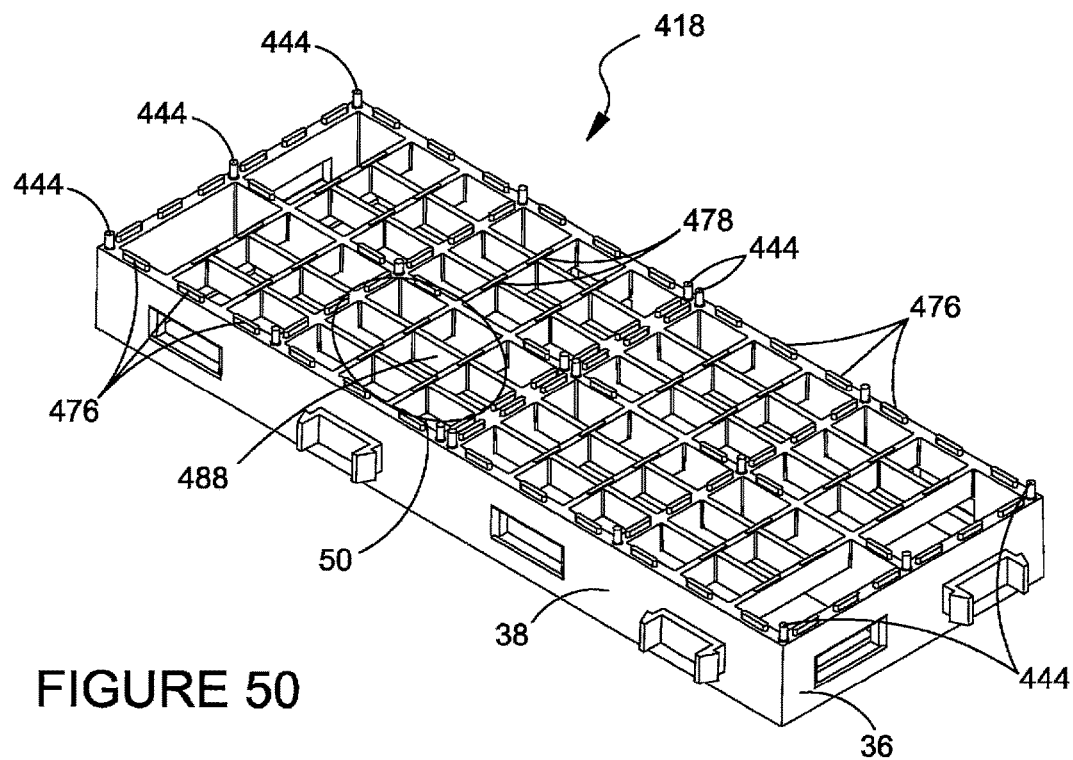
FIG. 50 is a top isometric view of a center subgrid, according to an exemplary embodiment of the present invention.
Figure 50A:
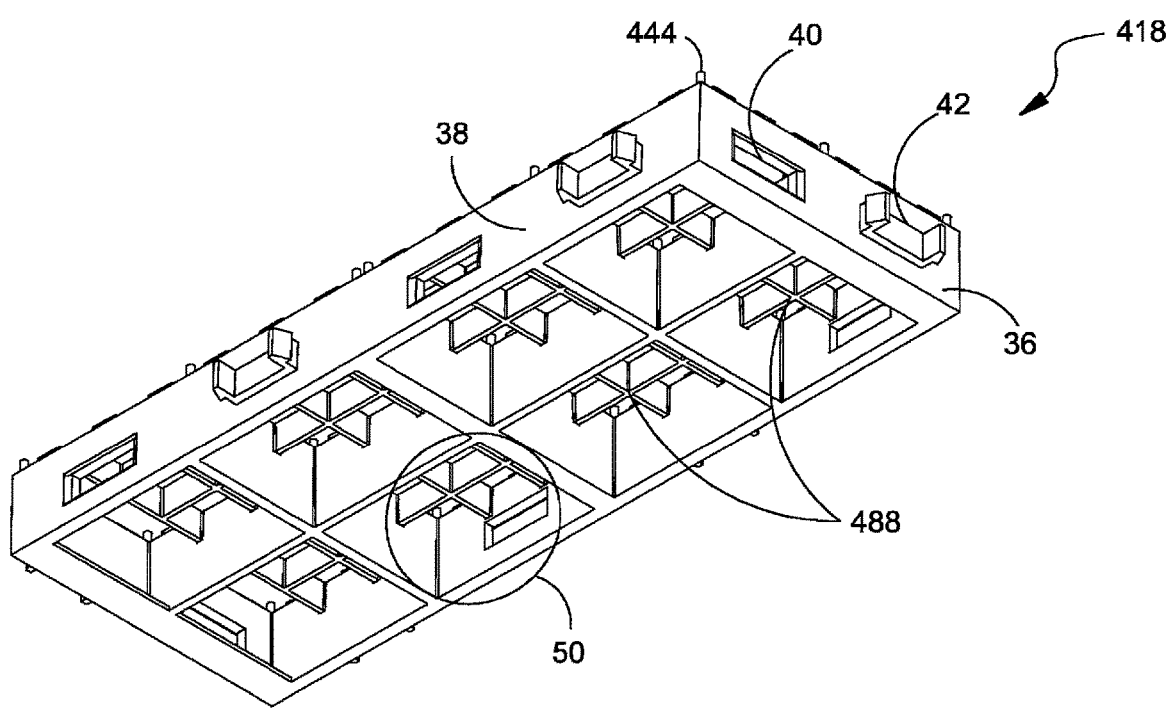
FIG. 50A is a bottom isometric view of the center subgrid shown in FIG. 50.
Figures 52, 52A:
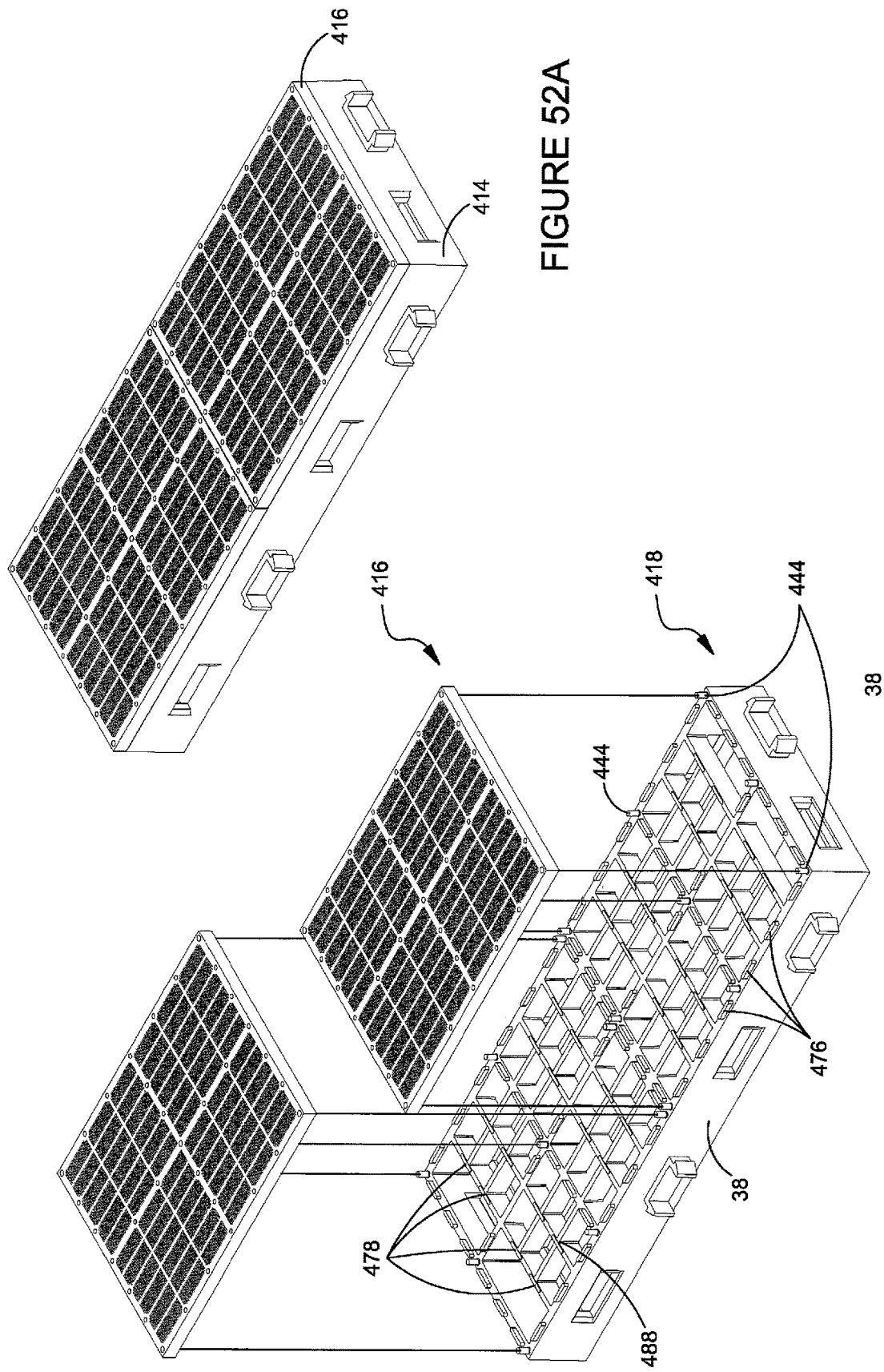
FIG. 52 is an exploded isometric view of a center subgrid showing screen elements prior to attachment to the center subgrid, according to an exemplary embodiment of the present invention.
FIG. 52A is an isometric view of the center subgrid shown in FIG. 52 having the screen elements attached thereto.

In this example, screen elements 516 (e.g., see FIGS. 66-66C) have twice the length of screen elements 416 but half the width of screen elements 416 (e.g., see FIGS. 48-48C). For example, a distance measured alongside portion 122 of screen element 516 is substantially equal to twice a distance measured alongside portion 22 of screen element 416 (e.g., see FIG. 48). However, a distance measured along end portion 120 of screen element 516 is substantially equal to half of a distance measured along end portion 20 of screen element 416 (e.g., see FIG. 48). Choosing screen elements 516 to have a shorter width allows manufacturing of screen elements 516 having smaller features such as smaller screening openings 86, and smaller surface elements 84 (e.g., see FIG. 2D), as described in greater detail below.

Screen element 516 may have similar features to screen element 416 (e.g., see FIGS. 48B and 48C) on a bottom side of screen element 516, as illustrated in FIGS. 66B and 66C. For example, screen element 516 may have a plurality of cavity pockets 472 that may be arranged along end portions 120 and side portions 122 between the location apertures 424. As with screen element 416, the cavity pockets 472 (e.g., see FIG. 66C) may serve as an adhesion arrangement of screen element 516 that may be configured to mate with a complementary second adhesion arrangement on a top surface of a subgrid unit (e.g., such as on end subgrid 718 of FIGS. 64 and 64A or on center subgrid 818 of FIGS. 65 and 65A).

Figure 61A:
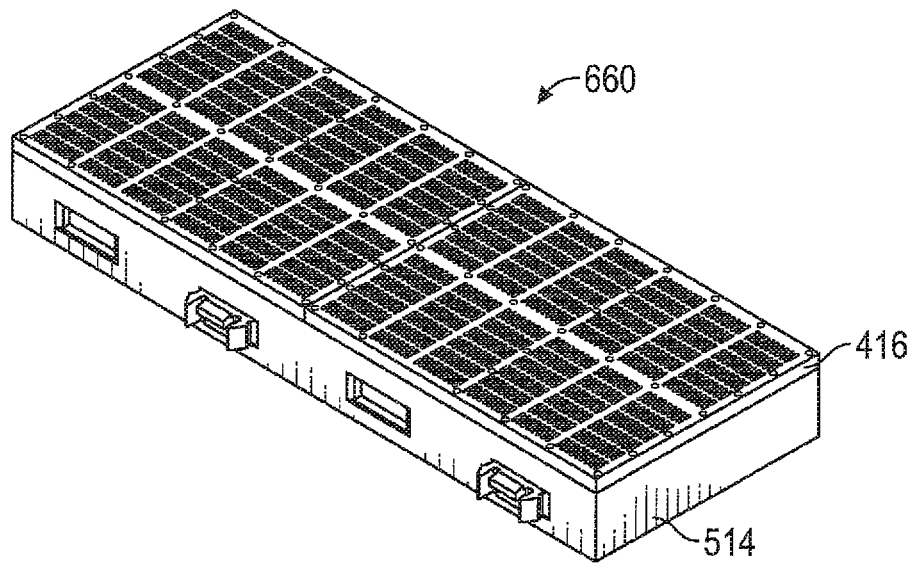
FIG. 61A is an isometric view of the end subgrid shown in FIG. 61 having the screen elements attached thereto, according to an exemplary embodiment.

As illustrated, for example, in FIGS. 67 and 67A, screen elements 516 may be attached to end subgrid 718 to generate end screen subassembly 860, using methods similar to those described above used to attach screen elements 416 to end subgrid 514 to generate the end subassembly 660 (e.g., see FIGS. 61 and 61A). For example, location apertures, 424 and 524, of screen element 516 (e.g., see FIG. 66A) may engage with location members 444 of end subgrid 718. Fusion bars 476 and 478 may then be melted to fuse screen element 516 to end subgrid 718, as described in greater detail above with reference to FIGS. 51, 51A, 61, and 61A.

In contrast to the situation illustrated in FIG. 61, in which two screen elements 416 span end subgrid 514, as shown in FIG. 67, a single screen element 516 spans end subgrid 718. This situation occurs because screen element 516 has twice the length and half the width of screen element 416 while end subgrid 718 has the same length but half the width of end subgrid 514. The shorter width and longer length of screen element 516 allows smaller features, such as screening openings 86, and smaller surface elements 84 (e.g., see FIG. 2D), to be manufactured (e.g., via thermoplastic injection molding), as described in greater detail below.

As illustrated, for example, in FIGS. 68 and 68A, screen elements 516 may be attached to center subgrid 818 to generate center screen subassembly 960, using methods similar to those described above used to attach screen elements 416 to center subgrid 518 to generate the center subassembly 760 (e.g., see FIGS. 62 and 62A). For example, fusion bars 476 and 478 may be melted to fuse screen element 516 to center subgrid 818, as described in greater detail above with reference to FIGS. 52, 52A, 62, and 62A.

In contrast to the situation illustrated in FIG. 62, in which two screen elements 416 span center subgrid 518, as shown in FIG. 68, a single screen element 516 spans center subgrid 818. This situation occurs because screen element 516 has twice the length and half the width of screen element 416 while center subgrid 818 has the same length but half the width of center subgrid 518. The shorter width and longer length of screen element 516 allows smaller features, such as screening openings 86, and smaller surface elements 84 (e.g., see FIG. 2D), to be manufactured, as described in greater detail below.

As illustrated, for example, in FIGS. 69 and 69A, a screen assembly 80 may be formed by combining end screen subassemblies 860, center screen subassemblies 960, and screen subassemblies having pyramidal shaped subgrids, such as pyramidal shaped end subassemblies based on pyramidal end subgrids 58 and pyramidal shaped center subassemblies based on pyramidal center subgrids 60, described above. Pyramidal shaped subassemblies may include screen elements 16 (e.g., see FIGS. 2 to 2C), 416 (e.g., see FIGS. 48 to 48C), or 516 (e.g., see FIGS. 66 to 66C). By using end screen subassemblies 860 and center screen subassemblies 960, which each have half the width of end subgrids 514 and center subgrids 518, respectively, the pyramidal shaped subassemblies may be placed closer together than similar assemblies shown in other embodiments, such as the screen assemblies shown, for example, in FIGS. 21 and 21A.

FIGS. 70 and 70A compare screen element 516 (see FIG. 70) with an alternative embodiment screen element 616 (see FIG. 70A) having smaller features than those of screen element 516. Screen element 616 is designed to support smaller features including smaller screening openings 86 and smaller surface elements 84 (e.g., see FIG. 2D), as described in greater detail below.

Screen element 616 may be thermoplastic (or other suitably chosen material) injection molded and have similar features to those of screen element 516. For example, screen element 616 may include location apertures 424, which may be located at four corners of screen element 616 and at various places along end member 120 and side member 122 of screen element 616. Greater or fewer location apertures 424 may be provided on screen element 616 and multiple configurations may be provided. The location apertures 424 may be utilized to locate the screen element 616 on a subgrid (e.g., such as on end subgrid 718 of FIGS. 67 and 67A or on center subgrid 818 of FIGS. 68 and 68A). Screen element 616 may further include a center location aperture 524. Alternatively, in an embodiment, screen element 616 may be located without location apertures 424. Screen element 616 may include a plurality of tapered counter bores 470, which may facilitate extraction of screen element 616 from a mold, wherein the mold may have injector pins configured to push the screen element out of the mold.

Screen element 616 may have a plurality of cavity pockets 472 that may be arranged along end portions 120 and side portions 122 between the location apertures 424. As with screen element 516, the cavity pockets 472 may serve as an adhesion arrangement of screen element 616 that may be configured to mate with a complementary second adhesion arrangement on a top surface of a subgrid unit. Screen element 616 may thus be attached to a subgrid using similar techniques as those described above for attaching screen element 516 to a subgrid. For example, fusion bars 476 and 478 (e.g., see FIGS. 67 and 68) may be melted to fuse screen element 516 to a subgrid (e.g., end subgrid 718 of FIG. 67 or center subgrid 818 of FIG. 68).

Differences between screen element 516 (of FIG. 70) and screen 616 (of FIG. 70A) relate to support structures, as follows. Screen element 516 has a first series of reinforcement members 32 and screen 616 has a first series of reinforcement members 132. The linear density of reinforcement members 132 of screen element 616 is higher than the linear density of reinforcement members 32 of screen element 516. In this example, there are a total of ten reinforcement members 32 spanning a direction parallel to end member 120 for screen element 516, while there are a total of fourteen reinforcement members 132 spanning a direction parallel to end member 120 for screen element 616. The greater linear density of reinforcement members 132 of screen element 616 provides greater structural strength to screen element 616 in comparison to screen element 516. Further, as described in greater detail below, the greater number of reinforcement members 132 allows for a greater number of screen surface elements 84 and screening openings 86, both of which reside between reinforcement members 132.

Screen element 516 has a second series of reinforcement members 34. Screen element 616 also includes the second series of support members 34 along with an additional third series 134 of reinforcement members. FIG. 70 illustrates two of the second series of support members 34 in screen element 516. FIG. 71 also illustrates a corresponding two of the second series of support members 34 of screen element 616. The additional third series of reinforcement members 134 of screen element 616 are shown interposed between neighboring reinforcement members 34 of the second series of reinforcement members 34. Collectively, the second series of reinforcement members 34 combined with the third series of reinforcement members 134 of screen element 616 represents a larger linear density of reinforcement members, in contrast to the linear density of second reinforcement members 34 of screen member 516. As described above, regarding the case of the linear density of reinforcement members 132, the greater linear density of reinforcement members, 34 and 132, of screen element 616 provides greater structural strength to screen element 616 in comparison to screen element 516.

FIGS. 71 and 71A compare center subgrid unit 818 (of FIG. 71) with an alternative embodiment center subgrid unit 918 (of FIG. 71A) having additional structural support features. The additional structural support features of center subgrid 918 correspond to and provide additional support for the third series of reinforcement members 134 of screen element 616, as described in greater detail below.

Center subgrid 918 may be thermoplastic (or other suitably chosen material) injection molded and may include similar features to those found in center subgrid unit 818. For example, center subgrid 918 includes a plurality of elongated location members 444, a plurality of fusion bars 476, and a plurality of shortened fusion bars 478. Further, center subgrid 918 includes parallel subgrid end members 136, and parallel subgrid side members 138 that are substantially perpendicular to the subgrid end members 136. Center subgrid 918 may also have clips 242 similar to those of center subgrid 818 (e.g., see FIG. 65) and to those of pyramidal shaped center subgrid 558 (e.g., see FIGS. 63 and 63A).

Like center subgrid 818, center subgrid 918 has a secondary support framework 488 spanning across grid openings 50 (e.g., see grid openings 50 of FIG. 65A). In contrast to center subgrid 818, however, center subgrid 918 has an additional tertiary support framework 588 as shown in greater detail in FIGS. 71B, 71C, 71D, and 71F.

FIG. 71B shows an enlarged view of the region "A" of FIG. 71A. The view of FIG. 71B illustrates two members of secondary support framework 488 that are parallel to end members 136 and two members of secondary framework 488 that are parallel to side members 138. The additional tertiary support framework 588 includes members that are parallel to end members 136 and are interspersed between adjacent members of secondary framework 488 that are parallel to end members 136. The combination of secondary framework 488 and tertiary framework 588 collectively results in a framework that has an increased linear density of support members along a direction parallel to side members 138. The additional support members of tertiary support framework 588 correspond to, and provide support to the third series of reinforcement members 134 of screen element 616 (e.g., see FIG. 70A), as described in greater detail below. Similarly, support members of secondary support framework 488 that are parallel to end members 136 support the corresponding second series of support members 34 of screen element 616.

FIG. 71C illustrates a top-down view of center subgrid 918 and FIG. 71D illustrates a side view of center subgrid 918. Center subgrid 918 includes secondary support framework 488 as does center subgrid 818. In contrast to center subgrid 818, however, center subgrid 918 includes tertiary support framework 588, as described above. Both FIGS. 71C and 71D show members of tertiary support framework 588 interspersed between adjacent members of secondary support framework 488 that are parallel to end members 136. As mentioned above, the combination of secondary framework 488 and tertiary framework 588 collectively results in a framework that has an increased linear density of support members along a direction parallel to side members 138.

FIGS. 71E and 71F illustrate a correspondence between reinforcement members of screen elements 516 and 616 and corresponding members of support frameworks 488 and 588, respectively. For clarity of comparison, screen 516 is placed next to center subgrid 818 in FIG. 71E, and screen 616 is placed next to center subgrid 918 in FIG. 71F. In FIG. 71E, two reinforcement members 34 of screen element 516 are shown to spatially align with corresponding members of secondary support network 488 of center subgrid 818. Similarly, in FIG. 71F, two reinforcement members 34 of screen element 616 are shown to spatially align with corresponding members of secondary support network 488 of center subgrid 918. Further, FIG. 71F shows two members of third series of support members 134 that spatially align with corresponding members of tertiary support network 588 of center subgrid 918. As mentioned above, the additional tertiary support framework 588 includes members that are parallel to end members 136 and are interspersed between adjacent members of secondary framework 488 that are parallel to end members 136. As such, the combination of secondary framework 488 and tertiary framework 588 collectively results in a framework that has an increased linear density of support members along a direction parallel to side members 138.

The above discussion regarding end subgrids 818 and 918 may be generalized to other subgrid structures, including end sugrids, as well as pyramidal center, and end subgrids. For example, FIG. 72 illustrates pyramidal shaped end subgrid 558 having a grid framework with a first linear density of support members along a direction parallel to side member 64. The support members in FIGS. 72 and 72A are parallel to end member 62. FIG. 72A illustrates an alternate embodiment pyramidal shaped end subgrid 658 that includes a grid framework having a higher linear density of support members along a direction parallel to side member 64 in contrast to pyramidal shaped end subgrid 558 of FIG. 72. The additional support members of end subgrid 658 provide support for the reinforcement members of screen element 516 as follows.

FIG. 72B illustrates support members 688 of support framework of end subgrid 558 that spatially align with corresponding reinforcement members 34 of screen element 516. This alignment between support members 688 of pyramidal shaped end subgrid 558 and reinforcement members 34 of screen element 516 is similar to the way that support members 488 of center subgrid 818 aligned with reinforcement members 34 of screen element 516 in FIG. 71E.

Similarly, pyramidal shaped end subgrid 658, shown in FIG. 71F, has support members 688 that spatially align with corresponding reinforcement members 34 of screen element 616. In contrast to pyramidal shaped end subgrid 558, however, pyramidal shaped end subgrid 658 includes additional support members 788. As shown in FIG. 72C, support members 788 of pyramidal shaped end subgrid 658 spatially align with reinforcement members 134 of screen element 616. In this regard, pyramidal shaped end subgrid 658 provides additional structural support to screen element 516 than pyramidal shaped end subgrid 558 provides to screen element 416.

The following discussion provides further details of screen element 616 with reference to FIGS. 73 to 73D and 74 to 74D. As mentioned above, screen element 616 is similar to screen element 516 in that it is twice as long and half as wide as screen element 416 (e.g., compare relative dimensions of screen elements 416 in FIG. 61 to screen element 516 in FIG. 67). The smaller width allows manufacturing of screens 616 having smaller features such as smaller screening openings 86 and smaller surface elements 84 (e.g., see FIG. 2D).

FIG. 73 illustrates a top-down view of a screen element 616, previously illustrated, for example, in FIGS. 70A, 71F, and 72C. FIG. 73 defines a first cross section direction A to A and a second cross section direction C to C. FIG. 73A illustrates a first cross section of the screen element 616 of FIG. 73 defined by the first cross section direction A to A of FIG. 73. The view of FIG. 73A is drawn with a 2:1 scale. Cross section A to A of FIG. 73A illustrates a plurality of reinforcement members 132 (e.g., see the discussion related to FIG. 70A) that are parallel to side edges 122 of screen element 616. FIG. 73B illustrates an enlarged view of a portion "B" of the first cross section illustrated in FIG. 73A. FIG. 73B also shows reinforcement members 132.

FIG. 73C illustrates a second cross section of the screen element 616 of FIG. 73 defined by the second cross section direction C to C of FIG. 73. The view of FIG. 73C is drawn with a 2:1 scale and illustrates reinforcement members 34 and 134 (e.g., see the discussion related to FIGS. 70A, 71F, and 72C) that are parallel to end portions 120 of screen element 616. FIG. 73D illustrates an enlarged view of the second cross section of screen element 616 illustrated in FIG. 73C. FIG. 73D illustrates a plurality of screening openings 86 and surface elements 84, in addition to the reinforcement members 34 and 134 shown in FIG. 73C. Details of the screening openings 86 and surface elements 84 are described in greater detail below with reference to FIGS. 74C and 74D.

FIG. 74 illustrates a top-down view of the center screen subassembly formed by attaching screen element 616 to an end subgrid unit 818, similar to screen subassembly 960 shown in FIG. 68A. FIG. 74 defines a cross sectional direction A to A, which is used to define views in FIGS. 74B, 74C, and 74D. FIG. 74A illustrates a side view of center screen subassembly 960 of FIG. 74 showing screen element 616 and end subgrid unit 818. For the purpose of illustration, screen element 616 is shown positioned slightly above end subgrid unit 818.

FIG. 74B illustrates a cross section of the center screen subassembly of FIG. 74 defined by the cross section direction A to A of FIG. 74. FIG. 74B also illustrates a region of detail "B" that is enlarged in FIGS. 74C and 74D. Elements of support frameworks 488 and 558 are also shown. As described above, elements of support frameworks 488 and 588 spatially align and provide support for reinforcement members 34 and 134 of screen element 516, respectively.

FIG. 74C illustrates an enlarged view of the portion "B" of the cross section of center screen subassembly of FIG. 74B. FIG. 74C shows detail similar to that shown in FIG. 10C. In this regard, FIG. 74C illustrates a subgrid end member 36, a secondary subgrid support member 488, and a tertiary subgrid support framework 588 (e.g., see FIGS. 71, 71A, 71B, 71C, 71D and 71F). FIG. 74C also illustrates reinforcement members 34 and 134, shown above in FIG. 73D. The detail region labeled "C" in FIG. 74C shown in an enlarged view in FIG. 74D.

FIG. 74D illustrates a cross sectional view of a plurality of surface elements 84 separated by a series of screening openings 86. As described above with reference to FIG. 2D, surface elements 84 have a thickness T, which may vary depending on the screening application and configuration of the screening openings 86. T may be chosen depending on the open screening area desired and the width W of screening openings 86. The screening openings 86 are elongated slots having a length L and a width W (e.g., see FIG. 2D), which may be varied for a chosen configuration. The slots, having length L (e.g., see FIG. 2D for definition of L, not shown in FIG. 74D), extend substantially into the plane of FIG. 74D and are shown horizontally in FIG. 2D.

Table 1. (below) illustrates the percent open area of example embodiments of screen assemblies including screen element 616, as a function of parameters W, T, and L, describing the width of screen openings 86, the width of surface elements 84, and the length of screen openings 86, respectively. As described above, the percent open area shown below is achieved by generating example screen assemblies that include elements 616 and example subgrid structures (e.g., subgrids 818 and 918) having corresponding structural elements to support screen elements 616. In this way, appropriately designed screen elements 616 and subgrid structures (e.g., subgrids 818 and 918) work together to maximize open screening area.

In this example, surface elements 84 have a fixed thickness T=0.014 in. Screening openings 86 have a fixed length L=0.076 in and variable width W. As may be expected, for a fixed number of screen openings 86, the percent open area decreases with the width W of each screen opening 86. In this example, the percent open area varies from a minimum of 6.2% open area, for the smallest width W=0.0017 in, to a maximum of 23.3% open area for the largest width W=0.0071.

TABLE 1

| mesh | W (in) | T (in) | L (in) | % open area |
|---|---|---|---|---|
| 80  | 0.0071 | 0.014 | 0.076 | 23.3 |
| 100 | 0.0059 | 0.014 | 0.076 | 20.3 |
| 120 | 0.0049 | 0.014 | 0.076 | 17.6 |
| 140 | 0.0041 | 0.014 | 0.076 | 13.4 |
| 170 | 0.0035 | 0.014 | 0.076 | 12.2 |
| 200 | 0.0029 | 0.014 | 0.076 | 10.3 |
| 230 | 0.0025 | 0.014 | 0.076 | 9.1 |
| 270 | 0.0021 | 0.014 | 0.076 | 7.9 |
| 325 | 0.0017 | 0.014 | 0.076 | 6.2 |

Table 2. (below) illustrates the percent open area of further example embodiments of screen assemblies including screen element 616, as a function of parameters W, T, and L. As described above, the percent open area shown below is achieved by generating example screen assemblies that include elements 616 and example subgrid structures (e.g., subgrids 818 and 918) having corresponding structural elements to support screen elements 616.

Table 2 illustrates the effect of reducing the length L of screening openings 86 and reducing the width T of surface elements 84 so that screen element 616 may include more screen elements. In this example, surface elements 84 have a fixed thickness T=0.007 in. Screening openings 86 have a fixed length L=0.046 in and variable width W. The resulting percent open area varies from a minimum of 10.1% open area, for the smallest width W=0.0017 in, to a maximum of 27.3% open area for the largest width W=0.0071. Thus, the maximum percent open area is increased from 23.3% to 27.3% by reducing T from 0.014 in to 0.007 in, and by reducing L from 0.076 in to 0.046 in, as seen by comparing the results of Table 2 with those of Table 1. As mentioned above, the increase in maximum percent open area occurs because when the screening openings 86 and surface features are reduced in size, more screening openings may be included on screen element 516.

TABLE 2

| mesh | W (in) | T (in) | L (in) | % open area |
|---|---|---|---|---|
| 80 | 0.0071 | 0.007 | 0.046 | 27.3 |
| 100 | 0.0059 | 0.007 | 0.046 | 25.2 |
| 120 | 0.0049 | 0.007 | 0.046 | 23.1 |
| 140 | 0.0041 | 0.007 | 0.046 | 20.5 |
| 170 | 0.0035 | 0.007 | 0.046 | 18.5 |
| 200 | 0.0029 | 0.007 | 0.046 | 16.5 |
| 230 | 0.0025 | 0.007 | 0.046 | 14.9 |
| 270 | 0.0021 | 0.007 | 0.046 | 12.8 |
| 325 | 0.0017 | 0.007 | 0.046 | 10.1 |

Table 3. (below) illustrates the percent open area of further example embodiments of screen assemblies including screen element 616, as a function of parameters W, T, and L. As described above, the percent open area shown below is achieved by generating example screen assemblies that include elements 616 and example subgrid structures (e.g., subgrids 818 and 918) having corresponding structural elements to support screen elements 616.

Table 3 shows that the trend may be continued. In this example, surface elements 84 have a fixed thickness T=0.005 in. Screening openings 86 have a fixed length L=0.032 in and variable width W. The resulting percent open area varies from a minimum of 12.1% open area, for the smallest width W=0.0017 in, to a maximum of 31.4% open area for the largest width W=0.0071. Thus, by reducing T from 0.007 in to 0.005 in, and by reducing L from 0.046 in to 0.032 in, the maximum percent open area is increased from 27.3% to 31.4%, as seen by comparing the results of Table 3 with those of Table 2.

TABLE 3

| mesh | W (in) | T (in) | L (in) | % open area |
|---|---|---|---|---|
| 80 | 0.0071 | 0.005 | 0.032 | 31.4 |
| 100 | 0.0059 | 0.005 | 0.032 | 29.3 |
| 120 | 0.0049 | 0.005 | 0.032 | 27.0 |
| 140 | 0.0041 | 0.005 | 0.032 | 24.1 |
| 170 | 0.0035 | 0.005 | 0.032 | 22.0 |
| 200 | 0.0029 | 0.005 | 0.032 | 19.7 |
| 230 | 0.0025 | 0.005 | 0.032 | 16.4 |
| 270 | 0.0021 | 0.005 | 0.032 | 14.7 |
| 325 | 0.0017 | 0.005 | 0.032 | 12.1 |

Table 4. (below) illustrates the percent open area of further example embodiments of screen assemblies including screen element 616, as a function of parameters W, T, and L. As described above, the percent open area shown below is achieved by generating example screen assemblies that include elements 616 and example subgrid structures (e.g., subgrids 818 and 918) having corresponding structural elements to support screen elements 616.

Table 4 shows further increase in percent open area as T and L are reduced. In this example, surface elements 84 have a fixed thickness T=0.003 in. Screening openings 86 have a fixed length L=0.028 in and variable width W. The resulting percent open area varies from a minimum of 13.2% open area, for the smallest width W=0.0017 in, to a maximum of 32.2% open area for the largest width W=0.0071. Thus, by reducing T from 0.005 in to 0.003 in, and by reducing L from 0.032 in to 0.028 in, the maximum percent open area is increased from 31.4% to 32.2%, as seen by comparing the results of Table 4 with those of Table 3.

TABLE 4

| mesh | W (in) | T (in) | L (in) | % open area |
|---|---|---|---|---|
| 80 | 0.0071 | 0.003 | 0.028 | 32.2 |
| 100 | 0.0059 | 0.003 | 0.028 | 30.1 |
| 120 | 0.0049 | 0.003 | 0.028 | 27.8 |
| 140 | 0.0041 | 0.003 | 0.028 | 25.2 |
| 170 | 0.0035 | 0.003 | 0.028 | 23.1 |
| 200 | 0.0029 | 0.003 | 0.028 | 20.1 |
| 230 | 0.0025 | 0.003 | 0.028 | 17.2 |
| 270 | 0.0021 | 0.003 | 0.028 | 15.3 |
| 325 | 0.0017 | 0.003 | 0.028 | 13.2 |

According to embodiments, multiple subassemblies may be secured together to form screen assemblies having a desired total screening area. For example, multiple subgrids secured together to form the screen assembly having a screening surface that has a total screening area in a range of approximately 0.4 m² to 6.0 m². In various embodiments, screen assemblies may be constructed having total screening areas of: 0.41 m², 0.68 m², 0.94 m², 3.75 m², 4.08 m², 4.89 m², and 5.44 m². In further example embodiments, screen assemblies may be constructed having virtually any total screening area by appropriate choice of a size of screening subassemblies and a total number of screening subassemblies.

FIGS. 75 and 76 illustrate different embodiments in which alternate strategies may be employed for combining screen elements to form screening assemblies. FIG. 75, for example, illustrates as system including a first 702 and a second 704 plurality of rails. The first plurality 702 of rails may be configured to be substantially parallel to one another. Likewise, the second 704 plurality of rails may be configured to be substantially parallel to one another. Further, the first plurality of rails may be configured to be substantially perpendicular to the second plurality 704 of rails. In this way, the first 702 and second 704 plurality of rails forms a rectangular grid framework.

Rather than binding screen subassemblies (e.g., subassembly 760 of FIG. 62A, subassembly 860 of FIG. 67A, etc) together using clips (e.g., clips 42 of FIG. 3, clips 142 of FIG. 60, clips 242 of FIG. 63, etc.), to form screen assemblies (e.g., screen assembly 10 of FIG. 1, screen assembly 410 of FIG. 47, screen assembly 510 of FIG. 58, etc.), screen assemblies may be formed by attaching screen subassemblies to rails 702 and 704. In this example, FIG. 75 illustrates screen subassemblies 706a, 706b, 706c, 706d, and 706e that have been attached to rectangular regions formed by the grid framework formed by the first 702 and second 704 pluralities of rails. Additional screen subassemblies may further be attached to additional open areas, such as open areas 708a, 708b, etc., of the grid framework of FIG. 75.

FIG. 76 illustrates a further embodiment in which screen elements may be attached directly to a plate structure 752 without the need to first attach the screen elements to subgrids. In this example, a plate 752 may be provided that has a plurality of window apertures 753a, 753b, 753c, and 753d. The window apertures 753a to 753d may be formed into the plate structure 752 by removing portions of the plate 752 material so that window apertures 753a to 753d include respective grid frameworks 754a, 754b, 754c, and 754d. The grid frameworks 754a, 754b, 754c, and 754d may serve as structures that may provide support for screen elements that may be attached thereto. In this way, the grid frameworks 754a, 754b, 754c, and 754d may act in the same way as the above-described subgrids of other embodiments. The window apertures 753*a* to 753*d* are shown as an exemplary embodiment of the concept. In other embodiments, plate structure 752 may have many more window apertures that may be closely spaced so that a screen assembly may be formed having large open area as described above with reference to other embodiments.

FIG. 76A illustrates screen elements 786 configured to be directly attached to a punched plate 780, according to an embodiment. In this embodiment, plate 780 may be a metal plate that has been mechanically punched to remove material to create apertures 782*a*, 782*b*, 782*c*, etc. In this example, apertures 782*a*, 782*b*, and 782*c*, etc., are rectangular apertures. In other embodiments, different shaped apertures may be provided. Plate 780 may be configured to be attached to a support structure 783. Support structure 783 may be a metal or plastic frame having a plurality of openings 784*a*, 784*b*, 784*c*, etc. Apertures 782*a*, 782*b*, and 782*c*, may be configured to accommodate a plurality of similarly sized screen elements 786.

In this example, screen element 786 may be a 1×6 screen element that may be similar to screen elements 516 and 616. A screen assembly may be generated by attaching a plurality of screening elements 786 to plate 780. In this regard, a plurality of screen elements 786 may attached to apertures 782*a*, 782*b*, and 782*c*, as indicated by arrows 788*a*, 788*b*, and 788*c*. Screen elements 786 may be attached to plate 780 by gluing edges of screen elements 786 to corresponding edges of apertures 782*a*, 782*b*, and 782*c*. Alternatively, screen elements 786 may molded into plate 780 by placing them into apertures 782*a*, 782*b*, 782*c*, etc., and pouring a thermoset material around their perimeters. In an alternative embodiment, screen elements 786 may have a size specifically designed so that screen elements 786 may be snapped into place into apertures 782*a*, 782*b*, and 782*c* and held in place by compressive forces exerted by edges of apertures 782*a*, 782*b*, 782*c*, etc.

FIG. 76B illustrates screen elements configured to be directly attached to a corrugated punched plate, according to an embodiment. In this example, plate 880 may have a corrugated shape. Plate 880 may be configured to be attached to a support structure 783 (e.g., see FIG. 76A). In this regard, plate 880 may have a plurality of flat surfaces 882*a*, 882*b*, 882*c*, etc. Flat surfaces 882*a*, 882*b*, 882*c*, etc., may be separated by raised features 884*a*, 884*b*, etc. Raised features 884*a*, 884*b*, etc., may include respective flat surfaces 886*a*, 886*b*, etc., as well as respective angled surfaces 888*a*, 888*b*, 888*c*, 888*d*, etc. Each of the flat surfaces 882*a*, 882*b*, 882*c*, etc., may include punched apertures, as described above with reference to FIG. 76A. Similarly, raised features 884*a*, 884*b*, etc., may include punched apertures on respective flat surfaces 886*a*, 886*b*, etc. Likewise, raised features 884*a*, 884*b*, etc., may include punched apertures on respective angled surfaces 888*a*, 888*b*, 888*c*, 888*d*, etc.

Each of the apertures on flat surfaces 882*a*, 882*b*, 882*c*, etc., on flat surfaces 886*a*, 886*b*, etc., and on angled surfaces 888*a*, 888*b*, 888*c*, 888*d*, etc., may be configured to accommodate screen elements, such as screen element 786 illustrated, for example, in FIG. 76A. As described above, screen elements 786 may be attached to apertures of corrugated plate 880 by gluing. Similarly, screen elements 786 may be molded into corrugated plate 880 by placing them into apertures and pouring a thermoset material around their perimeters. Similarly, screen elements 786 may be snapped into apertures and held in place by compressive forces.

FIG. 76C illustrates a frame 980 having pockets to accommodate screen elements, according to an embodiment. In this example, support structure 980 may be a thermoplastic molded frame. Support structure may be a single injection molded piece having a thickness 981 and may be configured to contain a plurality of apertures or pockets 982. In other embodiments, support structure 980 may be a metal frame. Thickness 981 may be about 0.125 inches to about 2 inches thick. In this example, pockets 982 are rectangular openings. In other embodiments, other shaped pockets may be provided. Pockets 982 may include edges 984 that may be configured to accommodate edges of a screen element 786. As shown in FIG. 76C, screen element may be placed over pockets 982 and may be attached to edges 984 by gluing. Similarly, as described above with reference to FIGS. 76A and 76B, screen element 786 may be molded into support structure 980 by placing screen elements 786 into pockets 982 and pouring a thermoset material around a perimeter of screen element 786 to thereby form a bond between edges of screen element 786 and edges 984 of pockets 982. Similarly, screen elements 786 may be snapped into apertures and held in place by compressive forces.

The embodiments of FIGS. 75 and 76 to 76C demonstrate that many different support structures may be provided for screen elements, in addition to the subgrid structures described above with reference to FIGS. 3 to 4A, 10, 10A, 11, 11A, 22, 22A, 23 to 24D, 34, 35, 49 to 57A, 59 to 63A, 64 to 65A, 67 to 68A, and 71 to 72C. A support structure need only provide sufficient mechanical and thermal stability to screening elements. The embodiments of FIGS. 75 and 76A to 76C may also allow a wider selection of materials to be used in generating screening members. In some embodiments, it may be advantageous to attach screen elements to subgrid structures using laser welding, as described in greater detail above. In this regard, certain subgrid structures (e.g., some of embodiments illustrated in FIGS. 3 to 4A, 10, 10A, 11, 11A, 22, 22A, 23 to 24D, 34, 35, 49 to 57A, 59 to 63A, 64 to 65A, 67 to 68A, and 71 to 72C) may have material properties that are complementary to the material properties of a screening element.

For embodiments in which screen elements are to be joined to subgrid structures using laser welding, screen elements should be optically transparent while subgrid structures should have optical properties that absorb electromagnetic radiation. In this way, laser light may pass through a screen element and may be absorbed by the optically absorbing material of the subgrid structure. Electromagnetic radiation absorbed by the subgrid structure generates heat that locally melts material of the subgrid structure. Upon cooling, a bond is formed between the screen element and the subgrid structure. The need to have an optically transparent screen element places constraints on material compositions used to generate screen elements. In this regard, glass fibers that are transparent may be used as reinforcing filler material. However, other filler materials such as carbon fibers should not be used as they are not transparent.

The embodiments of FIGS. 75 to 76C may use joining methods other than laser welding, such as gluing, as described above. Thus, using joining techniques that do not rely on laser welding removes the restriction that the screening elements should be optically transparent. In this regard, a wider selection of materials may be used to generate screening elements, such as carbon fibers mentioned above. Filler materials are generally used to strengthen material properties of screen elements, however, the presence of filler materials and other additives tends to degrade cut, abrasion, and tear resistance, properties of the material. Thus, depending on the support structure, the screening element may need more or less filler material. Therefore, certain material properties, such as cut, abrasion, and tear resistance, may be improved in situations requiring less filler material. For example, higher temperatures (e.g., >54° C. for mining operations, >90° C. for oil and gas operations) generally require more filler material to improve material strength. For situations involving lower temperatures and stronger support structures, however, less filler material may needed. For such situations, material properties such as cut, abrasion, and tear resistance, may be improved.

There are many ways to generate screening assemblies using support structures in embodiments illustrated in FIGS. 75 to 76C. For example, screen elements 786 may be attached to support structures illustrated in FIGS. 75 to 76C using automated processes, such as using robotic devices to generate screening assemblies. Further, although screening assemblies generated using subgrid structures (e.g., such as illustrated in FIGS. 3 to 4A, 10, 10A, 11, 11A, 22, 22A, 23 to 24D, 34, 35, 49 to 57A, 59 to 63A, 64 to 65A, 67 to 68A, and 71 to 72C) may be replaceable and removable, some screening assemblies may be permanently or semi-permanently attached to screening machines. For example, screening assemblies constructed using support structures illustrated, for example, in FIGS. 75 to 76C may be bolted or welded into a screening machine as a semi-permanent or permanent structure. Alternatively, embodiments illustrated in FIGS. 75 to 76C may also be configured to be removable and replaceable components of screening machines.

Many of the above-described embodiment subgrids have location members 444 and fusion bars 476 and 478 (e.g., see FIGS. 49, 59, 51, 52-55, 57, 59-65, 68, and 71-71B). Similarly, many of the above-described screen elements have location apertures, 424 and 524, and cavity pockets 472 (e.g, see FIGS. 45A-45E, 46, 48B, 48C, 66B, 66C, and 70A). According to the above-described embodiments, screen elements are aligned with subgrids by inserting location members 444 (of subgrids) into location apertures, 424 and 524 (of screen elements), so that fusion bars, 476 and 478 (of subgrids) reside within cavity pockets 472 (of screen elements). Screen elements may then attached to subgrids by melting (e.g., using laser welding, heat staking, etc.) fusion bars, 476 and 478, to fuse with cavity pockets 472 to form a bond.

The presence of location apertures, 424 and 525, in screen elements, however, may present problems when manufacturing screen elements using techniques involving thermoplastic injection molding. In this regard, the presence of location apertures, 424 and 524, may reduce the flow of thermoplastic material during the injection molding process.

FIGS. 77A, 77B, and 77C illustrate new embodiments in which location apertures (e.g., 424 and 525 of FIGS. 45A-45E, 46, 48B, 48C, 66B, 66C, and 70A) are eliminated from screen elements. According to new embodiments illustrated, for example, in FIGS. 77A, 77B, and 77C, cavity pockets and fusion bars may be re-designed to play a role formerly played by location apertures and location members, respectively, thus eliminating the need for separate location apertures in screen elements and location members in subgrids. FIG. 77A illustrates an embodiment fusion bar 544 having sharp corners 546a and 546b. FIG. 77B illustrates an embodiment cavity pocket having first 574a and second 574b approximately flat internal surfaces. Cavity pocket 572 is designed to be slightly larger than fusion bar 544 so that fusion bar 544 may fit within the shape of cavity pocket 572 when a screen element having cavity pocket 572 is place over a subgrid having fusion bar 544, as illustrated in FIG. 77C.

FIG. 77C illustrates an embodiment in which cavity pocket 572 acts as a location aperture and fusion bar 544 acts as a location member. In this regard, sharp points, 546a and 546b, of fusion bar 572 make contact with respective approximately flat internal surfaces 574a and 574b of cavity pocket 572. The size and shape of fusion bar 544 allows fusion bar 544 to make close contact with internal surfaces, 546a and 546b, of cavity pocket 572. According to this design, there is little freedom for relative motion between cavity pocket 572 and fusion bar 544. Thus, as shown in FIG. 77C, screen element may be properly aligned on a subgrid through the close tolerance of the alignment between fusion bar 544 and cavity pocket 572. In this regard, the need for separate location members and location apertures is eliminated.

The embodiments of the present invention described herein, including screening members and screening assemblies, may be configured for use with various different vibratory screening machines and parts thereof, including machines designed for wet and dry applications, machines having multi-tiered decks and/or multiple screening baskets, and machines having various screen attachment arrangements such as tensioning mechanisms (under and overmount), compression mechanisms, clamping mechanisms, magnetic mechanisms, etc. For example, the screen assemblies described in the present disclosure may be configured to be mounted on the vibratory screening machines described in U.S. Pat. Nos. 7,578,394; 5,332,101; 6,669,027; 6,431,366; and 6,820,748. Indeed, the screen assemblies described herein may include: side portions or binder bars including U-shaped members configured to receive overmount type tensioning members, e.g., as described in U.S. Pat. No. 5,332,101; side portions or binder bars including finger receiving apertures configured to receive undermount type tensioning, e.g., as described in U.S. Pat. No. 6,669,027; side members or binder bars for compression loading, e.g., as described in U.S. Pat. No. 7,578,394; or may be configured for attachment and loading on multi-tiered machines, e.g., such as the machines described in U.S. Pat. No. 6,431,366. The screen assemblies and/or screening elements may also be configured to include features described in U.S. patent application Ser. No. 12/460,200 (now U.S. Pat. No. 8,443,984), including the guide assembly technologies described therein and preformed panel technologies described therein. Still further, the screen assemblies and screening elements may be configured to be incorporated into the prescreening technologies (e.g., compatible with the mounting structures and screen configurations) described in U.S. patent application Ser. No. 12/051,658 (now U.S. Pat. No. 8,439,203). U.S. Pat. Nos. 7,578,394; 5,332,101; 4,882,054; 4,857,176; 6,669,027; 7,228,971; 6,431,366; and 6,820,748 and U.S. patent application Ser. No. 12/460,200 (now U.S. Pat. No. 8,443,984) and Ser. No. 12/051,658 (now U.S. Pat. No. 8,439,203), which, along with their related patent families and applications, and the patents and patent applications referenced in these documents, are expressly incorporated herein by reference hereto.

In the foregoing, example embodiments are described. It will, however, be evident that various modifications and changes may be made thereunto without departing from the broader spirit and scope hereof. The specification and drawings are accordingly to be regarded in an illustrative rather than in a restrictive sense.

What is claimed is:

1. A screen assembly, comprising:
a plurality of independently formed thermoplastic screen elements forming a screening surface, the screen elements having:
screening openings that are elongated slots having substantially uniform width W and substantially uniform length L; and
surface elements separating the screening openings, the surface elements having a thickness T that is approximately 70 µm≤T≤400 µm.

2. The screen assembly of claim 1, wherein each screen element is a single thermoplastic injection molded piece.

3. The screen assembly of claim 1, wherein the screen assembly has an open screening area of approximately 5% to approximately 35% of a total area of the screening surface.

4. The screen assembly of claim 1, wherein the length L of the screening openings is approximately 0.7 mm≤L≤2 mm.

5. The screen assembly of claim 1, wherein the width W of the screening openings is approximately 40 µm≤W≤200 µm.

6. The screen assembly of claim 5, wherein:
the surface element thickness is T≈356 µm;
the length of the screening openings is L≈1.9 mm; and
the open screening area varies from approximately 6% to approximately 24% as the width W of the screening openings varies from approximately 45 µm to approximately 180 µm.

7. The screen assembly of claim 5, wherein:
the surface element thickness is T≈178 µm;
the length of the screening openings is L≈1.2 mm; and
the open screening area varies from approximately 10% to approximately 28% as the width W of the screening openings varies from approximately 45 µm to approximately 180 µm.

8. The screen assembly of claim 5, wherein:
the surface element thickness is T≈127 µm;
the length of the screening openings is L≈0.8 mm; and
the open screening area varies from approximately 12% to approximately 32% as the width W of the screening openings varies from approximately 45 µm to approximately 180 µm.

9. The screen assembly of claim 5, wherein:
the surface element thickness is T≈76 µm;
the length of the screening openings is L≈0.7 mm; and
the open screening area varies from approximately 13% to approximately 33% as the width W of the screening openings varies from approximately 45 µm to approximately 180 µm.

10. The screen assembly of claim 1, further comprising:
a support structure having support structure openings,
wherein at least one of the screen elements is secured to the support structure over support structure openings.

11. The screen assembly of claim 10, wherein multiple screen elements are secured to the support structure over the support structure openings such that the screening surface is a continuous screening surface.

12. The screen assembly of claim 10, wherein:
the support structure is a subgrid, and
one or more screen elements are secured to the subgrid by laser welding.

13. The screen assembly of claim 12, wherein:
the subgrid includes multiple elongated subgrid structural members forming a grid framework having grid openings; and
screen elements each include a plurality of screen element support members,
wherein subgrid structural members are aligned with respective screen element support members so that the subgrid structural members provide mechanical support to the screen element support members.

14. The screen assembly of claim 13, wherein:
a spacing of subgrid structural members is configured to correspond to a spacing of screen element support members, and
the spacing of subgrid structural members and the spacing of screen element support members is a decreasing function of surface element thickness T.

15. The screen assembly of claim 14, wherein:
the screen assembly has an open screening area of approximately 5% to approximately 35% of a total area of the screening surface, and
the spacing of subgrid structural members and the spacing of screen element support members varies from a first value corresponding to open screening area of approximately 5%, to a second value corresponding to open screening area of approximately 35%, wherein the first value is larger than the second value.

16. The screen assembly of claim 12, wherein:
multiple independent subgrids are permanently secured to each other to form the screen assembly,
the screen assembly is an independent structure configured to be removably secured to a vibratory screening machine, and
the screen assembly has a continuous screen assembly screening surface having multiple screen element screening surfaces.

17. The screen assembly of claim 10, wherein the screen assembly is configured to withstand accelerations in a range from approximately 3G to approximately 9G, and to withstand compressive loading forces in a range from approximately 2,000 lb to approximately 3,000 lb.

18. A screen assembly, comprising:
a plurality of independently formed thermoplastic screen elements forming a screening surface, the screen elements having screening openings that are elongated slots having a substantially uniform width W that is approximately 40 µm≤W≤200 µm, and a substantially uniform length L that is approximately 0.7 mm≤L≤2 mm,
wherein the screen assembly has an open screening area of approximately 5% to approximately 35% of a total area of the screening surface.

19. The screen assembly of claim 18, further comprising:
surface elements separating the screening openings, the surface elements having a thickness T that is approximately 70 µm≤T≤400 µm.

20. The screen assembly of claim 18, further comprising:
a support structure having support structure openings,
wherein at least one of the screen elements is secured to the support structure over support structure openings.

21. The screen assembly of claim 20, wherein the screen assembly has a total screening area in a range of approximately 0.4 m² to 6.0 m².

22. The screen assembly of claim 20, wherein the screen assembly is configured to withstand accelerations in a range from approximately 3G to approximately 9G, and to withstand compressive loading forces in a range from approximately 2,000 lb to approximately 3,000 lb.

23. A method of fabricating a screen assembly, comprising:

injection molding a plurality of thermoplastic screen elements, the screen elements having:
  screening openings that are elongated slots having substantially uniform width W and substantially uniform length L; and
  surface elements separating the screening openings, the surface elements having a thickness T that is approximately 70 µm≤T≤400 µm; and
forming a screening surface that includes the plurality of screen elements.

24. The method of claim 23, further comprising:
injection molding each screen element to be a single thermoplastic injection molded piece.

25. The method of claim 23, further comprising:
injection molding the screen elements to have screening openings that have a length L that is approximately 0.7 mm≤L≤2 mm.

26. The method of claim 23, further comprising:
injection molding the screen elements to have screening openings that have a width W that is approximately 40 µm≤W≤200 µm.

27. The method of claim 23, further comprising:
securing at least one of the screen elements to a support structure, having support structure openings, to generate a screen assembly having a screening surface having an open screening area of approximately 5% to approximately 35% of a total area of the screening surface.

28. A method of fabricating a screen assembly, the method comprising:
injection molding a plurality of independently formed thermoplastic screen elements, the screen elements having:
  screening openings that are elongated slots having substantially a uniform width W that is approximately 40 µm≤W≤200 µm, and a substantially uniform length L that is approximately 0.7 mm≤L≤2 mm, forming a screening surface that includes the plurality of screen elements.

29. The method of claim 28, further comprising:
injection molding the screen elements to have surface elements separating the screening openings, the surface elements having a thickness T that is approximately 70 µm≤T≤400 µm.

30. The method of claim 28, further comprising:
securing at least one of the screen elements to a support structure, having support structure openings, to generate a screen assembly having a screening surface having an open screening area of approximately 5% to approximately 35% of a total area of the screening surface.

* * * * *